(12) United States Patent
Sakai et al.

(10) Patent No.: US 11,982,896 B2
(45) Date of Patent: *May 14, 2024

(54) LIQUID CRYSTAL DISPLAY DEVICE AND POLARIZING PLATE

(71) Applicant: SHARP KABUSHIKI KAISHA, Sakai (JP)

(72) Inventors: Akira Sakai, Sakai (JP); Yuichi Kawahira, Sakai (JP); Masahiro Hasegawa, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,913

(22) Filed: Feb. 7, 2023

(65) Prior Publication Data

US 2023/0185123 A1 Jun. 15, 2023

Related U.S. Application Data

(63) Continuation of application No. 17/332,443, filed on May 27, 2021, now Pat. No. 11,604,379.

(30) Foreign Application Priority Data

May 29, 2020 (JP) ................................ 2020-095061
Sep. 15, 2020 (JP) ................................ 2020-154960

(51) Int. Cl.
*G02F 1/1335* (2006.01)
*G02B 5/30* (2006.01)
*G02F 1/13363* (2006.01)

(52) U.S. Cl.
CPC ..... *G02F 1/133528* (2013.01); *G02B 5/3083* (2013.01); *G02F 1/133504* (2013.01); *G02F 1/133531* (2021.01); *G02F 1/13363* (2013.01)

(58) Field of Classification Search
CPC .. G02B 5/3083; G02B 5/3025; G02B 5/3033; G02F 1/13363; G02F 1/133638; G02F 1/133528; G02F 1/133531
See application file for complete search history.

(56) References Cited

U.S. PATENT DOCUMENTS

2008/0013323 A1 1/2008 Katsumoto et al.
2012/0140152 A1* 6/2012 Sakai .................. G02F 1/13363
                                                     359/489.07

(Continued)

FOREIGN PATENT DOCUMENTS

EP       1715375 A1 * 10/2006 ........... G02F 1/1391
JP       2008-003232 A      1/2008

(Continued)

OTHER PUBLICATIONS

Non-final Rejection dated Aug. 1, 2022 for U.S. Appl. No. 17/332,443 which is the parent application of the instant application.

(Continued)

*Primary Examiner* — Jia X Pan
(74) *Attorney, Agent, or Firm* — ScienBiziP, P.C.

(57) ABSTRACT

Provided is a liquid crystal display device and a polarizing plate capable of improving the contrast ratio in the front direction. The polarizing plate includes a pair of polarizers including a first polarizer and a second polarizer whose transmission axes are parallel to each other; a retarder between the paired polarizers; and a diffusion layer in at least one of a region between the paired polarizers or a region on a side without the retarder of the first polarizer.

20 Claims, 105 Drawing Sheets

(56) References Cited

U.S. PATENT DOCUMENTS

| | | | |
|---|---|---|---|
| 2015/0205157 A1 | 7/2015 | Sakai et al. | |
| 2018/0113334 A1 | 4/2018 | Fang et al. | |
| 2018/0210243 A1 | 7/2018 | Fang et al. | |
| 2018/0329245 A1* | 11/2018 | Robinson | G02F 1/134309 |
| 2018/0364405 A1 | 12/2018 | Chen et al. | |
| 2019/0196236 A1* | 6/2019 | Chen | G02F 1/1323 |

FOREIGN PATENT DOCUMENTS

| | | | |
|---|---|---|---|
| WO | 2012/090769 A1 | 7/2012 | |
| WO | WO-2012090769 A1 * | 7/2012 | G02B 27/281 |

OTHER PUBLICATIONS

Notice of Allowance dated Nov. 10, 2022 for U.S. Appl. No. 17/332,443 which is the parent application of the instant application.

* cited by examiner (Viewing surface side)

(Back surface side)

(Viewing surface side)

(Back surface side)

(Viewing surface side)

(Back surface side)

FIG.9A

| Comparative Example1 ||
|---|---|
| Schematic cross-sectional view | First polarizer 0°<br>Liquid crystal panel<br>Second polarizer 90°<br>Third polarizer 90°<br><br>First prism sheet 135°<br>Second prism sheet 45°<br>Diffusion sheet<br>Light guide plate/LED |
| First retarder | R (nm)<br>Rth (nm)<br>NZ<br>R450/R550<br>R650/R550 |
| Second retarder | R (nm)<br>Rth (nm)<br>NZ<br>R450/R550<br>R650/R550 |
| Third retarder | R (nm)<br>Rth (nm)<br>NZ<br>R450/R550<br>R650/R550 |
| Total Rth (nm) | 0 |
| Third polarizer | Reflective polarizer |

FIG.9B

| Comparative Example1 ||
|---|---|
| Polarizing louver viewing angle | 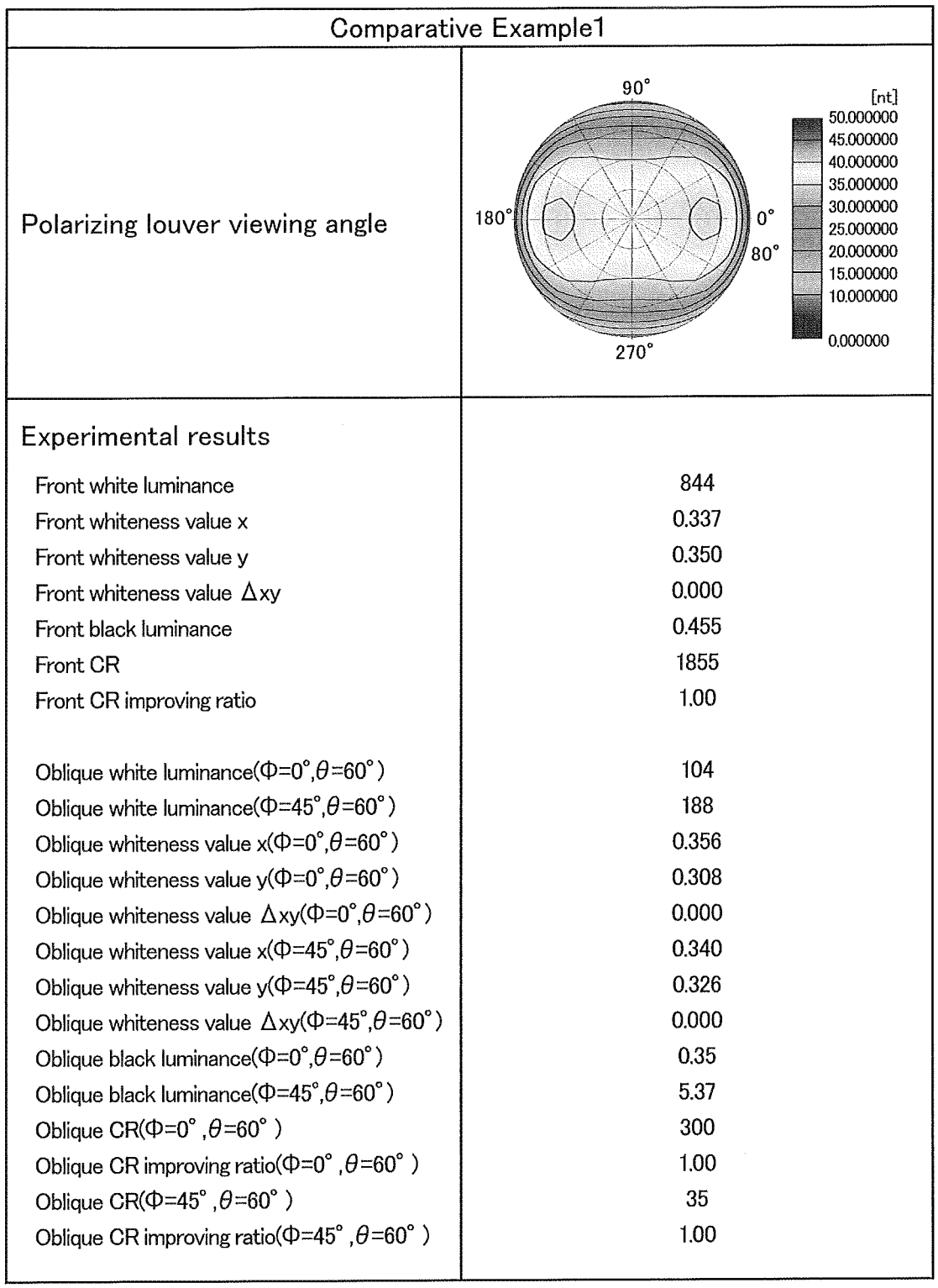 |
| Experimental results | |
| Front white luminance | 844 |
| Front whiteness value x | 0.337 |
| Front whiteness value y | 0.350 |
| Front whiteness value $\Delta xy$ | 0.000 |
| Front black luminance | 0.455 |
| Front CR | 1855 |
| Front CR improving ratio | 1.00 |
| | |
| Oblique white luminance($\Phi=0°, \theta=60°$) | 104 |
| Oblique white luminance($\Phi=45°, \theta=60°$) | 188 |
| Oblique whiteness value x($\Phi=0°, \theta=60°$) | 0.356 |
| Oblique whiteness value y($\Phi=0°, \theta=60°$) | 0.308 |
| Oblique whiteness value $\Delta xy$($\Phi=0°, \theta=60°$) | 0.000 |
| Oblique whiteness value x($\Phi=45°, \theta=60°$) | 0.340 |
| Oblique whiteness value y($\Phi=45°, \theta=60°$) | 0.326 |
| Oblique whiteness value $\Delta xy$($\Phi=45°, \theta=60°$) | 0.000 |
| Oblique black luminance($\Phi=0°, \theta=60°$) | 0.35 |
| Oblique black luminance($\Phi=45°, \theta=60°$) | 5.37 |
| Oblique CR($\Phi=0°, \theta=60°$) | 300 |
| Oblique CR improving ratio($\Phi=0°, \theta=60°$) | 1.00 |
| Oblique CR($\Phi=45°, \theta=60°$) | 35 |
| Oblique CR improving ratio($\Phi=45°, \theta=60°$) | 1.00 |

| Example1 | |
|---|---|
| Schematic cross-sectional view |  |
| First retarder | R (nm) 140<br>Rth (nm) −70<br>NZ 1.0<br>R450/R550 0.88<br>R650/R550 1.02 |
| Second retarder | R (nm) 140<br>Rth (nm) −70<br>NZ 1.0<br>R450/R550 0.88<br>R650/R550 1.02 |
| Third retarder | R (nm)<br>Rth (nm)<br>NZ<br>R450/R550<br>R650/R550 |
| Total Rth (nm) | −140 |
| Third polarizer | Reflective polarizer |

FIG.10B

| Example1 ||
|---|---|
| Polarizing louver viewing angle | 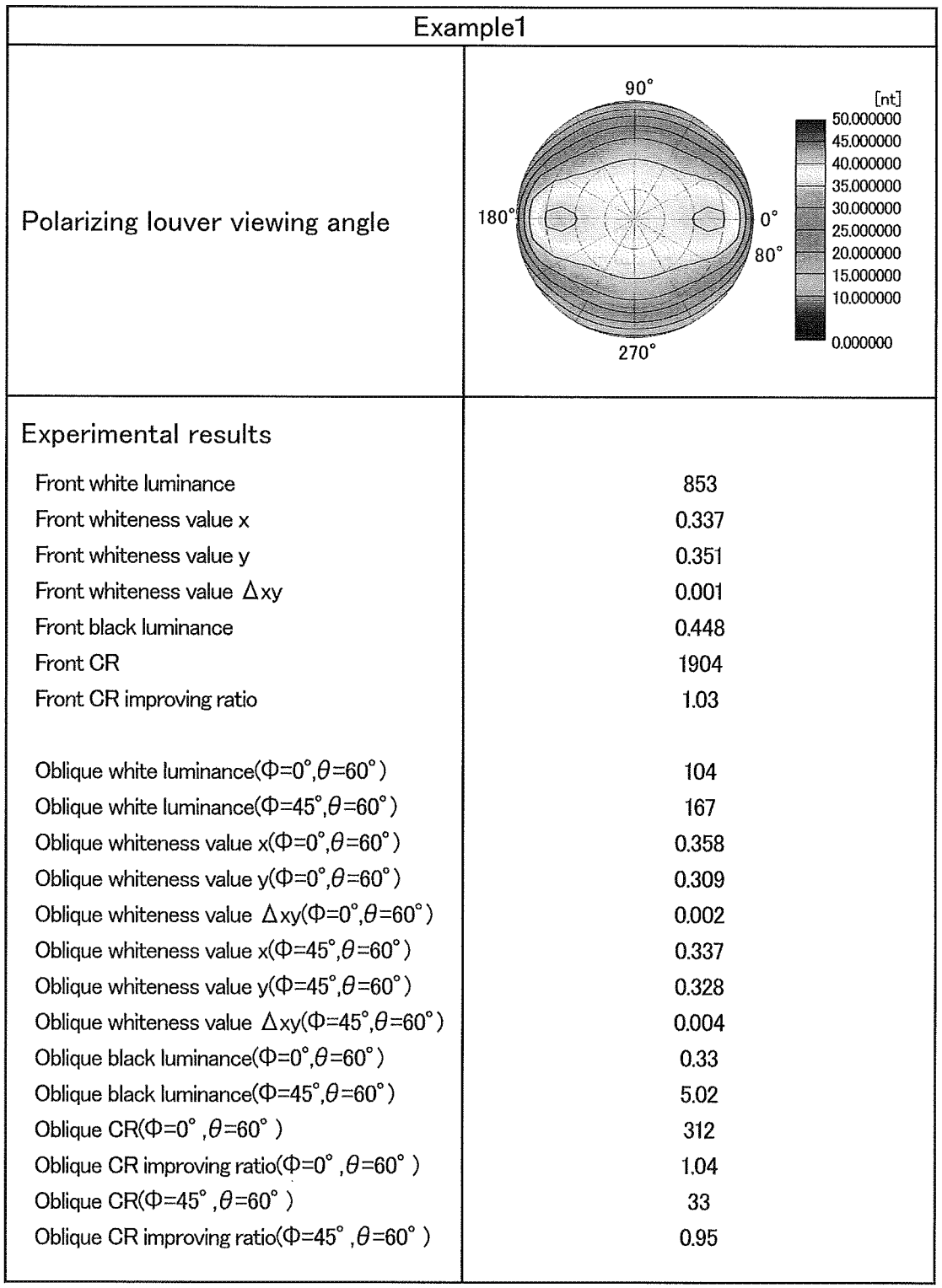 |
| Experimental results | |
| Front white luminance | 853 |
| Front whiteness value x | 0.337 |
| Front whiteness value y | 0.351 |
| Front whiteness value $\Delta xy$ | 0.001 |
| Front black luminance | 0.448 |
| Front CR | 1904 |
| Front CR improving ratio | 1.03 |
| | |
| Oblique white luminance($\Phi=0°, \theta=60°$) | 104 |
| Oblique white luminance($\Phi=45°, \theta=60°$) | 167 |
| Oblique whiteness value x($\Phi=0°, \theta=60°$) | 0.358 |
| Oblique whiteness value y($\Phi=0°, \theta=60°$) | 0.309 |
| Oblique whiteness value $\Delta xy$($\Phi=0°, \theta=60°$) | 0.002 |
| Oblique whiteness value x($\Phi=45°, \theta=60°$) | 0.337 |
| Oblique whiteness value y($\Phi=45°, \theta=60°$) | 0.328 |
| Oblique whiteness value $\Delta xy$($\Phi=45°, \theta=60°$) | 0.004 |
| Oblique black luminance($\Phi=0°, \theta=60°$) | 0.33 |
| Oblique black luminance($\Phi=45°, \theta=60°$) | 5.02 |
| Oblique CR($\Phi=0°, \theta=60°$) | 312 |
| Oblique CR improving ratio($\Phi=0°, \theta=60°$) | 1.04 |
| Oblique CR($\Phi=45°, \theta=60°$) | 33 |
| Oblique CR improving ratio($\Phi=45°, \theta=60°$) | 0.95 |

| Comparative Example2 | | |
|---|---|---|
| Schematic cross-sectional view |  | |
| First retarder | R (nm) | 140 |
| | Rth (nm) | −70 |
| | NZ | 1.0 |
| | R450/R550 | 0.88 |
| | R650/R550 | 1.02 |
| Second retarder | R (nm) | 140 |
| | Rth (nm) | −70 |
| | NZ | 1.0 |
| | R450/R550 | 0.88 |
| | R650/R550 | 1.02 |
| Third retarder | R (nm) | |
| | Rth (nm) | |
| | NZ | |
| | R450/R550 | |
| | R650/R550 | |
| Total Rth (nm) | | −140 |
| Third polarizer | | Reflective polarizer |

FIG.11B

| Comparative Example2 | |
|---|---|
| Polarizing louver viewing angle | 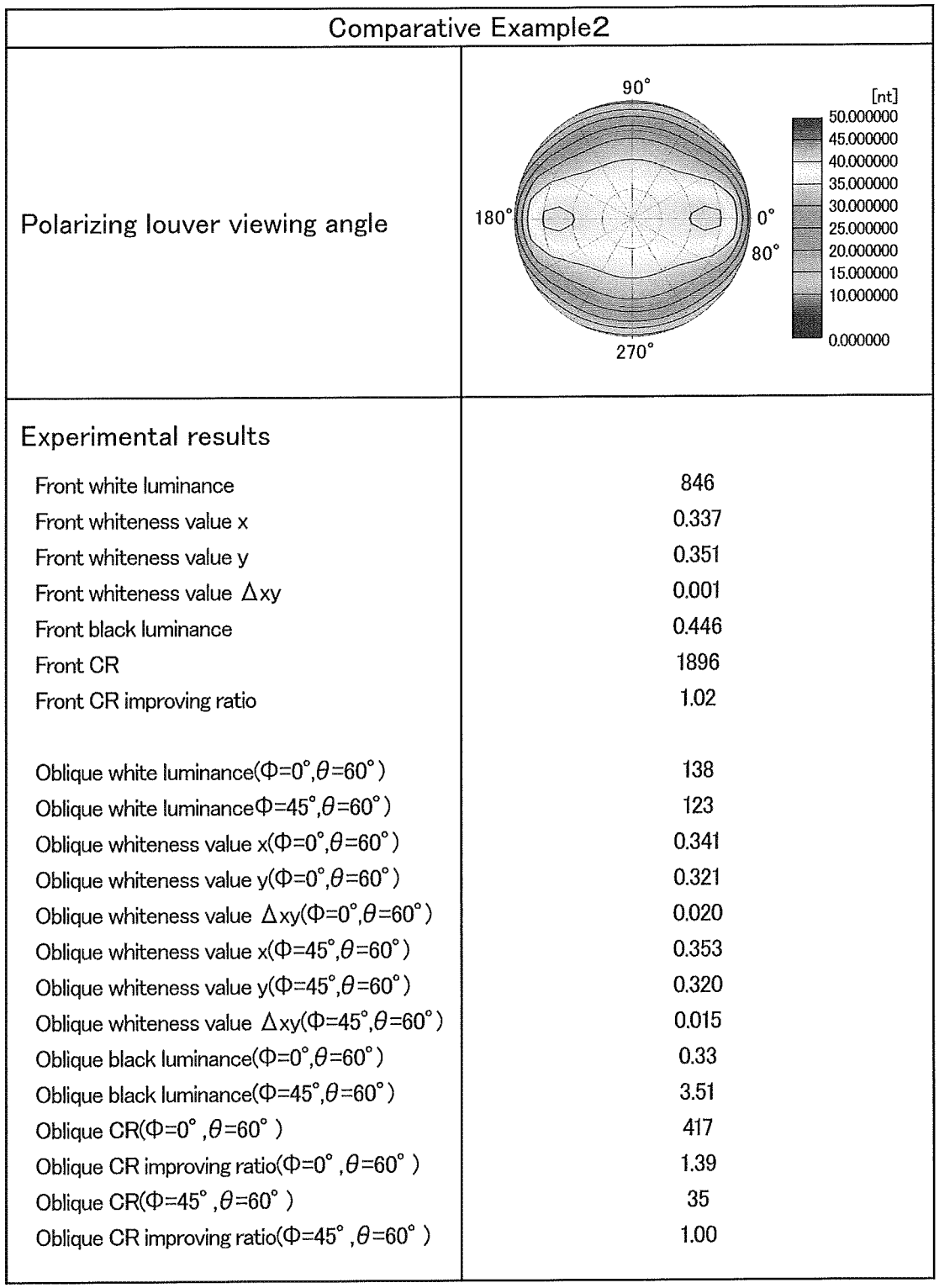 |
| Experimental results | |
| Front white luminance | 846 |
| Front whiteness value x | 0.337 |
| Front whiteness value y | 0.351 |
| Front whiteness value $\Delta xy$ | 0.001 |
| Front black luminance | 0.446 |
| Front CR | 1896 |
| Front CR improving ratio | 1.02 |
| | |
| Oblique white luminance($\Phi=0°, \theta=60°$) | 138 |
| Oblique white luminance($\Phi=45°, \theta=60°$) | 123 |
| Oblique whiteness value x($\Phi=0°, \theta=60°$) | 0.341 |
| Oblique whiteness value y($\Phi=0°, \theta=60°$) | 0.321 |
| Oblique whiteness value $\Delta xy$($\Phi=0°, \theta=60°$) | 0.020 |
| Oblique whiteness value x($\Phi=45°, \theta=60°$) | 0.353 |
| Oblique whiteness value y($\Phi=45°, \theta=60°$) | 0.320 |
| Oblique whiteness value $\Delta xy$($\Phi=45°, \theta=60°$) | 0.015 |
| Oblique black luminance($\Phi=0°, \theta=60°$) | 0.33 |
| Oblique black luminance($\Phi=45°, \theta=60°$) | 3.51 |
| Oblique CR($\Phi=0°, \theta=60°$) | 417 |
| Oblique CR improving ratio($\Phi=0°, \theta=60°$) | 1.39 |
| Oblique CR($\Phi=45°, \theta=60°$) | 35 |
| Oblique CR improving ratio($\Phi=45°, \theta=60°$) | 1.00 |

FIG.12A

| Example2 ||
|---|---|
| Schematic cross-sectional view | First polarizer 0°<br>Liquid crystal panel<br>Second polarizer 90°<br>First retarder 0°<br>Second retarder 0°<br>Third polarizer 90°<br><br>First prism sheet 135°<br>Second prism sheet 45°<br>Diffusion sheet<br>Light guide plate/LED |
| First retarder — R (nm)<br>Rth (nm)<br>NZ<br>R450/R550<br>R650/R550 | 55<br>−125<br>2.8<br>0.98<br>1.01 |
| Second retarder — R (nm)<br>Rth (nm)<br>NZ<br>R450/R550<br>R650/R550 | 55<br>−125<br>2.8<br>0.98<br>1.01 |
| Third retarder — R (nm)<br>Rth (nm)<br>NZ<br>R450/R550<br>R650/R550 | |
| Total Rth (nm) | −250 |
| Third polarizer | Reflective polarizer |

FIG.12B

| Example2 |||
|---|---|---|
| Polarizing louver viewing angle | 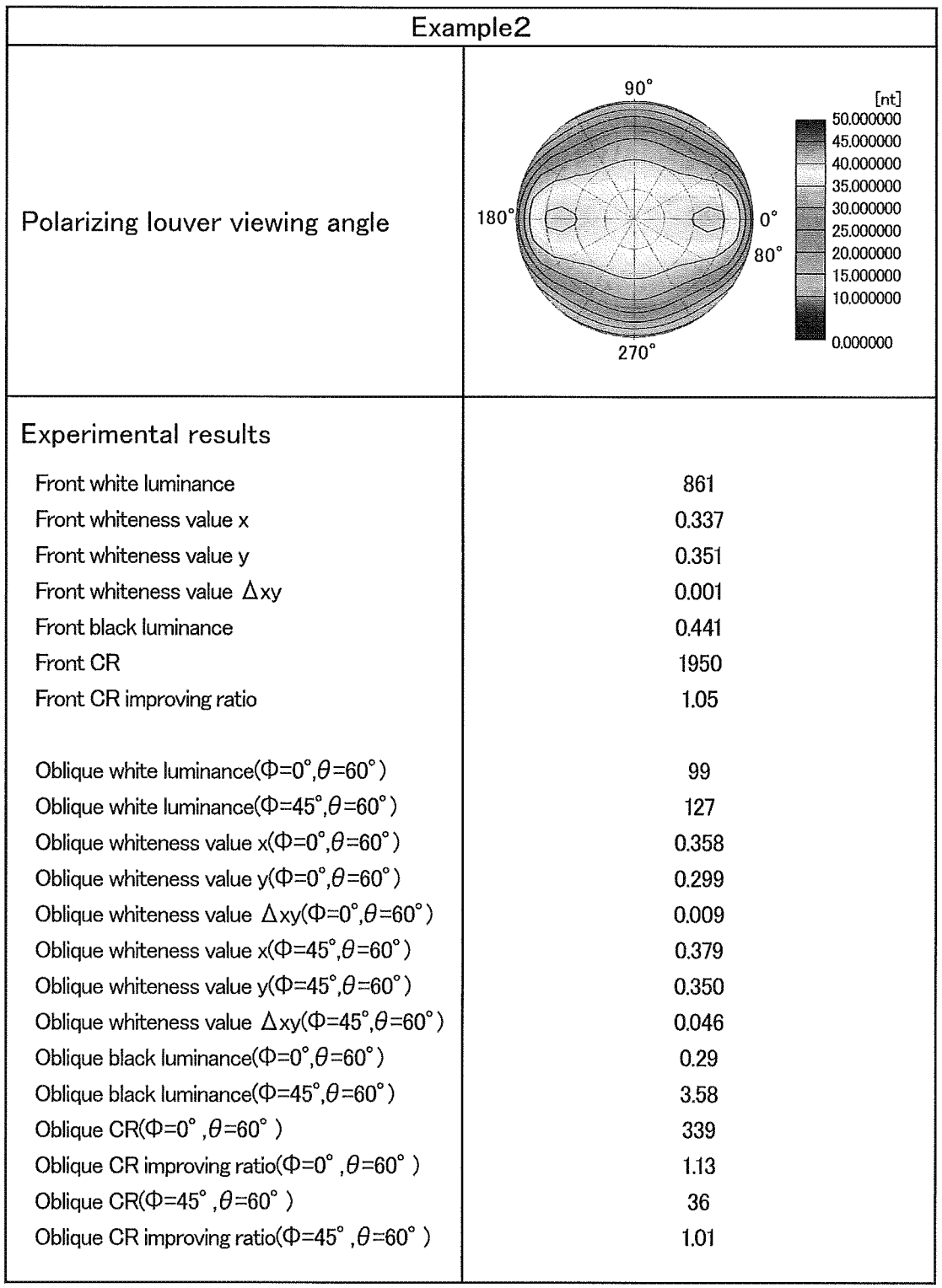 ||
| Experimental results |||
| Front white luminance | | 861 |
| Front whiteness value x | | 0.337 |
| Front whiteness value y | | 0.351 |
| Front whiteness value $\Delta xy$ | | 0.001 |
| Front black luminance | | 0.441 |
| Front CR | | 1950 |
| Front CR improving ratio | | 1.05 |
| Oblique white luminance($\Phi=0°, \theta=60°$) | | 99 |
| Oblique white luminance($\Phi=45°, \theta=60°$) | | 127 |
| Oblique whiteness value x($\Phi=0°, \theta=60°$) | | 0.358 |
| Oblique whiteness value y($\Phi=0°, \theta=60°$) | | 0.299 |
| Oblique whiteness value $\Delta xy$($\Phi=0°, \theta=60°$) | | 0.009 |
| Oblique whiteness value x($\Phi=45°, \theta=60°$) | | 0.379 |
| Oblique whiteness value y($\Phi=45°, \theta=60°$) | | 0.350 |
| Oblique whiteness value $\Delta xy$($\Phi=45°, \theta=60°$) | | 0.046 |
| Oblique black luminance($\Phi=0°, \theta=60°$) | | 0.29 |
| Oblique black luminance($\Phi=45°, \theta=60°$) | | 3.58 |
| Oblique CR($\Phi=0°, \theta=60°$) | | 339 |
| Oblique CR improving ratio($\Phi=0°, \theta=60°$) | | 1.13 |
| Oblique CR($\Phi=45°, \theta=60°$) | | 36 |
| Oblique CR improving ratio($\Phi=45°, \theta=60°$) | | 1.01 |

| Example3 ||
|---|---|
| Schematic cross-sectional view |  |
| First retarder | R (nm) 55<br>Rth (nm) −125<br>NZ 2.8<br>R450/R550 0.98<br>R650/R550 1.01 |
| Second retarder | R (nm) 55<br>Rth (nm) −125<br>NZ 2.8<br>R450/R550 0.98<br>R650/R550 1.01 |
| Third retarder | R (nm) 55<br>Rth (nm) −125<br>NZ 2.8<br>R450/R550 0.98<br>R650/R550 1.01 |
| Total Rth (nm) | −375 |
| Third polarizer | Reflective polarizer |

FIG.13B

| | Example3 |
|---|---|
| Polarizing louver viewing angle | 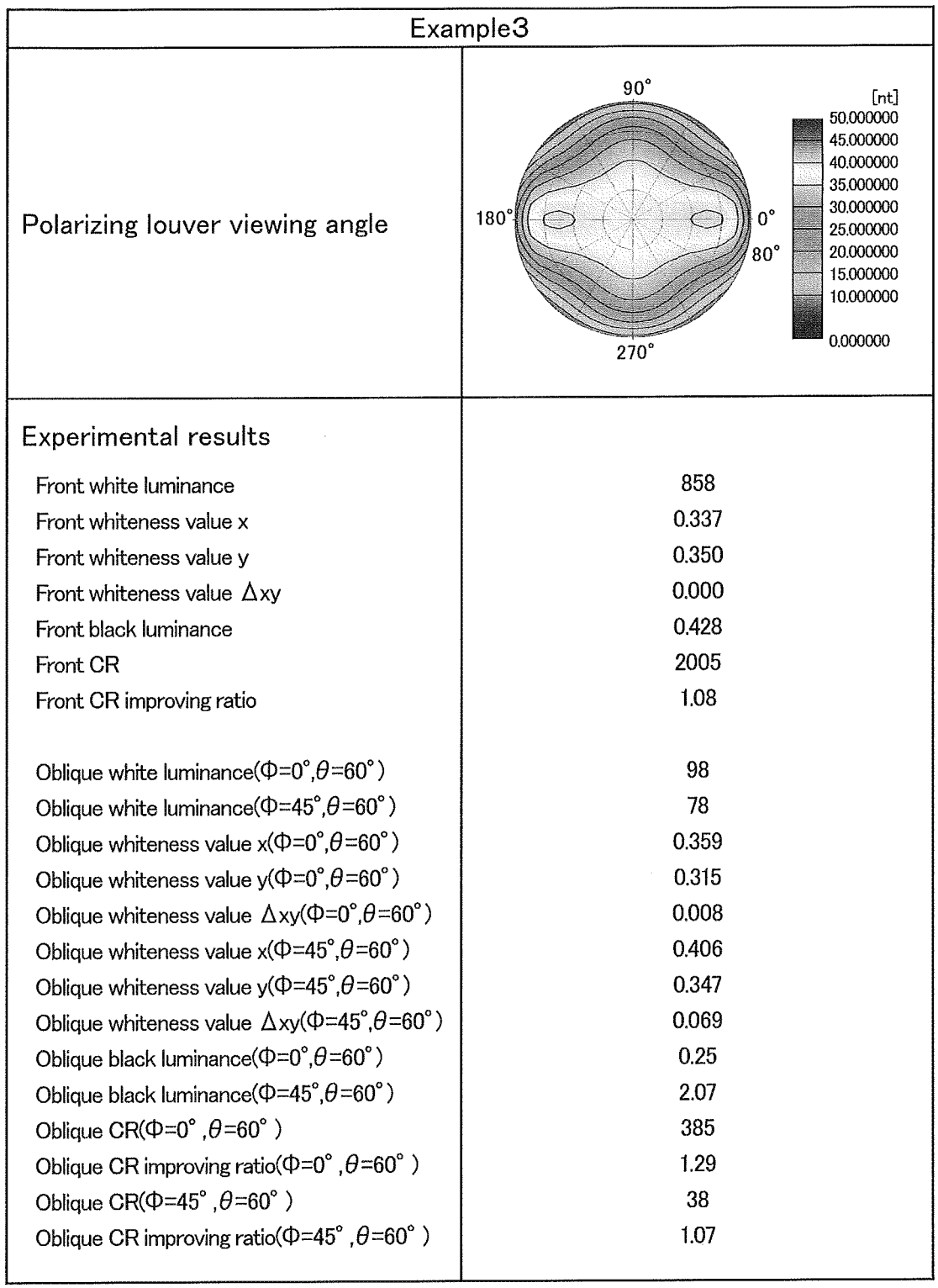 |
| Experimental results | |
| Front white luminance | 858 |
| Front whiteness value x | 0.337 |
| Front whiteness value y | 0.350 |
| Front whiteness value $\Delta xy$ | 0.000 |
| Front black luminance | 0.428 |
| Front CR | 2005 |
| Front CR improving ratio | 1.08 |
| | |
| Oblique white luminance($\Phi=0°, \theta=60°$) | 98 |
| Oblique white luminance($\Phi=45°, \theta=60°$) | 78 |
| Oblique whiteness value x($\Phi=0°, \theta=60°$) | 0.359 |
| Oblique whiteness value y($\Phi=0°, \theta=60°$) | 0.315 |
| Oblique whiteness value $\Delta xy$($\Phi=0°, \theta=60°$) | 0.008 |
| Oblique whiteness value x($\Phi=45°, \theta=60°$) | 0.406 |
| Oblique whiteness value y($\Phi=45°, \theta=60°$) | 0.347 |
| Oblique whiteness value $\Delta xy$($\Phi=45°, \theta=60°$) | 0.069 |
| Oblique black luminance($\Phi=0°, \theta=60°$) | 0.25 |
| Oblique black luminance($\Phi=45°, \theta=60°$) | 2.07 |
| Oblique CR($\Phi=0°, \theta=60°$) | 385 |
| Oblique CR improving ratio($\Phi=0°, \theta=60°$) | 1.29 |
| Oblique CR($\Phi=45°, \theta=60°$) | 38 |
| Oblique CR improving ratio($\Phi=45°, \theta=60°$) | 1.07 |

| Comparative Example3 ||
|---|---|
| Schematic cross-sectional view |  |
| First retarder | R (nm) 55<br>Rth (nm) −125<br>NZ 2.8<br>R450/R550 0.98<br>R650/R550 1.01 |
| Second retarder | R (nm) 55<br>Rth (nm) −125<br>NZ 2.8<br>R450/R550 0.98<br>R650/R550 1.01 |
| Third retarder | R (nm) 55<br>Rth (nm) −125<br>NZ 2.8<br>R450/R550 0.98<br>R650/R550 1.01 |
| Total Rth (nm) | −375 |
| Third polarizer | Reflective polarizer |

FIG.14B

| Comparative Example3 | |
|---|---|
| Polarizing louver viewing angle | 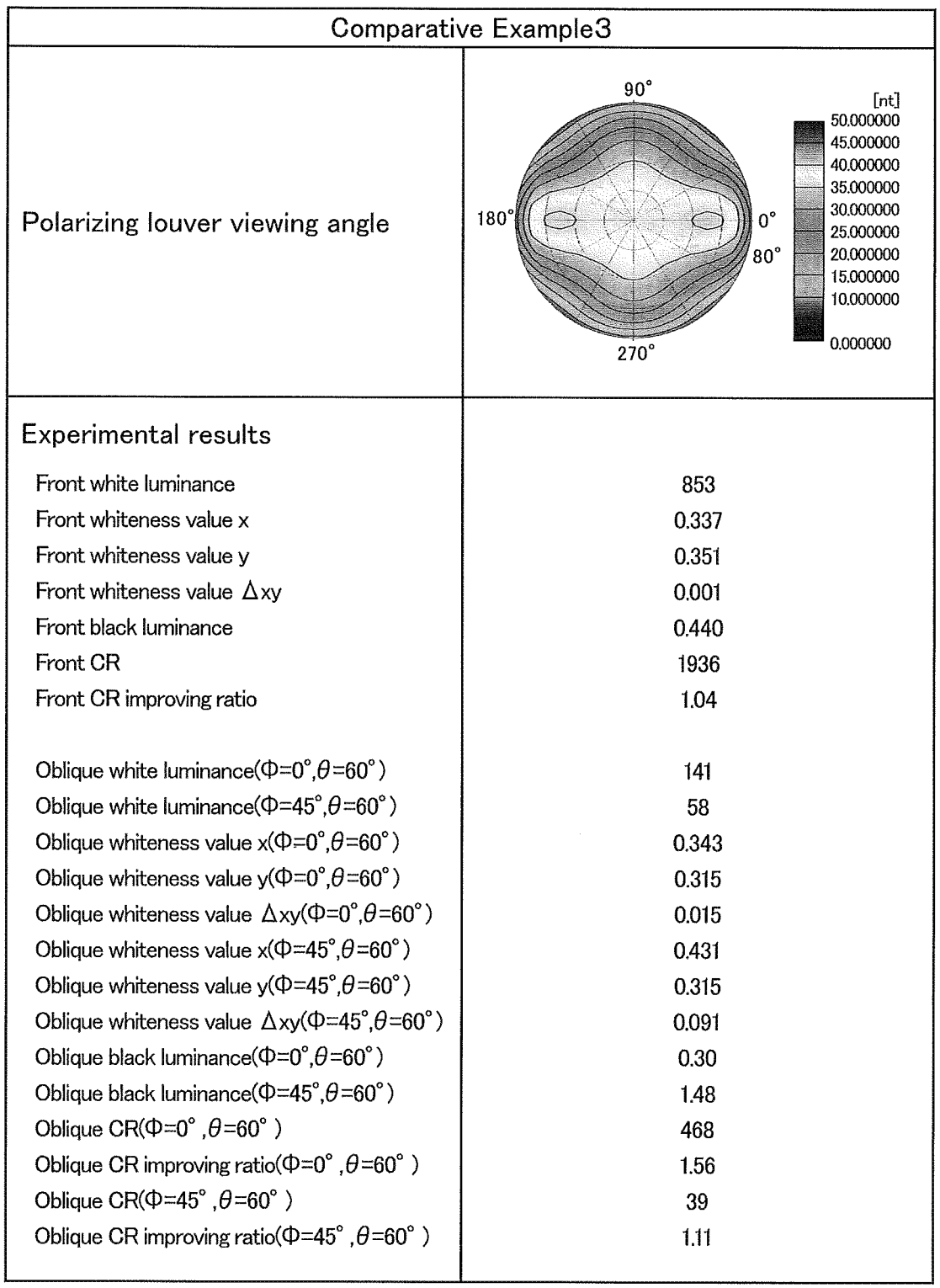 |
| Experimental results | |
| Front white luminance | 853 |
| Front whiteness value x | 0.337 |
| Front whiteness value y | 0.351 |
| Front whiteness value $\Delta xy$ | 0.001 |
| Front black luminance | 0.440 |
| Front CR | 1936 |
| Front CR improving ratio | 1.04 |
| | |
| Oblique white luminance($\Phi=0°, \theta=60°$) | 141 |
| Oblique white luminance($\Phi=45°, \theta=60°$) | 58 |
| Oblique whiteness value x($\Phi=0°, \theta=60°$) | 0.343 |
| Oblique whiteness value y($\Phi=0°, \theta=60°$) | 0.315 |
| Oblique whiteness value $\Delta xy$($\Phi=0°, \theta=60°$) | 0.015 |
| Oblique whiteness value x($\Phi=45°, \theta=60°$) | 0.431 |
| Oblique whiteness value y($\Phi=45°, \theta=60°$) | 0.315 |
| Oblique whiteness value $\Delta xy$($\Phi=45°, \theta=60°$) | 0.091 |
| Oblique black luminance($\Phi=0°, \theta=60°$) | 0.30 |
| Oblique black luminance($\Phi=45°, \theta=60°$) | 1.48 |
| Oblique CR($\Phi=0°, \theta=60°$) | 468 |
| Oblique CR improving ratio($\Phi=0°, \theta=60°$) | 1.56 |
| Oblique CR($\Phi=45°, \theta=60°$) | 39 |
| Oblique CR improving ratio($\Phi=45°, \theta=60°$) | 1.11 |

FIG.15A

| Example4 ||
|---|---|
| Schematic cross-sectional view | First polarizer 0°<br>Liquid crystal panel<br>Second polarizer 90°<br>First retarder 0°<br>Second retarder 0°<br>Third retarder 90°<br><br>First prism sheet 135°<br>Second prism sheet 45°<br>Diffusion sheet<br>Light guide plate/LED |
| First retarder | R (nm) 140<br>Rth (nm) −70<br>NZ 1.0<br>R450/R550 1.01<br>R650/R550 0.99 |
| Second retarder | R (nm) 140<br>Rth (nm) −70<br>NZ 1.0<br>R450/R550 1.01<br>R650/R550 0.99 |
| Third retarder | R (nm)<br>Rth (nm)<br>NZ<br>R450/R550<br>R650/R550 |
| Total Rth (nm) | −140 |
| Third polarizer | Reflective polarizer |

FIG.15B

| Example4 ||
|---|---|
| Polarizing louver viewing angle | 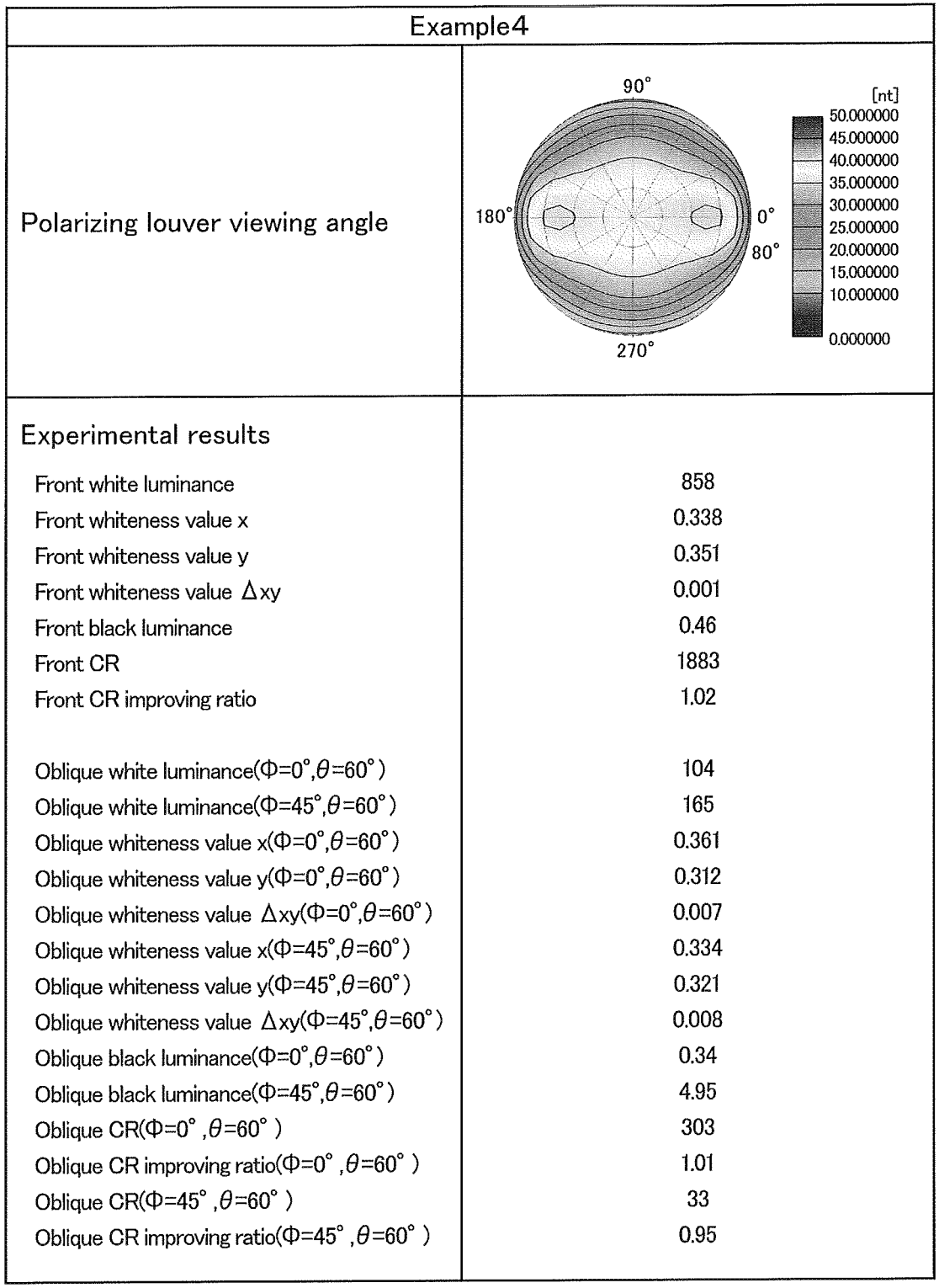 |
| Experimental results | |
| Front white luminance | 858 |
| Front whiteness value x | 0.338 |
| Front whiteness value y | 0.351 |
| Front whiteness value $\Delta xy$ | 0.001 |
| Front black luminance | 0.46 |
| Front CR | 1883 |
| Front CR improving ratio | 1.02 |
| | |
| Oblique white luminance($\Phi=0°, \theta=60°$) | 104 |
| Oblique white luminance($\Phi=45°, \theta=60°$) | 165 |
| Oblique whiteness value x($\Phi=0°, \theta=60°$) | 0.361 |
| Oblique whiteness value y($\Phi=0°, \theta=60°$) | 0.312 |
| Oblique whiteness value $\Delta xy$($\Phi=0°, \theta=60°$) | 0.007 |
| Oblique whiteness value x($\Phi=45°, \theta=60°$) | 0.334 |
| Oblique whiteness value y($\Phi=45°, \theta=60°$) | 0.321 |
| Oblique whiteness value $\Delta xy$($\Phi=45°, \theta=60°$) | 0.008 |
| Oblique black luminance($\Phi=0°, \theta=60°$) | 0.34 |
| Oblique black luminance($\Phi=45°, \theta=60°$) | 4.95 |
| Oblique CR($\Phi=0°, \theta=60°$) | 303 |
| Oblique CR improving ratio($\Phi=0°, \theta=60°$) | 1.01 |
| Oblique CR($\Phi=45°, \theta=60°$) | 33 |
| Oblique CR improving ratio($\Phi=45°, \theta=60°$) | 0.95 |

FIG.16A

| Example5 |||
|---|---|---|
| Schematic cross-sectional view | | First polarizer 0°<br>Liquid crystal panel<br>Second polarizer 90°<br>First retarder 0°<br>Third polarizer 90°<br><br>First prism sheet 135°<br>Second prism sheet 45°<br>Diffusion sheet<br>Light guide plate/LED |
| First retarder | R (nm)<br>Rth (nm)<br>NZ<br>R450/R550<br>R650/R550 | 64<br>−215<br>3.9<br>1.01<br>0.99 |
| Second retarder | R (nm)<br>Rth (nm)<br>NZ<br>R450/R550<br>R650/R550 | |
| Third retarder | R (nm)<br>Rth (nm)<br>NZ<br>R450/R550<br>R650/R550 | |
| Total Rth (nm) || −215 |
| Third polarizer || Reflective polarizer |

FIG.16B

| Example5 | |
|---|---|
| Polarizing louver viewing angle | 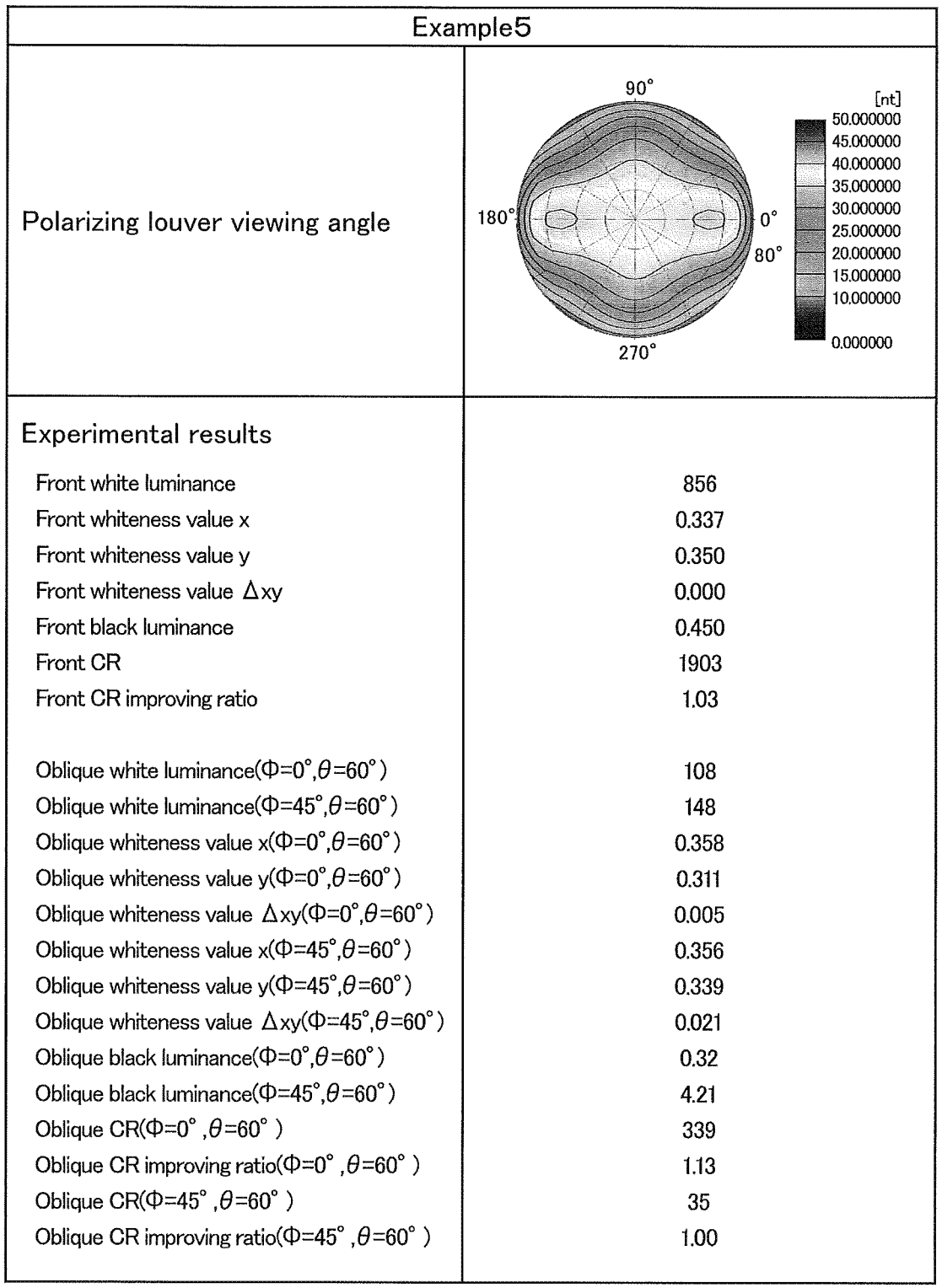 |
| Experimental results | |
| Front white luminance | 856 |
| Front whiteness value x | 0.337 |
| Front whiteness value y | 0.350 |
| Front whiteness value $\Delta xy$ | 0.000 |
| Front black luminance | 0.450 |
| Front CR | 1903 |
| Front CR improving ratio | 1.03 |
| | |
| Oblique white luminance($\Phi=0°, \theta=60°$) | 108 |
| Oblique white luminance($\Phi=45°, \theta=60°$) | 148 |
| Oblique whiteness value x($\Phi=0°, \theta=60°$) | 0.358 |
| Oblique whiteness value y($\Phi=0°, \theta=60°$) | 0.311 |
| Oblique whiteness value $\Delta xy$($\Phi=0°, \theta=60°$) | 0.005 |
| Oblique whiteness value x($\Phi=45°, \theta=60°$) | 0.356 |
| Oblique whiteness value y($\Phi=45°, \theta=60°$) | 0.339 |
| Oblique whiteness value $\Delta xy$($\Phi=45°, \theta=60°$) | 0.021 |
| Oblique black luminance($\Phi=0°, \theta=60°$) | 0.32 |
| Oblique black luminance($\Phi=45°, \theta=60°$) | 4.21 |
| Oblique CR($\Phi=0°, \theta=60°$) | 339 |
| Oblique CR improving ratio($\Phi=0°, \theta=60°$) | 1.13 |
| Oblique CR($\Phi=45°, \theta=60°$) | 35 |
| Oblique CR improving ratio($\Phi=45°, \theta=60°$) | 1.00 |

| Example6 |||
|---|---|---|
| Schematic cross-sectional view |  ||
| First retarder | R (nm)<br>Rth (nm)<br>NZ<br>R450/R550<br>R650/R550 | 64<br>−215<br>3.9<br>1.01<br>0.99 |
| Second retarder | R (nm)<br>Rth (nm)<br>NZ<br>R450/R550<br>R650/R550 | 64<br>−215<br>3.9<br>1.01<br>0.99 |
| Third retarder | R (nm)<br>Rth (nm)<br>NZ<br>R450/R550<br>R650/R550 | |
| Total Rth (nm) || −430 |
| Third polarizer || Reflective polarizer |

FIG.17B

| Example6 | |
|---|---|
| Polarizing louver viewing angle | 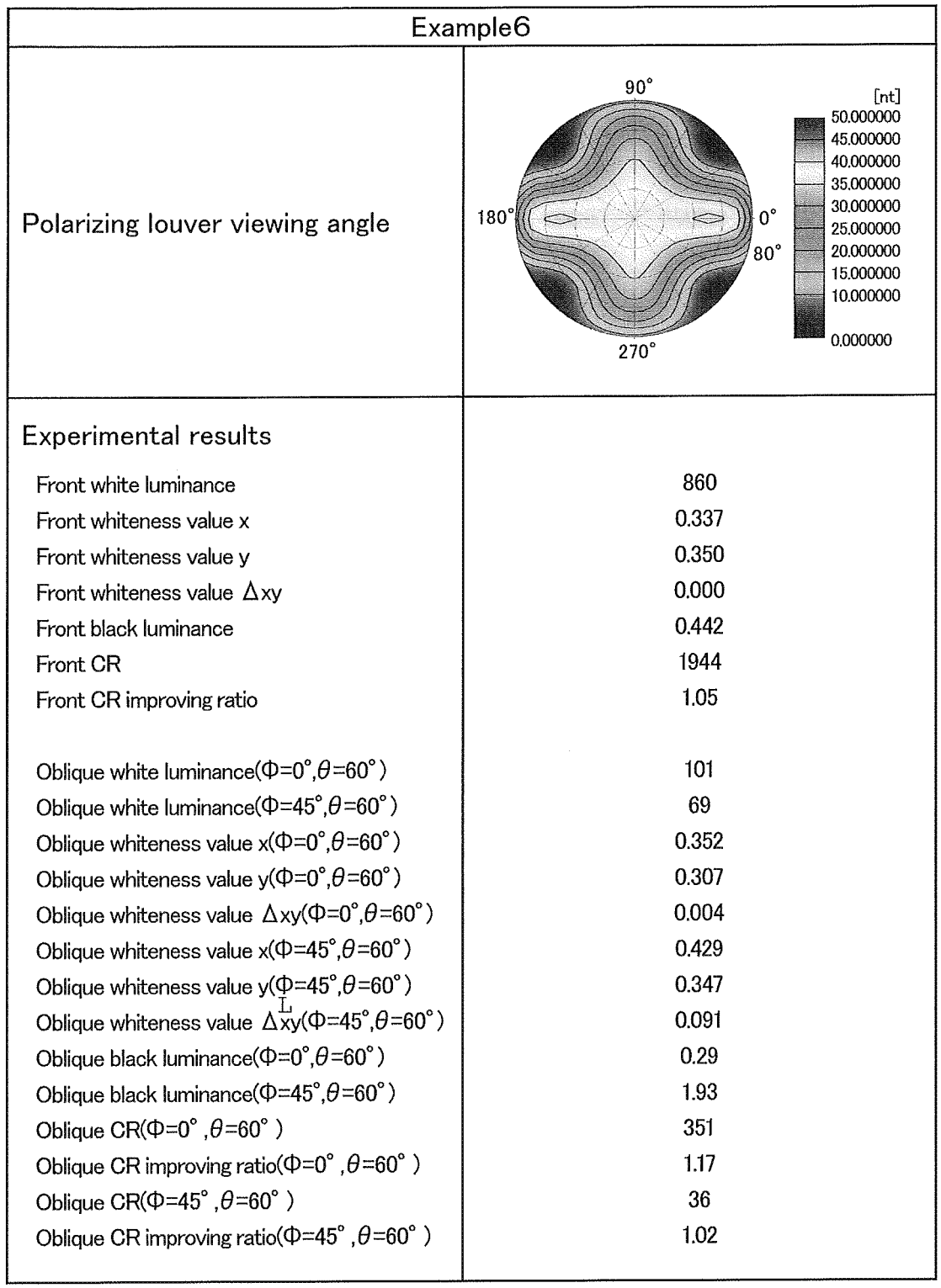 |
| Experimental results | |
| Front white luminance | 860 |
| Front whiteness value x | 0.337 |
| Front whiteness value y | 0.350 |
| Front whiteness value $\Delta xy$ | 0.000 |
| Front black luminance | 0.442 |
| Front CR | 1944 |
| Front CR improving ratio | 1.05 |
| | |
| Oblique white luminance($\Phi=0°, \theta=60°$) | 101 |
| Oblique white luminance($\Phi=45°, \theta=60°$) | 69 |
| Oblique whiteness value x($\Phi=0°, \theta=60°$) | 0.352 |
| Oblique whiteness value y($\Phi=0°, \theta=60°$) | 0.307 |
| Oblique whiteness value $\Delta xy(\Phi=0°, \theta=60°)$ | 0.004 |
| Oblique whiteness value x($\Phi=45°, \theta=60°$) | 0.429 |
| Oblique whiteness value y($\Phi=45°, \theta=60°$) | 0.347 |
| Oblique whiteness value $\Delta xy(\Phi=45°, \theta=60°)$ | 0.091 |
| Oblique black luminance($\Phi=0°, \theta=60°$) | 0.29 |
| Oblique black luminance($\Phi=45°, \theta=60°$) | 1.93 |
| Oblique CR($\Phi=0°, \theta=60°$) | 351 |
| Oblique CR improving ratio($\Phi=0°, \theta=60°$) | 1.17 |
| Oblique CR($\Phi=45°, \theta=60°$) | 36 |
| Oblique CR improving ratio($\Phi=45°, \theta=60°$) | 1.02 |

FIG.18A

| Example7 |||
|---|---|---|
| Schematic cross-sectional view | | |
| First retarder | R (nm) | 140 |
| | Rth (nm) | −154 |
| | NZ | 1.6 |
| | R450/R550 | 1.01 |
| | R650/R550 | 0.99 |
| Second retarder | R (nm) | 140 |
| | Rth (nm) | −154 |
| | NZ | 1.6 |
| | R450/R550 | 1.01 |
| | R650/R550 | 0.99 |
| Third retarder | R (nm) | |
| | Rth (nm) | |
| | NZ | |
| | R450/R550 | |
| | R650/R550 | |
| Total Rth (nm) || −308 |
| Third polarizer || Reflective polarizer |

Stack (top to bottom):
- First polarizer — 0°
- Liquid crystal panel
- Second polarizer — 90°
- First retarder — 45°
- Second retarder — 135°
- Third polarizer — 90°

- First prism sheet — 135°
- Second prism sheet — 45°
- Diffusion sheet
- Light guide plate/LED

FIG.18B

| Example7 | |
|---|---|
| Polarizing louver viewing angle | 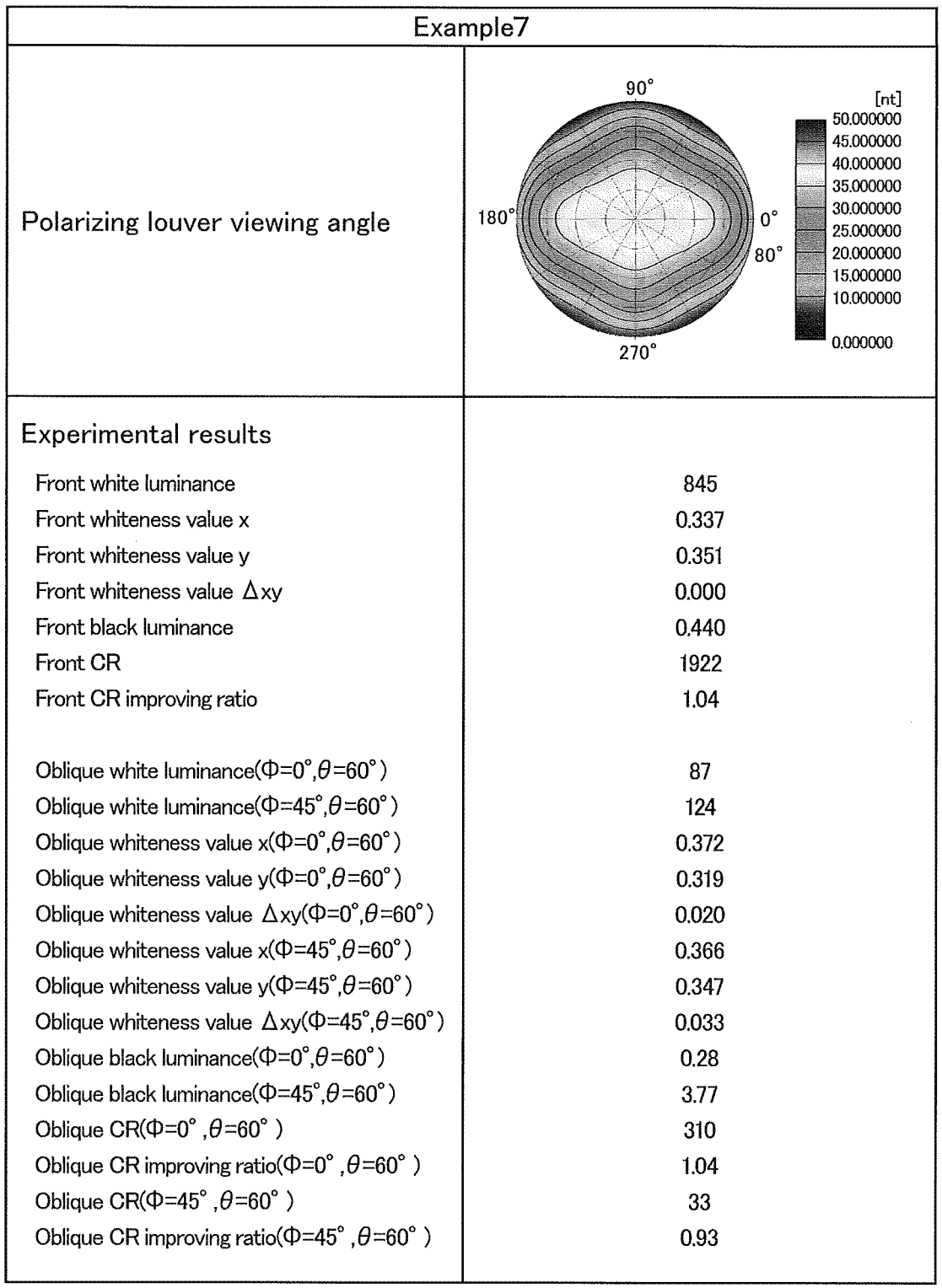 |
| Experimental results | |
| Front white luminance | 845 |
| Front whiteness value x | 0.337 |
| Front whiteness value y | 0.351 |
| Front whiteness value $\Delta xy$ | 0.000 |
| Front black luminance | 0.440 |
| Front CR | 1922 |
| Front CR improving ratio | 1.04 |
| | |
| Oblique white luminance($\Phi=0°, \theta=60°$) | 87 |
| Oblique white luminance($\Phi=45°, \theta=60°$) | 124 |
| Oblique whiteness value x($\Phi=0°, \theta=60°$) | 0.372 |
| Oblique whiteness value y($\Phi=0°, \theta=60°$) | 0.319 |
| Oblique whiteness value $\Delta xy$($\Phi=0°, \theta=60°$) | 0.020 |
| Oblique whiteness value x($\Phi=45°, \theta=60°$) | 0.366 |
| Oblique whiteness value y($\Phi=45°, \theta=60°$) | 0.347 |
| Oblique whiteness value $\Delta xy$($\Phi=45°, \theta=60°$) | 0.033 |
| Oblique black luminance($\Phi=0°, \theta=60°$) | 0.28 |
| Oblique black luminance($\Phi=45°, \theta=60°$) | 3.77 |
| Oblique CR($\Phi=0°, \theta=60°$) | 310 |
| Oblique CR improving ratio($\Phi=0°, \theta=60°$) | 1.04 |
| Oblique CR($\Phi=45°, \theta=60°$) | 33 |
| Oblique CR improving ratio($\Phi=45°, \theta=60°$) | 0.93 |

FIG.19A

| Comparative Example4 | | |
|---|---|---|
| Schematic cross-sectional view | | First polarizer 0°<br>Liquid crystal panel<br>Second polarizer 90°<br>First retarder 45°<br>Second retarder 135°<br>Third polarizer 90°<br><br>First prism sheet 110°<br>Second prism sheet 20°<br>Diffusion sheet<br>Light guide plate/LED |
| First retarder | R (nm)<br>Rth (nm)<br>NZ<br>R450/R550<br>R650/R550 | 140<br>−154<br>1.6<br>1.01<br>0.99 |
| Second retarder | R (nm)<br>Rth (nm)<br>NZ<br>R450/R550<br>R650/R550 | 140<br>−154<br>1.6<br>1.01<br>0.99 |
| Third retarder | R (nm)<br>Rth (nm)<br>NZ<br>R450/R550<br>R650/R550 | |
| Total Rth (nm) | | −308 |
| Third polarizer | | Reflective polarizer |

FIG.19B

| Comparative Example4 | |
|---|---|
| Polarizing louver viewing angle | 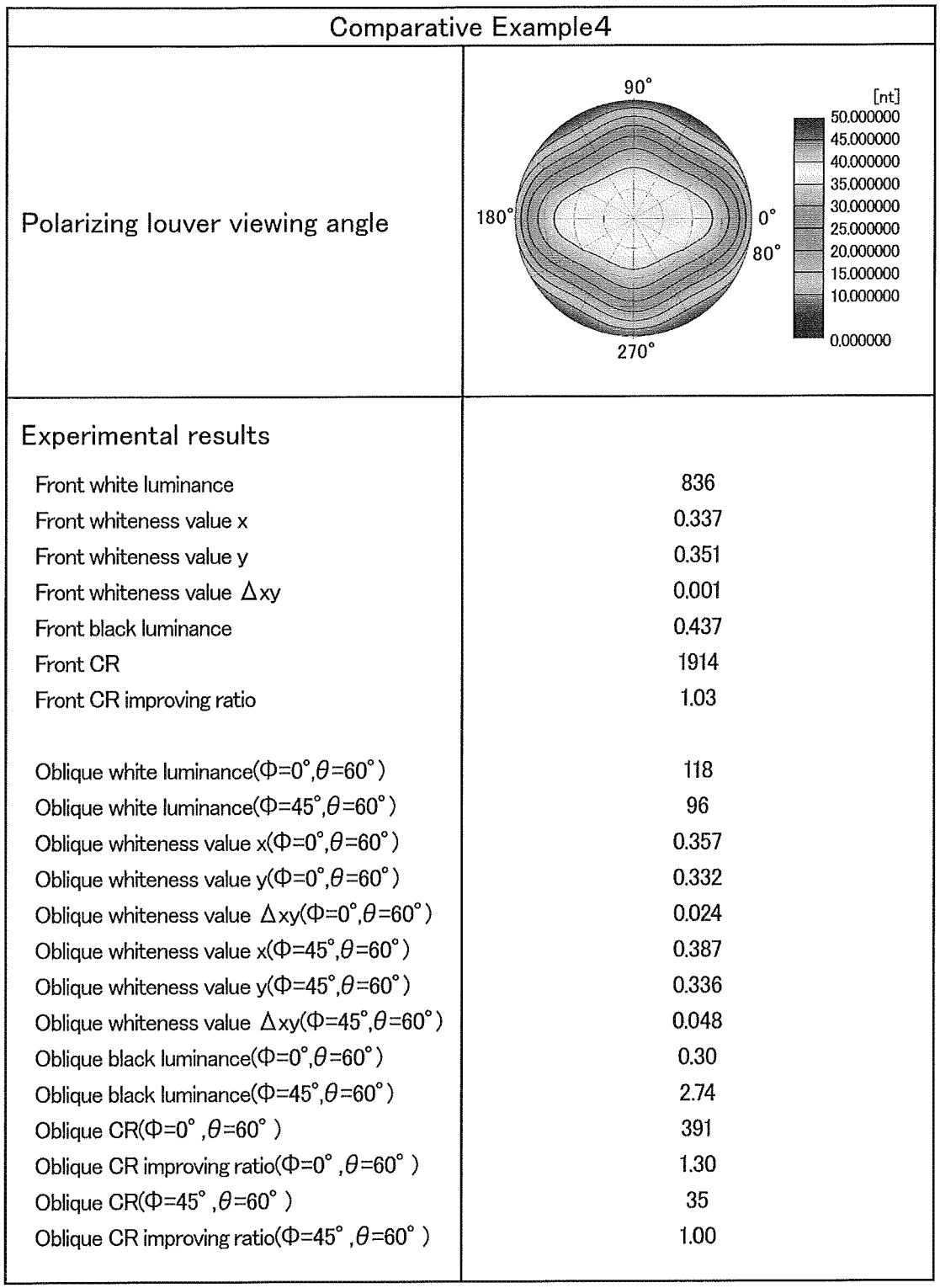 |
| Experimental results | |
| Front white luminance | 836 |
| Front whiteness value x | 0.337 |
| Front whiteness value y | 0.351 |
| Front whiteness value $\Delta xy$ | 0.001 |
| Front black luminance | 0.437 |
| Front CR | 1914 |
| Front CR improving ratio | 1.03 |
| | |
| Oblique white luminance($\Phi=0°, \theta=60°$) | 118 |
| Oblique white luminance($\Phi=45°, \theta=60°$) | 96 |
| Oblique whiteness value x($\Phi=0°, \theta=60°$) | 0.357 |
| Oblique whiteness value y($\Phi=0°, \theta=60°$) | 0.332 |
| Oblique whiteness value $\Delta xy$($\Phi=0°, \theta=60°$) | 0.024 |
| Oblique whiteness value x($\Phi=45°, \theta=60°$) | 0.387 |
| Oblique whiteness value y($\Phi=45°, \theta=60°$) | 0.336 |
| Oblique whiteness value $\Delta xy$($\Phi=45°, \theta=60°$) | 0.048 |
| Oblique black luminance($\Phi=0°, \theta=60°$) | 0.30 |
| Oblique black luminance($\Phi=45°, \theta=60°$) | 2.74 |
| Oblique CR($\Phi=0°, \theta=60°$) | 391 |
| Oblique CR improving ratio($\Phi=0°, \theta=60°$) | 1.30 |
| Oblique CR($\Phi=45°, \theta=60°$) | 35 |
| Oblique CR improving ratio($\Phi=45°, \theta=60°$) | 1.00 |

| Example8 |||
|---|---|---|
| Schematic cross-sectional view | |   |
| First retarder | R (nm)<br>Rth (nm)<br>NZ<br>R450/R550<br>R650/R550 | 140<br>-252<br>2.3<br>1.01<br>0.99 |
| Second retarder | R (nm)<br>Rth (nm)<br>NZ<br>R450/R550<br>R650/R550 | 140<br>-252<br>2.3<br>1.01<br>0.99 |
| Third retarder | R (nm)<br>Rth (nm)<br>NZ<br>R450/R550<br>R650/R550 | |
| Total Rth (nm) || -504 |
| Third polarizer || Reflective polarizer |

FIG.20B

| Example8 ||
|---|---|
| Polarizing louver viewing angle | 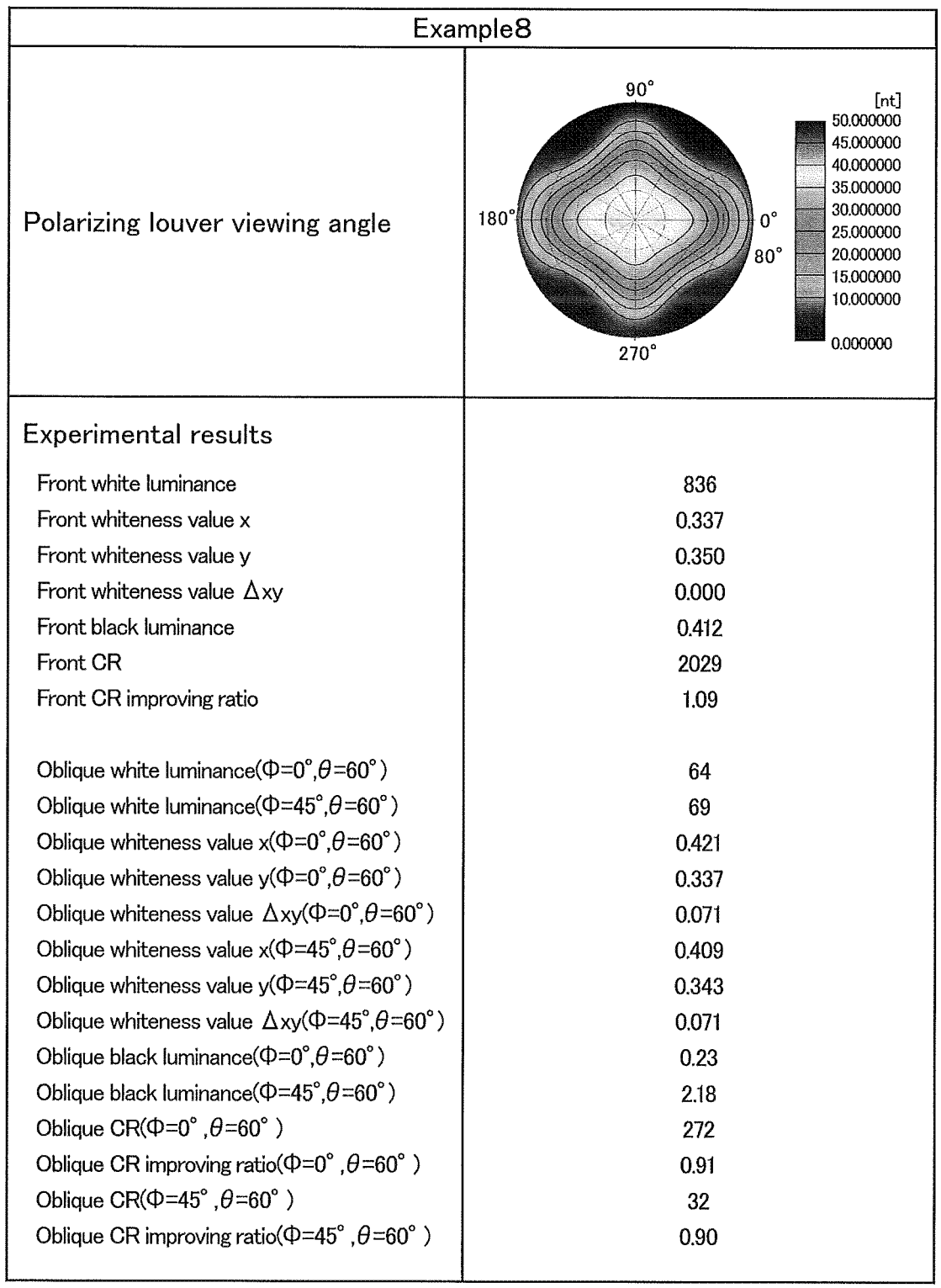 |
| Experimental results | |
| Front white luminance | 836 |
| Front whiteness value x | 0.337 |
| Front whiteness value y | 0.350 |
| Front whiteness value $\Delta xy$ | 0.000 |
| Front black luminance | 0.412 |
| Front CR | 2029 |
| Front CR improving ratio | 1.09 |
| | |
| Oblique white luminance($\Phi=0°, \theta=60°$) | 64 |
| Oblique white luminance($\Phi=45°, \theta=60°$) | 69 |
| Oblique whiteness value x($\Phi=0°, \theta=60°$) | 0.421 |
| Oblique whiteness value y($\Phi=0°, \theta=60°$) | 0.337 |
| Oblique whiteness value $\Delta xy$($\Phi=0°, \theta=60°$) | 0.071 |
| Oblique whiteness value x($\Phi=45°, \theta=60°$) | 0.409 |
| Oblique whiteness value y($\Phi=45°, \theta=60°$) | 0.343 |
| Oblique whiteness value $\Delta xy$($\Phi=45°, \theta=60°$) | 0.071 |
| Oblique black luminance($\Phi=0°, \theta=60°$) | 0.23 |
| Oblique black luminance($\Phi=45°, \theta=60°$) | 2.18 |
| Oblique CR($\Phi=0°, \theta=60°$) | 272 |
| Oblique CR improving ratio($\Phi=0°, \theta=60°$) | 0.91 |
| Oblique CR($\Phi=45°, \theta=60°$) | 32 |
| Oblique CR improving ratio($\Phi=45°, \theta=60°$) | 0.90 |

| Example9 |||
|---|---|---|
| Schematic cross-sectional view ||  |
| First retarder | R (nm)<br>Rth (nm)<br>NZ<br>R450/R550<br>R650/R550 | 0<br>-270<br>+∞<br>1.01<br>0.99 |
| Second retarder | R (nm)<br>Rth (nm)<br>NZ<br>R450/R550<br>R650/R550 | |
| Third retarder | R (nm)<br>Rth (nm)<br>NZ<br>R450/R550<br>R650/R550 | |
| Total Rth (nm) || -270 |
| Third polarizer || Reflective polarizer |

FIG.21B

| Example9 |||
|---|---|---|
| Polarizing louver viewing angle | 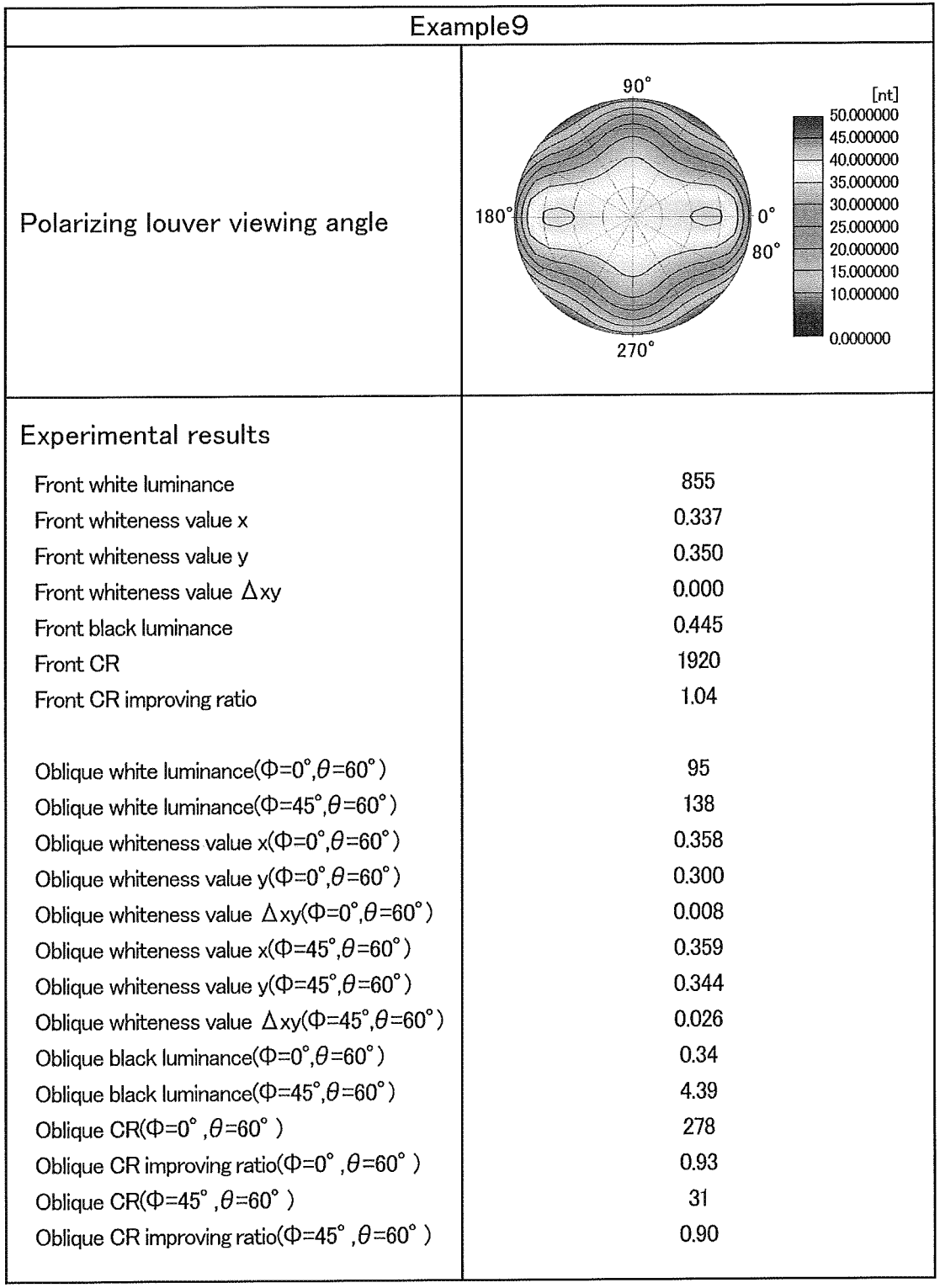 ||
| Experimental results |||
| Front white luminance | | 855 |
| Front whiteness value x | | 0.337 |
| Front whiteness value y | | 0.350 |
| Front whiteness value Δxy | | 0.000 |
| Front black luminance | | 0.445 |
| Front CR | | 1920 |
| Front CR improving ratio | | 1.04 |
| | | |
| Oblique white luminance(Φ=0°,θ=60°) | | 95 |
| Oblique white luminance(Φ=45°,θ=60°) | | 138 |
| Oblique whiteness value x(Φ=0°,θ=60°) | | 0.358 |
| Oblique whiteness value y(Φ=0°,θ=60°) | | 0.300 |
| Oblique whiteness value Δxy(Φ=0°,θ=60°) | | 0.008 |
| Oblique whiteness value x(Φ=45°,θ=60°) | | 0.359 |
| Oblique whiteness value y(Φ=45°,θ=60°) | | 0.344 |
| Oblique whiteness value Δxy(Φ=45°,θ=60°) | | 0.026 |
| Oblique black luminance(Φ=0°,θ=60°) | | 0.34 |
| Oblique black luminance(Φ=45°,θ=60°) | | 4.39 |
| Oblique CR(Φ=0°,θ=60°) | | 278 |
| Oblique CR improving ratio(Φ=0°,θ=60°) | | 0.93 |
| Oblique CR(Φ=45°,θ=60°) | | 31 |
| Oblique CR improving ratio(Φ=45°,θ=60°) | | 0.90 |

| Example10 | | |
|---|---|---|
| Schematic cross-sectional view |  | |
| First retarder | R (nm)<br>Rth (nm)<br>NZ<br>R450/R550<br>R650/R550 | 0<br>−270<br>+∞<br>1.01<br>0.99 |
| Second retarder | R (nm)<br>Rth (nm)<br>NZ<br>R450/R550<br>R650/R550 | 0<br>−270<br>+∞<br>1.01<br>0.99 |
| Third retarder | R (nm)<br>Rth (nm)<br>NZ<br>R450/R550<br>R650/R550 | |
| Total Rth (nm) | | −540 |
| Third polarizer | | Reflective polarizer |

FIG.22B

| Example10 | |
|---|---|
| Polarizing louver viewing angle | 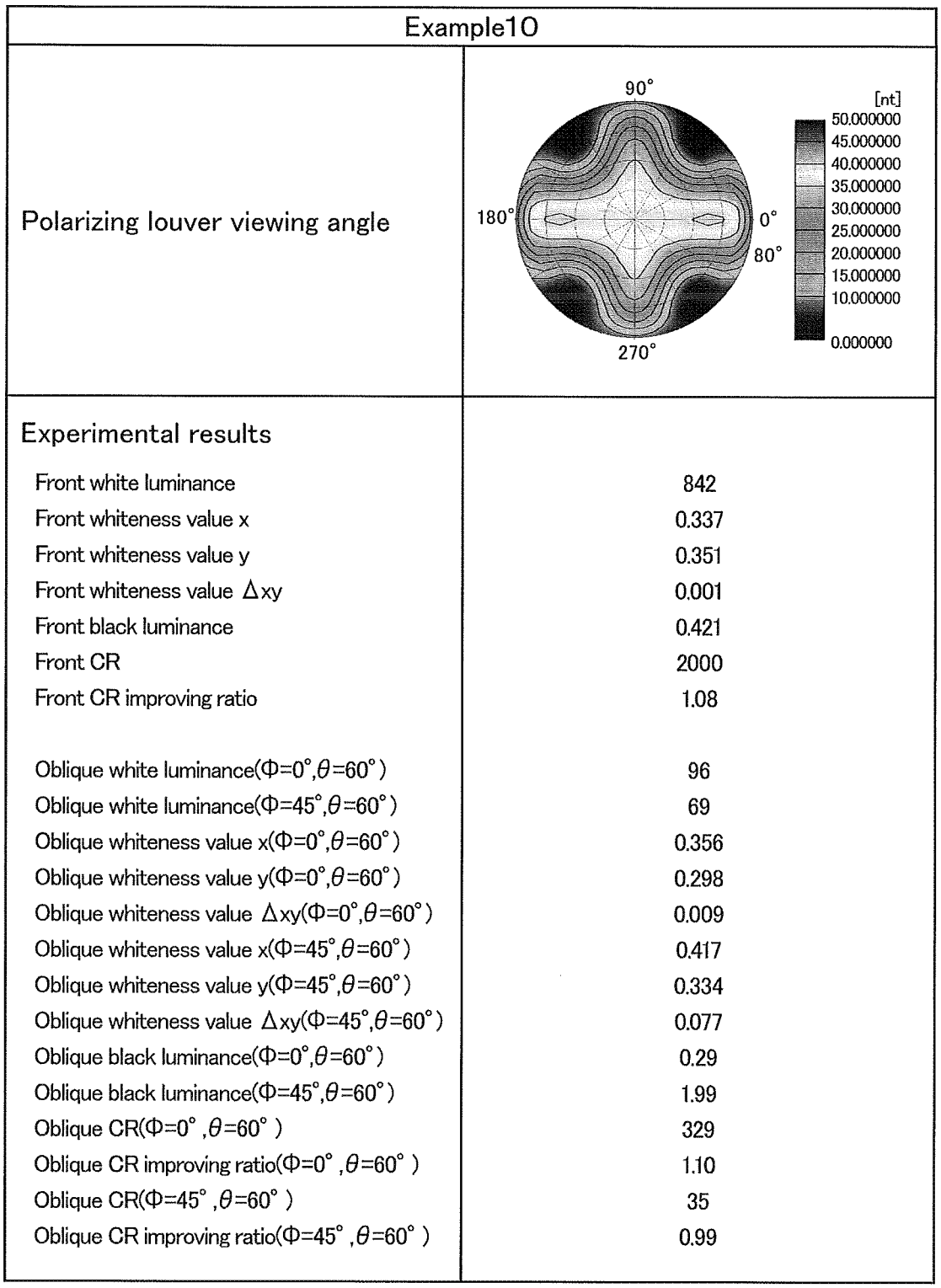 |
| Experimental results | |
| Front white luminance | 842 |
| Front whiteness value x | 0.337 |
| Front whiteness value y | 0.351 |
| Front whiteness value $\Delta xy$ | 0.001 |
| Front black luminance | 0.421 |
| Front CR | 2000 |
| Front CR improving ratio | 1.08 |
| | |
| Oblique white luminance($\Phi=0°, \theta=60°$) | 96 |
| Oblique white luminance($\Phi=45°, \theta=60°$) | 69 |
| Oblique whiteness value x($\Phi=0°, \theta=60°$) | 0.356 |
| Oblique whiteness value y($\Phi=0°, \theta=60°$) | 0.298 |
| Oblique whiteness value $\Delta xy$($\Phi=0°, \theta=60°$) | 0.009 |
| Oblique whiteness value x($\Phi=45°, \theta=60°$) | 0.417 |
| Oblique whiteness value y($\Phi=45°, \theta=60°$) | 0.334 |
| Oblique whiteness value $\Delta xy$($\Phi=45°, \theta=60°$) | 0.077 |
| Oblique black luminance($\Phi=0°, \theta=60°$) | 0.29 |
| Oblique black luminance($\Phi=45°, \theta=60°$) | 1.99 |
| Oblique CR($\Phi=0°, \theta=60°$) | 329 |
| Oblique CR improving ratio($\Phi=0°, \theta=60°$) | 1.10 |
| Oblique CR($\Phi=45°, \theta=60°$) | 35 |
| Oblique CR improving ratio($\Phi=45°, \theta=60°$) | 0.99 |

FIG.23A

| Comparative Example 5 ||||
|---|---|---|---|
| Schematic cross-sectional view || First polarizer 0°<br>Liquid crystal panel<br>Second polarizer 90°<br>First retarder<br>Third polarizer 90°<br><br>First prism sheet 110°<br>Second prism sheet 20°<br>Diffusion sheet<br>Light guide plate/LED ||
| First retarder | R (nm)<br>Rth (nm)<br>NZ<br>R450/R550<br>R650/R550 | 0<br>−270<br>+∞<br>1.01<br>0.99 ||
| Second retarder | R (nm)<br>Rth (nm)<br>NZ<br>R450/R550<br>R650/R550 |  ||
| Third retarder | R (nm)<br>Rth (nm)<br>NZ<br>R450/R550<br>R650/R550 |  ||
| Total Rth (nm) || −270 ||
| Third polarizer || Reflective polarizer ||

FIG23B

| Comparative Example5 | |
|---|---|
| Polarizing louver viewing angle | 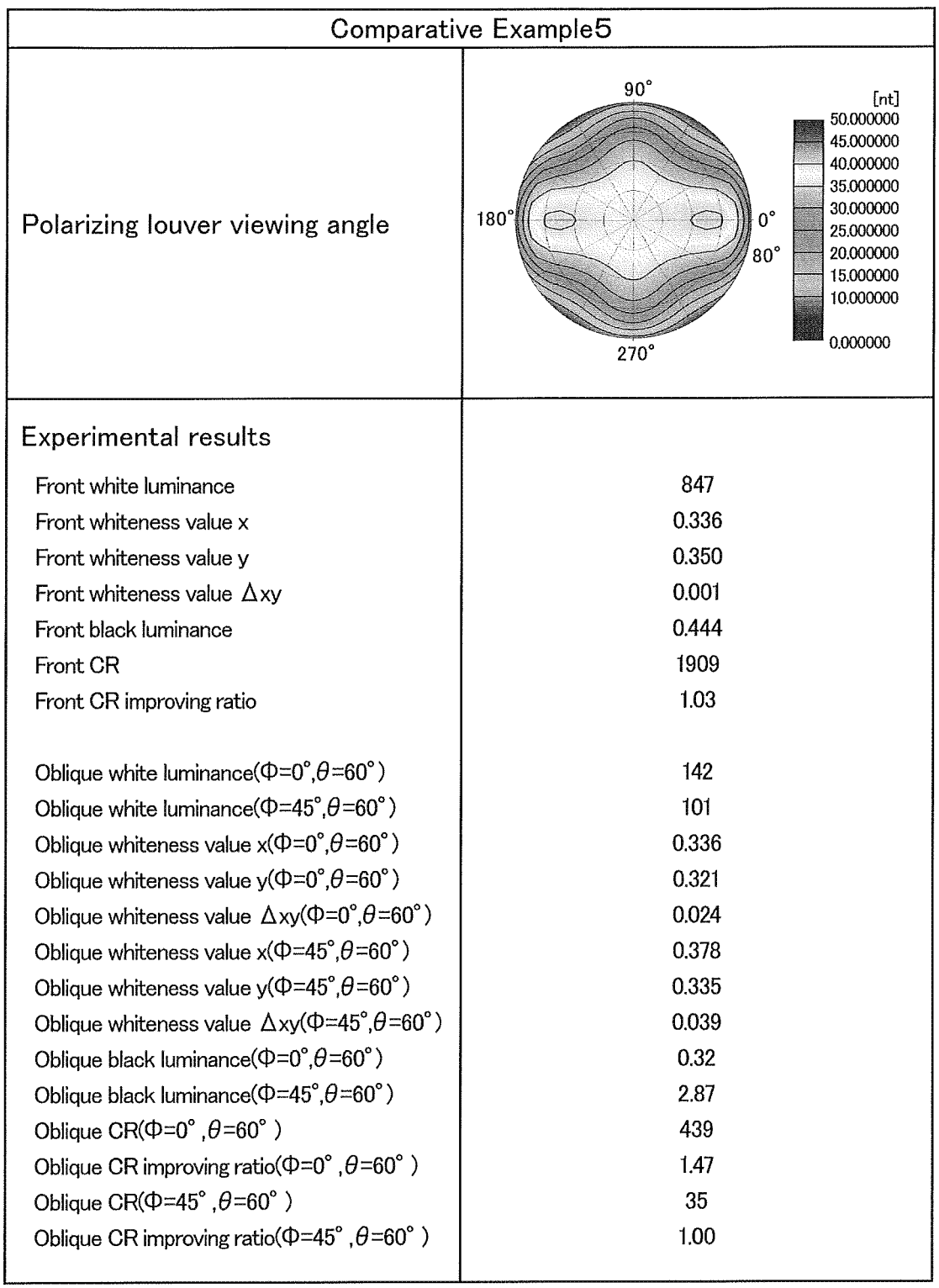 |
| Experimental results | |
| Front white luminance | 847 |
| Front whiteness value x | 0.336 |
| Front whiteness value y | 0.350 |
| Front whiteness value $\Delta xy$ | 0.001 |
| Front black luminance | 0.444 |
| Front CR | 1909 |
| Front CR improving ratio | 1.03 |
| | |
| Oblique white luminance($\Phi=0°, \theta=60°$) | 142 |
| Oblique white luminance($\Phi=45°, \theta=60°$) | 101 |
| Oblique whiteness value x($\Phi=0°, \theta=60°$) | 0.336 |
| Oblique whiteness value y($\Phi=0°, \theta=60°$) | 0.321 |
| Oblique whiteness value $\Delta xy$($\Phi=0°, \theta=60°$) | 0.024 |
| Oblique whiteness value x($\Phi=45°, \theta=60°$) | 0.378 |
| Oblique whiteness value y($\Phi=45°, \theta=60°$) | 0.335 |
| Oblique whiteness value $\Delta xy$($\Phi=45°, \theta=60°$) | 0.039 |
| Oblique black luminance($\Phi=0°, \theta=60°$) | 0.32 |
| Oblique black luminance($\Phi=45°, \theta=60°$) | 2.87 |
| Oblique CR($\Phi=0°, \theta=60°$) | 439 |
| Oblique CR improving ratio($\Phi=0°, \theta=60°$) | 1.47 |
| Oblique CR($\Phi=45°, \theta=60°$) | 35 |
| Oblique CR improving ratio($\Phi=45°, \theta=60°$) | 1.00 |

FIG.24A

| Example11 | |
|---|---|
| Schematic cross-sectional view | First polarizer 0°<br>Liquid crystal panel<br>Second polarizer 90°<br>First retarder 110°<br>Second retarder<br>Third polarizer 130°<br><br>First prism sheet 110°<br>Second prism sheet 20°<br>Diffusion sheet<br>Light guide plate/LED |
| First retarder — R (nm)<br>Rth (nm)<br>NZ<br>R450/R550<br>R650/R550 | 275<br>−137.5<br>1.0<br>0.88<br>1.02 |
| Second retarder — R (nm)<br>Rth (nm)<br>NZ<br>R450/R550<br>R650/R550 | 0<br>−200<br>+∞<br>1.01<br>0.99 |
| Third retarder — R (nm)<br>Rth (nm)<br>NZ<br>R450/R550<br>R650/R550 | |
| Total Rth (nm) | −338 |
| Third polarizer | Reflective polarizer |

FIG.24B

| Example11 | |
|---|---|
| Polarizing louver viewing angle | 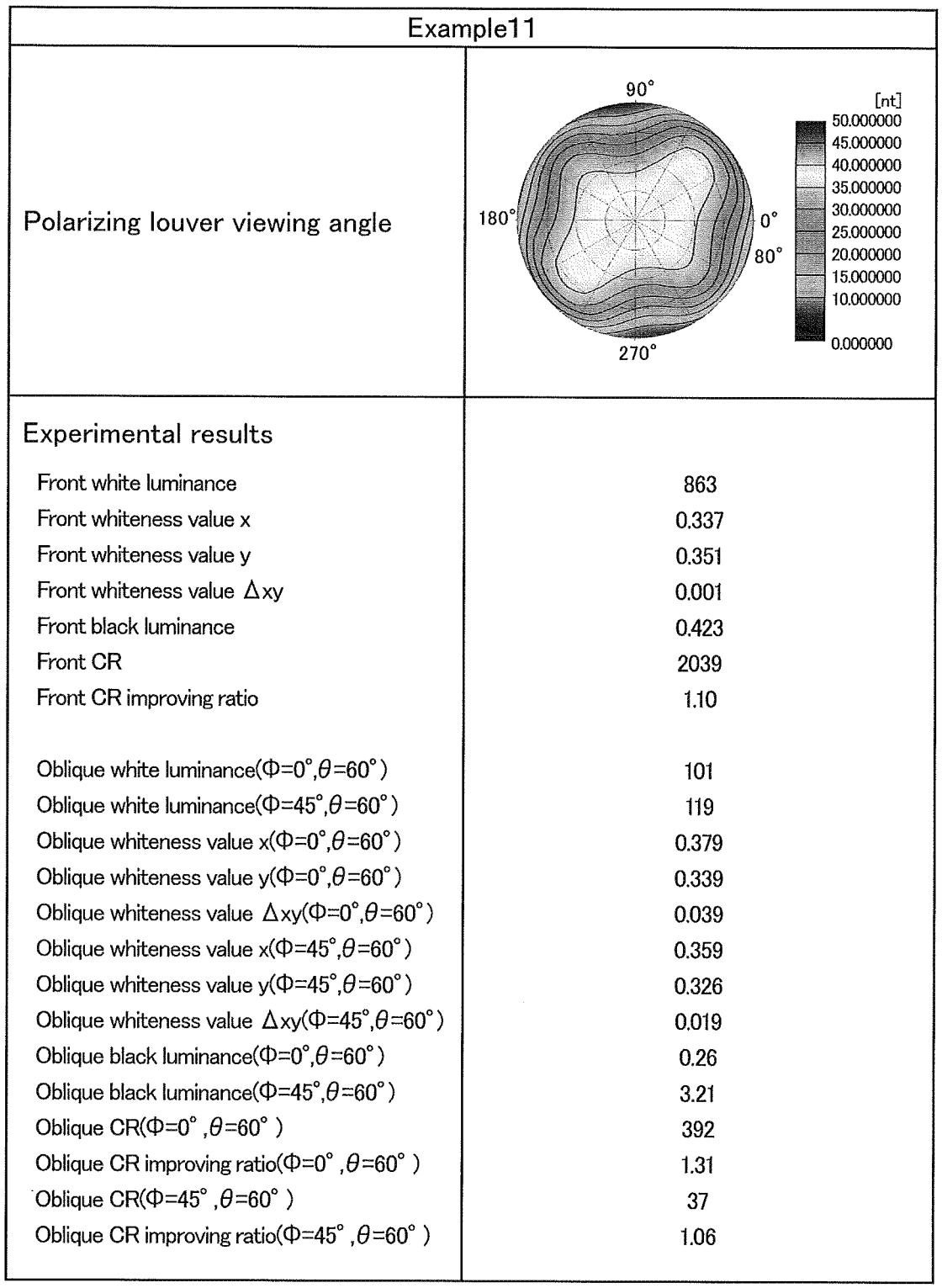 |
| Experimental results | |
| Front white luminance | 863 |
| Front whiteness value x | 0.337 |
| Front whiteness value y | 0.351 |
| Front whiteness value Δxy | 0.001 |
| Front black luminance | 0.423 |
| Front CR | 2039 |
| Front CR improving ratio | 1.10 |
| | |
| Oblique white luminance(Φ=0°,θ=60°) | 101 |
| Oblique white luminance(Φ=45°,θ=60°) | 119 |
| Oblique whiteness value x(Φ=0°,θ=60°) | 0.379 |
| Oblique whiteness value y(Φ=0°,θ=60°) | 0.339 |
| Oblique whiteness value Δxy(Φ=0°,θ=60°) | 0.039 |
| Oblique whiteness value x(Φ=45°,θ=60°) | 0.359 |
| Oblique whiteness value y(Φ=45°,θ=60°) | 0.326 |
| Oblique whiteness value Δxy(Φ=45°,θ=60°) | 0.019 |
| Oblique black luminance(Φ=0°,θ=60°) | 0.26 |
| Oblique black luminance(Φ=45°,θ=60°) | 3.21 |
| Oblique CR(Φ=0°,θ=60°) | 392 |
| Oblique CR improving ratio(Φ=0°,θ=60°) | 1.31 |
| Oblique CR(Φ=45°,θ=60°) | 37 |
| Oblique CR improving ratio(Φ=45°,θ=60°) | 1.06 |

| Comparative Example6 ||
|---|---|
| Schematic cross-sectional view |  |
| First retarder | R (nm): 275<br>Rth (nm): −137.5<br>NZ: 1.0<br>R450/R550: 0.88<br>R650/R550: 1.02 |
| Second retarder | R (nm): 0<br>Rth (nm): −200<br>NZ: +∞<br>R450/R550: 1.01<br>R650/R550: 0.99 |
| Third retarder | R (nm):<br>Rth (nm):<br>NZ:<br>R450/R550:<br>R650/R550: |
| Total Rth (nm) | −338 |
| Third polarizer | Reflective polarizer |

FIG.26B

| Comparative Example6 | |
|---|---|
| Polarizing louver viewing angle | 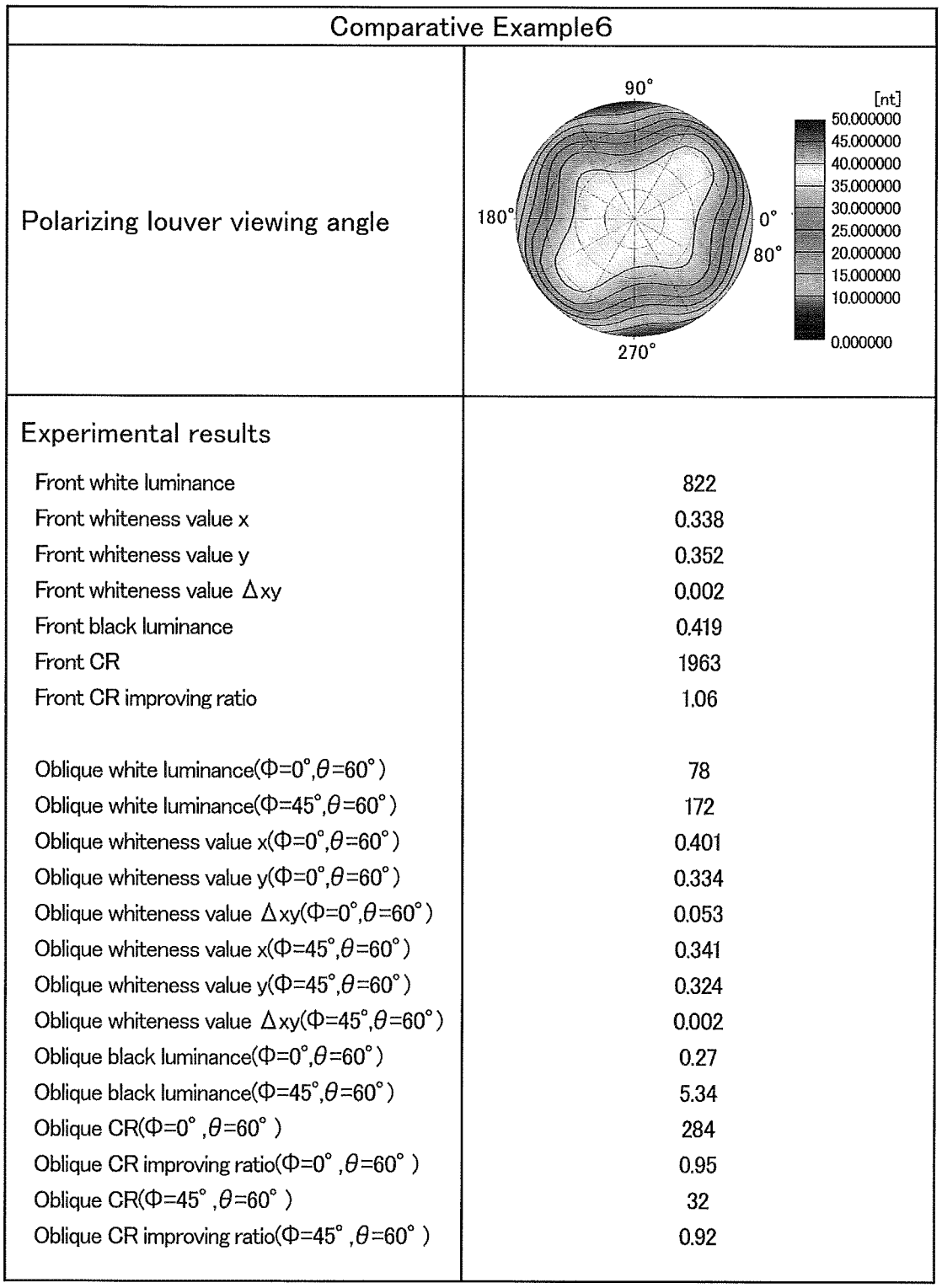 |
| Experimental results | |
| Front white luminance | 822 |
| Front whiteness value x | 0.338 |
| Front whiteness value y | 0.352 |
| Front whiteness value $\Delta xy$ | 0.002 |
| Front black luminance | 0.419 |
| Front CR | 1963 |
| Front CR improving ratio | 1.06 |
| | |
| Oblique white luminance($\Phi=0°, \theta=60°$) | 78 |
| Oblique white luminance($\Phi=45°, \theta=60°$) | 172 |
| Oblique whiteness value x($\Phi=0°, \theta=60°$) | 0.401 |
| Oblique whiteness value y($\Phi=0°, \theta=60°$) | 0.334 |
| Oblique whiteness value $\Delta xy$($\Phi=0°, \theta=60°$) | 0.053 |
| Oblique whiteness value x($\Phi=45°, \theta=60°$) | 0.341 |
| Oblique whiteness value y($\Phi=45°, \theta=60°$) | 0.324 |
| Oblique whiteness value $\Delta xy$($\Phi=45°, \theta=60°$) | 0.002 |
| Oblique black luminance($\Phi=0°, \theta=60°$) | 0.27 |
| Oblique black luminance($\Phi=45°, \theta=60°$) | 5.34 |
| Oblique CR($\Phi=0°, \theta=60°$) | 284 |
| Oblique CR improving ratio($\Phi=0°, \theta=60°$) | 0.95 |
| Oblique CR($\Phi=45°, \theta=60°$) | 32 |
| Oblique CR improving ratio($\Phi=45°, \theta=60°$) | 0.92 |

| Example12 ||||
|---|---|---|---|
| Schematic cross-sectional view |  ||||
| First retarder | R (nm)<br>Rth (nm)<br>NZ<br>R450/R550<br>R650/R550 | 275<br>−137.5<br>1.0<br>0.88<br>1.02 ||
| Second retarder | R (nm)<br>Rth (nm)<br>NZ<br>R450/R550<br>R650/R550 | 0<br>−200<br>+∞<br>1.01<br>0.99 ||
| Third retarder | R (nm)<br>Rth (nm)<br>NZ<br>R450/R550<br>R650/R550 | ||
| Total Rth (nm) || −338 ||
| Third polarizer || Reflective polarizer ||

FIG.28A

| Example13 ||  |
|---|---|---|
| Schematic cross-sectional view || 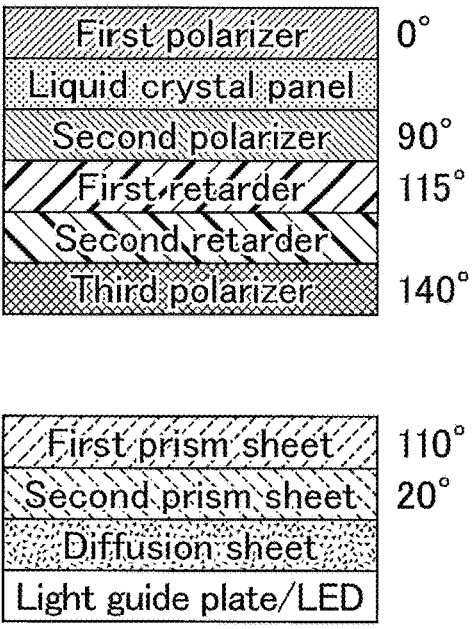 |
| First retarder | R (nm)<br>Rth (nm)<br>NZ<br>R450/R550<br>R650/R550 | 275<br>-137.5<br>1.0<br>0.88<br>1.02 |
| Second retarder | R (nm)<br>Rth (nm)<br>NZ<br>R450/R550<br>R650/R550 | 0<br>-200<br>+∞<br>1.01<br>0.99 |
| Third retarder | R (nm)<br>Rth (nm)<br>NZ<br>R450/R550<br>R650/R550 | |
| Total Rth (nm) || -338 |
| Third polarizer || Reflective polarizer |

Schematic cross-sectional view labels:
- First polarizer 0°
- Liquid crystal panel
- Second polarizer 90°
- First retarder 115°
- Second retarder
- Third polarizer 140°

- First prism sheet 110°
- Second prism sheet 20°
- Diffusion sheet
- Light guide plate/LED

FIG.29A

| Example14 |||
|---|---|---|
| Schematic cross-sectional view || First polarizer 0°<br>Liquid crystal panel<br>Second polarizer 90°<br>First retarder 120°<br>Second retarder<br>Third polarizer 150°<br><br>First prism sheet 110°<br>Second prism sheet 20°<br>Diffusion sheet<br>Light guide plate/LED |
| First retarder | R (nm)<br>Rth (nm)<br>NZ<br>R450/R550<br>R650/R550 | 275<br>−137.5<br>1.0<br>0.88<br>1.02 |
| Second retarder | R (nm)<br>Rth (nm)<br>NZ<br>R450/R550<br>R650/R550 | 0<br>−275<br>+∞<br>1.01<br>0.99 |
| Third retarder | R (nm)<br>Rth (nm)<br>NZ<br>R450/R550<br>R650/R550 | |
| Total Rth (nm) || −413 |
| Third polarizer || Reflective polarizer |

FIG.30A

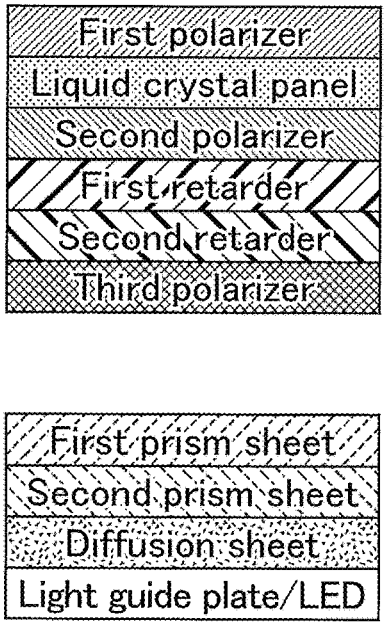

| Example15 | | |
|---|---|---|
| Schematic cross-sectional view | | First polarizer 0°<br>Liquid crystal panel<br>Second polarizer 90°<br>First retarder<br>Second retarder 120°<br>Third polarizer 150°<br><br>First prism sheet 110°<br>Second prism sheet 20°<br>Diffusion sheet<br>Light guide plate/LED |
| First retarder | R (nm)<br>Rth (nm)<br>NZ<br>R450/R550<br>R650/R550 | 0<br>−200<br>+∞<br>1.01<br>0.99 |
| Second retarder | R (nm)<br>Rth (nm)<br>NZ<br>R450/R550<br>R650/R550 | 275<br>−137.5<br>1.0<br>0.88<br>1.02 |
| Third retarder | R (nm)<br>Rth (nm)<br>NZ<br>R450/R550<br>R650/R550 | |
| Total Rth (nm) | | −338 |
| Third polarizer | | Reflective polarizer |

FIG.31A

| Example16 |||
|---|---|---|
| Schematic cross-sectional view | colspan="2" | First polarizer 0° / Liquid crystal panel / Second polarizer 90° / First retarder 0° / Third polarizer 90°<br><br>First prism sheet 135° / Second prism sheet 45° / Diffusion sheet / Light guide plate/LED |
| First retarder | R (nm)<br>Rth (nm)<br>NZ<br>R450/R550<br>R650/R550 | 0<br>270<br>$-\infty$<br>1.05<br>0.97 |
| Second retarder | R (nm)<br>Rth (nm)<br>NZ<br>R450/R550<br>R650/R550 | |
| Third retarder | R (nm)<br>Rth (nm)<br>NZ<br>R450/R550<br>R650/R550 | |
| Total Rth (nm) || 270 |
| Third polarizer || Reflective polarizer |

FIG.32A

| Example17 |||
|---|---|---|
| Schematic cross-sectional view || First polarizer 0°<br>Liquid crystal panel<br>Second polarizer 90°<br>First retarder 0°<br>Second retarder 0°<br>Third polarizer 90°<br><br>First prism sheet 135°<br>Second prism sheet 40°<br>Diffusion sheet<br>Light guide plate/LED |
| First retarder | R (nm)<br>Rth (nm)<br>NZ<br>R450/R550<br>R650/R550 | 0<br>270<br>$-\infty$<br>1.05<br>0.97 |
| Second retarder | R (nm)<br>Rth (nm)<br>NZ<br>R450/R550<br>R650/R550 | 0<br>270<br>$-\infty$<br>1.05<br>0.97 |
| Third retarder | R (nm)<br>Rth (nm)<br>NZ<br>R450/R550<br>R650/R550 | |
| Total Rth (nm) || 540 |
| Third polarizer || Reflective polarizer |

FIG.43A

| Comparative Example 101 |||
|---|---|---|
| Schematic cross-sectional view | First polarizer — 0°<br>Liquid crystal panel<br>Viewing angle compensation film<br>Second polarizer — 90°<br>Third polarizer — 90°<br><br>First prism sheet — 135°<br>Second prism sheet — 45°<br>Diffusion sheet<br>Light guide plate/LED ||
| First retarder | R (nm)<br>Rth (nm)<br>NZ<br>R450/R550<br>R650/R550 | |
| Second retarder | R (nm)<br>Rth (nm)<br>NZ<br>R450/R550<br>R650/R550 | |
| Third retarder | R (nm)<br>Rth (nm)<br>NZ<br>R450/R550<br>R650/R550 | |
| Total Rth (nm) || 0 |
| Third polarizer || Reflective polarizer |

FIG.43B

| Comparative Example101 | |
|---|---|
| Polarizing louver viewing angle | 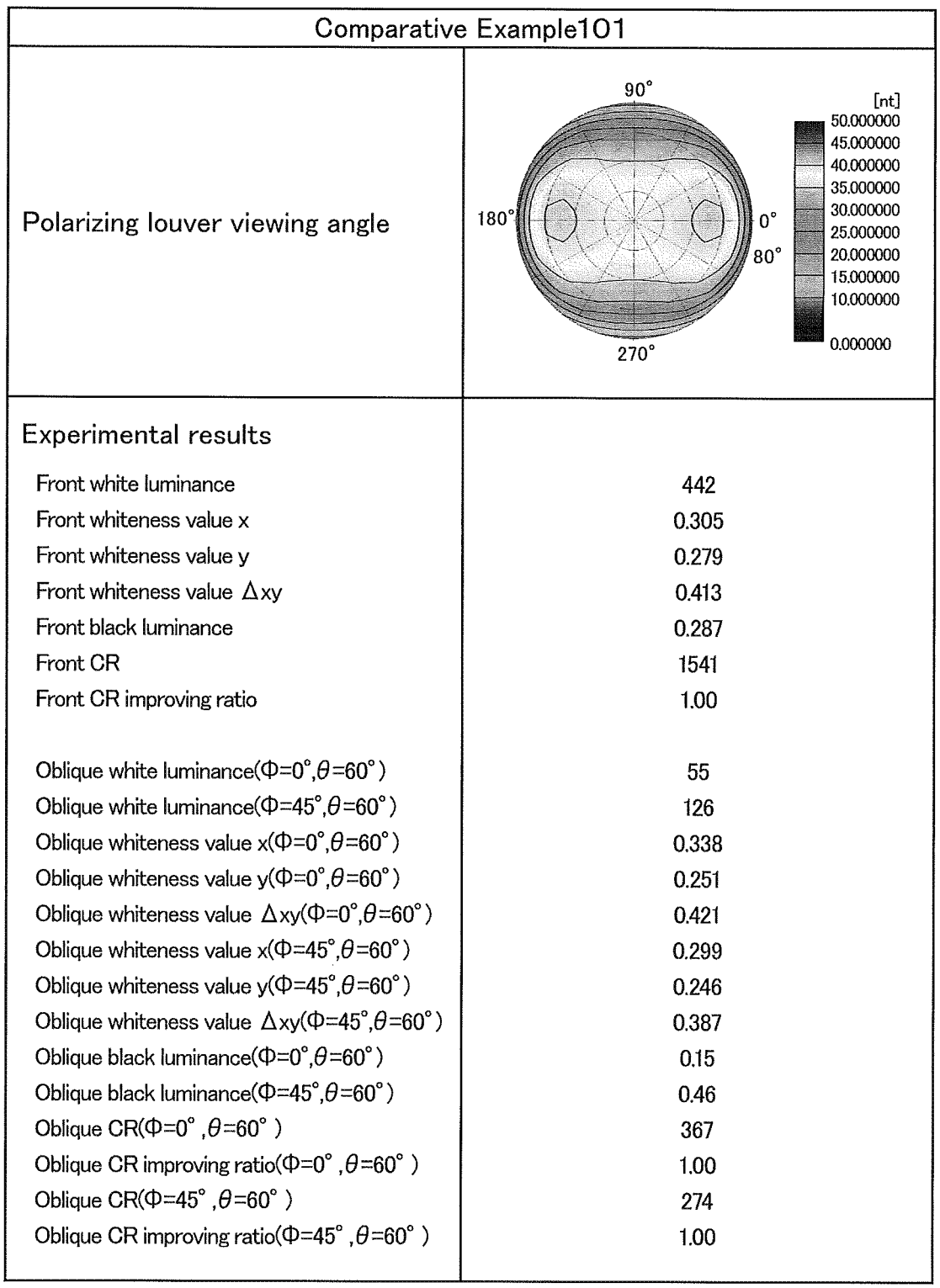 |
| Experimental results | |
| Front white luminance | 442 |
| Front whiteness value x | 0.305 |
| Front whiteness value y | 0.279 |
| Front whiteness value Δxy | 0.413 |
| Front black luminance | 0.287 |
| Front CR | 1541 |
| Front CR improving ratio | 1.00 |
| | |
| Oblique white luminance($\Phi=0°, \theta=60°$) | 55 |
| Oblique white luminance($\Phi=45°, \theta=60°$) | 126 |
| Oblique whiteness value x($\Phi=0°, \theta=60°$) | 0.338 |
| Oblique whiteness value y($\Phi=0°, \theta=60°$) | 0.251 |
| Oblique whiteness value Δxy($\Phi=0°, \theta=60°$) | 0.421 |
| Oblique whiteness value x($\Phi=45°, \theta=60°$) | 0.299 |
| Oblique whiteness value y($\Phi=45°, \theta=60°$) | 0.246 |
| Oblique whiteness value Δxy($\Phi=45°, \theta=60°$) | 0.387 |
| Oblique black luminance($\Phi=0°, \theta=60°$) | 0.15 |
| Oblique black luminance($\Phi=45°, \theta=60°$) | 0.46 |
| Oblique CR($\Phi=0°, \theta=60°$) | 367 |
| Oblique CR improving ratio($\Phi=0°, \theta=60°$) | 1.00 |
| Oblique CR($\Phi=45°, \theta=60°$) | 274 |
| Oblique CR improving ratio($\Phi=45°, \theta=60°$) | 1.00 |

| Example101 |||
|---|---|---|
| Schematic cross-sectional view | colspan="2" | |
| First retarder | R (nm)<br>Rth (nm)<br>NZ<br>R450/R550<br>R650/R550 | 140<br>-70<br>1.0<br>0.88<br>1.02 |
| Second retarder | R (nm)<br>Rth (nm)<br>NZ<br>R450/R550<br>R650/R550 | 140<br>-70<br>1.0<br>0.88<br>1.02 |
| Third retarder | R (nm)<br>Rth (nm)<br>NZ<br>R450/R550<br>R650/R550 | |
| Total Rth (nm) || -140 |
| Third polarizer || Reflective polarizer |

FIG.44B

| Example101 | |
|---|---|
| Polarizing louver viewing angle | 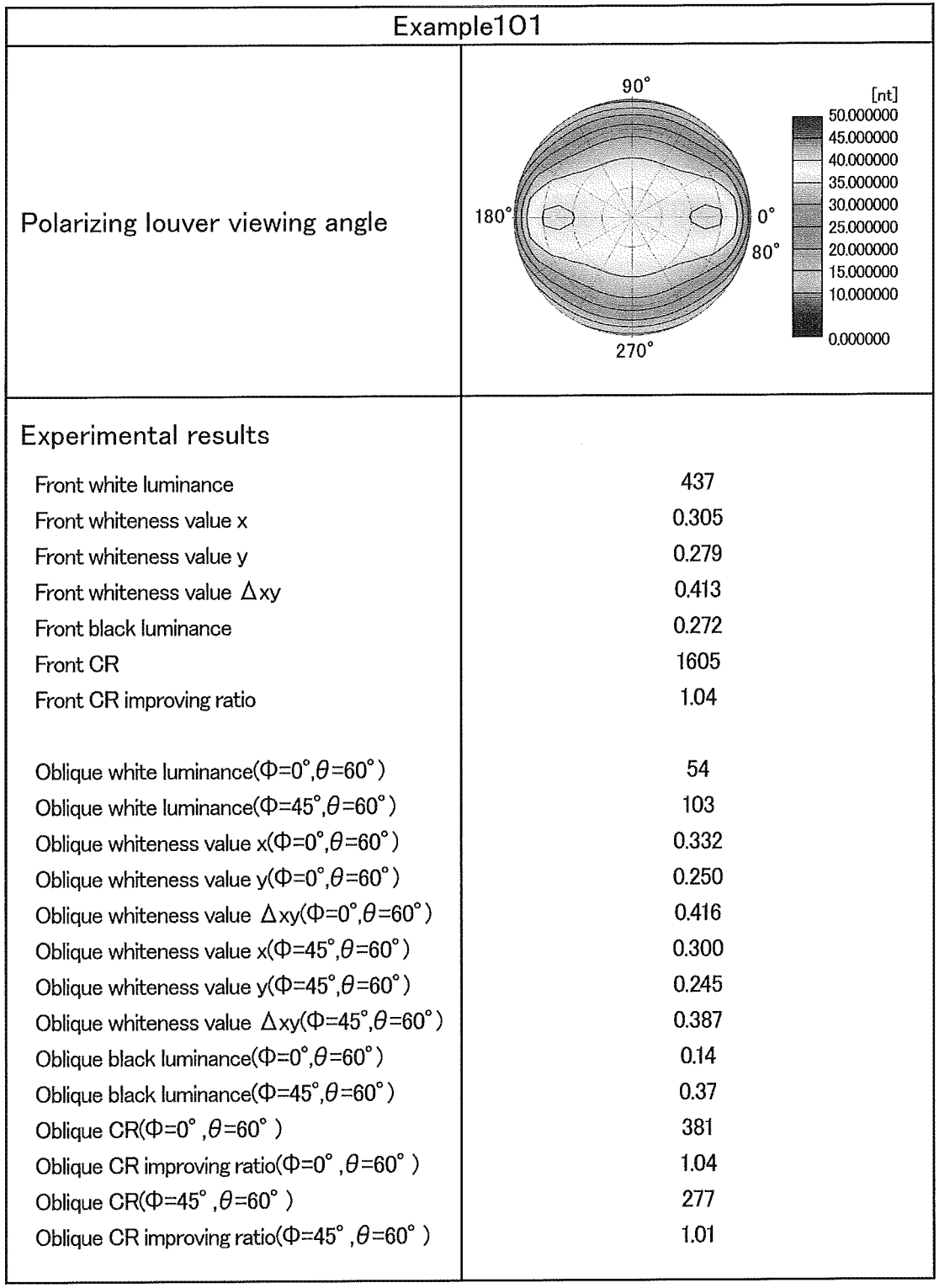 |
| Experimental results | |
| Front white luminance | 437 |
| Front whiteness value x | 0.305 |
| Front whiteness value y | 0.279 |
| Front whiteness value $\Delta xy$ | 0.413 |
| Front black luminance | 0.272 |
| Front CR | 1605 |
| Front CR improving ratio | 1.04 |
| | |
| Oblique white luminance($\Phi=0°, \theta=60°$) | 54 |
| Oblique white luminance($\Phi=45°, \theta=60°$) | 103 |
| Oblique whiteness value x($\Phi=0°, \theta=60°$) | 0.332 |
| Oblique whiteness value y($\Phi=0°, \theta=60°$) | 0.250 |
| Oblique whiteness value $\Delta xy$($\Phi=0°, \theta=60°$) | 0.416 |
| Oblique whiteness value x($\Phi=45°, \theta=60°$) | 0.300 |
| Oblique whiteness value y($\Phi=45°, \theta=60°$) | 0.245 |
| Oblique whiteness value $\Delta xy$($\Phi=45°, \theta=60°$) | 0.387 |
| Oblique black luminance($\Phi=0°, \theta=60°$) | 0.14 |
| Oblique black luminance($\Phi=45°, \theta=60°$) | 0.37 |
| Oblique CR($\Phi=0°, \theta=60°$) | 381 |
| Oblique CR improving ratio($\Phi=0°, \theta=60°$) | 1.04 |
| Oblique CR($\Phi=45°, \theta=60°$) | 277 |
| Oblique CR improving ratio($\Phi=45°, \theta=60°$) | 1.01 |

| Example103 ||||
|---|---|---|---|
| Schematic cross-sectional view ||  ||
| First retarder | R (nm) || 55 |
|  | Rth (nm) || −125 |
|  | NZ || 2.8 |
|  | R450/R550 || 0.98 |
|  | R650/R550 || 1.01 |
| Second retarder | R (nm) || 55 |
|  | Rth (nm) || −125 |
|  | NZ || 2.8 |
|  | R450/R550 || 0.98 |
|  | R650/R550 || 1.01 |
| Third retarder | R (nm) || 55 |
|  | Rth (nm) || −125 |
|  | NZ || 2.8 |
|  | R450/R550 || 0.98 |
|  | R650/R550 || 1.01 |
| Total Rth (nm) ||| −375 |
| Third polarizer ||| Reflective polarizer |

FIG.45B

| Example103 | |
|---|---|
| Polarizing louver viewing angle | 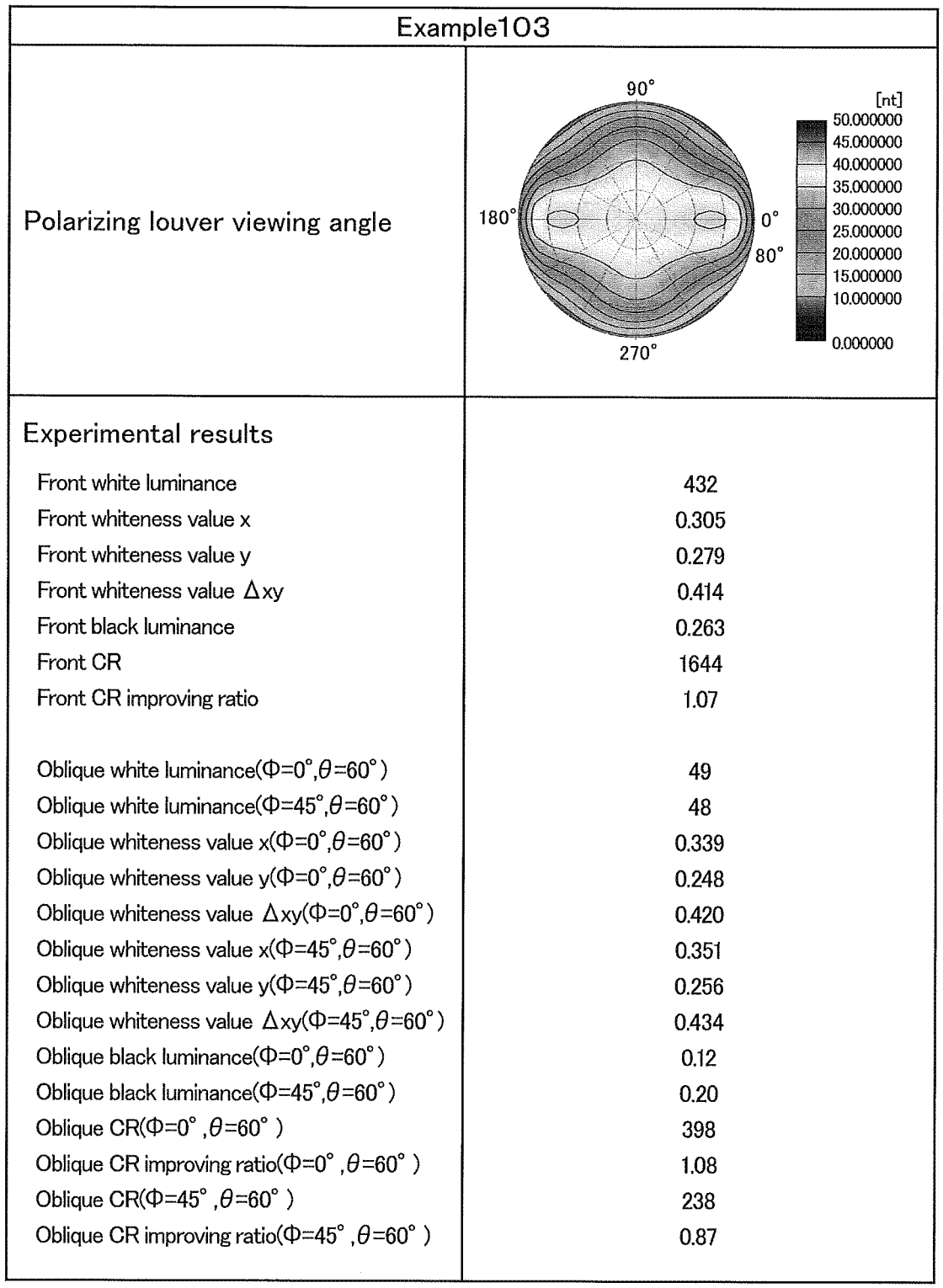 |
| Experimental results | |
| Front white luminance | 432 |
| Front whiteness value x | 0.305 |
| Front whiteness value y | 0.279 |
| Front whiteness value $\Delta xy$ | 0.414 |
| Front black luminance | 0.263 |
| Front CR | 1644 |
| Front CR improving ratio | 1.07 |
| | |
| Oblique white luminance($\Phi=0°, \theta=60°$) | 49 |
| Oblique white luminance($\Phi=45°, \theta=60°$) | 48 |
| Oblique whiteness value x($\Phi=0°, \theta=60°$) | 0.339 |
| Oblique whiteness value y($\Phi=0°, \theta=60°$) | 0.248 |
| Oblique whiteness value $\Delta xy$($\Phi=0°, \theta=60°$) | 0.420 |
| Oblique whiteness value x($\Phi=45°, \theta=60°$) | 0.351 |
| Oblique whiteness value y($\Phi=45°, \theta=60°$) | 0.256 |
| Oblique whiteness value $\Delta xy$($\Phi=45°, \theta=60°$) | 0.434 |
| Oblique black luminance($\Phi=0°, \theta=60°$) | 0.12 |
| Oblique black luminance($\Phi=45°, \theta=60°$) | 0.20 |
| Oblique CR($\Phi=0°, \theta=60°$) | 398 |
| Oblique CR improving ratio($\Phi=0°, \theta=60°$) | 1.08 |
| Oblique CR($\Phi=45°, \theta=60°$) | 238 |
| Oblique CR improving ratio($\Phi=45°, \theta=60°$) | 0.87 |

FIG.46A

| Example109 ||
|---|---|
| Schematic cross-sectional view | First polarizer 0°<br>Liquid crystal panel<br>Viewing angle compensation film<br>Second polarizer 90°<br>First retarder 0°<br>Third polarizer 90°<br><br>First prism sheet 135°<br>Second prism sheet 45°<br>Diffusion sheet<br>Light guide plate/LED |
| First retarder    R (nm)<br>Rth (nm)<br>NZ<br>R450/R550<br>R650/R550 | 0<br>−270<br>+∞<br>1.01<br>0.99 |
| Second retarder    R (nm)<br>Rth (nm)<br>NZ<br>R450/R550<br>R650/R550 | |
| Third retarder    R (nm)<br>Rth (nm)<br>NZ<br>R450/R550<br>R650/R550 | |
| Total Rth (nm) | −270 |
| Third polarizer | Reflective polarizer |

FIG.46B

| Example109 ||
|---|---|
| Polarizing louver viewing angle | 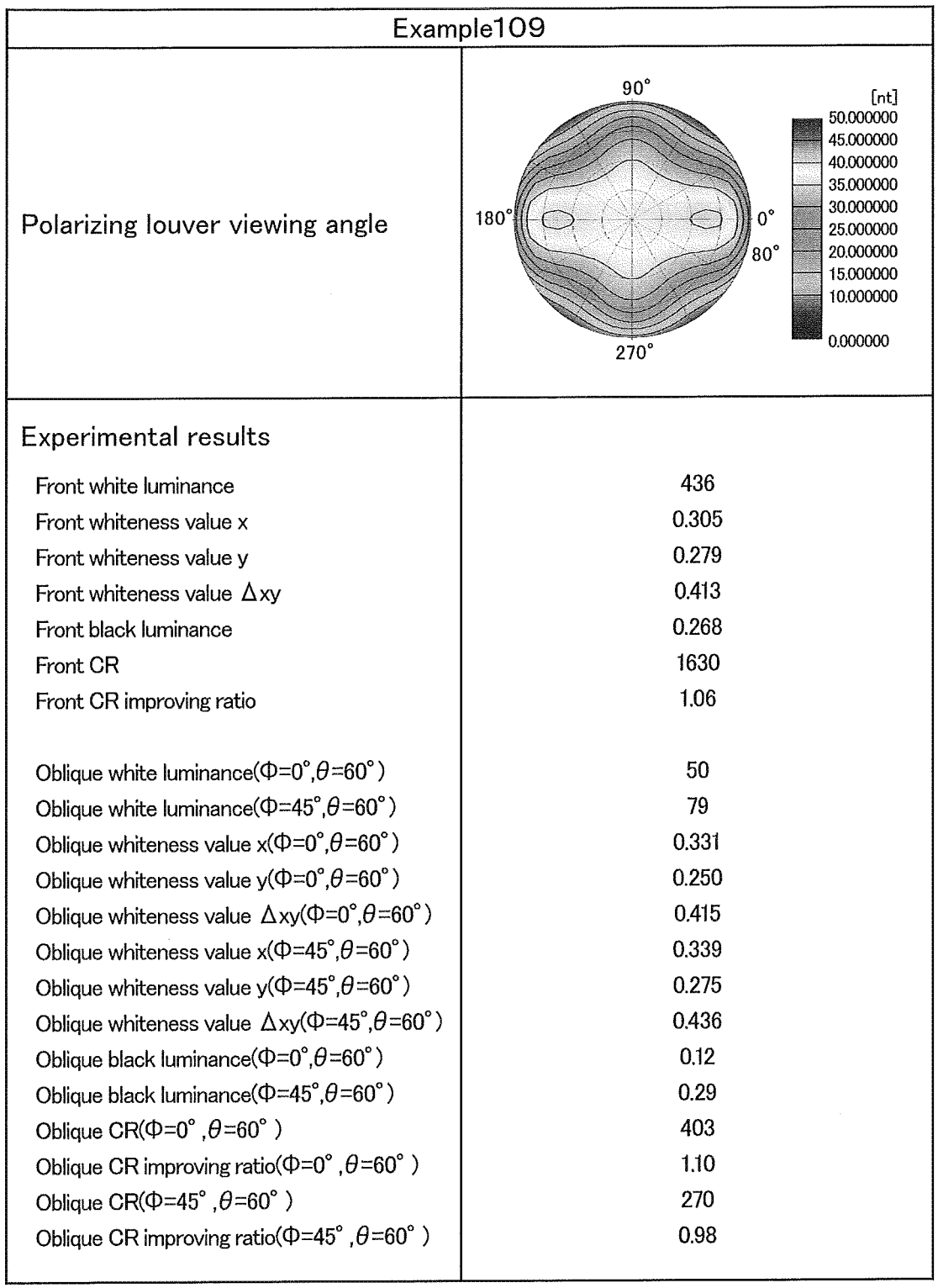 |
| Experimental results | |
| Front white luminance | 436 |
| Front whiteness value x | 0.305 |
| Front whiteness value y | 0.279 |
| Front whiteness value $\Delta xy$ | 0.413 |
| Front black luminance | 0.268 |
| Front CR | 1630 |
| Front CR improving ratio | 1.06 |
| | |
| Oblique white luminance($\Phi=0°, \theta=60°$) | 50 |
| Oblique white luminance($\Phi=45°, \theta=60°$) | 79 |
| Oblique whiteness value x($\Phi=0°, \theta=60°$) | 0.331 |
| Oblique whiteness value y($\Phi=0°, \theta=60°$) | 0.250 |
| Oblique whiteness value $\Delta xy$($\Phi=0°, \theta=60°$) | 0.415 |
| Oblique whiteness value x($\Phi=45°, \theta=60°$) | 0.339 |
| Oblique whiteness value y($\Phi=45°, \theta=60°$) | 0.275 |
| Oblique whiteness value $\Delta xy$($\Phi=45°, \theta=60°$) | 0.436 |
| Oblique black luminance($\Phi=0°, \theta=60°$) | 0.12 |
| Oblique black luminance($\Phi=45°, \theta=60°$) | 0.29 |
| Oblique CR($\Phi=0°, \theta=60°$) | 403 |
| Oblique CR improving ratio($\Phi=0°, \theta=60°$) | 1.10 |
| Oblique CR($\Phi=45°, \theta=60°$) | 270 |
| Oblique CR improving ratio($\Phi=45°, \theta=60°$) | 0.98 |

FIG.47B

| Comparative Example201 | |
|---|---|
| Polarizing louver viewing angle | 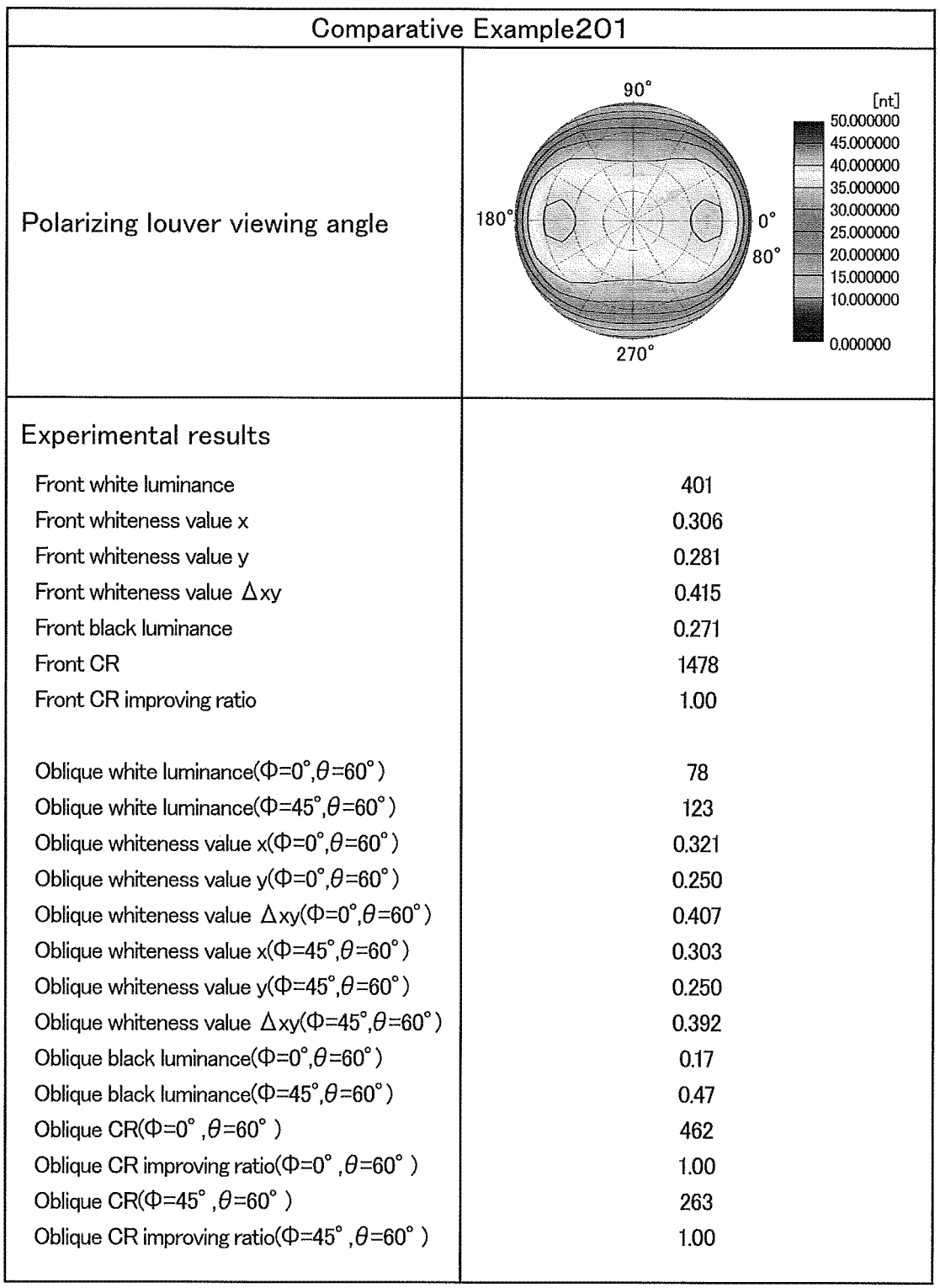 |
| Experimental results | |
| Front white luminance | 401 |
| Front whiteness value x | 0.306 |
| Front whiteness value y | 0.281 |
| Front whiteness value $\Delta xy$ | 0.415 |
| Front black luminance | 0.271 |
| Front CR | 1478 |
| Front CR improving ratio | 1.00 |
| | |
| Oblique white luminance($\Phi=0°, \theta=60°$) | 78 |
| Oblique white luminance($\Phi=45°, \theta=60°$) | 123 |
| Oblique whiteness value x($\Phi=0°, \theta=60°$) | 0.321 |
| Oblique whiteness value y($\Phi=0°, \theta=60°$) | 0.250 |
| Oblique whiteness value $\Delta xy$($\Phi=0°, \theta=60°$) | 0.407 |
| Oblique whiteness value x($\Phi=45°, \theta=60°$) | 0.303 |
| Oblique whiteness value y($\Phi=45°, \theta=60°$) | 0.250 |
| Oblique whiteness value $\Delta xy$($\Phi=45°, \theta=60°$) | 0.392 |
| Oblique black luminance($\Phi=0°, \theta=60°$) | 0.17 |
| Oblique black luminance($\Phi=45°, \theta=60°$) | 0.47 |
| Oblique CR($\Phi=0°, \theta=60°$) | 462 |
| Oblique CR improving ratio($\Phi=0°, \theta=60°$) | 1.00 |
| Oblique CR($\Phi=45°, \theta=60°$) | 263 |
| Oblique CR improving ratio($\Phi=45°, \theta=60°$) | 1.00 |

| Example201 ||
|---|---|
| Schematic cross-sectional view |  |
| First retarder | R (nm) 140<br>Rth (nm) −70<br>NZ 1.0<br>R450/R550 0.88<br>R650/R550 1.02 |
| Second retarder | R (nm) 140<br>Rth (nm) −70<br>NZ 1.0<br>R450/R550 0.88<br>R650/R550 1.02 |
| Third retarder | R (nm)<br>Rth (nm)<br>NZ<br>R450/R550<br>R650/R550 |
| Total Rth (nm) | −140 |
| Third polarizer | Reflective polarizer |

FIG.48B

| Example201 | |
|---|---|
| Polarizing louver viewing angle | 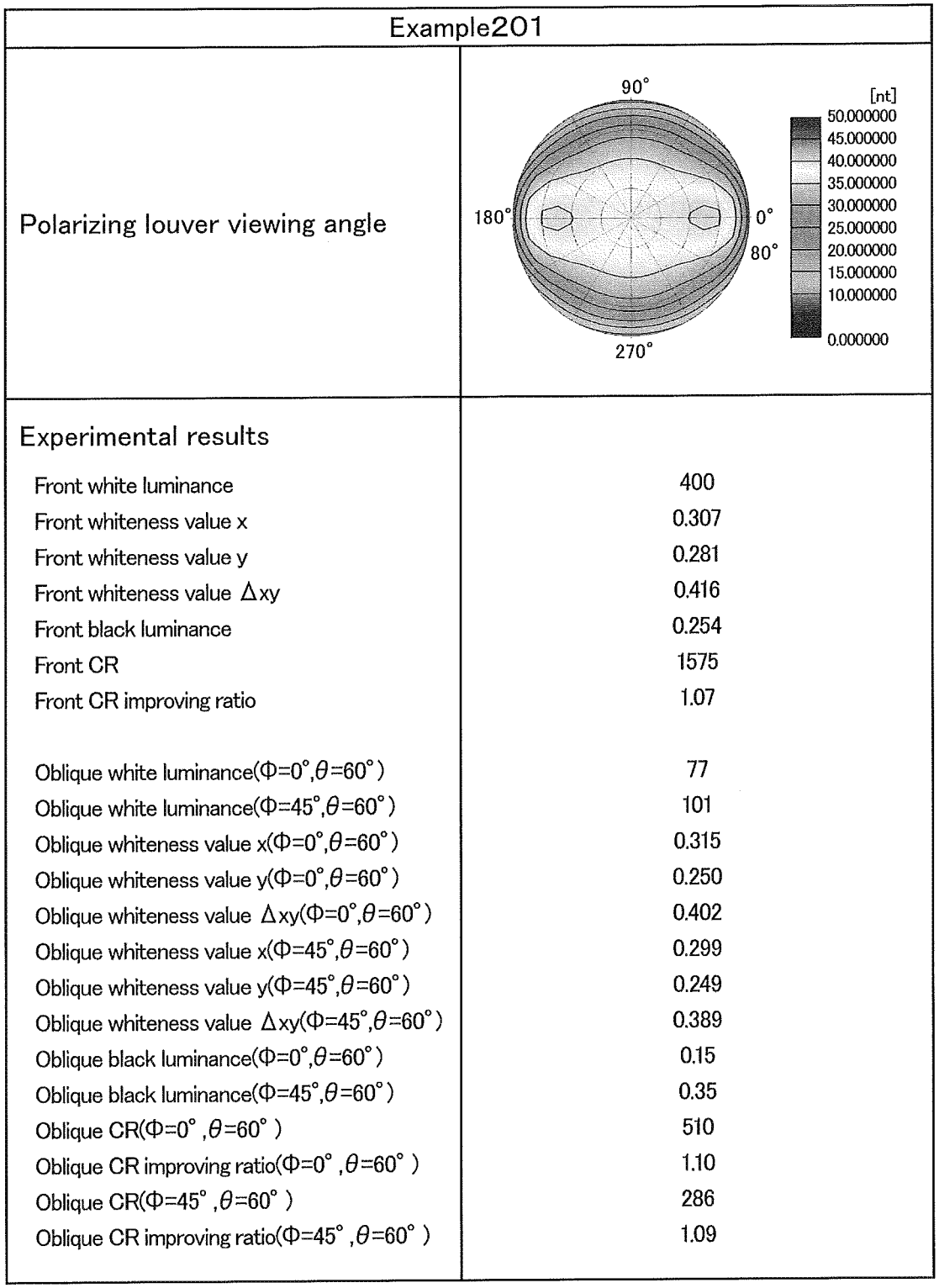 |
| Experimental results | |
| Front white luminance | 400 |
| Front whiteness value x | 0.307 |
| Front whiteness value y | 0.281 |
| Front whiteness value $\Delta xy$ | 0.416 |
| Front black luminance | 0.254 |
| Front CR | 1575 |
| Front CR improving ratio | 1.07 |
| | |
| Oblique white luminance($\Phi=0°, \theta=60°$) | 77 |
| Oblique white luminance($\Phi=45°, \theta=60°$) | 101 |
| Oblique whiteness value x($\Phi=0°, \theta=60°$) | 0.315 |
| Oblique whiteness value y($\Phi=0°, \theta=60°$) | 0.250 |
| Oblique whiteness value $\Delta xy$($\Phi=0°, \theta=60°$) | 0.402 |
| Oblique whiteness value x($\Phi=45°, \theta=60°$) | 0.299 |
| Oblique whiteness value y($\Phi=45°, \theta=60°$) | 0.249 |
| Oblique whiteness value $\Delta xy$($\Phi=45°, \theta=60°$) | 0.389 |
| Oblique black luminance($\Phi=0°, \theta=60°$) | 0.15 |
| Oblique black luminance($\Phi=45°, \theta=60°$) | 0.35 |
| Oblique CR($\Phi=0°, \theta=60°$) | 510 |
| Oblique CR improving ratio($\Phi=0°, \theta=60°$) | 1.10 |
| Oblique CR($\Phi=45°, \theta=60°$) | 286 |
| Oblique CR improving ratio($\Phi=45°, \theta=60°$) | 1.09 |

FIG.49B

| Example203 | |
|---|---|
| Polarizing louver viewing angle | 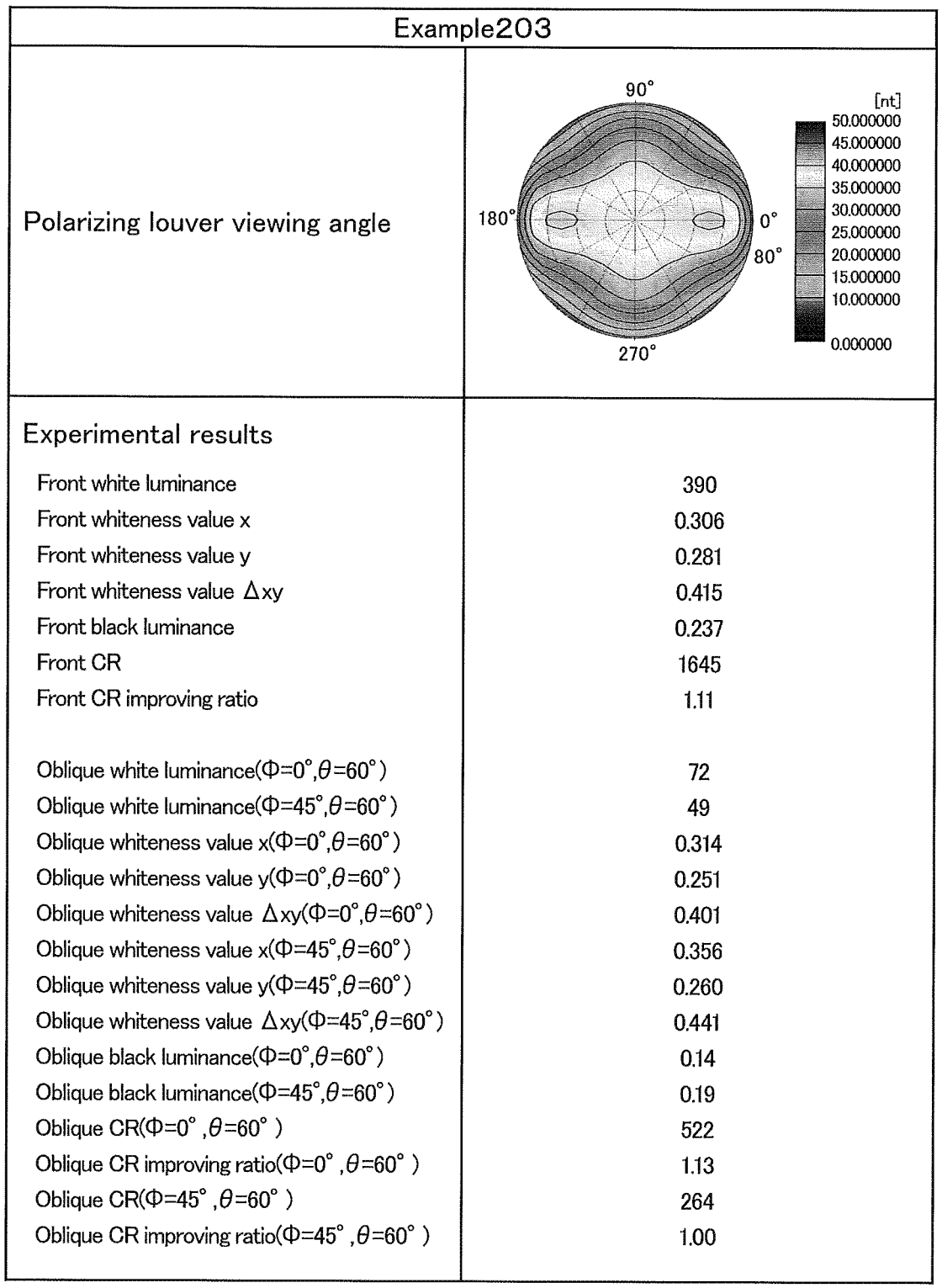 |
| Experimental results | |
| Front white luminance | 390 |
| Front whiteness value x | 0.306 |
| Front whiteness value y | 0.281 |
| Front whiteness value $\Delta xy$ | 0.415 |
| Front black luminance | 0.237 |
| Front CR | 1645 |
| Front CR improving ratio | 1.11 |
| | |
| Oblique white luminance($\Phi=0°, \theta=60°$) | 72 |
| Oblique white luminance($\Phi=45°, \theta=60°$) | 49 |
| Oblique whiteness value x($\Phi=0°, \theta=60°$) | 0.314 |
| Oblique whiteness value y($\Phi=0°, \theta=60°$) | 0.251 |
| Oblique whiteness value $\Delta xy(\Phi=0°, \theta=60°)$ | 0.401 |
| Oblique whiteness value x($\Phi=45°, \theta=60°$) | 0.356 |
| Oblique whiteness value y($\Phi=45°, \theta=60°$) | 0.260 |
| Oblique whiteness value $\Delta xy(\Phi=45°, \theta=60°)$ | 0.441 |
| Oblique black luminance($\Phi=0°, \theta=60°$) | 0.14 |
| Oblique black luminance($\Phi=45°, \theta=60°$) | 0.19 |
| Oblique CR($\Phi=0°, \theta=60°$) | 522 |
| Oblique CR improving ratio($\Phi=0°, \theta=60°$) | 1.13 |
| Oblique CR($\Phi=45°, \theta=60°$) | 264 |
| Oblique CR improving ratio($\Phi=45°, \theta=60°$) | 1.00 |

| Example209 ||
|---|---|
| Schematic cross-sectional view |  |
| First retarder<br>R (nm)<br>Rth (nm)<br>NZ<br>R450/R550<br>R650/R550 | 0<br>−270<br>+∞<br>1.01<br>0.99 |
| Second retarder<br>R (nm)<br>Rth (nm)<br>NZ<br>R450/R550<br>R650/R550 | |
| Third retarder<br>R (nm)<br>Rth (nm)<br>NZ<br>R450/R550<br>R650/R550 | |
| Total Rth (nm) | −270 |
| Third polarizer | Reflective polarizer |

FIG.50B

| Example209 ||
|---|---|
| Polarizing louver viewing angle | 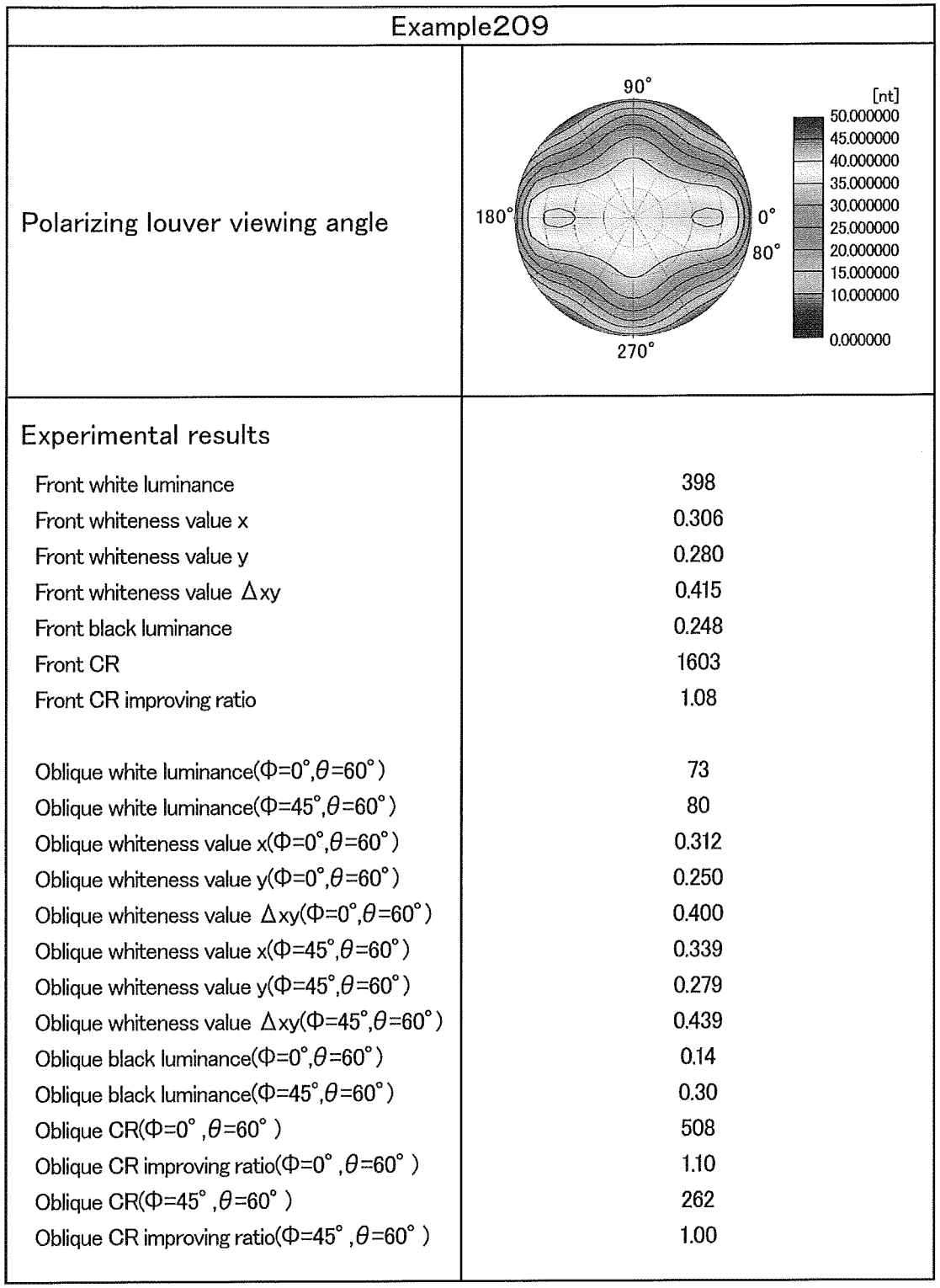 |
| Experimental results ||
| Front white luminance | 398 |
| Front whiteness value x | 0.306 |
| Front whiteness value y | 0.280 |
| Front whiteness value $\Delta xy$ | 0.415 |
| Front black luminance | 0.248 |
| Front CR | 1603 |
| Front CR improving ratio | 1.08 |
| Oblique white luminance($\Phi=0°, \theta=60°$) | 73 |
| Oblique white luminance($\Phi=45°, \theta=60°$) | 80 |
| Oblique whiteness value x($\Phi=0°, \theta=60°$) | 0.312 |
| Oblique whiteness value y($\Phi=0°, \theta=60°$) | 0.250 |
| Oblique whiteness value $\Delta xy$($\Phi=0°, \theta=60°$) | 0.400 |
| Oblique whiteness value x($\Phi=45°, \theta=60°$) | 0.339 |
| Oblique whiteness value y($\Phi=45°, \theta=60°$) | 0.279 |
| Oblique whiteness value $\Delta xy$($\Phi=45°, \theta=60°$) | 0.439 |
| Oblique black luminance($\Phi=0°, \theta=60°$) | 0.14 |
| Oblique black luminance($\Phi=45°, \theta=60°$) | 0.30 |
| Oblique CR($\Phi=0°, \theta=60°$) | 508 |
| Oblique CR improving ratio($\Phi=0°, \theta=60°$) | 1.10 |
| Oblique CR($\Phi=45°, \theta=60°$) | 262 |
| Oblique CR improving ratio($\Phi=45°, \theta=60°$) | 1.00 |

White luminance viewing angle

Black luminance viewing angle

Contrast ratio viewing angle

LIQUID CRYSTAL DISPLAY DEVICE AND POLARIZING PLATE

CROSS-REFERENCE TO RELATED APPLICATIONS

The present application is a continuation application of U.S. patent application Ser. No. 17/332,443, filed on May 27, 2021, which claims priority from Japanese Patent Application 2020-095061 filed on May 29, 2020 and Japanese Patent Application No. 2020-154960 filed on Sep. 15, 2020, the content of which is hereby incorporated by reference into this application.

BACKGROUND OF THE INVENTION

Field of the Invention

The present invention relates to liquid crystal display devices and polarizing plates.

Description of Related Art

A typical liquid crystal display device typically consists of members such as a liquid crystal panel, a backlight, and optical elements including a polarizing plate and a retarder. Liquid crystal display devices have excellent display properties and are thus widely used for electronic devices such as monitors, projectors, mobile phones, and personal digital assistants (PDAs).

Also, a technique has been known in which use of a polarizing plate and a retarder can control the viewing angle characteristics of light emitted from a backlight. Specifically, WO 2012/090769 discloses, for example, an optical element including a first polarizer, a birefringent layer, and a second polarizer, the first polarizer, the birefringent layer, and the second polarizer being stacked in the stated order, the first polarizer including a transmission axis parallel to a transmission axis of the second polarizer, the birefringent layer having a biaxial order parameter NZ satisfying 10≤NZ or NZ≤−9, the birefringent layer having an absolute value of thickness retardation |Rth| satisfying |Rth|≥200 nm.

JP 2008-3232 A discloses, as an optical sheet that is used for a backlight and includes a prism sheet, an optical sheet having a wide viewing angle and not causing side lobes, and describes the fact that conventional optical sheets including a prism sheet causes side lobes.

BRIEF SUMMARY OF THE INVENTION

Liquid crystal display devices still have room for improvement in the point that they usually have a low contrast ratio (CR) and in particular, the black color of a dark image is less likely to be recognized as black.

The reasons for this are as follows. A liquid crystal panel used in a liquid crystal display device includes a polarizing plate having viewing angle dependence. Thus, light leakage occurs in a black display state observed from oblique directions. Additionally, a prism sheet used for increasing the luminance of a backlight (BL) also has poor viewing angle characteristics (e.g., see paragraphs [0027-0037] and FIGS. 2 and 3 in JP 2008-3232 A) and tends to extremely increase the luminance in specific oblique directions (this phenomenon is expressed as that a luminance profile has side lobes). This tendency combines with poor viewing angle characteristics of the polarizing plate to cause light leakage.

This phenomenon is specifically described with reference to FIGS. 51 to 53. FIG. 51 is a schematic cross-sectional view of a liquid crystal display device of Comparative Embodiment 1. FIG. 52 is a contour plot showing the measurement results of backlight viewing angles of the liquid crystal display device of Comparative Embodiment 1. FIG. 53 includes contour plots showing measurement results of viewing angle characteristics of the liquid crystal display device of Comparative Embodiment 1. The upper plot shows white luminance viewing angles, the middle plot shows black luminance viewing angles, and the lower plot shows contrast ratio viewing angles.

Herein, white luminance and black luminance respectively mean the luminance in a white display state and the luminance in a black display state. Whiteness means the chromaticity of white display. White luminance viewing angles, black luminance viewing angles, contrast ratio viewing angles, and backlight viewing angles respectively mean the viewing angle characteristics of the luminance in a white display state, the viewing angle characteristics of the luminance in a black display state, the viewing angle characteristics of contrast ratio, and the viewing angle characteristics of the luminance of the backlight.

As shown in FIG. 51, a liquid crystal display device 101 of Comparative Embodiment 1 sequentially includes from the viewing surface side a first polarizing plate 111 that is an absorptive polarizing plate, a liquid crystal panel 120, a second polarizing plate 112 that is an absorptive polarizing plate and is disposed in the crossed Nicols with respect to the first polarizing plate 111, a third polarizing plate 113 that is a reflective polarizing plate and is disposed in the parallel Nicols with respect to the second polarizing plate 112, and a backlight 140 including two prism sheets whose ridge lines of the uneven portions are perpendicular to each other. Thus, as shown in FIG. 52, the luminance profile of the backlight 140 has side lobes. Also, as shown in FIG. 53, light leakage occurs in oblique directions due to the side lobes of the prism sheets and/or poor viewing angle characteristics of the polarizing plates 111 to 113. Light leakage in oblique directions and an increase in amount of light obliquely incident on the liquid crystal panel deteriorate the contrast ratio in the front direction.

The reason for this is described with reference to FIG. 54. FIG. 54 is a schematic cross-sectional view showing scattering of oblique incident light in the liquid crystal panel. As shown in (1) of FIG. 54, oblique incident light obliquely incident on the liquid crystal panel 120 through the second polarizing plate 112 is firstly polarized into elliptically polarized light by a retarder 132 and a liquid crystal layer 123. As shown in (2), the elliptically polarized light changes its traveling direction into the normal direction because of scattering in the pair of substrates 121 and 122 of the liquid crystal panel 120 and in the liquid crystal layer 123 (the polarization state is rarely changed before and after the scattering). Then, as shown in (3), the elliptically polarized light passes through the retarder 131 and the first polarizing plate 111 without changing its polarization state, which causes light leakage to be observed according to the ellipticity. Thus, the contrast ratio in the front direction is deteriorated.

WO 2012/090769 discloses a technique for controlling the viewing angle characteristics of backlight illumination using a polarizing plate and a retarder but fails to disclose and imply the means for restricting the light leakage in oblique directions due to the side lobes of prism sheets. Thus, there is still room for further improving the contrast ratio in the front direction.

The present invention has been made under the current situation in the art and aims to provide a liquid crystal display device and a polarizing plate capable of improving the contrast ratio in the front direction.

(1) One embodiment of the present invention is directed to a liquid crystal display device sequentially including from a viewing surface side: a first polarizer including a first transmission axis; a liquid crystal panel; a second polarizer including a second transmission axis; a retarder; a third polarizer including a third transmission axis that is parallel to the second transmission axis; and a first prism sheet that includes a first uneven portion including a first ridge line, the third transmission axis and the first ridge line forming an angle of 30° or greater and 60° or smaller.

(2) In an embodiment of the present invention, the liquid crystal display device includes the structure (1), and a total absolute value of a thickness retardation between the second polarizer and the third polarizer is less than 400 nm.

(3) In an embodiment of the present invention, the liquid crystal display device includes the structure (2), and the total absolute value of the thickness retardation between the second polarizer and the third polarizer is 120 nm or more.

(4) In an embodiment of the present invention, the liquid crystal display device includes the structure (1), and a total absolute value of a thickness retardation between the second polarizer and the third polarizer is 400 nm or more.

(5) In an embodiment of the present invention, the liquid crystal display device includes the structure (4), and the total absolute value of the thickness retardation between the second polarizer and the third polarizer is 600 nm or less.

(6) In an embodiment of the present invention, the liquid crystal display device includes the structure (1), (2), (3), (4), or (5), and the retarder has reverse wavelength dispersion characteristics.

(7) In an embodiment of the present invention, the liquid crystal display device includes the structure (1), (2), (3), (4), (5), or (6), and the retarder has a biaxial order parameter NZ satisfying 0.9≤NZ<10.

(8) In an embodiment of the present invention, the liquid crystal display device includes the structure (7), and the retarder includes an in-plane slow axis that is parallel to or perpendicular to the second transmission axis.

(9) In an embodiment of the present invention, the liquid crystal display device includes the structure (7), and the retarder includes an in-plane slow axis that forms an angle of 30° or greater and 60° or smaller with the second transmission axis.

(10) In an embodiment of the present invention, the liquid crystal display device includes the structure (1), (2), (3), (4), (5), or (6), and the retarder has a biaxial order parameter NZ satisfying 10≤NZ.

(11) In an embodiment of the present invention, the liquid crystal display device includes the structure (1), (2), (3), (4), (5), (6), (7), (8), (9), or (10), and the retarder includes a plurality of the retarders.

(12) In an embodiment of the present invention, the liquid crystal display device includes the structure (1), (2), (3), (4), (5), (6), (7), (8), (9), (10), or (11), and the liquid crystal display device further includes a diffusion layer between the second polarizer and the first prism sheet.

(13) In an embodiment of the present invention, the liquid crystal display device includes the structure (1), (2), (3), (4), (5), (6), (7), (8), (9), (10), (11), or (12), and the liquid crystal display device further includes a viewing angle compensation film in at least one of a region between the first polarizer and the liquid crystal panel or a region between the liquid crystal panel and the second polarizer.

(14) One embodiment of the present invention is directed to a liquid crystal display device sequentially including from a viewing surface side: a first polarizer including a first transmission axis; a liquid crystal panel; a second polarizer including a second transmission axis; a retarder; a third polarizer including a third transmission axis that is not parallel to the second transmission axis; and a first prism sheet that includes a first uneven portion including a first ridge line, the first ridge line forming an angle of −15° or greater and +15° or smaller with an azimuth that halves an angle between the second transmission axis and the third transmission axis.

(15) In an embodiment of the present invention, the liquid crystal display device includes the structure (14), and a total absolute value of a thickness retardation between the second polarizer and the third polarizer is less than 400 nm.

(16) In an embodiment of the present invention, the liquid crystal display device includes the structure (15), and the total absolute value of the thickness retardation between the second polarizer and the third polarizer is 120 nm or more.

(17) In an embodiment of the present invention, the liquid crystal display device includes the structure (14), and a total absolute value of a thickness retardation between the second polarizer and the third polarizer is 400 nm or more.

(18) In an embodiment of the present invention, the liquid crystal display device includes the structure (17), and the total absolute value of the thickness retardation between the second polarizer and the third polarizer is 600 nm or less.

(19) In an embodiment of the present invention, the liquid crystal display device includes the structure (14), (15), (16), (17), or (18), and the retarder has reverse wavelength dispersion characteristics.

(20) In an embodiment of the present invention, the liquid crystal display device includes the structure (14), (15), (16), (17), (18), or (19), the retarder includes a plurality of the retarders, the retarders include a retarder having a biaxial order parameter NZ satisfying 0.9≤NZ<10 and a retarder having a biaxial order parameter NZ satisfying 10≤NZ, and the retarder satisfying 0.9≤NZ<10 includes an in-plane slow axis that forms an angle of −5° or greater and +5° or smaller with an azimuth that halves an angle between the second transmission axis and the third transmission axis.

(21) In an embodiment of the present invention, the liquid crystal display device includes the structure (14), (15), (16), (17), (18), (19), or (20), and the liquid crystal display device further includes a diffusion layer between the second polarizer and the first prism sheet.

(22) In an embodiment of the present invention, the liquid crystal display device includes the structure (14), (15), (16), (17), (18), (19), (20), or (21), and the liquid crystal display device further includes a viewing angle compensation film in at least one of a region between the first polarizer and the liquid crystal panel or a region between the liquid crystal panel and the second polarizer.

(23) One embodiment of the present invention is directed to a polarizing plate including: a pair of polarizers including a first polarizer and a second polarizer whose transmission axes are parallel to each other; a retarder between the paired polarizers; and a diffusion layer in at least one of a region between the paired polarizers or a region on a side without the retarder of the first polarizer.

(24) In an embodiment of the present invention, the polarizing plate includes the structure (23), and the retarder has reverse wavelength dispersion characteristics.

(25) In an embodiment of the present invention, the polarizing plate includes the structure (23) or (24), and the polarizing plate further includes a viewing angle compensation film on a side without the retarder of the second polarizer.

(26) One embodiment of the present invention is directed to a polarizing plate including: a pair of polarizers including a first polarizer and a second polarizer whose transmission axes are parallel to each other; and a retarder having reverse wavelength dispersion characteristics between the paired polarizers.

(27) In an embodiment of the present invention, the polarizing plate includes the structure (26), and the polarizing plate further includes a viewing angle compensation film on a side without the retarder of the first polarizer.

(28) In an embodiment of the present invention, the polarizing plate includes the structure (23), (24), (25), (26), or (27), and a total absolute value of a thickness retardation between the paired polarizers is less than 400 nm.

(29) In an embodiment of the present invention, the polarizing plate includes the structure (28), and the total absolute value of the thickness retardation between the paired polarizers is 120 nm or more.

(30) In an embodiment of the present invention, the polarizing plate includes the structure (23), (24), (25), (26), or (27), and a total absolute value of a thickness retardation between the paired polarizers is 400 or more.

(31) In an embodiment of the present invention, the polarizing plate includes the structure (30), and the total absolute value of the thickness retardation between the paired polarizers is 600 nm or less.

(32) In an embodiment of the present invention, the polarizing plate includes the structure (23), (24), (25), (26), (27), (28), (29), (30), or (31), and the retarder has a biaxial order parameter NZ satisfying 0.9≤NZ<10.

(33) In an embodiment of the present invention, the polarizing plate includes the structure (32), and the retarder includes an in-plane slow axis that is parallel to or perpendicular to the transmission axis of the first polarizer.

(34) In an embodiment of the present invention, the polarizing plate includes the structure (32), and the retarder includes an in-plane slow axis that forms an angle of 30° or greater and 60° or smaller with the transmission axis of the first polarizer.

(35) In an embodiment of the present invention, the polarizing plate includes the structure (23), (24), (25), (26), (27), (28), (29), (30), or (31), and the retarder has a biaxial order parameter NZ satisfying 10≤NZ.

(36) In an embodiment of the present invention, the polarizing plate includes the structure (23), (24), (25), (26), (27), (28), (29), (30), (31), (32), (33), (34), or (35), and the retarder includes a plurality of the retarders.

(37) One embodiment of the present invention is directed to a polarizing plate including: a pair of polarizers including a first polarizer and a second polarizer whose transmission axes are not parallel to each other; and a retarder between the paired polarizers.

(38) In an embodiment of the present invention, the polarizing plate includes the structure (37), and a total absolute value of a thickness retardation between the paired polarizers is less than 400 nm.

(39) In an embodiment of the present invention, the polarizing plate includes the structure (38), and the total absolute value of the thickness retardation between the paired polarizers is 120 nm or more.

(40) In an embodiment of the present invention, the polarizing plate includes the structure (37), and a total absolute value of a thickness retardation between the paired polarizers is 400 nm or more.

(41) In an embodiment of the present invention, the polarizing plate includes the structure (40), and the total absolute value of the thickness retardation between the paired polarizers is 600 nm or less.

(42) In an embodiment of the present invention, the polarizing plate includes the structure (37), (38), (39), (40), or (41), and the retarder has reverse wavelength dispersion characteristics.

(43) In an embodiment of the present invention, the polarizing plate includes the structure (37), (38), (39), (40), (41), (42), or (43), the retarder includes a plurality of the retarders, the retarders includes a retarder having a biaxial order parameter NZ satisfying 0.9≤NZ<10 and a retarder having a biaxial order parameter NZ satisfying 10≤NZ, and the retarder satisfying 0.9≤NZ<10 includes an in-plane slow axis that forms an angle of −5° or greater and +5° or smaller with an azimuth that halves an angle between the transmission axes of the paired polarizers.

(44) In an embodiment of the present invention, the polarizing plate includes the structure (37), (38), (39), (40), (41), (42), or (43), and the polarizing plate further includes a diffusion layer in at least one of a region between the paired polarizers or a region on a side without the retarder of the first polarizer.

(45) In an embodiment of the present invention, the polarizing plate includes the structure (44), and the polarizing plate further includes a viewing angle compensation film on a side without the retarder of the second polarizer.

(46) In an embodiment of the present invention, the polarizing plate includes the structure (37), (38), (39), (40), (41), (42), or (43), and the polarizing plate further includes a viewing angle compensation film on a side without the retarder of the first polarizer.

Advantageous Effects of Invention

The present invention can provide a liquid crystal display device and a polarizing plate capable of improving the contrast ratio in the front direction.

BRIEF DESCRIPTION OF THE DRAWINGS

FIG. 9A is a figure showing the structure of a liquid crystal display device and a polarizing plate of Comparative Example 1.

FIG. 9B is a figure showing calculation results of transmittance viewing angles of a polarizing louver of Comparative Example 1 and measurement results of parameters of the liquid crystal display device of Comparative Example 1.

FIG. 10B is a figure showing calculation results of transmittance viewing angles of a polarizing louver of Example 1 and measurement results of parameters of the liquid crystal display device of Example 1.

FIG. 11B is a figure showing calculation results of transmittance viewing angles of a polarizing louver of Comparative Example 2 and measurement results of parameters of the liquid crystal display device of Comparative Example 2.

FIG. 12A is a figure showing the structure of a liquid crystal display device and a polarizing plate of Example 2.

FIG. 12B is a figure showing calculation results of transmittance viewing angles of a polarizing louver of Example 2 and measurement results of parameters of the liquid crystal display device of Example 2.

FIG. 13B is a figure showing calculation results of transmittance viewing angles of a polarizing louver of Example 3 and measurement results of parameters of the liquid crystal display device of Example 3.

FIG. 14B is a figure showing calculation results of transmittance viewing angles of a polarizing louver of Comparative Example 3 and measurement results of parameters of the liquid crystal display device of Comparative Example 3.

FIG. 15A is a figure showing the structure of a liquid crystal display device and a polarizing plate of Example 4.

FIG. 15B is a figure showing calculation results of transmittance viewing angles of a polarizing louver of Example 4 and measurement results of parameters of the liquid crystal display device of Example 4.

FIG. 16A is a figure showing the structure of a liquid crystal display device and a polarizing plate of Example 5.

FIG. 16B is a figure showing calculation results of transmittance viewing angles of a polarizing louver of Example 5 and measurement results of parameters of the liquid crystal display device of Example 5.

FIG. 17B is a figure showing calculation results of transmittance viewing angles of a polarizing louver of Example 6 and measurement results of parameters of the liquid crystal display device of Example 6.

FIG. 18A is a figure showing the structure of a liquid crystal display device and a polarizing plate of Example 7.

FIG. 18B is a figure showing calculation results of transmittance viewing angles of a polarizing louver of Example 7 and measurement results of parameters of the liquid crystal display device of Example 7.

FIG. 19A is a figure showing the structure of a liquid crystal display device of Comparative Example 4.

FIG. 19B is a figure showing calculation results of transmittance viewing angles of a polarizing louver of Comparative Example 4 and measurement results of parameters of the liquid crystal display device of Comparative Example 4.

FIG. 20B is a figure showing calculation results of transmittance viewing angles of a polarizing louver of Example 8 and measurement results of parameters of the liquid crystal display device of Example 8.

FIG. 21B is a figure showing calculation results of transmittance viewing angles of a polarizing louver of Example 9 and measurement results of parameters of the liquid crystal display device of Example 9.

FIG. 22B is a figure showing calculation results of transmittance viewing angles of a polarizing louver of Example 10 and measurement results of parameters of the liquid crystal display device of Example 10.

FIG. 23A is a figure showing the structure of a liquid crystal display device of Comparative Example 5.

FIG. 23B is a figure showing calculation results of transmittance viewing angles of a polarizing louver of Comparative Example 5 and measurement results of parameters of the liquid crystal display device of Comparative Example 5.

FIG. 24A is a figure showing the structure of a liquid crystal display device and a polarizing plate of Example 11.

FIG. 24B is a figure showing calculation results of transmittance viewing angles of a polarizing louver of Example 11 and measurement results of parameters of the liquid crystal display device of Example 11.

FIG. 26B is a figure showing calculation results of transmittance viewing angles of a polarizing louver of Comparative Example 6 and measurement results of parameters of the liquid crystal display device of Comparative Example 6.

FIG. 28A is a figure showing the structure of a liquid crystal display device and a polarizing plate of Example 13.

FIG. 29A is a figure showing the structure of a liquid crystal display device and a polarizing plate of Example 14.

FIG. 30A is a figure showing the structure of a liquid crystal display device and a polarizing plate of Example 15.

FIG. 31A is a figure showing the structure of a liquid crystal display device and a polarizing plate of Example 16.

FIG. 32A is a figure showing the structure of a liquid crystal display device and a polarizing plate of Example 17.

FIG. 43A is a figure showing the structure of a liquid crystal display device of Comparative Example 101.

FIG. 43B is a figure showing calculation results of transmittance viewing angles of a polarizing louver of Comparative Example 101 and measurement results of parameters of the liquid crystal display device of Comparative Example 101.

FIG. 44B is a figure showing calculation results of transmittance viewing angles of a polarizing louver of Example 101 and measurement results of parameters of the liquid crystal display device of Example 101.

FIG. 45B is a figure showing calculation results of transmittance viewing angles of a polarizing louver of Example 103 and measurement results of parameters of the liquid crystal display device of Example 103.

FIG. 46A is a figure showing the structure of a liquid crystal display device and a polarizing plate of Example 109.

FIG. 46B is a figure showing calculation results of transmittance viewing angles of a polarizing louver of Example 109 and measurement results of parameters of the liquid crystal display device of Example 109.

FIG. 47B is a figure showing calculation results of transmittance viewing angles of a polarizing louver of Comparative Example 201 and measurement results of parameters of the liquid crystal display device of Comparative Example 201.

FIG. 48B is a figure showing calculation results of transmittance viewing angles of a polarizing louver of Example 201 and measurement results of parameters of the liquid crystal display device of Example 201.

FIG. 49B is a figure showing calculation results of transmittance viewing angles of a polarizing louver of Example 203 and measurement results of parameters of the liquid crystal display device of Example 203.

FIG. 50B is a figure showing calculation results of transmittance viewing angles of a polarizing louver of Example 209 and measurement results of parameters of the liquid crystal display device of Example 209.

DETAILED DESCRIPTION OF THE INVENTION

Term Definition

Figure 1:
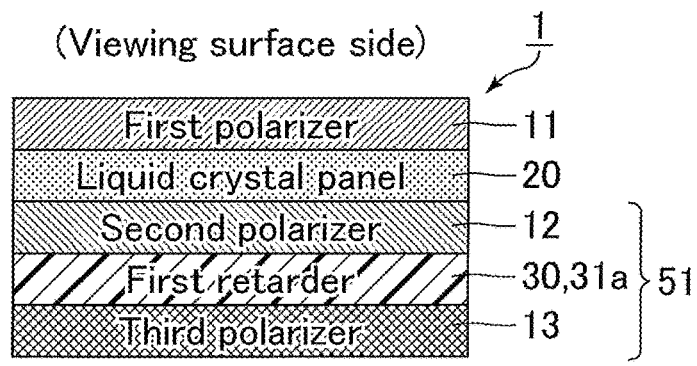
FIG. 1 is a schematic cross-sectional view showing a structure example of a liquid crystal display device and a polarizing plate of Embodiment 1.
Figure 1:
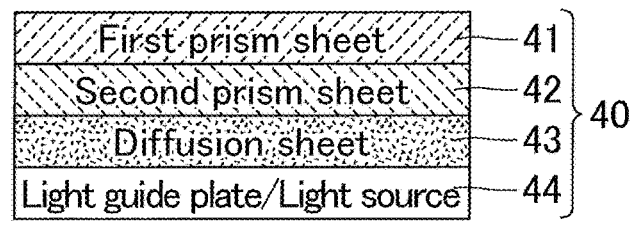

Herein, a polarizer means an object having a function of extracting polarized light vibrating in a specific direction only (linearly polarized light) from unpolarized light (natural light), partially polarized light, or polarized light, and is distinguished from a circular polarizer (a circularly polarizing plate). Unless otherwise noted, a "polarizer" herein indicates an element having a polarizing function and does not include protective film(s). An absorptive polarizer means a polarizer that absorbs light vibrating in a specific direction and passes through polarized light vibrating in the orthogonal direction to the specific direction (linearly polarized light). A reflective polarizer means a polarizer that reflects light vibrating in a specific direction and passes through polarized light vibrating in the orthogonal direction to the specific direction (linearly polarized light).

Herein, an in-plane retardation R is defined by R=(ns−nf)d. A thickness retardation Rth is defined by Rth=(nz−(nx+ny)/2)d. A coefficient NZ (biaxial order parameter) is defined by NZ=(ns−nz)/(ns−nf). A symbol ns indicates a greater value of nx and ny, and nf indicates a smaller value thereof. Symbols nx and ny indicate principal refractive indices of a birefringent layer (including a retarder and a liquid crystal panel) in an in-plane direction, nz indicates a principal refractive index in an out-of-plane direction, i.e., a direction orthogonal to the surface of the birefringent layer, and d indicates the thickness of the birefringent layer.

The following indices are herein used for showing the wavelength dispersion characteristics of a birefringent layer: R450/R550, which is a ratio of an in-plane retardation R at a wavelength of 450 nm to an in-plane retardation R at a wavelength of 550 nm; and R650/R550, which is a ratio of an in-plane retardation R at a wavelength of 650 nm to an in-plane retardation R at a wavelength of 550 nm.

Optical parameters such as principal refractive indices, retardation values, and coefficient NZ values are herein measured at a wavelength of 550 nm unless otherwise noted.

A birefringent layer herein indicates an optically anisotropic layer and conceptually includes a retarder and a liquid crystal panel. A birefringent layer means a layer in which one of the in-plane retardation R and the absolute value of the thickness retardation Rth is 10 nm or more, preferably 20 nm or more.

An isotropic film herein means a film in which both of the in-plane retardation R and the absolute value of the thickness retardation Rth are 10 nm or less, preferably 5 nm or less.

Herein, a viewing surface side means a side closer to the screen (display surface) of a liquid crystal display device, and a back surface side means a side further from the screen (display surface) of a liquid crystal display device.

Herein, a polar angle θ means an angle between an object direction (e.g., measurement direction) and the normal direction of the screen of a liquid crystal panel. An azimuth ϕ means a direction of an object direction projected on the screen of a liquid crystal panel and is expressed by an angle formed with a reference azimuth (azimuth angle). Here, the reference azimuth (ϕ=0°) is set at the horizontally right direction of the screen of a liquid crystal panel. Angles and azimuth angles have positive values in a counterclockwise direction and negative values in a clockwise direction. The counterclockwise and clockwise directions mean rotation directions when the screen of a liquid crystal panel is viewed from the viewing surface side (front side). An angle indicates a value measured in a planar view of a liquid crystal panel. A state in which two straight lines (including axes, directions, and ridge lines) are perpendicular to each other means that the lines are perpendicular to each other in a planar view of a liquid crystal panel.

An axis azimuth herein means the azimuth of the absorption axis (reflection axis) of a polarizer or the slow axis of a retarder, unless otherwise noted.

Hereinafter, embodiments of the present invention are described. The embodiments, however, are not intended to limit the scope of the present invention. The designs in the embodiments may appropriately be modified within the spirit of the present invention.

Embodiment 1

FIG. 1 is a schematic cross-sectional view showing a structure example of a liquid crystal display device and a polarizing plate of Embodiment 1. A liquid crystal display device 1 of the present embodiment is a transmissive liquid crystal display device that includes a stack sequentially including from the viewing surface side toward the back surface side a first polarizer 11, a liquid crystal panel 20 including a liquid crystal layer, a second polarizer 12, a first retarder 31a, a third polarizer 13, and a backlight (BL) 40 as shown in FIG. 1. A polarizing plate 51 of the present embodiment includes a stack sequentially including the second polarizer 12, the first retarder 31a, and the third polarizer 13. In other words, the polarizing plate 51 includes a pair of polarizers 12 and 13 and the first retarder 31a between the paired polarizers 12 and 13.

Figure 2:
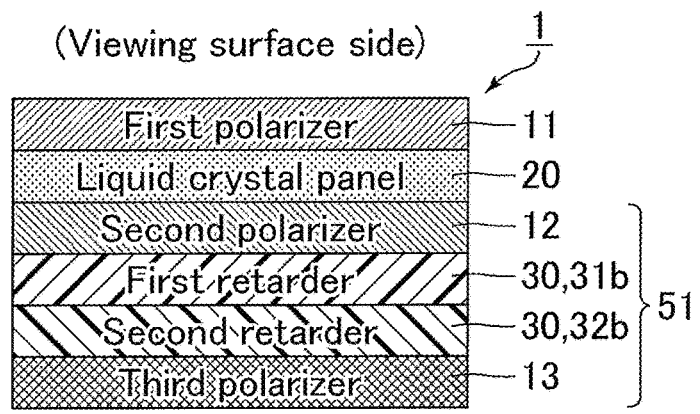
FIG. 2 is a schematic cross-sectional view showing another structure example of the liquid crystal display device and the polarizing plate of Embodiment 1.
Figure 2:
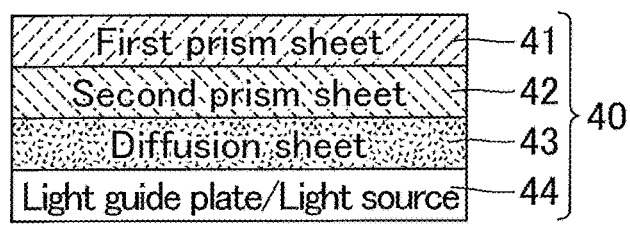

FIG. 2 is a schematic cross-sectional view showing another structure example of the liquid crystal display device and the polarizing plate of Embodiment 1. The liquid crystal display device 1 of the present embodiment may be a transmissive liquid crystal display device that includes a stack sequentially including from the viewing surface side toward the back surface side the first polarizer 11, the liquid crystal panel 20 including a liquid crystal layer, the second polarizer 12, a first retarder 31b, a second retarder 32b, the third polarizer 13, and the backlight (BL) 40 as shown in FIG. 2. The polarizing plate 51 of the present embodiment may include a stack sequentially including the second polarizer 12, the first retarder 31b, the second retarder 32b, and the third polarizer 13. In other words, the polarizing plate 51 may include the pair of polarizers 12 and 13, and the first retarder 31b and the second retarder 32b between the paired polarizers 12 and 13.

Figure 3:
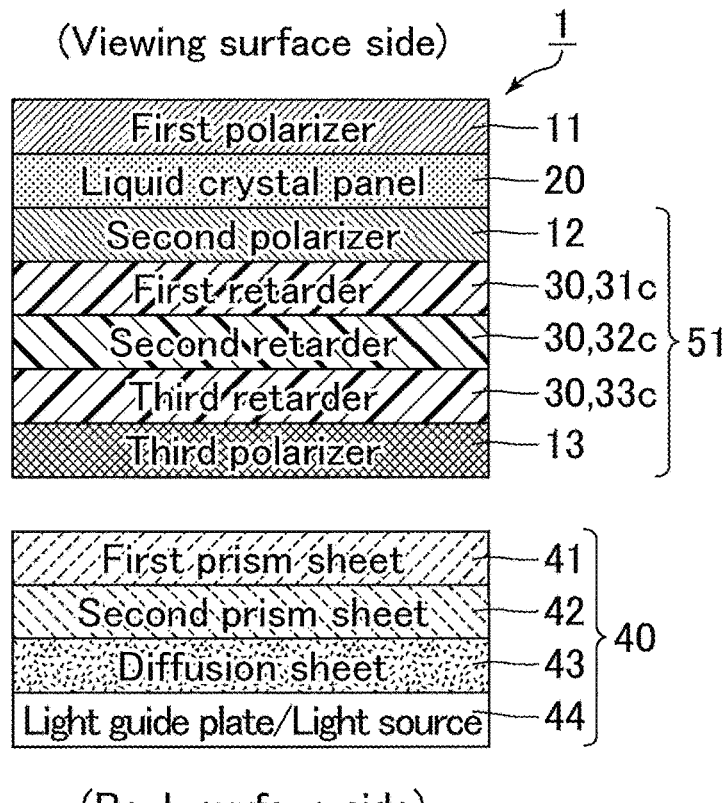
FIG. 3 is a schematic cross-sectional view showing still another structure example of the liquid crystal display device and the polarizing plate of Embodiment 1.

FIG. 3 is a schematic cross-sectional view showing still another structure example of the liquid crystal display device and the polarizing plate of Embodiment 1. The liquid crystal display device 1 of the present embodiment may be a transmissive liquid crystal display device that includes a stack sequentially including from the viewing surface side toward the back surface side the first polarizer 11, the liquid crystal panel 20 including a liquid crystal layer, the second polarizer 12, a first retarder 31c, a second retarder 32c, a third retarder 33c, the third polarizer 13, and the backlight (BL) 40 as shown in FIG. 3. The polarizing plate 51 of the present embodiment may include a stack sequentially including the second polarizer 12, the first retarder 31c, the second retarder 32c, the third retarder 33c, and the third polarizer 13. In other words, the polarizing plate 51 may include the pair of polarizers 12 and 13, and the first retarder 31c, the second retarder 32c, and the third retarder 33c between the paired polarizers 12 and 13.

The polarizing plate 51 is typically attached to the liquid crystal panel 20 with an adhesive layer (not shown).

Hereinafter, the first retarders 31a, 31b, and 31c, the second retarders 32b and 32c, and the third retarder 33c are each referred to as a retarder 30 when no particular distinguishment is needed.

The first polarizer 11 includes a first transmission axis and a first absorption axis perpendicular to the first transmission axis or a first reflection axis perpendicular to the first transmission axis. The second polarizer 12 includes a second transmission axis and a second absorption axis perpendicular to the second transmission axis or a second reflection axis perpendicular to the second transmission axis. The third polarizer 13 includes a third transmission axis and a third absorption axis perpendicular to the third transmission axis or a third reflection axis perpendicular to the third transmission axis.

The second polarizer 12 and the third polarizer 13 are arranged in the parallel Nicols. In other words, the second transmission axis (or the second absorption axis or the second reflection axis) of the second polarizer 12 and the third transmission axis (or the third absorption axis or the third reflection axis) of the third polarizer 13 are parallel to each other. Specifically, the axes form an angle in the range of 0°±10° (preferably in the range of 0°±5°).

The liquid crystal display device 1 includes the polarizing plate 51 sequentially including from the viewing surface side the second polarizer 12 including the second transmission axis, the retarder 30, and the third polarizer 13 including the third transmission axis that is parallel to the second transmission axis. The liquid crystal display device 1 thus can use collimation in which the distribution of light emitted from the backlight 40 is selectively focused to the normal direction, the second transmission axis direction (the third transmission axis direction), and the second absorption axis direction or the second reflection axis direction (the third absorption axis direction or the third reflection axis direction) (cross light distribution). As for light entering from other oblique directions such as directions at azimuths of 45°, 135°, 225°, and 315°, i.e., the directions that form an angle of about 45° with the second transmission axis direction (third transmission axis direction), the retarder 30 changes the polarization state of light having passed through the third polarizer 13 and causes a low transmittance observed.

A combination of the second polarizer 12, the retarder 30, and the third polarizer 13 functions as an optical louver and is thus referred to as a polarizing louver hereinbelow.

The backlight 40 sequentially includes from the viewing surface side toward the back surface side a first prism sheet 41 including a first uneven portion with first ridge lines, a second prism sheet 42 including a second uneven portion with second ridge lines perpendicular to the first ridge lines, a diffusion sheet 43, and a light source unit 44 including a light guide plate and a light source.

Accordingly, the luminance is increased by side lobes at azimuths at which the first ridge lines and the second ridge lines extend and at azimuths perpendicular to the azimuths.

Figure 54:
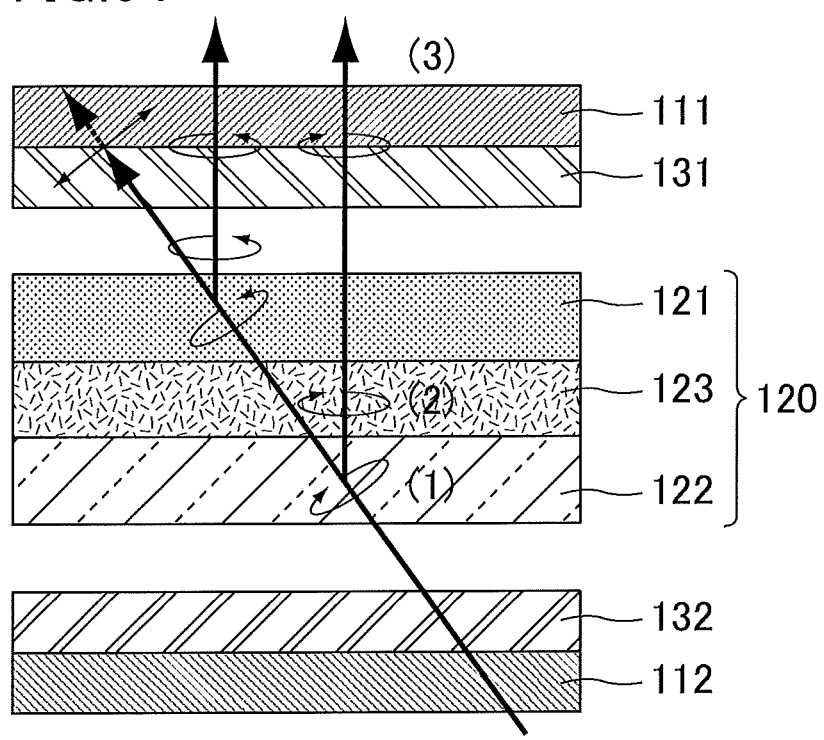
FIG. 54 is a schematic cross-sectional view showing scattering of oblique incident light in a liquid crystal panel.

In the present embodiment, the angle between the third transmission axis of the third polarizer 13 and each first ridge line of the first prism sheet 41 (the angle between the second transmission axis of the second polarizer 12 and each first ridge line of the first prism sheet 41) is set to 30° or greater and 60° or smaller (preferably 40° or greater and 50° or smaller, more preferably 43° or greater and 47° or smaller, still more preferably substantially 45°). In this structure, the azimuth at which the polarizing louver dims light can substantially match the azimuths at which the luminance is increased by side lobes of the first and second prism sheets 41 and 42. Thereby, oblique incident light obliquely incident on the liquid crystal panel 20 is effectively restricted particularly at an azimuth the luminance is increased by side lobes. This can resultantly restrict a reduction in contrast ratio in the front direction due to scattering of oblique incident light as described with reference to FIG. 54. In other words, this can improve the contrast ratio in the front direction. The azimuth at which the polarizing louver dims light may not exactly match the azimuths at which the luminance is increased by side lobes.

Hereinafter, the liquid crystal display device 1 is specifically described.

The first polarizer 11 and the second polarizer 12 are arranged in the crossed Nicols. In other words, the first transmission axis (or the first absorption axis or the first reflection axis) of the first polarizer 11 and the second transmission axis (or the second absorption axis or the second reflection axis) of the second polarizer 12 are perpendicular to each other. Specifically, the axes form an angle in the range of 90°±3° (preferably in the range of 90°±1°).

The first polarizer 11 and the second polarizer 12 may be arranged in the parallel Nicols. Still, they are preferably arranged in the crossed Nicols in order to achieve a high contrast ratio.

The polarizers 11, 12, and 13 may be formed from any material, may have any optical characteristics, and may each be a polarizer such as an absorptive polarizer or a reflective polarizer, for example. Specific examples thereof include an absorptive polarizer obtained by aligning dichroic anisotropic molecules such as an iodine complex adsorbed on a polyvinyl alcohol (PVA) film, a reflective polarizer obtained by uniaxially stretching a coextruded film including two resins (e.g., APCF available from Nitto Denko Corporation and DBEF available from 3M Japan Limited), and a reflective polarizer obtained by aligning thin metal wires in a periodic pattern (i.e., wire grid polarizer). A stack including an absorptive polarizer and a reflective polarizer may also be used.

Among these, an absorptive polarizer is suitable for the first polarizer 11 and the second polarizer 12, and a reflective polarizer is suitable for the third polarizer 13. In this case, the first polarizer 11 includes a first transmission axis and a first absorption axis perpendicular to the first transmission axis. The second polarizer 12 includes a second transmission axis and a second absorption axis perpendicular to the second transmission axis. The third polarizer 13 includes a third transmission axis and a third reflection axis perpendicular to the third transmission axis.

The polarizing louver may include a plurality of third polarizers 13 stacked. In this case, the third transmission axes of the third polarizers 13 are set at substantially the same azimuth.

In order to assure the mechanical strength and the humidity and heat resistance, a protective film (not shown) such as a triacetyl cellulose (TAC) film may be laminated on at least one of the viewing surface side or the back surface side of each of the polarizers 11, 12, and 13. The protective film is attached to the polarizer 11, 12, or 13 with any appropriate bonding layer (not shown) in between.

A protective film having the function of the retarder 30 may replace the retarder 30. In other words, at least one selected from the group consisting of the first retarders 31a, 31b, and 31c, the second retarders 32b and 32c, and the third retarder 33c may be a protective film such as a TAC film (wherein the absolute value of one of the in-plane retardation R and the thickness retardation Rth is 10 nm or greater).

The "bonding layer" herein means a layer that bonds the surfaces of adjacent optical elements and thereby integrates them with a practically sufficient adhesiveness in a practically sufficient bonding time. Examples of the material for forming the bonding layer include adhesives and anchor coating agents. The bonding layer may have a multilayer structure in which an anchor coating layer is formed on the surface of a bonding target and a bonding agent layer is formed on the anchor coating layer. The bonding layer may be a thin layer invisible with the naked eye.

Similarly to the "bonding layer", the "adhesive layer" herein is a layer that bonds the surfaces of adjacent optical elements and integrates them with a practically sufficient adhesiveness in a practically sufficient bonding time. The difference from the bonding layer is that the layer itself has adhesiveness and elasticity and thus can bond the objects with a slight pressure for a while at room temperature without a chemical reaction caused by a factor such as water, a solvent, or heat. Another difference is that objects attached by a bonding layer cannot be separated, while objects attached by an adhesive layer can be separated. Examples of the material for forming the adhesive layer include resins including acrylic resin, silicone resin, and urethane resin and rubber materials.

The axis azimuths of the second polarizer 12 and the third polarizer 13 may each be appropriately set and are each preferably in the range of 0°±10° or 90°±10°, more preferably in the range of 0°±5° or 90°±5°, particularly preferably substantially 0° or 90°. This structure can provide bright display in the normal direction and in the upper, lower, left, and right directions.

The total absolute value of the thickness retardation Rth between the second polarizer 12 and the third polarizer 13 may be (1) less than 400 nm (preferably 300 nm or less) or (2) 400 nm or more (preferably 500 nm or more). In the case (1), the polarizing louver can prevent an extreme reduction in luminance in oblique directions. Thus, this is suitable to general-purpose liquid crystal display devices required to have a certain viewing angle (e.g., laptop PCs, tablet computers, vehicle-mounted displays, and smartphones). Unfortunately, an effect of improving the contrast ratio in the front direction is inferior to the case (2). In the case (2), the polarizing louver may cause an extreme reduction in luminance in oblique directions but can achieve a higher contrast ratio in the front direction. Accordingly, this is suitable to liquid crystal display devices not required to have a wide viewing angle, such as head-mounted displays (VR displays), and to liquid crystal display devices including a light diffusion film or the like for increasing the viewing angle on the top surface thereof. As described above, the present embodiment has a trade-off relationship between the effect of improving the contrast ratio in the front direction and the white luminance viewing angle.

In the case (1), the total absolute value of the thickness retardation Rth between the second polarizer 12 and the third polarizer 13 is preferably 120 nm or more, more preferably 140 nm or more. An absolute value of less than 120 nm may fail to achieve a sufficient effect of improving the contrast ratio in the front direction.

Figure 33:
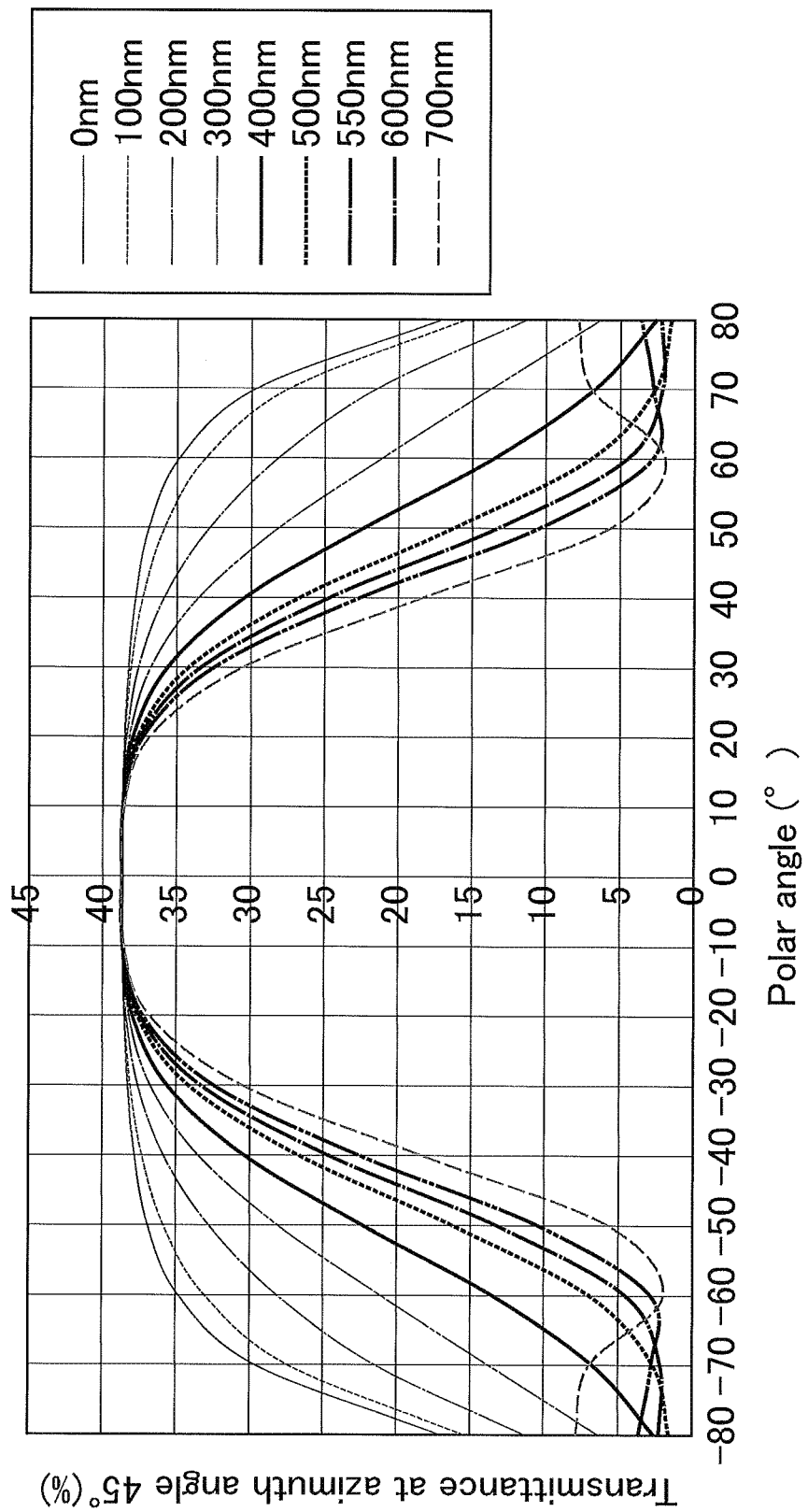
FIG. 33 is a graph showing calculation results of transmittance changes of the polarizing louver of Embodiment 1 at an azimuth of 45° under changing the polar angle, in which the total absolute value of the thickness retardation Rth between the second polarizer and the third polarizer ranges from 0 nm to 700 nm.
Figure 34:
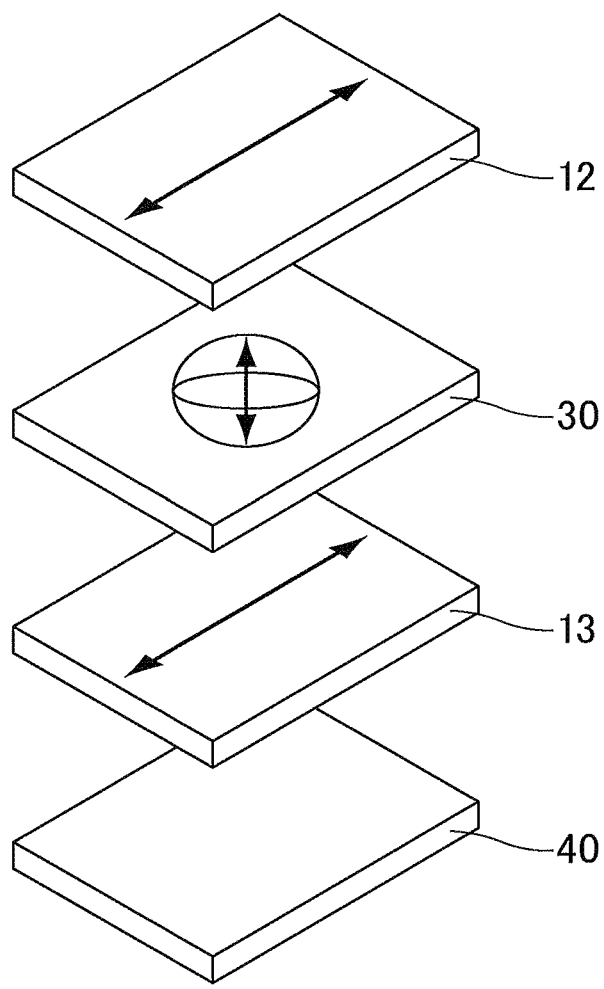
FIG. 34 is a schematic exploded perspective view showing the structure of the polarizing louver used for the calculation in FIG. 33.

In the case (2), the total absolute value of the thickness retardation Rth between the second polarizer 12 and the third polarizer 13 is preferably 600 nm or less, more preferably 550 nm or less. An absolute value exceeding 550 nm may cause even the polarizing louver to start having side lobes. In other words, the following phenomenon may be caused. That is, at an azimuth the polarizing louver dims light, as the polar angle increases, the transmittance monotonically decreases, monotonically increases, and then monotonically decreases again. FIG. 33 is a graph showing calculation results of transmittance changes of the polarizing louver of Embodiment 1 at an azimuth of 45° under changing the polar angles, in which the total absolute value of the thickness retardation Rth between the second polarizer and the third polarizer ranges from 0 nm to 700 nm. FIG. 34 is a schematic exploded perspective view showing the structure of the polarizing louver used for the calculation in FIG. 33. Here, the axis azimuths of the second polarizer 12 and the third polarizer 13 are set to 90°, a negative C plate and the retarder 30 is placed between these polarizers, and the thickness retardation Rth is changed. As shown in FIG. 33, when the total absolute value of the thickness retardation Rth exceeds 550 nm, side lobes of the polarizing louver increase along with an increase in total absolute value.

Herein, the total of the thickness retardation Rth between the second polarizer 12 and the third polarizer 13 means the total thickness retardation values Rth of all layers (films) between the second polarizer 12 and the third polarizer 13. Thus, for example, when a protective film such as a TAC film (which may be an isotropic film) is laminated on at least one of the back surface side of the second polarizer 12 or the viewing surface side of the third polarizer 13, the total thickness retardation Rth includes not only the thickness retardation Rth of the retarder(s) 30 but also the thickness retardation Rth of the protective film.

At least one retarder 30 preferably has reverse wavelength dispersion characteristics. This can restrict coloring of display (particularly white display) in an oblique view of the liquid crystal display device 1. More specifically, R450/R550 is preferably 0.80 or more and 0.99 or less, more preferably 0.82 or more and 0.90 or less. Also, R650/R550 is preferably 1.01 or more and 1.20 or less, more preferably 1.02 or more and 1.18 or less. In the case of disposing a plurality of the retarders 30, the effect of restricting coloring can be achieved to some extent by the structure where at least one retarder 30 has reverse wavelength dispersion characteristics. Still, all the retarders 30 between the second polarizer 12 and the third polarizer 13 preferably have reverse wavelength dispersion characteristics in order to restrict coloring.

The biaxial order parameter NZ of each retarder 30 may satisfy (I) 0.9≤NZ<10 (preferably 1.5≤NZ<5.0), (II) 10≤NZ (preferably 100 NZ), (III) −11<NZ≤−0.9, or (IV) NZ≤−11 (preferably NZ≤−100).

In the case (I), the in-plane slow axis of each retarder 30 may be (I-1) parallel to the second transmission axis of the second polarizer 12 (or the third transmission axis of the third polarizer 13) or (I-2) perpendicular thereto. In other words, the in-plane slow axis of the retarder 30 satisfying 0.9≤NZ<10 may be parallel to or perpendicular to the second transmission axis of the second polarizer 12. The expression "parallel to" in the case (I-1) specifically means that the axes form an angle in the range of 0°±10° (preferably in the range of 0°±5°), and the expression "perpendicular to" in the case (I-2) specifically means that the axes form an angle in the range of 90°±10° (preferably in the range of 90°±5°).

Figure 4A:
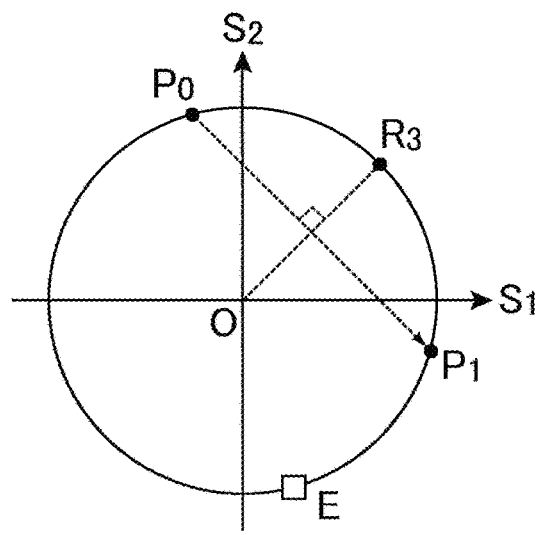
FIG. 4A is a figure showing transition of the polarization state in the liquid crystal display device and the polarizing plate of Embodiment 1 on the Poincare sphere in the case where the in-plane slow axis of each retarder is perpendicular to the second transmission axis of the second polarizer.
Figure 4B:
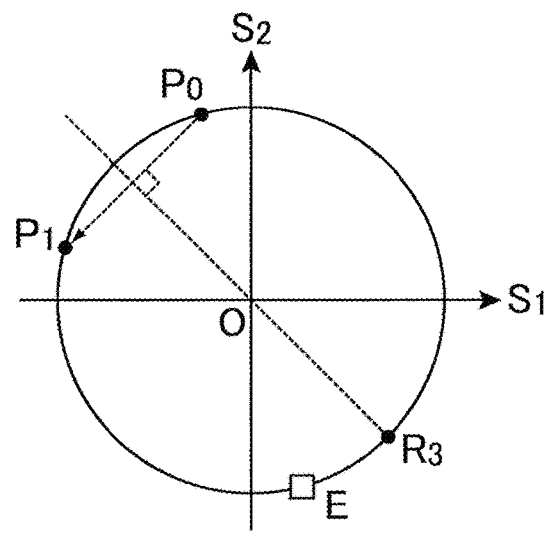
FIG. 4B is a figure showing transition of the polarization state in the liquid crystal display device and the polarizing plate of Embodiment 1 on the Poincare sphere in the case where the in-plane slow axis of each retarder is parallel to the second transmission axis of the second polarizer.

A similar effect can be achieved in the both (I-1) and (I-2) cases. However, in the case (I-2), a greater retardation is required in order to achieve the same effect as in the case (I-1). The reason why these cases require different retardations can be described using the Poincare sphere as shown in FIGS. 4A and 4B. FIG. 4A is a figure showing transition of the polarization state in the liquid crystal display device and the polarizing plate of Embodiment 1 on the Poincare sphere in the case where the in-plane slow axis of each retarder is perpendicular to the second transmission axis of the second polarizer. FIG. 4B is a figure showing transition of the polarization state in the liquid crystal display device and the polarizing plate of Embodiment 1 on the Poincare sphere in the case where the in-plane slow axis of each retarder is parallel to the second transmission axis of the second polarizer.

The concept using the Poincare sphere is widely known in the field of crystal optics or the like as a useful technique for tracking the polarization state of light changing through a birefringent layer (e.g., Hiroshi Takasaki, "crystal optics" (Kessho Kogaku), Morikita shuppan, 1975, p. 146 to 163)). On the Poincare sphere, right-handed polarized light is represented in the upper hemisphere, left-handed polarized light is represented in the lower hemisphere, linearly polarized light is represented on the equator, and right circularly polarized light and left circularly polarized light are respectively represented at the upper and lower poles. Two polarization states that are symmetric with respect to the center of the sphere represent a pair of polarized light beams whose polarization axes form an angle of 90° because the absolute values of their ellipticity angles are the same and their polarities are opposite to each other. Also, the function of a birefringent layer is expressed on the Poincare sphere as follows. That is, a point representing the polarization state of light immediately before passing through the birefringent layer is converted into a point that is rotated counterclockwise by an angle determined by $(2\pi)\times$(retardation)/(wavelength) (unit:rad) about the slow axis on the Poincare sphere (more precisely, a line segment connecting the origin point O and the point representing the polarization state of the slower mode of two natural vibration modes of the birefringent layer on the Poincare sphere) (the same function is achieved when the point is rotated clockwise about the fast axis). The rotation center and the rotation angle in an oblique view are determined by the slow axis (or fast axis) and the retardation at the viewing angle. Although detailed explanation is omitted, these can be calculated by, for example, solving the Fresnel's wave front normal equation and determining the vibration direction and the wavenumber vector of the natural vibration mode in the birefringent layer. The slow axis in an oblique view depends on the viewing angle and the coefficient NZ, and the retardation in an oblique view depends on the viewing angle, the coefficient NZ, and the in-plane retardation R (or the thickness retardation Rth).

Here, the case is considered in which light is incident on the polarizing louver satisfying the case (I-1) from an oblique direction at an azimuth of 45° and a polar angle of 60°. The polarization state of light emitted from the backlight 40 and then passed through the third polarizer 13 and the polarization state of light passed through the retarder 30 can be respectively represented as points P0 and P1 on an S1-S2 plane of the Poincare sphere as shown in FIG. 4A. A point E represents the polarization state of light at the extinction position (polarized light vibrating in the absorption axis direction) of the second polarizer 12 in an oblique view at an azimuth of 45° and a polar angle of 60°. The points representing the respective polarization states are actually on the Poincare sphere surface. In this figure, these points are projected on the S1-S2 plane. Light having passed through the third polarizer 13, whose polarization state is represented as the point P0, passes through the retarder 30. Thereby, the point P0 is rotated counterclockwise about a line segment R30 connecting a center O of the Poincare sphere and a point R3 representing the slow axis of the retarder 30 on the Poincare sphere, and is then converted to the point P1. The light is then incident on the second polarizer 12. Here, the amount of light passed through depends on the distance between the point P1 representing the polarization state of light having passed through the retarder 30 and the point E representing the polarization state of light at the extinction position of the second polarizer 12. More precisely, the transmittance is proportional to $\sin^2((\frac{1}{2})\times\angle P1OE)$.

Similarly, the case where light is incident on the polarizing louver satisfying the case (I-2) from an oblique direction at an azimuth 45° and a polar angle 60° can be shown as in FIG. 4B. Light having passed through the third polarizer 13, whose polarization state is represented as the point P0, passes through the retarder 30. Thereby, the point P0 is rotated counterclockwise about a line segment connecting the center O of the Poincare sphere and the point R3 representing the slow axis of the retarder 30 on the Poincare sphere, and is then converted to the point P1. The light is then incident on the second polarizer 12. In the case (I-2), (in a view from the normal direction) the angle between the slow axis of the retarder 30 and the second absorption axis or the second reflection axis of the second polarizer 12 is 0° (the angle between the slow axis of the retarder 30 and the transmission axis of the second polarizer 12 is 90°). Thus, the point R3 and the point E are close to each other even in an oblique view. Accordingly, even after the rotational move about the line segment R30, the point P1 cannot come close to the point E, failing to sufficiently reduce the transmittance. In contrast, in the above-described case (I-1), the angle between the slow axis of the retarder 30 and the second absorption axis or the second reflection axis of the second polarizer 12 is 90° (the angle between the slow axis of the retarder 30 and the transmission axis of the second polarizer 12 is 0°). Thus, the point R3 is away from the point E in an oblique view. Accordingly, the rotational move about the line segment R30 allows the point P1 to come close to the point E, achieving a reduced transmittance in comparison to the case (I-2).

The position of the point R3 representing the slow axis of the retarder 30 in an oblique view at an azimuth of 45° and a polar angle of 60° depends on the coefficient NZ. As the coefficient NZ increases, the retarder 30 is more likely to function as a negative C plate. Thus, the point R3 moves closer to the +S1 axis in both of the cases where the angle between the slow axis of the retarder 30 and the second absorption axis or the second reflection axis of the second polarizer 12 is 0° and 90°. Then, the retarder 30 completely functions as a negative C plate at the ultimate satisfying 1<<NZ (NZ→+∞), where the point R3 comes on the +S1 axis. In contrast, as the coefficient NZ decreases, the retarder 30 is more likely to function as a positive C plate. Thus, the point R3 moves closer to the −S1 axis in both of the cases where the angle between the slow axis of the retarder 30 and the second absorption axis or the second reflection axis of the second polarizer 12 is 0° and 90°.

Figure 5:
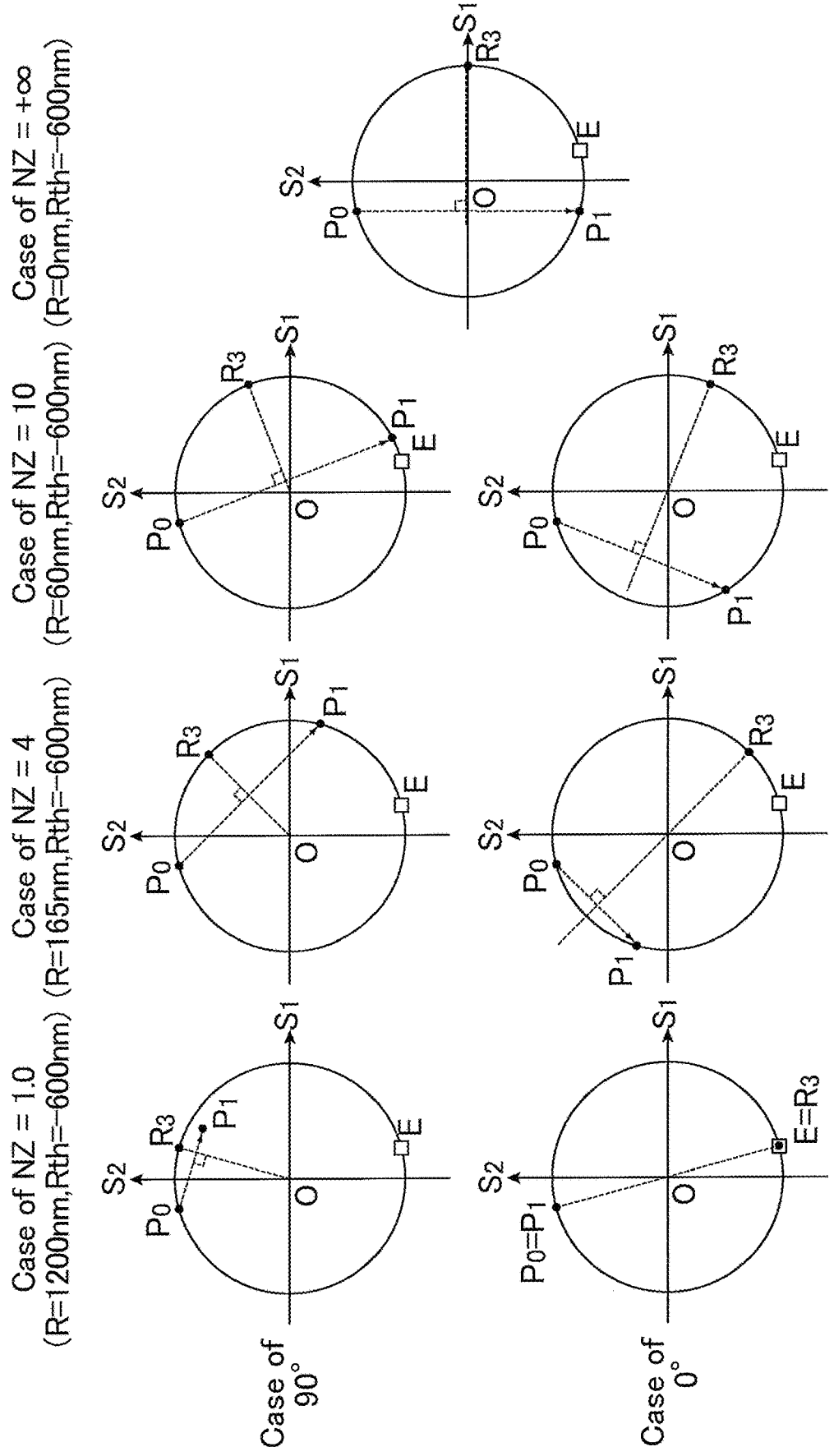
FIG. 5 is a figure showing transition of the polarization state in the liquid crystal display device and the polarizing plate of Embodiment 1 on the Poincare sphere under changing the NZ value in the cases where the in-plane slow axis of each retarder forms an angle of 90° and an angle of 0° with the second absorption axis or the second reflection axis of the second polarizer.

In order to confirm the operation principle for each coefficient NZ, the transition of the polarization states through the cases of NZ=1, NZ=4, NZ=10, and NZ=+∞ are shown on the Poincare sphere in FIG. 5, separately in the case where the angle between the slow axis of the retarder 30 and the second absorption axis or the second reflection axis of the second polarizer 12 is 0° and in the case where the angle is 90° (the case satisfying NZ=+∞ has only one pattern because the case of 0° and the case of 90° show the same pattern). FIG. 5 is a figure showing transition of the polarization state in the liquid crystal display device and the polarizing plate of Embodiment 1 on the Poincare sphere under changing the NZ value in the cases where the in-plane slow axis of each retarder form an angle of 90° and an angle of 0° with the second absorption axis or the second reflection axis of the second polarizer. The Rth was fixed to −600 nm in each case.

As shown in FIG. 5, when the angle between the slow axis of the retarder 30 and the second absorption axis or the second reflection axis of the second polarizer 12 is 0°, the point P1 cannot approach the point E in comparison to the case where the angle is 90°. This structure thus fails to achieve a sufficient reduction in transmittance and a sufficient louver effect. In particular, in the case of NZ=1, the point P0 comes on the line segment R30 which is the center axis of rotation. Thus, the louver effect cannot be obtained at all. Thus, when the retarder 30 used has an in-plane retardation other than zero, the retarder 30 is more preferably placed to satisfy the case (I-1) where the slow axis of the retarder 30 is perpendicular to the second absorption axis or the second reflection axis of the second polarizer 12 (such that the slow axis of the retarder 30 is parallel to the second transmission axis of the second polarizer 12). Here, as shown in the result of the case satisfying NZ=10, as the NZ increases, the retarder 30 is more likely to function as a negative C plate. Thus, the transmittance in an oblique direction can be sufficiently reduced and a louver effect can be obtained in both of the perpendicular arrangement and the parallel arrangement. In such a case where the NZ exceeds 10, both of the perpendicular arrangement and the parallel arrangement are applicable. In the case of NZ=1, the point P0 is too close to the point R3 even in the perpendicular arrangement. Thus, the point P1 fails to come close to the point E by rotational move about the line segment R30, whereby almost no louver effect is obtained. Even after any adjustment in retardation value, the point P1 can be present only on the line segment P0P1 or on an extension line thereof (on the S1-S2 plane of the Poincare sphere). This structure thus fails to achieve a sufficient louver effect.

Therefore, in order to obtain a sufficient louver effect, the following conditions are preferably satisfied: (1) a perpendicular arrangement of the slow axis of the retarder 30 and the absorption axis of the second polarizer 12 (parallel arrangement of the slow axis of the retarder 30 and the second transmission axis of the second polarizer 12) (in the case where the retarder 30 satisfies 10<NZ, both of a perpendicular arrangement and a parallel arrangement are applicable); and (2) the coefficient NZ is as great as possible.

In the case where a plurality of the retarders 30 is used (the cases shown in FIGS. 2 and 3) and each retarder 30 satisfies the case (I-1) or (I-2), the in-plane slow axes of the retarders 31b and 32b or the in-plane slow axes of the retarders 31c, 32c, and 33c preferably have the same arrangement relation relative to the second transmission axis of the second polarizer 12. In other words, the retarders 31b and 32b or the retarders 31c, 32c, and 33c preferably have in-plane slow axes each being parallel to the second transmission axis (the above (I-1)) or have in-plane slow axes each being perpendicular to the second transmission axis (the above (I-2)).

In the case (I), the case (I-3) may be satisfied in which the angle between the in-plane slow axis of each retarder 30 and the second transmission axis of the second polarizer 12 (or the third transmission axis of the third polarizer 13) is set to 30° or greater and 60° or smaller (preferably 40° or greater and 50° or smaller, more preferably 43° or greater and 47° or smaller, still more preferably substantially 45°).

In the case where a plurality of the retarders 30 is used (the cases shown in FIGS. 2 and 3) and each retarder 30 satisfies the case (I-3), the in-plane slow axes of the retarders 31b and 32b or the in-plane slow axes of the retarders 31c, 32c, and 33c are preferably perpendicular to each other. In the case where the retarder 30 includes an even number of retarders (2n retarders in which n is a natural number), n retarders 30 and the rest of n retarders 30 are preferably arranged such that the in-plane slow axes are perpendicular to each other. In other words, preferably, the in-plane slow axis of one of the retarders 31b and 32b forms an angle of 30° or greater and 60° or smaller with the second transmission axis, and the in-plane slow axis of the other forms an angle of −60° or greater and −30° or smaller with the second transmission axis. When the retarder 30 includes four or more even number of retarders, the order of stacking is not limited. The same effect can be achieved by arranging the in-plane slow axes, for example, in either of the following orders from the viewing surface side: azimuth 45°/azimuth 135°/azimuth 45°/azimuth 135°, azimuth 45°/azimuth 45°/ azimuth 135°/azimuth 135°; and azimuth 45°/azimuth 135°/ azimuth 135°/azimuth 45°. When the retarder 30 includes an odd number of retarders, the in-plane slow axes are preferably arranged such that the total of the in-plane retardations is zero in order to eliminate the influence in the front direction. For example, when the retarder includes the three retarders shown in FIG. 3, the in-plane slow axis of the retarder 31c having an in-plane retardation R may be set to an azimuth 45°, the in-plane slow axis of the retarder 32c having an in-plane retardation 2R (twice the in-plane retardation of the retarder 31c) may be set to an azimuth 135°, and the in-plane slow axis of the retarder 33c having an in-plane retardation R (the same in-plane retardation as the retarder 31c) may be set to an azimuth 45°.

In the case (II), the upper limit of the biaxial order parameter NZ of each retarder 30 is not limited and may be +=∞. In this case, the retarder 30 functions as a negative C plate.

Also, in the case (IV), the lower limit of the biaxial order parameter NZ of each retarder 30 is not limited and may satisfy (III) NZ=−∞. In this case, the retarder 30 functions as a positive C plate.

In the cases (II) and (IV), each retarder 30 has a sufficiently small in-plane retardation R and is substantially optically isotropic in the plane. Thus, each retarder 30 can be placed in any direction in the plane.

As for the retarder 30, (A) one retarder 30 may be used as shown in FIG. 1, or (B) a plurality of the retarders 30 may be used as shown in FIG. 2 or 3.

In the case (B), the retarders 30 are preferably substantially the same as each other (those prepared using substantially the same material through substantially the same steps and exhibiting substantially the same properties). The first reason for this is economic rationality. Typically, a large amount of retarder is manufactured in rolls with a long length at once. Thus, the production cost can be reduced by using fewer types of retarders or the same type of retarder. The second reason is a technical merit. In consideration of ununiformity in products (especially in the case where a plurality of the retarders 30 satisfies the case (I-3)), use of retarders of the same type increases the possibility of achieving that the in-plane retardations R are completely cancelled and thereby no residual retardation is left.

Examples of the material for forming each retarder 30 include, but not limited to, stretched polymer films, liquid crystal materials with fixed alignment, and thin plates formed from inorganic materials. Each retarder 30 may be formed by any method. In formation using a polymer film, for example, the retarder can be formed by a method such as solvent casting or melt extrusion. Multiple retarders 30 may be simultaneously formed by coextrusion. The retarder(s) may be non-stretched or stretched as long as the desired retardation is exhibited. Any stretching method may be used, including inter-roll tensile stretching, inter-roll compression stretching, tenter horizontal uniaxial stretching, oblique stretching, vertical and horizontal biaxial stretching, and special stretching in which a heat-shrinkable film is stretched under the shrinkage strength of the film. In formation using a liquid crystal material, a method can be employed which includes applying a liquid crystal material to a substrate film after alignment treatment and fixing the alignment, for example. The retarder(s) may be formed by other methods as long as the desired retardation is exerted, such as a method including no particular alignment treatment on a substrate film and a method including fixing the alignment of the liquid crystal material film, separating the liquid crystal material from a substrate film, and transferring the film to another film. Furthermore, a method may be employed which includes no step for fixing the alignment of a liquid crystal material. In formation using a non-liquid crystal material, methods similar to those using a liquid crystal material may be employed.

Examples of the retarder 30 satisfying $0.9 \le NZ < 10$ include a stretched film including as a component a material whose natural birefringence is positive. Examples of the material whose natural birefringence is positive include polycarbonate, polysulfone, polyethersulfone, polyethylene terephthalate, polyethylene, polyvinyl alcohol, norbornene, triacetyl cellulose, and diacetyl cellulose.

The retarder 30 satisfying $10 \le NZ$ may be a negative C plate or the like. Examples of the negative C plate include a film obtained by biaxially stretching a film horizontally and vertically, which contains as a component a material whose natural birefringence is positive, a film to which a liquid crystal material such as a cholesteric (chiral nematic) liquid crystal material or a discotic liquid crystal material is applied, and a film to which a non-liquid crystal material such as a polyimide or a polyamide is applied.

Examples of the retarder 30 satisfying $-11 < NZ \le -0.9$ include a stretched film which contains as a component a material whose natural birefringence is negative and a film in which a heat-shrinkable film containing as a component a material whose natural birefringence is positive is stretched under the shrinkage strength of the film. Preferred among these is a stretched film containing as a component a material whose natural birefringence is negative in order to simplify the production method. Examples of the material whose natural birefringence is negative include resin compositions including acrylic resin and styrene resin, polystyrene, polyvinyl naphthalene, polyvinyl biphenyl, polyvinyl pyridine, polymethyl methacrylate, polymethyl acrylate, an n-substituted maleimide copolymer, a polycarbonate including a fluorene skeleton, and triacetyl cellulose (especially one with a small acetylation degree).

The retarder 30 satisfying $NZ \le -11$ may be a positive C plate or the like. Examples of the positive C plate include a film obtained by biaxially stretching a film horizontally and vertically, which contains as a component a material whose natural birefringence is negative, and a film to which a liquid crystal material such as a nematic liquid crystal material is applied.

The liquid crystal panel 20 may be of any liquid crystal mode, such as a mode providing black display by aligning liquid crystal molecules in a liquid crystal layer in an orthogonal direction with respect to the substrate surface or a mode providing black display by aligning liquid crystal molecules in a liquid crystal layer in a parallel direction with respect to the substrate surface or in a direction that is not parallel or orthogonal with respect to the substrate surface. Examples of the driving mode of the liquid crystal panel include TFT mode (active matrix mode), simple matrix mode (passive matrix mode), and plasma address mode. Examples of the structure of the liquid crystal panel include a structure in which a liquid crystal layer is sandwiched between a pair of substrates one of which includes pixel electrodes and a common electrode, and an image is displayed by applying voltage between the pixel electrodes and the common electrode to form a horizontal electric field (including a fringe electric field) in the liquid crystal layer; a structure in which a liquid crystal layer is sandwiched between a pair of substrates one of which includes pixel electrodes and the other of which includes a common electrode, and an image is displayed by applying voltage between the pixel electrodes and the common electrode to form a vertical electric field in the liquid crystal layer. More specific examples of the horizontal electric field mode include a fringe field switching (FFS) mode and an in-plane switching (IPS) mode, in both of which in a no-voltage applied state, liquid crystal molecules in a liquid crystal layer are aligned in a direction parallel to the substrate surface. More specific examples of the vertical electric field mode include a vertical alignment (VA) mode in which in a no-voltage applied state, liquid crystal molecules in a liquid crystal layer are aligned in a direction orthogonal to the substrate surface.

Figure 6:
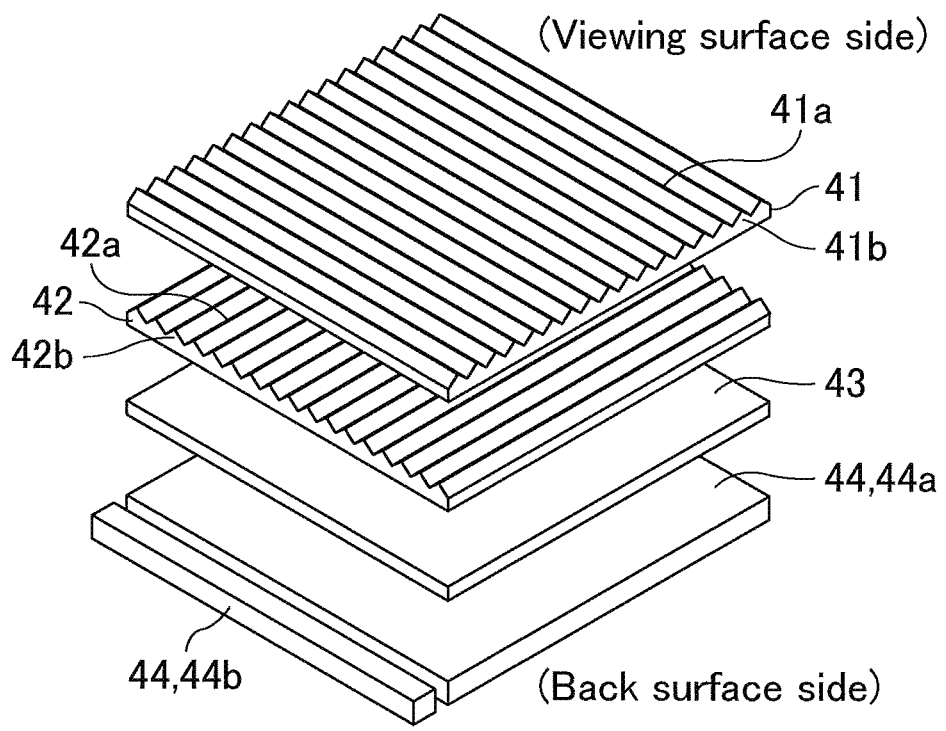
FIG. 6 is a schematic exploded perspective view of a backlight in the liquid crystal display device of Embodiment 1.
Figure 7:
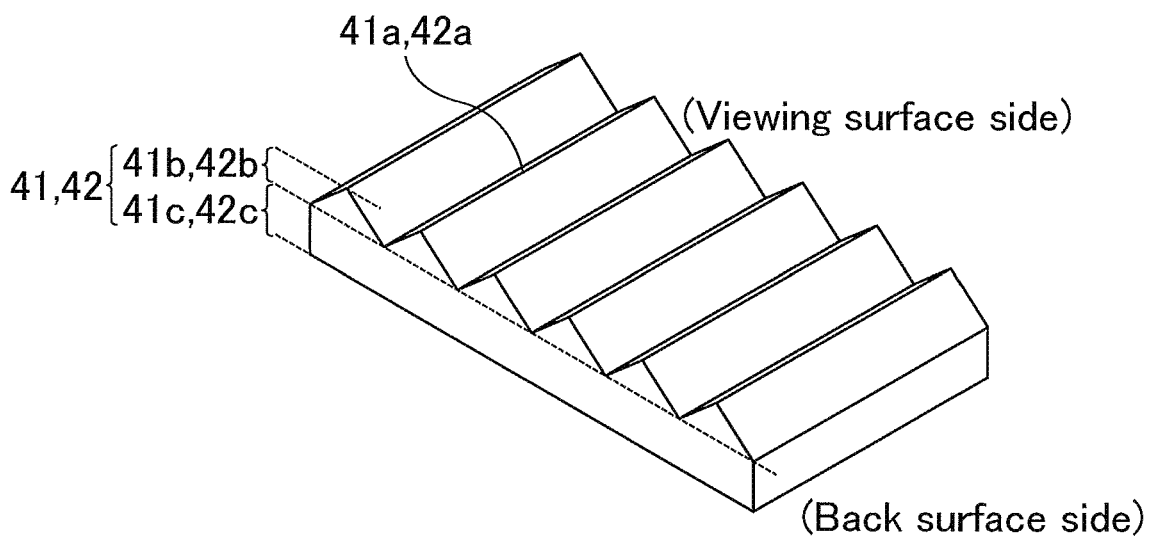
FIG. 7 is a schematic perspective view of first and second prism sheets of the backlight in the liquid crystal display device of Embodiment 1.

FIG. 6 is a schematic exploded perspective view of a backlight in the liquid crystal display device of Embodiment 1. FIG. 7 is a schematic perspective view of first and second prism sheets of the backlight in the liquid crystal display device of Embodiment 1. As shown in FIG. 6, the backlight 40 sequentially includes from the viewing surface side toward the back surface side the first prism sheet 41 including a first uneven portion 41b with first ridge lines 41a, the second prism sheet 42 including a second uneven portion 42b with second ridge lines 42a, the diffusion sheet 43, and the light source unit 44 including a light guide plate 44a and a light source 44b. The first ridge lines 41a and the second ridge lines 42a are perpendicular to each other. More specifically, a first ridge line 41a and a second ridge line 42a form an angle in the range of 90°±3° (preferably in the range of 90°±1°).

The first prism sheet 41 and the second prism sheet 42 each collect oblique light at an azimuth perpendicular to the first ridge lines 41a and the second ridge lines 42a, respectively, to the front direction. As shown in FIG. 7, the first prism sheet 41 and the second prism sheet 42 respectively further include a first flat portion 41c and a second flat portion 42c respectively supporting the first uneven portion 41b and the second uneven portion 42b. The flat portions 41c and 42c each have a structure including a flat surface on both of the viewing surface side and the back surface side. The first uneven portion 41b and the second uneven portion 42b include pillars parallel to the first flat portion 41c and the second flat portion 42c, respectively. The longitudinal directions of the pillars are parallel to one another. The pillars are each in a triangular prism shape, for example, and preferably have an isosceles triangular cross section in which two sides sandwiching the top apex of the convex portion have the same lengths. The first ridge lines 41a and the second ridge lines 42a are repetition of straight lines each connecting two opposed top apexes of the first uneven portion 41b and the second uneven portion 42b, respectively. The uneven portions 41b and 42b may each have an appropriate apex angle, an appropriate pitch of the convex portion, an appropriate height of the convex portion, or the like. The prism sheets 41 and 42 may each be a sheet of BEF series available from 3M Japan Limited, for example.

The backlight 40 may not include the second prism sheet 42. In this case, the first prism sheet 41, the diffusion sheet 43, and the light source unit 44 are sequentially stacked from the viewing surface side.

The diffusion sheet 43 is a translucent resin film and diffuses light emitted from the emitting surface of the light guide plate 44a, and thereby gives wider directional characteristics to light. A plurality of the diffusion sheets 43 may be used. In this case, the diffusion sheets 43 may be disposed in any region between the third polarizer 13 and the light source unit 44.

The light guide plate 44a is an optical element plate formed from a transparent resin such as a polycarbonate resin or a polymethyl methacrylate resin and has an emitting surface for emitting light on the viewing surface side. The light guide plate 44a guides light incident on the light guide plate 44a from the light source 44b to the entire emitting surface, and the light is uniformly emitted from the entire emitting surface.

The light source 44b is disposed in a position facing a side surface of the light guide plate 44a, emits light from a side surface, and allows the light to enter the light guide plate 44a. The light source 44b may be a light emitting diode (LED), for example.

Only one of the diffusion sheet 43 and the light guide plate 44a may be disposed in the backlight 40. The backlight 40 may be an edge backlight in which the light source 44b as mentioned above is disposed on a lateral side of the light guide plate 44a, or a direct backlight in which the light source 44b is stacked on the entire surface of the liquid crystal panel 20. In the case of a direct backlight, the diffusion sheet 43 and the light guide plate 44a may not be disposed.

The liquid crystal display device 1 may include four or more stacked retarders between the second polarizer 12 and the third polarizer 13. The above design concept may be achieved even in this case, and a similar effect can be achieved.

Embodiment 2

The present embodiment is substantially the same as Embodiment 1 except for the axis azimuth of the third polarizer, the structure of the retarder(s), and the arrangement direction of the first and second prism sheets. The repetitive description is thus appropriately omitted. In the present embodiment and Embodiment 1, the same members or the members having similar functions are given the same reference sign, and description for the member is omitted in the present embodiment as appropriate.

Figure 8:
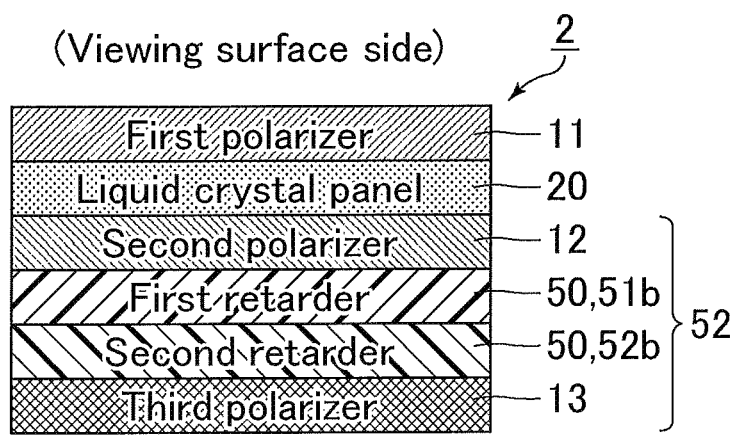
FIG. 8 is a schematic cross-sectional view showing a structure example of a liquid crystal display device and a polarizing plate of Embodiment 2.
Figure 8:
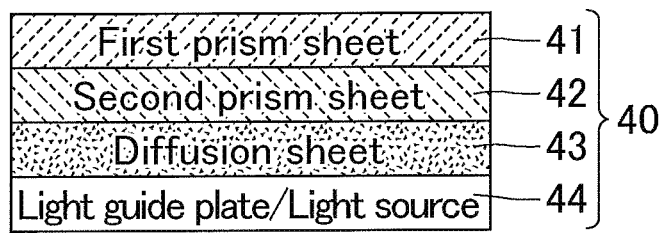

FIG. 8 is a schematic cross-sectional view showing a structure example of a liquid crystal display device and a polarizing plate of Embodiment 2. A liquid crystal display device 2 of the present embodiment is a transmissive liquid crystal display device and includes a stack sequentially including from the viewing surface side toward the back surface side the first polarizer 11, the liquid crystal panel 20 including a liquid crystal layer, the second polarizer 12, a first retarder 51b, a second retarder 52b, the third polarizer 13, and the backlight (BL) 40 as shown in FIG. 8. A polarizing plate 52 of the present embodiment is obtainable by sequentially stacking the second polarizer 12, the first retarder 51b, the second retarder 52b, and the third polarizer 13. In other words, the polarizing plate 52 includes a pair of polarizers 12 and 13 and the first retarder 51b and the second retarder 52b between the paired polarizers 12 and 13.

The polarizing plate 52 is usually attached to the liquid crystal panel 20 with an adhesive layer (not shown).

Hereinafter, the first retarder 51b and the second retarder 52b are each referred to as a retarder 50 when no particular distinguishment is needed.

In the present embodiment, the second polarizer 12 and the third polarizer 13 are not parallel to each other. In other words, the second transmission axis (or the second absorption axis or the second reflection axis) of the second polarizer 12 and the third transmission axis (or the third absorption axis or the third reflection axis) of the third polarizer 13 are not parallel to each other. More specifically, the axes form an angle of 20° or greater and 80° or smaller (preferably 30° or greater and 70° or smaller, more preferably 35° or greater and 65° or smaller).

The liquid crystal display device 2 includes the polarizing plate 52 sequentially including from the viewing surface side the second polarizer 12 including the second transmission axis, the retarder 50, and the third polarizer 13 including the third transmission axis that is not parallel to the second transmission axis. The liquid crystal display device 2 thus can use collimation in which the distribution of light emitted from the backlight 40 is selectively focused to the normal direction and an oblique direction at azimuth a that is none of the second transmission axis direction (the third transmission axis direction), the second absorption axis direction, and the second reflection axis direction (the third absorption axis direction and the third reflection axis direction) (anisotropic light distribution). As for light entering from other oblique directions, i.e., directions other than the azimuth a, the retarder 50 changes the polarization state of light having passed through the third polarizer 13 and causes a low transmittance observed. The azimuth a varies depending on the angle and the retardation value of the retarder 50, the direction of the third transmission axis of the third polarizer 13, and the design of the second transmission axis of the second polarizer 12.

Also in the present embodiment, the combination of the second polarizer 12, the retarder 50, and the third polarizer 13, which functions as an optical louver, is hereinafter referred to as a polarizing louver.

Similarly to Embodiment 1, the backlight 40 sequentially includes the first prism sheet 41 including a first uneven portion with first ridge lines and the second prism sheet 42 including a second uneven portion with second ridge lines perpendicular to the first ridge lines.

Accordingly, the luminance is increased by side lobes at azimuths at which the first ridge lines and the second ridge lines extend and at azimuths perpendicular to the azimuths also in the present embodiment.

In the present embodiment, the first and second prism sheets 41 and 42 are placed such that each first ridge line forms an angle of −15° or greater and +15° or smaller (preferably −10° or greater and +10° or smaller) with an azimuth that halves the angle between the second transmission axis and the third transmission axis. In this structure, the azimuth at which the polarizing louver dims light can come close to, preferably can substantially match, at least one of the azimuths at which the luminance is increased by side lobes of the first and second prism sheets 41 and 42. Thereby, oblique incident light that is obliquely incident on the liquid crystal panel 20 is effectively restricted particularly at azimuths at which the luminance is increased by side lobes. This can resultantly restrict a reduction in contrast ratio in the front direction due to scattering of oblique incident light as described with reference to FIG. 54. In other words, this structure can improve the contrast ratio in the front direction. The azimuth at which the polarizing louver dims light may not exactly correspond to at least one of the azimuths at which the luminance is increased by side lobes.

Hereinafter, the liquid crystal display device 2 is described.

The axis azimuths of the second polarizer 12 and the third polarizer 13 may each be appropriately set. The axis azimuth of the second polarizer 12 is preferably in the range of 0°±10° or 90°±10°, more preferably in the range of 0°±5° or 90°±5°, particularly preferably substantially 0° or 90°. This structure can provide bright display in the normal direction and in the upper, lower, left, and right directions.

The total absolute value of the thickness retardation Rth between the second polarizer 12 and the third polarizer 13 may be (1) less than 400 nm (preferably 300 nm or less) or (2) 400 nm or more (preferably 500 nm or more). In the case (1), the polarizing louver can prevent an extreme reduction in luminance in oblique directions. Thus, this is suitable to general-purpose liquid crystal display devices required to have a certain viewing angle (e.g., laptop PCs, tablet computers, vehicle-mounted displays, and smartphones). Unfortunately, an effect of improving the contrast ratio in the front direction is inferior to the case (2). In the case (2), the polarizing louver may cause an extreme reduction in luminance in oblique directions but can achieve a higher contrast ratio in the front direction. Accordingly, this is suitable to liquid crystal display devices not required to have a wide viewing angle, such as head-mounted displays (VR displays), and to liquid crystal display devices including a light diffusion film or the like for increasing the viewing angle on the top surface thereof. As described above, the present embodiment also has a trade-off relationship between the effect of improving the contrast ratio in the front direction and the white luminance viewing angle, similarly to Embodiment 1.

In the case (1), the total absolute value of the thickness retardation Rth between the second polarizer 12 and the third polarizer 13 is preferably 120 nm or more, more preferably 140 nm or more. An absolute value of less than 120 nm may fail to achieve a sufficient effect of improving the contrast ratio in the front direction.

In the case (2), the total absolute value of the thickness retardation Rth between the second polarizer 12 and the third polarizer 13 is preferably 600 nm or less, more preferably 550 nm or less. An absolute value exceeding 550 nm may cause even the polarizing louver to start having side lobes similarly to Embodiment 1. In other words, the following phenomenon may be caused. That is, at an azimuth the polarizing louver dims light, as the polar angle increases, the transmittance monotonically decreases, monotonically increases, and then monotonically decreases again. When the total absolute value of the thickness retardation Rth exceeds 550 nm, side lobes of the polarizing louver may increase along with an increase in total absolute value.

The in-plane retardation R of one of the first retarder 51b and the second retarder 52b is preferably 250 nm or more and 300 nm or less. The in-plane retardation R is more preferably 260 nm or more and 290 nm or less. The retarder 50 having an in-plane retardation R of 250 nm or more and 300 nm or less preferably has an in-plane slow axis that forms an angle of −5° or greater and +5° or smaller (more preferably −3° or greater and +3° or smaller, particularly preferably substantially 0°) with an azimuth that halves the angle between the second transmission axis of the second polarizer 12 and the third transmission axis of the third polarizer. This structure can prevent the reduction in transmittance in the normal direction even when the second transmission axis of the second polarizer 12 and the third transmission axis of the third polarizer 13 are not parallel to each other.

At least one retarder 50 preferably has reverse wavelength dispersion characteristics. This can restrict coloring of display (particularly white display) in an oblique view of the liquid crystal display device 2. More specifically, R450/R550 is preferably 0.80 or more and 0.99 or less, more preferably 0.82 or more and 0.90 or less. Also, R650/R550 is preferably 1.01 or more and 1.20 or less, more preferably 1.02 or more and 1.18 or less. In the case of disposing a plurality of the retarders 50, the effect of restricting coloring can be achieved to some extent by the structure where at least one retarder 50 has reverse wavelength dispersion characteristics. Still, all the retarders 50 between the second polarizer 12 and the third polarizer 13 preferably have reverse wavelength dispersion characteristics in order to restrict coloring.

The first retarder 51b and the second retarder 52b may satisfy any of the following conditions: (I) the biaxial order parameter NZ of the first retarder 51b satisfies $0.9 \leq NZ < 10$ (preferably $1.5 \leq NZ < 5.0$) and the biaxial order parameter NZ of the second retarder 52b satisfies $10 \leq NZ$ (preferably $100 \leq NZ$); (II) the biaxial order parameter NZ of the first retarder 51b satisfies $10 \leq NZ$ (preferably $100 \leq NZ$) and the biaxial order parameter NZ of the second retarder 52b satisfies $0.9 \leq NZ < 10$ (preferably $1.5 \leq NZ < 5.0$); (III) the biaxial order parameter NZ of the first retarder 51b satisfies $-11 < NZ \leq -0.9$ and the biaxial order parameter NZ of the second retarder 52b satisfies $10 \leq NZ$ (preferably $100 \leq NZ$); (IV) the biaxial order parameter NZ of the first retarder 51b satisfies $10 \leq NZ$ (preferably $100 \leq NZ$) and the biaxial order parameter NZ of the second retarder 52b satisfies $-11 < NZ \leq -0.9$; (V) the biaxial order parameter NZ of the first retarder 51b satisfies $0.9 \leq NZ < 10$ (preferably $1.5 \leq NZ < 5.0$) and the biaxial order parameter NZ of the second retarder 52b satisfies $NZ \leq -11$ (preferably $NZ \leq -100$); (VI) the biaxial order parameter NZ of the first retarder 51b satisfies $NZ \leq -11$ (preferably $NZ-100$) and the biaxial order parameter NZ of the second retarder 52b satisfies $0.9 \leq NZ < 10$ (preferably $1.5 \leq NZ < 5.0$); (VII) the biaxial order parameter NZ of the first retarder 51b satisfies $-11 < NZ \leq -0.9$ and the biaxial order parameter NZ of the second retarder 52b satisfies $NZ \leq -11$ (preferably $NZ \leq -100$); and (VIII) the biaxial order parameter NZ of the first retarder 51b satisfies $NZ \leq -11$ (preferably $NZ \leq -100$) and the biaxial order parameter NZ of the second retarder 52b satisfies $-11 < NZ \leq -0.9$.

In any of the cases (I), (II), (V), and (VI), the in-plane slow axis of the retarder 50 satisfying $0.9 \leq NZ < 10$ forms an angle of $-5°$ or greater and $+5°$ or smaller (preferably $-3°$ or greater and $+3°$ or smaller, more preferably substantially $0°$) with an azimuth that halves the angle between the second transmission axis of the second polarizer 12 and the third transmission axis of the third polarizer 13.

A similar effect can be achieved in any of the cases (I) to (VIII).

In the cases (I) to (IV), the upper limit of the biaxial order parameter NZ of the retarder 50 satisfying $10 \leq NZ$ is not limited and may be $+\infty$. In this case, the retarder 50 functions as a negative C plate.

Also, in the cases (V) to (VIII), the lower limit of the biaxial order parameter NZ of the retarder 50 satisfying $NZ \leq -11$ is not limited and may be $-\infty$. In this case, the retarder 50 functions as a positive C plate.

In the cases (I) to (VIII), the retarder 50 satisfying $10 \leq NZ$ or $NZ \leq -11$ has a sufficiently small in-plane retardation R and is substantially optically isotropic in the plane. Thus, the retarder 50 satisfying $10 \leq NZ$ or $NZ \leq -11$ can be placed in any direction in the plane.

The retarder 50 may be formed from any material and by any method, and examples thereof include those exemplified in Embodiment 1.

Examples of the retarder 50 satisfying $0.9 \leq NZ < 10$ include a stretched film including as a component a material whose natural birefringence is positive. Examples of the material whose natural birefringence is positive include those exemplified in Embodiment 1.

The retarder 50 satisfying $10 \leq NZ$ may be a negative C plate or the like. Examples of the negative C plate include those exemplified in Embodiment 1.

Examples of the retarder 50 satisfying $-11 < NZ \leq -0.9$ include a stretched film which contains as a component a material whose natural birefringence is negative and a film in which a film containing as a component a material whose natural birefringence is positive is stretched under a shrinkage strength of a heat-shrinkable film. Preferred among these is a stretched film containing as a component a material whose natural birefringence is negative in order to simplify the production method. Examples of the material whose natural birefringence is positive and the material whose natural birefringence is negative include those exemplified in Embodiment 1.

The retarder 50 satisfying $NZ \leq -11$ may be a positive C plate or the like. Examples of the positive C plate include those exemplified in Embodiment 1.

The liquid crystal display device 2 may include only one retarder or three or more retarders stacked between the second polarizer 12 and the third polarizer 13. The above design concept may be applicable even to this case, and a similar effect can be achieved.

Embodiment 3

The present embodiment is substantially the same as Embodiment 1 except that a viewing angle compensation film is further disposed in at least one of a region between the first polarizer and the liquid crystal panel or a region between the liquid crystal panel and the second polarizer. The repetitive description is thus appropriately omitted. In the present embodiment and Embodiment 1, the same members or the members having similar functions are given the same reference sign, and description for the member is omitted in the present embodiment as appropriate.

Figure 35:
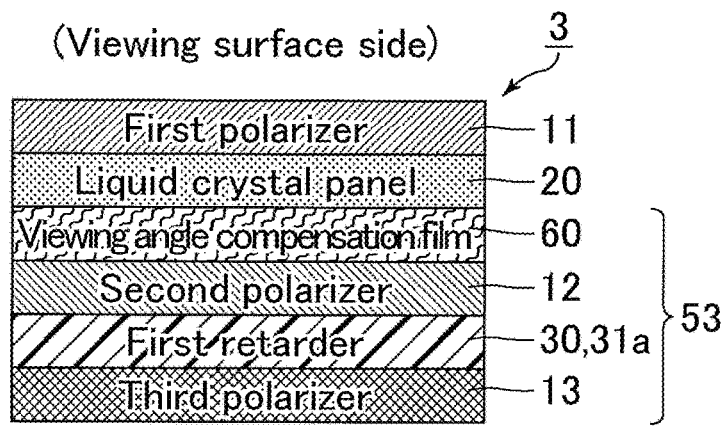
FIG. 35 is a schematic cross-sectional view showing a structure example of a liquid crystal display device and a polarizing plate of Embodiment 3.
Figure 35:
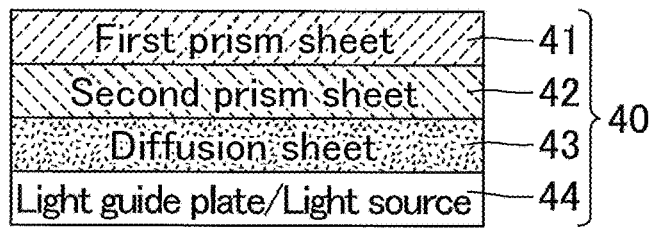

FIG. 35 is a schematic cross-sectional view showing a structure example of a liquid crystal display device and a polarizing plate of Embodiment 3. A liquid crystal display device 3 of the present embodiment is a transmissive liquid crystal display device that includes a stack sequentially including from the viewing surface side toward the back surface side the first polarizer 11, the liquid crystal panel 20 including a liquid crystal layer, a viewing angle compensation film 60, the second polarizer 12, the first retarder 31a, the third polarizer 13, and the backlight (BL) 40 as shown in FIG. 35. A polarizing plate 53 of the present embodiment is obtainable by sequentially stacking the viewing angle compensation film 60, the second polarizer 12, the first retarder 31a, and the third polarizer 13. In other words, the polarizing plate 53 includes a pair of polarizers 12 and 13, the retarder 30 between the paired polarizers 12 and 13, and the viewing angle compensation film 60 on the side without the retarder 30 of the polarizer 12.

Figure 36:
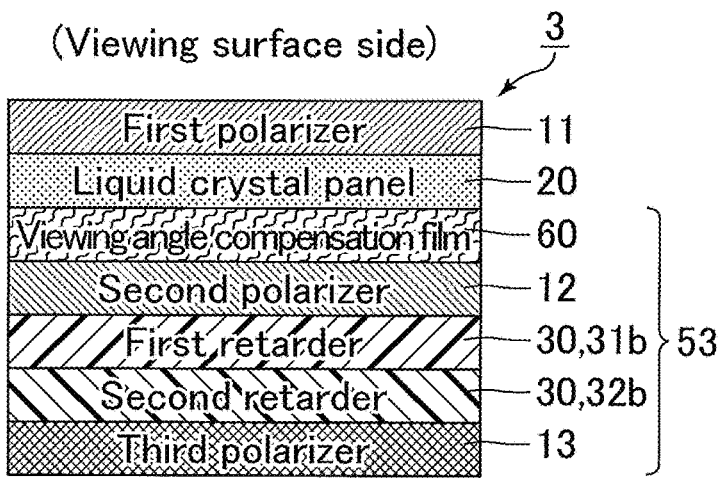
FIG. 36 is a schematic cross-sectional view showing another structure example of the liquid crystal display device and the polarizing plate of Embodiment 3.
Figure 36:
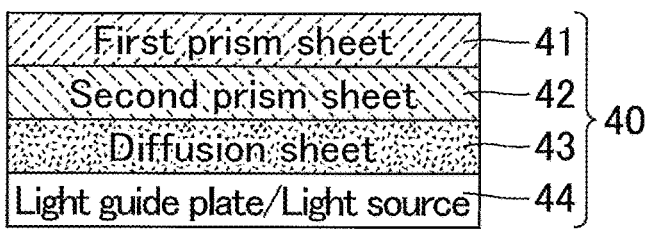

FIG. 36 is a schematic cross-sectional view showing another structure example of the liquid crystal display device and the polarizing plate of Embodiment 3. The liquid crystal display device 3 of the present embodiment may be a transmissive liquid crystal display device that includes a stack sequentially including from the viewing surface side toward the back surface side the first polarizer 11, the liquid crystal panel 20 including a liquid crystal layer, the viewing angle compensation film 60, the second polarizer 12, the first retarder 31b, the second retarder 32b, the third polarizer 13, and the backlight (BL) 40 as shown in FIG. 36. The polarizing plate 53 of the present embodiment may be a polarizing plate obtainable by sequentially stacking the viewing angle compensation film 60, the second polarizer 12, the first retarder 31b, the second retarder 32b, and the third polarizer 13. In other words, the polarizing plate 53 may include a pair of polarizers 12 and 13, the retarder 30 between the paired polarizers 12 and 13, and the viewing angle compensation film 60 on the side without the retarder 30 of the polarizer 12.

Figure 37:
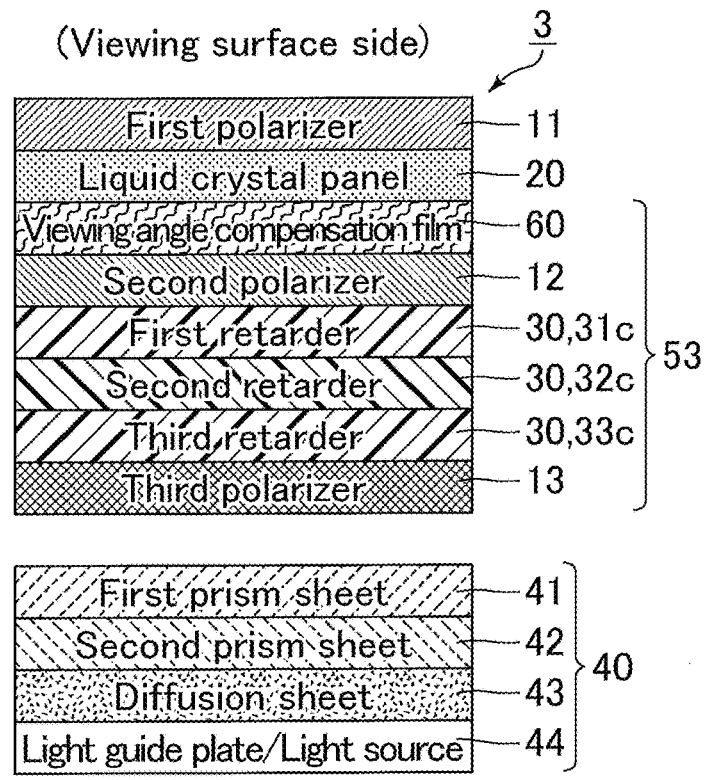
FIG. 37 is a schematic cross-sectional view showing still another structure example of the liquid crystal display device and the polarizing plate of Embodiment 3.

FIG. 37 is a schematic cross-sectional view showing still another structure example of the liquid crystal display device and the polarizing plate of Embodiment 3. The liquid crystal display device 3 of the present embodiment may be a transmissive liquid crystal display device that includes a stack sequentially including from the viewing surface side toward the back surface side the first polarizer 11, the liquid crystal panel 20 including a liquid crystal layer, the viewing angle compensation film 60, the second polarizer 12, the first retarder 31c, the second retarder 32c, the third retarder 33c, the third polarizer 13, and the backlight (BL) 40 as shown in FIG. 37. The polarizing plate 53 of the present embodiment may be a polarizing plate obtainable by sequentially stacking the viewing angle compensation film 60, the second polarizer 12, the first retarder 31c, the second retarder 32c, the third retarder 33c, and the third polarizer 13. In other words, the polarizing plate 53 may include a pair of polarizers 12 and 13, the retarder 30 between the paired polarizers 12 and 13, and the viewing angle compensation film 60 on the side without the retarder 30 of the polarizer 12.

The polarizing plate 53 is usually attached to the liquid crystal panel 20 with an adhesive layer (not shown).

The liquid crystal display device 3 of the present embodiment includes the viewing angle compensation film 60 and thus can improve the viewing angle characteristics. In comparison to the case without the retarder 30, the liquid crystal display device 3 can improve the contrast ratio in an oblique direction at the axis azimuth of the second polarizer 12 and the third polarizer 13.

Unfortunately, the liquid crystal display device of the present embodiment, including both of the retarder 30 and the viewing angle compensation film 60, may have a reduced contrast ratio in an oblique direction at an azimuth shifted by 45° from the axis azimuth of the second polarizer 12 and the third polarizer 13.

The viewing angle compensation film 60 functions to restrict a reduction in contrast ratio in an oblique direction at an azimuth shifted by 45° from the axis azimuth of the second polarizer 12 and the third polarizer 13. Paired polarizers arranged in the crossed Nicols are perpendicular to each other and cause no light leakage in a view from the normal direction or an oblique direction at the axis azimuth, which achieves a high contrast ratio. Meanwhile, in an oblique view at an azimuth shifted by 45° from the axis azimuth, the polarization axes are not substantially perpendicular to each other and light leakage occurs, which reduces the contrast ratio. The viewing angle compensation film 60 may consist of any number of films, may be formed from any material, and may have any structure as long as it can modulate the polarization state of light having passed through the second polarizer 12 and convert the light into linearly polarized light that vibrates at an azimuth parallel to the substantial absorption axis (or the absorption axis) of the first polarizer 11 in an oblique view. Examples thereof include one retarder satisfying 0<NZ<1 and a combination of at least one retarder satisfying NZ≥1 and at least one retarder satisfying NZ≤0. The material and the production method of the viewing angle compensation film 60 are the same as those described for the retarder 30.

A more specific example thereof is a retarder A having an in-plane retardation R of 275 nm and satisfying NZ=0.5. In this case, the retarder A and the second polarizer 12 are stacked in this order such that the slow axis of the retarder A and the second absorption axis (or the second reflection axis) of the second polarizer 12 are perpendicular to each other.

Another example is a stack including a retarder A having an in-plane retardation R of 140 nm and satisfying NZ=1.0 and a retarder B having an in-plane retardation R of 0 nm and a thickness retardation Rth of 90 nm and satisfying NZ=−∞. In this case, the retarder B, the retarder A, and the second polarizer 12 are stacked in this order such that the slow axis of the retarder A and the second absorption axis (or the second reflection axis) of the second polarizer 12 are perpendicular to each other.

A still another example is a stack including a retarder A having an in-plane retardation R of 115 nm and satisfying NZ=1.2 and a retarder B having an in-plane retardation R of 25 nm and satisfying NZ=−3. In this case, the retarder B, the retarder A, and the second polarizer 12 are stacked in this order such that the slow axes of the retarders A and B are parallel to each other and the slow axes of the retarders A and B are perpendicular to the second absorption axis (or the second reflection axis) of the second polarizer 12.

The polarizing plate 53 may not include the viewing angle compensation film 60. In this case, the viewing angle compensation film 60 is typically firstly attached to the liquid crystal panel 20 with an adhesive layer, and then the polarizing plate 53 is attached to the viewing angle compensation film 60 with an adhesive layer.

The viewing angle compensation film 60 may be disposed not between the liquid crystal panel 20 and the second polarizer 12 but between the first polarizer 11 and the liquid crystal panel 20. Furthermore, the viewing angle compensation film 60 may be disposed both of between the liquid crystal panel 20 and the second polarizer 12 and between the first polarizer 11 and the liquid crystal panel 20.

Embodiment 4

The present embodiment is substantially the same as Embodiment 2 except that the viewing angle compensation film described in Embodiment 3 is further disposed in at least one of a region between the first polarizer and the liquid crystal panel or a region between the liquid crystal panel and the second polarizer. The repetitive description is thus appropriately omitted. In the present embodiment and Embodiments 1 to 3, the same members or the members having similar functions are given the same reference sign, and description for the member is omitted in the present embodiment as appropriate.

Figure 38:
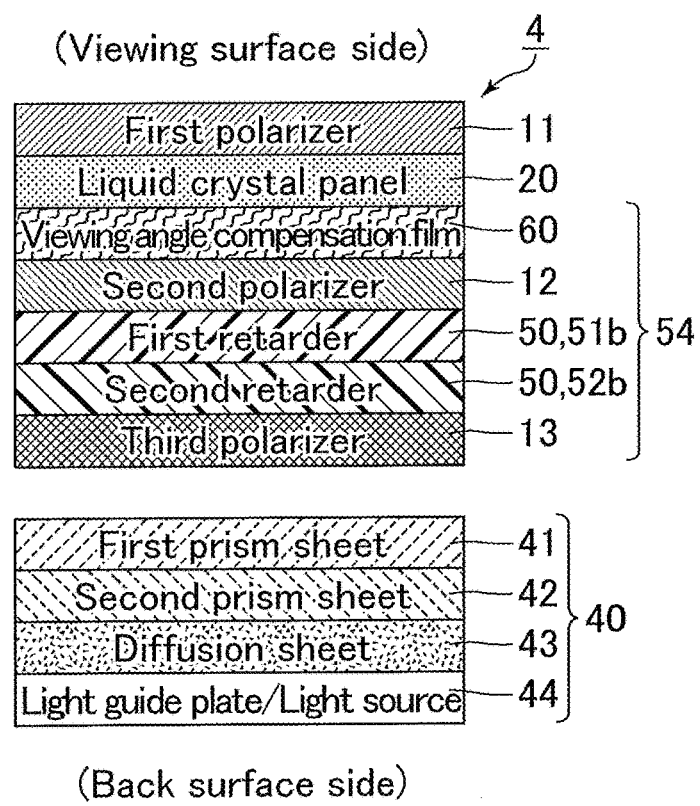
FIG. 38 is a schematic cross-sectional view showing a structure example of a liquid crystal display device and a polarizing plate of Embodiment 4.

FIG. 38 is a schematic cross-sectional view showing a structure example of a liquid crystal display device and a polarizing plate of Embodiment 4. A liquid crystal display device 4 of the present embodiment is a transmissive liquid crystal display device that includes a stack sequentially including from the viewing surface side toward the back surface side the first polarizer 11, the liquid crystal panel 20 including a liquid crystal layer, the viewing angle compensation film 60, the second polarizer 12, the first retarder 51b, the second retarder 52b, the third polarizer 13, and the backlight (BL) 40 as shown in FIG. 38. A polarizing plate 54 of the present embodiment is obtainable by sequentially stacking the viewing angle compensation film 60, the second polarizer 12, the first retarder 51b, the second retarder 52b, and the third polarizer 13. In other words, the polarizing plate 54 includes a pair of polarizers 12 and 13, the retarder 50, and the viewing angle compensation film 60 on the side without the retarder 50 of the polarizer 12.

The polarizing plate 54 is usually attached to the liquid crystal panel 20 with an adhesive layer (not shown).

The liquid crystal display device 4 of the present embodiment includes the viewing angle compensation film 60 and thus can improve the viewing angle characteristics. In comparison to the case without the retarder 30, the liquid crystal display device 4 can improve the contrast ratio in an oblique direction at the axis azimuth of the second polarizer 12 and the third polarizer 13.

Unfortunately, the liquid crystal display device of the present embodiment, including both of the retarder 30 and the viewing angle compensation film 60, may have a reduced contrast ratio in an oblique direction at an azimuth shifted by 45° from the axis azimuth of the second polarizer 12 and the third polarizer 13.

The polarizing plate 54 may not include the viewing angle compensation film 60. In this case, the viewing angle compensation film 60 is typically firstly attached to the liquid crystal panel 20 with an adhesive layer, and then the polarizing plate 54 is attached to the viewing angle compensation film 60 with an adhesive layer.

The viewing angle compensation film 60 may be disposed not between the liquid crystal panel 20 and the second polarizer 12 but between the first polarizer 11 and the liquid crystal panel 20. Furthermore, the viewing angle compensation film 60 may be disposed both of between the liquid crystal panel 20 and the second polarizer 12 and between the first polarizer 11 and the liquid crystal panel 20.

Embodiment 5

The present embodiment is substantially the same as Embodiment 3 except that a diffusion layer is further disposed between the second polarizer and the backlight 40. The repetitive description is thus appropriately omitted. In the present embodiment and Embodiments 1 and 3, the same members or the members having similar functions are given the same reference sign, and description for the member is omitted in the present embodiment as appropriate.

Figure 39:
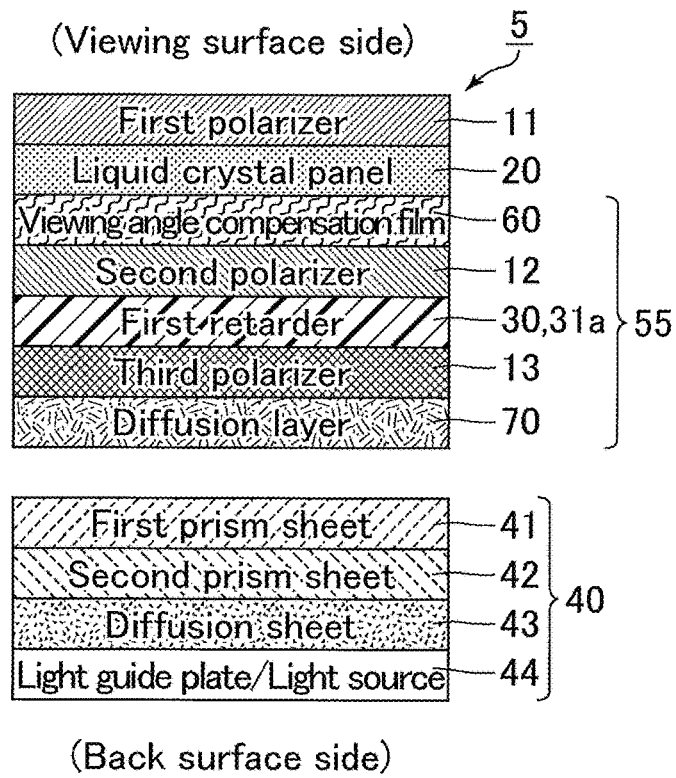
FIG. 39 is a schematic cross-sectional view showing a structure example of a liquid crystal display device and a polarizing plate of Embodiment 5.

FIG. 39 is a schematic cross-sectional view showing a structure example of a liquid crystal display device and a polarizing plate of Embodiment 5. A liquid crystal display device 5 of the present embodiment is a transmissive liquid crystal display device that includes a stack sequentially including from the viewing surface side toward the back surface side the first polarizer 11, the liquid crystal panel 20 including a liquid crystal layer, the viewing angle compensation film 60, the second polarizer 12, the first retarder 31a, the third polarizer 13, a diffusion layer 70, and the backlight (BL) 40 as shown in FIG. 39. A polarizing plate 55 of the present embodiment is obtainable by sequentially stacking the viewing angle compensation film 60, the second polarizer 12, the first retarder 31a, the third polarizer 13, and the diffusion layer 70. In other words, the polarizing plate 55 includes a pair of polarizers 12 and 13, the first retarder 30 between the paired polarizers 12 and 13, the viewing angle compensation film 60 on the side without the retarder 30 of the polarizer 12, and the diffusion layer 70 on the side without the retarder 30 of the polarizer 13.

Figure 40:
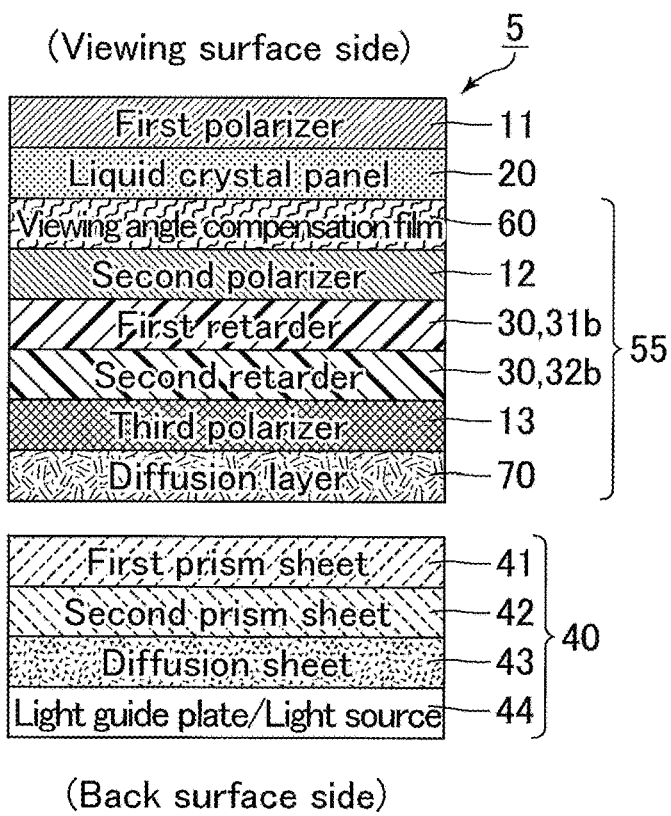
FIG. 40 is a schematic cross-sectional view showing another structure example of the liquid crystal display device and the polarizing plate of Embodiment 5.

FIG. 40 is a schematic cross-sectional view showing another structure example of the liquid crystal display device and the polarizing plate of Embodiment 5. The liquid crystal display device 5 of the present embodiment may be a transmissive liquid crystal display device that includes a stack sequentially including from the viewing surface side toward the back surface side the first polarizer 11, the liquid crystal panel 20 including a liquid crystal layer, the viewing angle compensation film 60, the second polarizer 12, the first retarder 31b, the second retarder 32b, the third polarizer 13, the diffusion layer 70, and the backlight (BL) 40 as shown in FIG. 40. The polarizing plate 55 of the present embodiment may be a polarizing plate obtainable by sequentially stacking the viewing angle compensation film 60, the second polarizer 12, the first retarder 31b, the second retarder 32b, the third polarizer 13, and the diffusion layer 70. In other words, the polarizing plate 55 may include a pair of polarizers 12 and 13, the retarder 30 between the paired polarizers 12 and 13, the viewing angle compensation film 60 on the side without the retarder 30 of the polarizer 12, and the diffusion layer 70 on the side without the retarder 30 of the polarizer 13.

Figure 41:
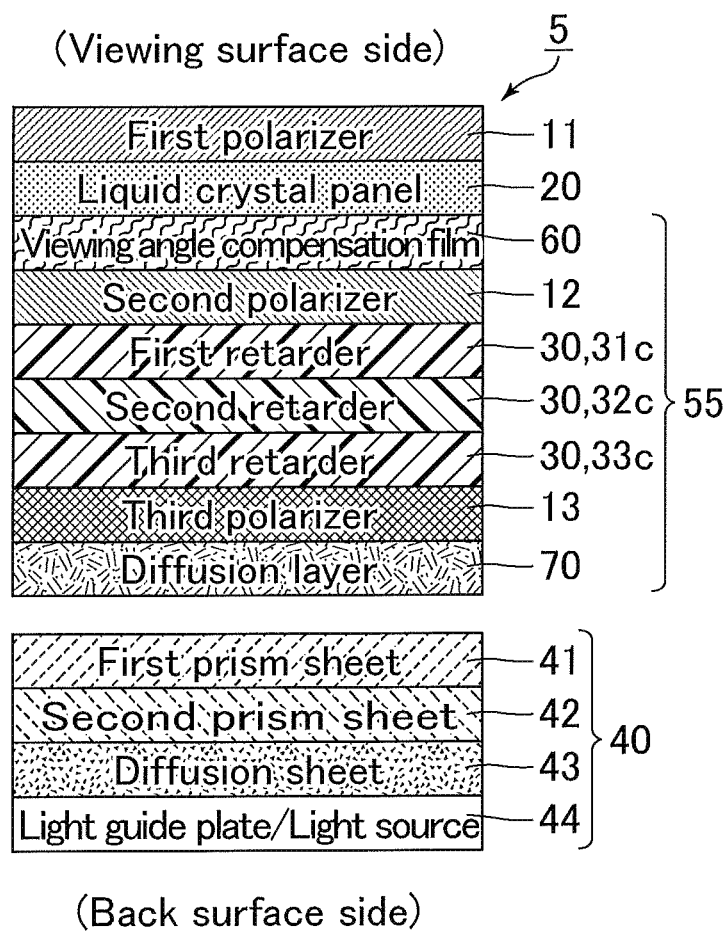
FIG. 41 is a schematic cross-sectional view showing still another structure example of the liquid crystal display device and the polarizing plate of Embodiment 5.

FIG. 41 is a schematic cross-sectional view showing still another structure example of the liquid crystal display device and the polarizing plate of Embodiment 5. The liquid crystal display device 5 of the present embodiment may be a transmissive liquid crystal display device that includes a stack sequentially including from the viewing surface side toward the back surface side the first polarizer 11, the liquid crystal panel 20 including a liquid crystal layer, the viewing angle compensation film 60, the second polarizer 12, the first retarder 31c, the second retarder 32c, the third retarder 33c, the third polarizer 13, the diffusion layer 70, and the backlight (BL) 40 as shown in FIG. 41. The polarizing plate 55 of the present embodiment may be a polarizing plate obtainable by sequentially stacking the viewing angle compensation film 60, the second polarizer 12, the first retarder 31c, the second retarder 32c, the third retarder 33c, the third polarizer 13, and the diffusion layer 70. In other words, the polarizing plate 55 may include a pair of polarizers 12 and 13, the retarder 30, the viewing angle compensation film 60 on the side without the retarder 30 of the polarizer 12, and the diffusion layer 70 on the side without the retarder 30 of the polarizer 13.

The polarizing plate 55 is usually attached to the liquid crystal panel 20 with an adhesive layer (not shown).

The liquid crystal display device 5 of the present embodiment includes the diffusion layer 70 in addition to the retarder 30 and the viewing angle compensation film 60 and thus can improve the contrast ratio in oblique directions not only at the axis azimuth of the second polarizer 12 and the third polarizer 13 but also at an azimuth shifted by 45° from the axis azimuth of the second polarizer 12 and the third polarizer 13. In other words, addition of the diffusion layer 70 can achieve an effect of improving the contrast ratio at all azimuths.

The diffusion layer 70 diffuses light emitted from the backlight 40 to increase the directional characteristics of light. The haze of the diffusion layer 70 may be appropriately set and is, for example, 35% or higher and 75% or lower, preferably 45% or higher and 65% or lower, more preferably 50% or higher and 60% or lower. The diffusion layer 70 may diffuse light by optical principles including internal diffusion and external diffusion. An example of the diffusion layer 70 causing internal diffusion is a diffusion sheet that is a translucent resin film. The diffusion sheet may be formed by mixing a transparent resin binder with a filler having a refractive index different from that of the transparent resin binder and forming the mixture into a film, or may be formed by applying the filler-mixed resin binder to a substrate film. The diffusion sheet may be attached to the third polarizer 13 with a bonding layer or an adhesive layer. An example of the diffusion layer 70 causing external diffusion is an anti-glare layer (anti-glare film). The anti-glare layer may be formed by preparing a filler-mixed resin binder in which the filler and the resin binder have the same refractive index and the size and the density of the filler are adjusted, applying the filler-mixed resin binder to a substrate film, and resultantly obtaining a layer with an uneven surface, or may be formed by imprinting a filler-free resin with a mold and resultantly obtaining a layer with an uneven surface. Each of the cases can cause external diffusion derived from the uneven surface. The anti-glare layer is formed on the third polarizer 13 (on a surface without the retarder 30 of the third polarizer 13).

The diffusion layer 70 may be disposed between the second polarizer 12 and the third polarizer 13. In this case, the diffusion layer 70 is disposed at least one of a region between the second polarizer 12 and the retarder 30, a region between the retarder 30 and the third polarizer 13, or a region between adjacent retarders 30. Also in this case, the diffusion layer 70 may be the above-mentioned diffusion layer formed by attaching a diffusion sheet to the polarizers 12 and 13 and/or the retarder 30 with an adhesive layer. Still, the diffusion layer 70 is preferably an adhesive diffusion layer in which a pressure-sensitive adhesive is mixed with a light diffusing component (e.g., a filler having a different refractive index from the pressure-sensitive adhesive). The adhesive diffusion layer is industrially preferred to be disposed between the third polarizer 13 and the next retarder 30.

Furthermore, the diffusion layer 70 may not be included in the polarizing plate 55. In this case, the diffusion layer 70 is disposed as an independent sheet, i.e., a diffusion sheet, between the third polarizer 13 and the backlight 40 and is usually not attached to the polarizing plate 55 or the backlight 40.

The polarizing plate 55 may not include the viewing angle compensation film 60. In this case, the viewing angle compensation film 60 is typically firstly attached to the liquid crystal panel 20 with an adhesive layer, and then the polarizing plate 55 is attached to the viewing angle compensation film 60 with an adhesive layer.

The viewing angle compensation film 60 may be disposed not between the liquid crystal panel 20 and the second polarizer 12 but between the first polarizer 11 and the liquid crystal panel 20. Furthermore, the viewing angle compensation film 60 may be disposed both of between the liquid crystal panel 20 and the second polarizer 12 and between the first polarizer 11 and the liquid crystal panel 20.

Moreover, in the present embodiment using the diffusion layer 70, the backlight 40 may not include the diffusion sheet 43.

Embodiment 6

The present embodiment is substantially the same as Embodiment 2 except that the diffusion layer described in Embodiment 5 is further disposed between the second polarizer and the backlight 40. The repetitive description is thus appropriately omitted. In the present embodiment and Embodiments 1 to 5, the same members or the members having similar functions are given the same reference sign, and description for the member is omitted in the present embodiment as appropriate.

Figure 42:
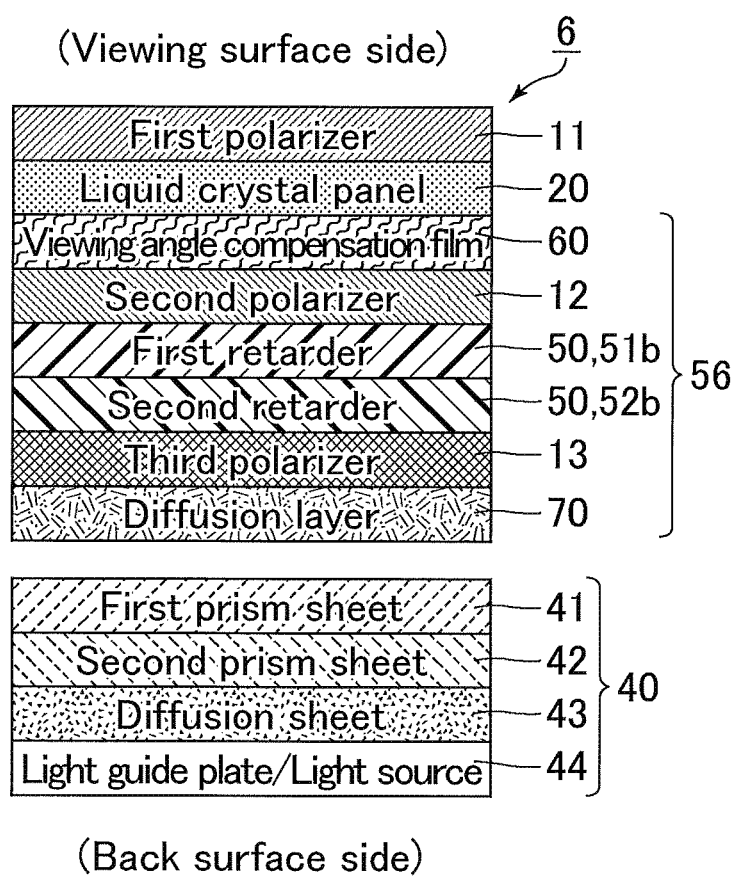
FIG. 42 is a schematic cross-sectional view showing a structure example of a liquid crystal display device and a polarizing plate of Embodiment 6.

FIG. 42 is a schematic cross-sectional view showing a structure example of a liquid crystal display device and a polarizing plate of Embodiment 6. A liquid crystal display device 6 of the present embodiment is a transmissive liquid crystal display device that includes a stack sequentially including from the viewing surface side toward the back surface side the first polarizer 11, the liquid crystal panel 20 including a liquid crystal layer, the viewing angle compensation film 60, the second polarizer 12, the first retarder 51b, the second retarder 52b, the third polarizer 13, the diffusion layer 70, and the backlight (BL) 40 as shown in FIG. 42. A polarizing plate 56 of the present embodiment is obtainable by sequentially stacking the viewing angle compensation film 60, the second polarizer 12, the first retarder 51b, the second retarder 52b, the first retarder 31a, the third polarizer 13, and the diffusion layer 70. In other words, the polarizing plate 56 includes a pair of polarizers 12 and 13, the first retarder 50 between the paired polarizers 12 and 13, the viewing angle compensation film 60 on the side without the retarder 50 of the polarizer 12, and the diffusion layer 70 on the side without the retarder 50 of the polarizer 13.

The polarizing plate 56 is usually attached to the liquid crystal panel 20 with an adhesive layer (not shown).

The liquid crystal display device 6 of the present embodiment includes the diffusion layer 70 in addition to the retarder 30 and the viewing angle compensation film 60 and thus can improve the contrast ratio in an oblique direction not only at the axis azimuth of the second polarizer 12 and the third polarizer 13 but also at an azimuth shifted by 45° from the axis azimuth of the second polarizer 12 and the third polarizer 13. In other words, addition of the diffusion layer 70 can achieve an effect of improving the contrast ratio at all azimuths.

Similarly to Embodiment 5, the diffusion layer 70 may be disposed between the second polarizer 12 and the third polarizer 13. The diffusion layer 70 may be any of a diffusion sheet, an anti-glare layer, and an adhesive diffusion layer. Furthermore, the diffusion layer 70 may not be included in the polarizing plate 56.

The polarizing plate 56 may not include the viewing angle compensation film 60. In this case, the viewing angle compensation film 60 is typically firstly attached to the liquid crystal panel 20 with an adhesive layer, and then the polarizing plate 56 is attached to the viewing angle compensation film 60 with an adhesive layer.

The viewing angle compensation film 60 may be disposed not between the liquid crystal panel 20 and the second polarizer 12 but between the first polarizer 11 and the liquid crystal panel 20. Furthermore, the viewing angle compensation film 60 may be disposed both of between the liquid crystal panel 20 and the second polarizer 12 and between the first polarizer 11 and the liquid crystal panel 20.

Moreover, in the present embodiment using the diffusion layer 70, the backlight 40 may not include the diffusion sheet 43.

The figures corresponding to the liquid crystal display devices 1 to 6 show that the retarders 30 and 50 are each formed from a single retarder, but the retarders 30 and 50 may each be an optically equivalent product formed of a plurality of retarders. Thereby, inexpensive retarders having a large area can be used which are widely used as conventional optical compensation films for a liquid crystal display device. For example, three retarders may be stacked to collectively function as one retarder.

The liquid crystal display devices 1 and 2 can provide bright display in the normal direction and four more directions (preferably upper, lower, left, and right directions) even when no light diffusion element is disposed on the viewing surface side of the first polarizer 11. Still, in order to provide bright display in directions other than these directions, a light diffusion element such as a light diffusion film or a lens film may be further disposed on the viewing surface side of the first polarizer 11. Also in the liquid crystal display devices 3 to 6, a light diffusion element such as a light diffusion film or a lens film may be further disposed on the viewing surface side of the first polarizer 11 in order to provide bright display at all azimuths.

In the liquid crystal display devices 1 to 6, the retarders 30 and 50 and the third polarizer 13 are disposed on the liquid crystal panel 20 side. Alternatively, only the third polarizer 13 or the third polarizer 13 and the retarder 30 or 50 may be disposed on the backlight 40, for example.

In the liquid crystal display devices 1 to 6, an air layer may be provided in at least one of the gaps between the individual members. For example, an air layer may be provided between the third polarizer 13 and the first prism sheet 41.

Example 1 and Comparative Example 1

Figure 9C:
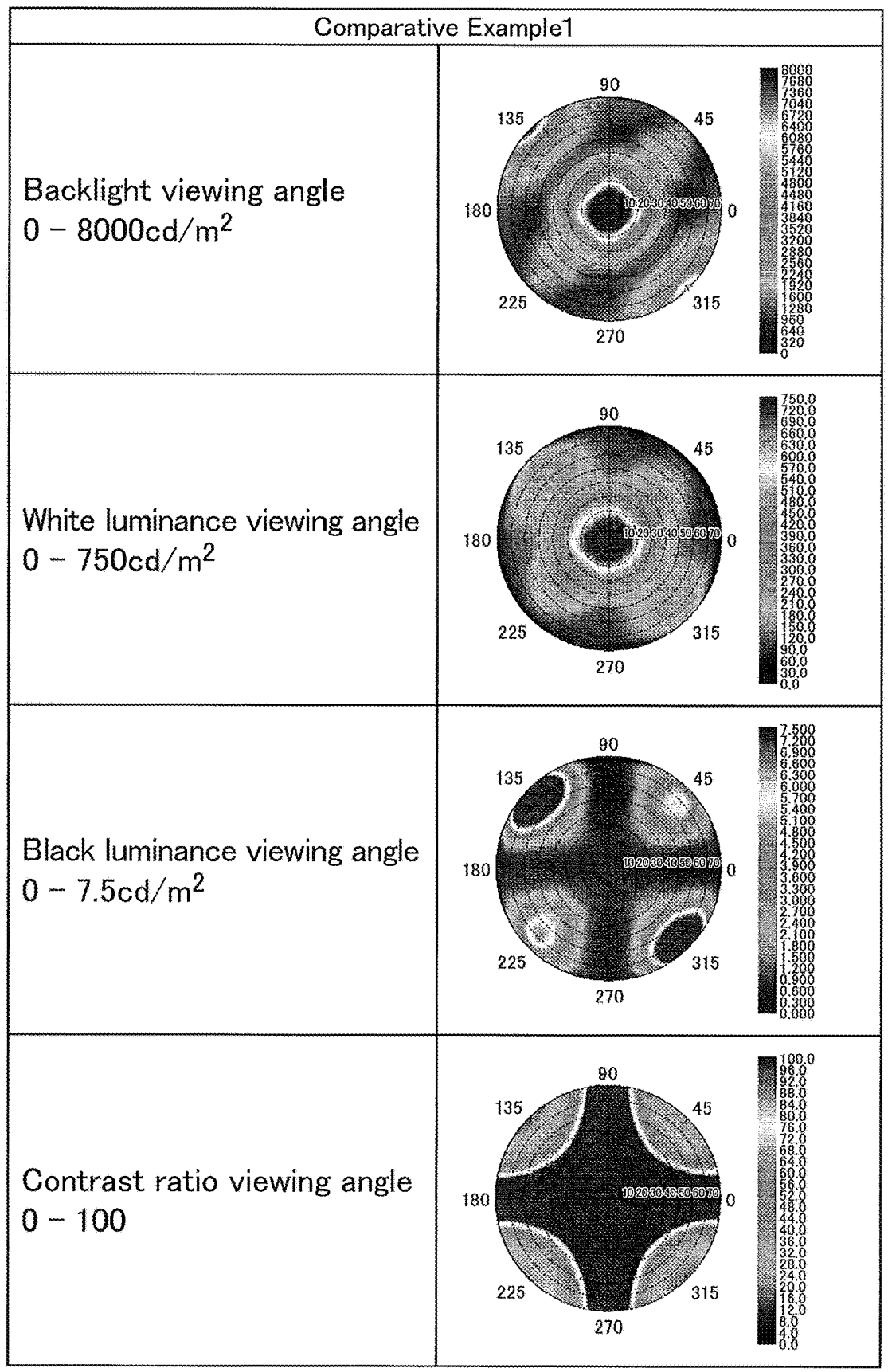
FIG. 9C includes contour plots showing measurement results of the viewing angle characteristics of the liquid crystal display device of Comparative Example 1.
Figure 10A:
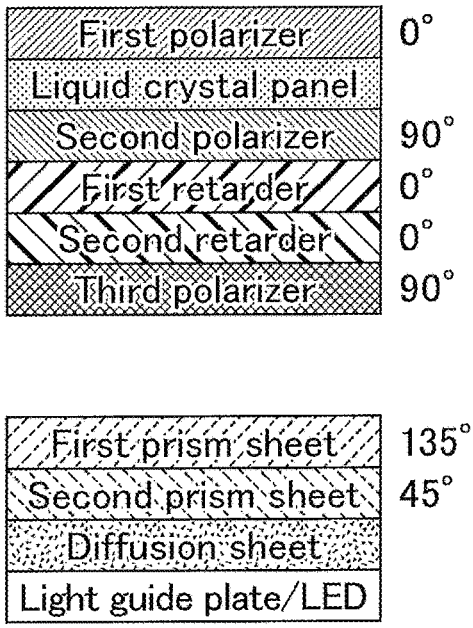
FIG. 10A is a figure showing the structure of a liquid crystal display device and a polarizing plate of Example 1.

Liquid crystal display devices and polarizing plates of Comparative Example 1 and Example 1 respectively have the structures shown in FIGS. 9A and 10A. FIG. 9A is a figure showing the structure of the liquid crystal display device and the polarizing plate of Comparative Example 1. FIG. 10A is a figure showing the structure of the liquid crystal display device and the polarizing plate of Example 1. The axis azimuth of each optical element is shown in the corresponding figure. The axis of an absorptive polarizer indicates the absorption axis, the axis of retarders other than a C plate indicates the in-plane slow axis, the axis of a reflective polarizer indicates the reflection axis, and the axis of a prism sheet indicates an azimuth perpendicular to the azimuth at which the ridge lines extend (side lobe-occurring azimuth). The first and second polarizers used were each an absorptive polarizer obtained by aligning dichroic iodine complex molecules adsorbed on a polyvinyl alcohol (PVA) film. The liquid crystal panel used was a FFS mode liquid crystal panel of horizontal electric field mode. The third polarizing plate used was a reflective polarizer APF available from 3M Japan Limited. The polarizing plate of Comparative Example 1 included a stack sequentially including a second polarizer and a third polarizer. The polarizing plate of Example 1 included a stack sequentially including a second polarizer, a first retarder, a second retarder, and a third polarizer. The backlight used included a stack sequentially including an LED light source, a light guide plate, a diffusion sheet, a second prism sheet, and a first prism sheet from the back surface side. The first and second retarders used were each a retarder having an in-plane retardation R of 140 nm and a thickness retardation Rth of −70 nm. Details of properties such as wavelength dispersion characteristics were as shown in the corresponding figures.

In order to comprehend light distribution of backlight illumination incident on each liquid crystal panel of Comparative Example 1 and Example 1, the transmittance viewing angle characteristics of members on the back surface side of the liquid crystal panel, i.e., a portion from the second polarizer to the third polarizer (polarizing louver) were calculated. The portion from the second polarizer to the third polarizer is also referred to as a polarizing louver in the following examples and comparative examples. The results are shown in FIGS. 9B and 10B. FIG. 9B is a figure showing calculation results of transmittance viewing angles of the polarizing louver of Comparative Example 1 and measurement results of parameters of the liquid crystal display device of Comparative Example 1. FIG. 10B is a figure showing calculation results of transmittance viewing angles of the polarizing louver of Example 1 and measurement results of parameters of the liquid crystal display device of Example 1. As shown in FIGS. 9B and 10B, the light distribution of the polarizing louver of Example 1 shows a substantial cross shape, and light incident on the liquid crystal panel is restricted at azimuths of 45°, 135°, 225°, and 315°. Setting the angle of each prism sheet such that side lobes occur at these azimuths can effectively restrict light leakage of the liquid crystal display device in oblique directions, and thereby hopefully increases the contrast ratio in the front direction. The side lobe-occurring azimuths were set to 135° and 45°.

Figure 10C:
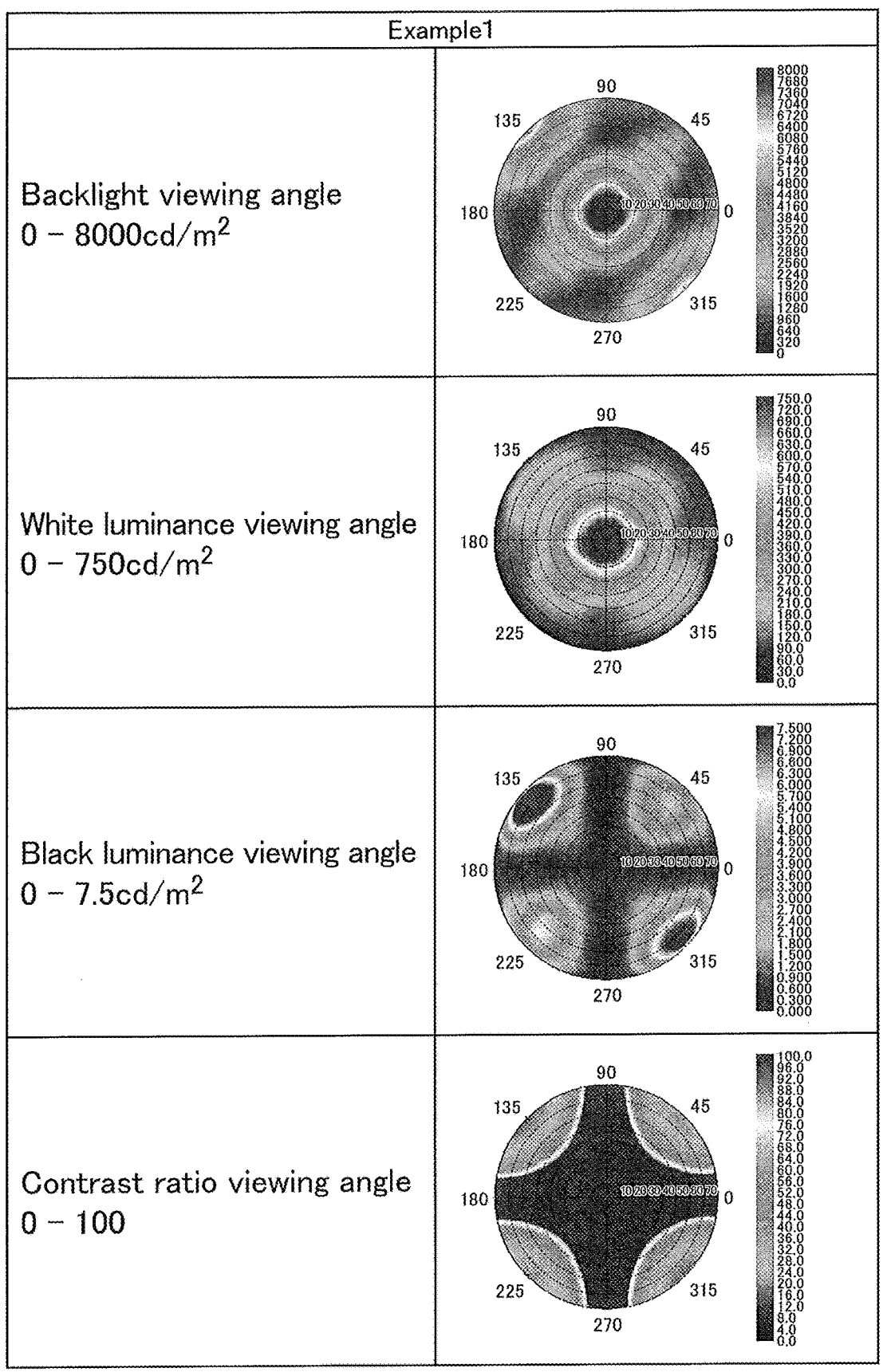
FIG. 10C includes contour plots showing measurement results of the viewing angle characteristics of the liquid crystal display device of Example 1.

Liquid crystal display devices of Comparative Example 1 and Example 1 were actually produced for trial, and the following parameters were actually determined: white luminance value ($cd/m^2$) in the front direction; whiteness value x in the front direction; whiteness value y in the front direction; whiteness difference Oxy in the front direction; black luminance value ($cd/m^2$) in the front direction; contrast ratio (CR) in the front direction; ratio of contrast ratio in the front direction in Example 1 to contrast ratio in the front direction in Comparative Example 1 (front CR improving ratio); white luminance value ($cd/m^2$) in an oblique direction (azimuth 0°, polar angle 60°); white luminance value ($cd/m^2$) in an oblique direction (azimuth 45°, polar angle 60°); whiteness value x in an oblique direction (azimuth 0°, polar angle 60°); whiteness difference Oxy in an oblique direction (azimuth 0°, polar angle 60°); whiteness value y in an oblique direction (azimuth 0°, polar angle 60°); whiteness value x in an oblique direction (azimuth 45°, polar angle 60°); whiteness value y in an oblique direction (azimuth 45°, polar angle 60°); whiteness difference Oxy in an oblique direction (azimuth 45°, polar angle 60°); black luminance value ($cd/m^2$) in an oblique direction (azimuth 0°, polar angle 60°); black luminance value ($cd/m^2$) in an oblique direction (azimuth 45°, polar angle 60°); contrast ratio (CR) in an oblique direction (azimuth 0°, polar angle 60°); ratio of contrast ratio in an oblique direction (azimuth 0°, polar angle 60°) in Example 1 to contrast ratio in an oblique direction (azimuth 0°, polar angle 60°) in Comparative Example 1 (oblique CR improving ratio (azimuth 0°, polar angle 60°)); contrast ratio (CR) in an oblique direction (azimuth 45°, polar angle 60°); ratio of contrast ratio in an oblique direction (azimuth 45°, polar angle 60°) in Example 1 to contrast ratio in an oblique direction (azimuth 45°, polar angle 60°) in Comparative Example 1 (oblique CR improving ratio (azimuth 45°, polar angle 60°)); backlight viewing angles ($cd/m^2$), white luminance viewing angles ($cd/m^2$), black luminance viewing angles ($cd/m^2$); and contrast ratio viewing angles. The measurement results are shown in FIGS. 9B, 9C, 10B, and 10C. FIG. 9C includes contour plots showing measurement results of the viewing angle characteristics of the liquid crystal display device of Comparative Example 1. FIG. 10C includes contour plots showing measurement results of the viewing angle characteristics of the liquid crystal display device of Example 1.

(Method for Determining R, Rth, Coefficient NZ, nx, ny, and nz)

These values were determined with a dual-rotating retarder polarimeter (available from Axometrics, trade name: Axo-scan). The in-plane retardation R was actually measured from the normal direction of the birefringent layer. The principal refractive indices nx, ny, and nz, the thickness retardation Rth, and coefficient NZ were determined by measuring the retardation in the normal direction of the birefringent layer and in each oblique direction inclined at −50° to 50° from the normal direction and calculating the values by curve fitting using a known refractive index ellipsoid equation. The inclination azimuth was set to an azimuth perpendicular to the in-plane slow axis. The values nx, ny, nz, Rth, and Nz depend on the average refractive index=(nx+ny+nz)/3, which is a calculation condition of curve fitting, and were calculated with the average refractive index of each birefringent layer to be unified to 1.5. An assumption of the average refractive index of 1.5 was also applied to a birefringent layer whose actual average refractive index was not 1.5.

(Method for Determining Luminance, Chromaticity, Contrast Ratio, and Viewing Angle Characteristics of Liquid Crystal Display Device)

The luminance values in a white display state and a black display state were measured with a viewing angle instrument (available from ELDIM, trade name: EZ Contrast 160), and the ratio thereof was taken as a contrast ratio (CR). Also, whiteness values (x, y) were measured.

As shown in FIGS. 9B, 9C, 10B, and 10C, in Example 1, light leakage in a black display state in oblique directions was reduced and the contrast ratio in the front direction was resultantly improved in comparison to Comparative Example 1. Also in Example 1, the retarder constituting the polarizing louver was a retarder that had reverse wavelength dispersion characteristics and had a total absolute value of the thickness retardation Rth between the second polarizer and the third polarizer (Rth total in the corresponding figure) of less than 400 nm. Thus, a reduction in white luminance and yellowing in oblique directions could be restricted, and the display quality was similar to that of Comparative Example 1.

Comparative Example 2

Figure 11A:
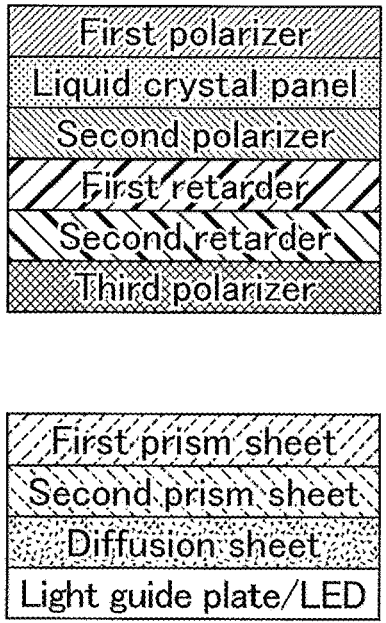
FIG. 11A is a figure showing the structure of a liquid crystal display device of Comparative Example 2.

A liquid crystal display device of Comparative Example 2 has the structure as shown in FIG. 11A. FIG. 11A is a figure showing the structure of a liquid crystal display device of Comparative Example 2. The present comparative example is the same as Example 1 except that the azimuths (side lobe-occurring azimuths) perpendicular to the azimuth at which the ridge lines of the prism sheets extended were set to 110° and 20°.

Calculation results of the transmittance viewing angle characteristics of the polarizing louver in the present comparative example are shown in FIG. 11B. FIG. 11B is a figure showing calculation results of transmittance viewing angles of the polarizing louver of Comparative Example 2 and measurement results of parameters of the liquid crystal display device of Comparative Example 2. As shown in FIG. 11B, the light distribution of the polarizing louver of the present comparative example shows a substantial cross shape as in Example 1. Thus, light incident on the liquid crystal panel is restricted at azimuths 45°, 135°, 225°, and 315°.

Figure 11C:
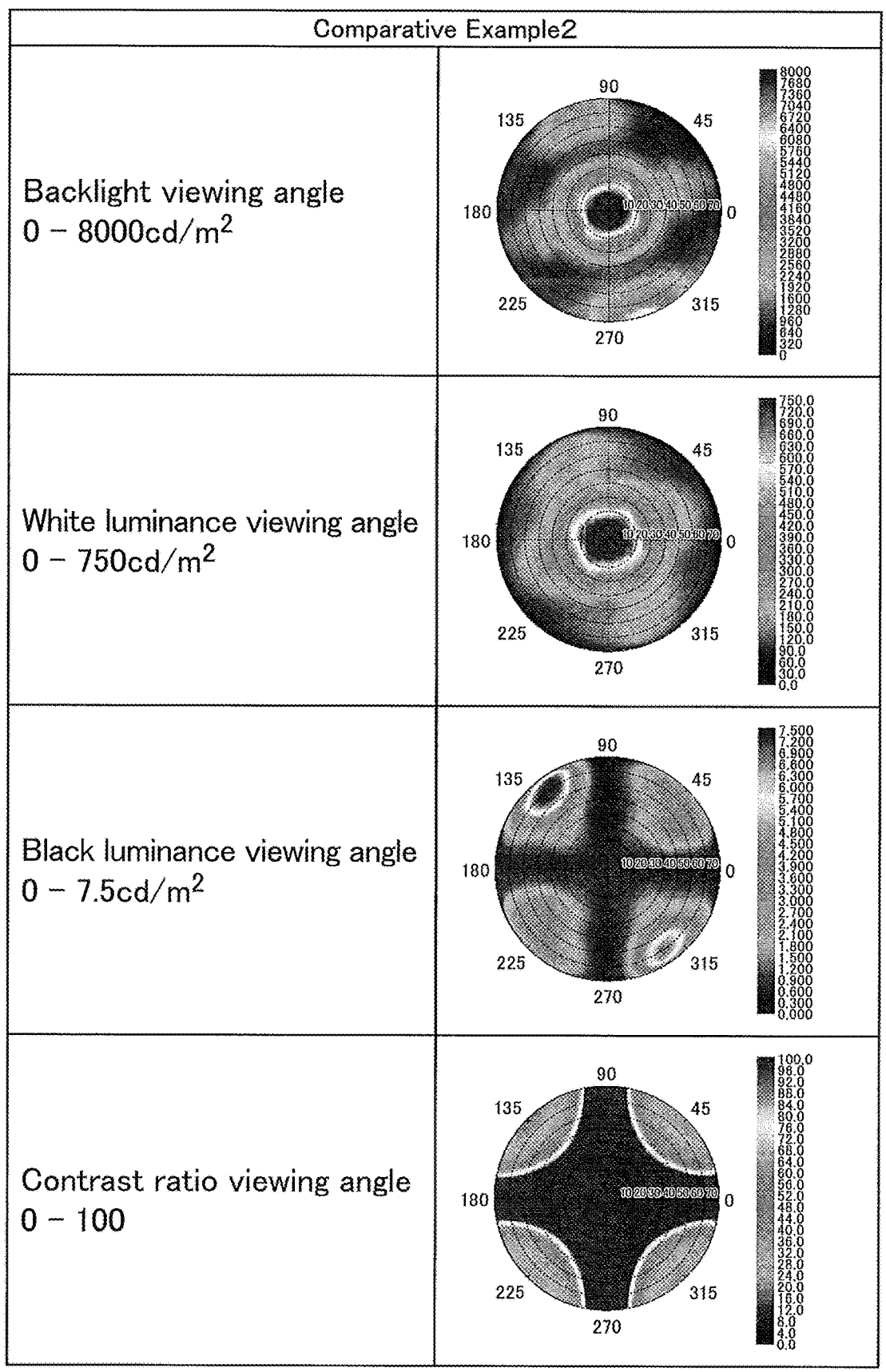
FIG. 11C includes contour plots showing measurement results of the viewing angle characteristics of the liquid crystal display device of Comparative Example 2.

The liquid crystal display device of the present comparative example was actually produced for trial, and parameters such as the contrast ratio in the front direction and the white luminance value in an oblique direction (azimuth 0°, polar angle 60°) were actually determined as in Example 1. The determination results are shown in FIGS. 11B and 11C. FIG. 11C includes contour plots showing measurement results of the viewing angle characteristics of the liquid crystal display device of Comparative Example 2. As shown in FIGS. 11B and 11C, in Comparative Example 2, light leakage in a black display state in oblique directions was reduced and the contrast ratio in the front direction was resultantly improved in comparison to Comparative Example 1. However, differently from Example 1, an effect of improving the contrast ratio was smaller than in Example 1 because the azimuths at which the polarizing louver restricted light incident on the liquid crystal panel did not match the side lobe-occurring azimuths.

Examples 2 and 3

Figure 12C:
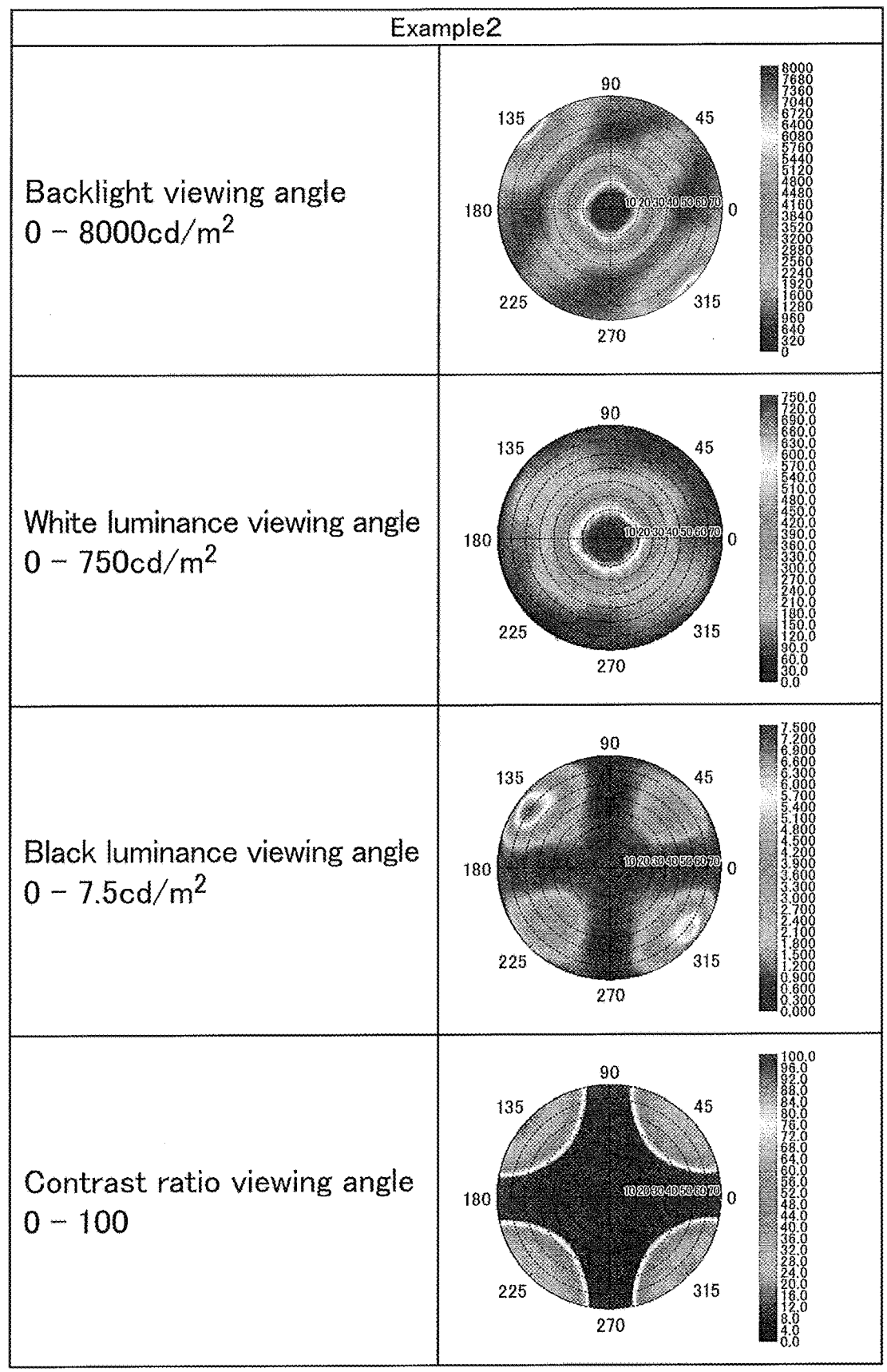
FIG. 12C includes contour plots showing measurement results of the viewing angle characteristics of the liquid crystal display device of Example 2.
Figure 13A:
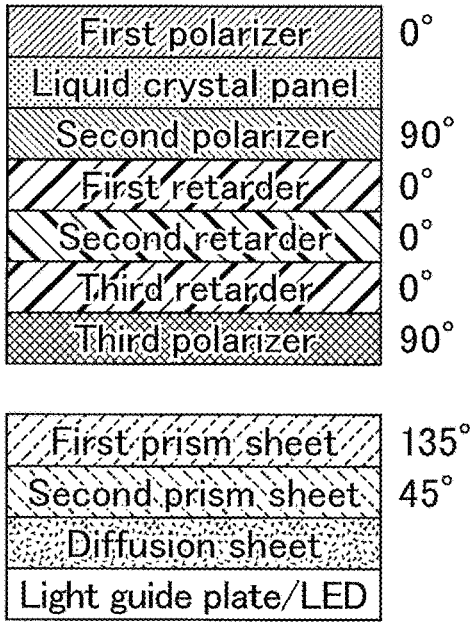
FIG. 13A is a figure showing the structure of a liquid crystal display device and a polarizing plate of Example 3.

Liquid crystal display devices and polarizing plates of Examples 2 and 3 respectively have the structures shown in FIGS. 12A and 13A. FIG. 12A is a figure showing the structure of the liquid crystal display device and the polarizing plate of Example 2. FIG. 13A is a figure showing the structure of the liquid crystal display device and the polarizing plate of Example 3. These examples are the same as Example 1 except for the structure of the retarders. The axis azimuths and the properties of the retarders are as shown in the corresponding figure. The polarizing plate of Example 2 included a stack sequentially including a second polarizer, a first retarder, a second retarder, and a third polarizer. The polarizing plate of Example 3 included a stack sequentially including a second polarizer, a first retarder, a second retarder, a third retarder, and a third polarizer.

Calculation results of transmittance viewing angle characteristics of the polarizing louvers of these examples are shown in FIGS. 12B and 13B. FIG. 12B is a figure showing calculation results of transmittance viewing angles of the polarizing louver of Example 2 and measurement results of parameters of the liquid crystal display device of Example 2. FIG. 13B is a figure showing calculation results of transmittance viewing angles of a polarizing louver of Example 3 and measurement results of parameters of the liquid crystal display device of Example 3. As shown in FIGS. 12B and 13B, the light distribution of the polarizing louvers of these examples shows a substantial cross shape as in Example 1, and light incident on the liquid crystal panel is restricted at azimuths 45°, 135°, 225°, and 315°.

Figure 13C:
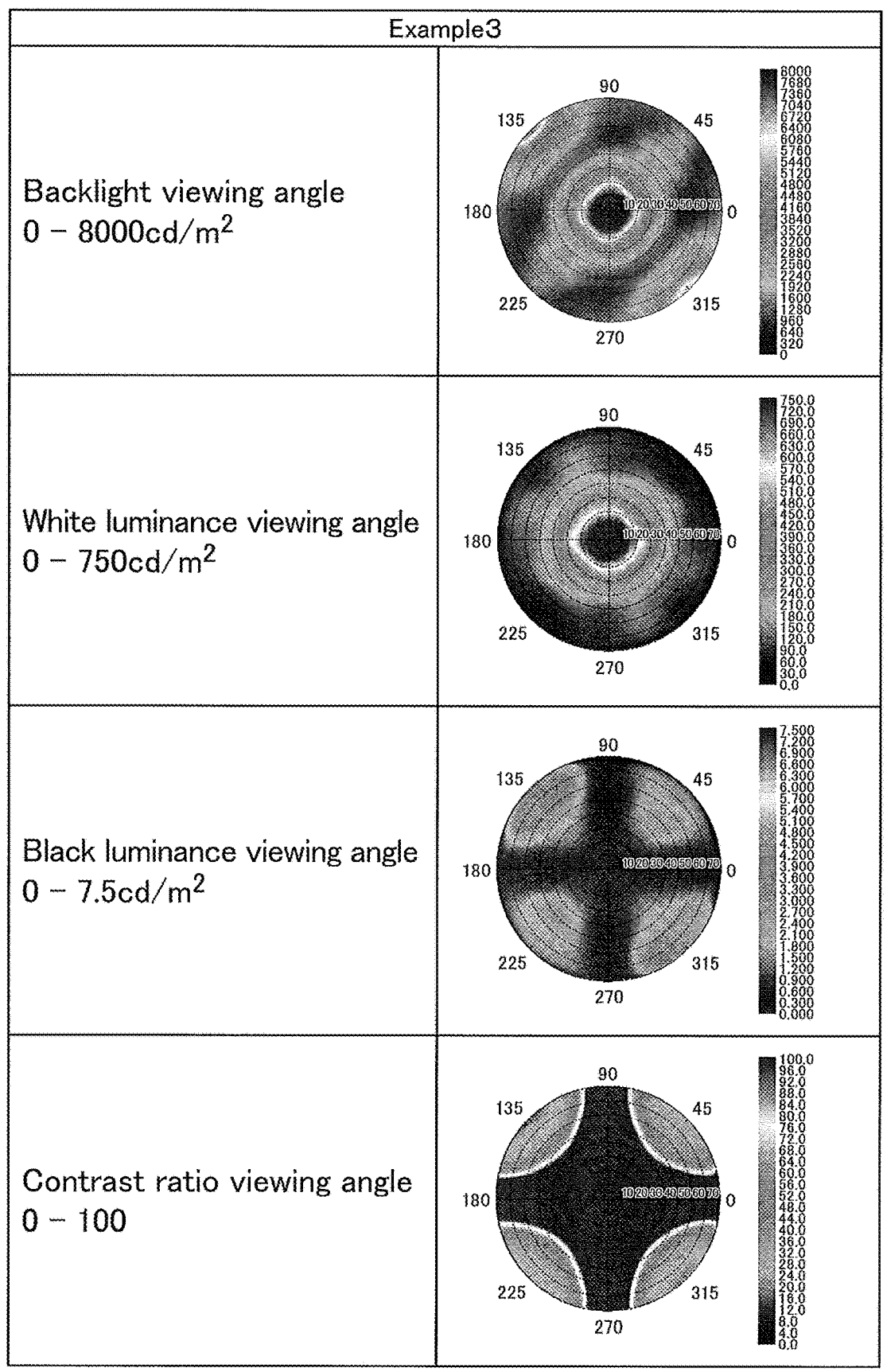
FIG. 13C includes contour plots showing measurement results of the viewing angle characteristics of the liquid crystal display device of Example 3.

The liquid crystal display devices of these examples were actually produced for trial, and parameters such as the contrast ratio in the front direction and the white luminance value in an oblique direction (azimuth 0°, polar angle 60°) were actually determined as in Example 1. The determination results are shown in FIGS. 12B, 12C, 13B, and 13C. FIG. 12C includes contour plots showing measurement results of the viewing angle characteristics of the liquid crystal display device of Example 2. FIG. 13C includes contour plots showing measurement results of the viewing angle characteristics of the liquid crystal display device of Example 3. As shown in FIGS. 12B, 12C, 13B, and 13C, in Examples 2 and 3, light leakage in a black display state in oblique directions was reduced and the contrast ratio in the front direction was resultantly improved in comparison to Comparative Example 1. Also, the retarder constituting the polarizing louver was a retarder that had a greater total absolute value of the thickness retardation Rth between the second polarizer and the third polarizer (Rth total in the corresponding figure) than in Example 1. Thus, a larger effect of improving the contrast ratio than in Example 1 was achieved. In particular, Example 3 achieved a large effect of improving the contrast ratio.

Comparative Example 3

Figure 14A:
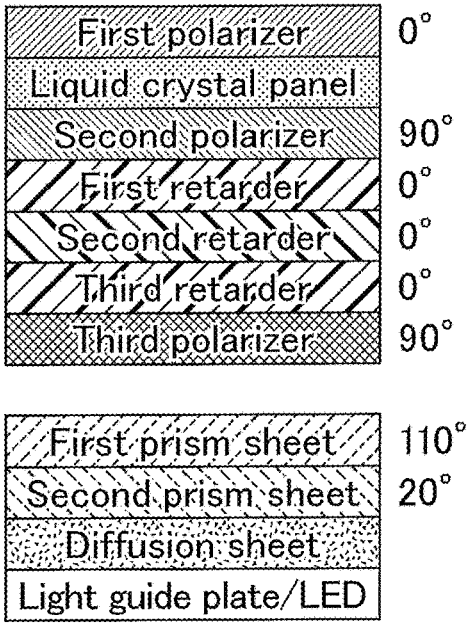
FIG. 14A is a figure showing the structure of a liquid crystal display device of Comparative Example 3.

A liquid crystal display device of Comparative Example 3 has the structure as shown in FIG. 14A. FIG. 14A is a figure showing the structure of the liquid crystal display device of Comparative Example 3. The present comparative example is the same as Example 3 except that the azimuths (side lobe-occurring azimuths) perpendicular to the azimuth at which the ridge lines of the prism sheets extended were set to 110° and 20°.

Calculation results of the transmittance viewing angle characteristics of the polarizing louver in the present comparative example are shown in FIG. 14B. FIG. 14B is a figure showing calculation results of transmittance viewing angles of the polarizing louver of Comparative Example 3 and measurement results of parameters of the liquid crystal display device of Comparative Example 3. As shown in FIG. 14B, the light distribution of the polarizing louver of the present comparative example shows a substantial cross shape as in Example 1. Thus, light incident on the liquid crystal panel is restricted at azimuths 45°, 135°, 225°, and 315°.

Figure 14C:
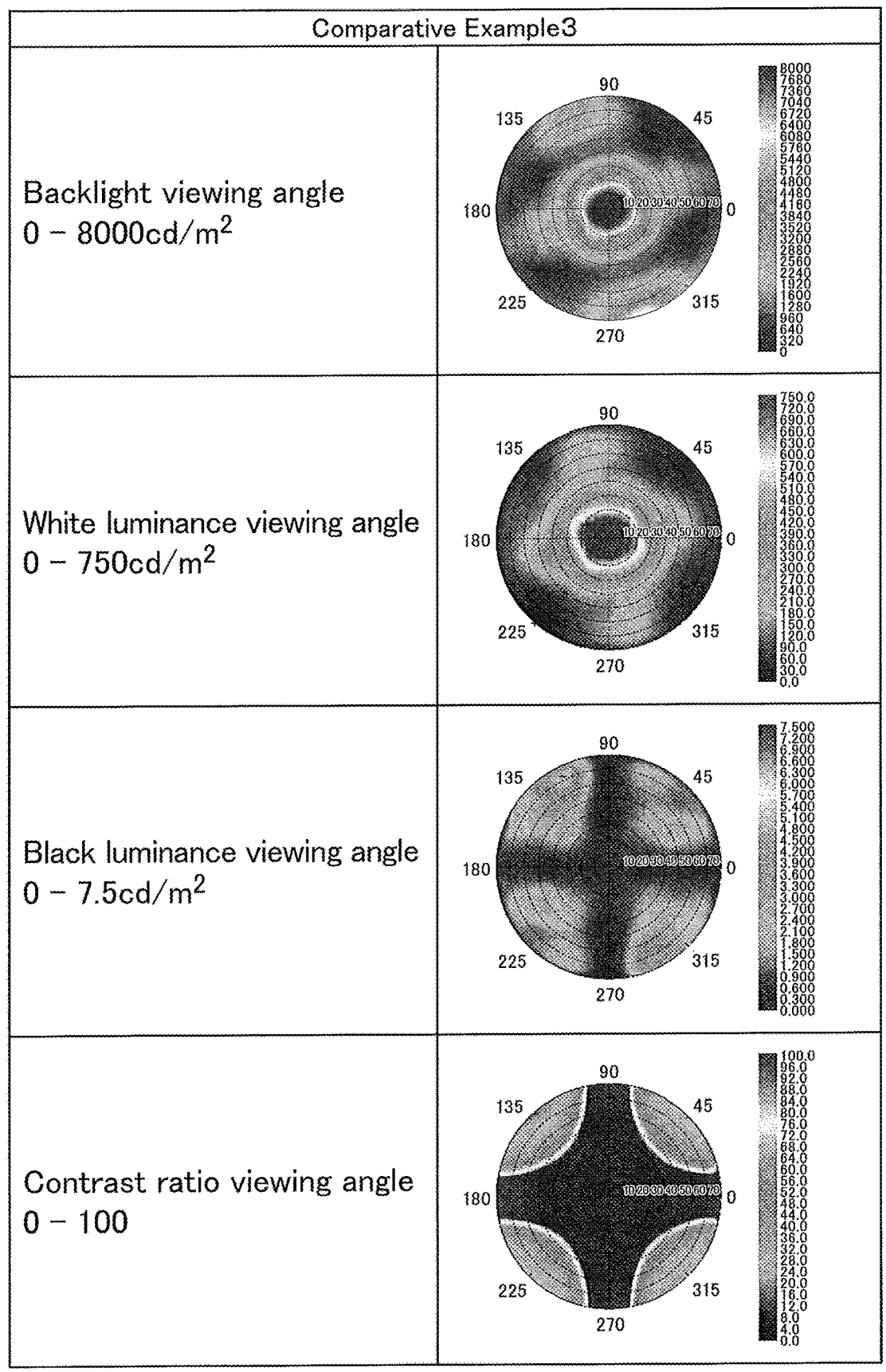
FIG. 14C includes contour plots showing measurement results of the viewing angle characteristics of the liquid crystal display device of Comparative Example 3.

The liquid crystal display device of the present comparative example was actually produced for trial, and parameters such as the contrast ratio in the front direction and the white luminance value in an oblique direction (azimuth 0°, polar angle 60°) were actually determined as in Example 1. The determination results are shown in FIGS. 14B and 14C. FIG. 14C includes contour plots showing measurement results of the viewing angle characteristics of the liquid crystal display device of Comparative Example 3. As shown in FIGS. 14B and 14C, in Comparative Example 3, light leakage in a black display state in oblique directions was reduced and the contrast ratio in the front direction was resultantly improved in comparison to Comparative Example 1. However, differently from Example 3, the effect of improving the contrast ratio was smaller than in Example 1 because the azimuths at which the polarizing louver restricted light incident on the liquid crystal panel did not match the side lobe-occurring azimuths.

Example 4

A liquid crystal display device and a polarizing plate of Example 4 have the structures shown in FIG. 15A. FIG. 15A is a figure showing the structure of the liquid crystal display device and the polarizing plate of Example 4. Example 4 is the same as Example 1 except for the wavelength dispersion characteristics of the retarders. The axis azimuths and the properties of the retarders are as shown in the figure. The polarizing plate of Example 4 included a stack sequentially including a second polarizer, a first retarder, a second retarder, and a third polarizer.

Calculation results of transmittance viewing angle characteristics of the polarizing louver of the present example are shown in FIG. 15B. FIG. 15B is a figure showing calculation results of transmittance viewing angles of the polarizing louver of Example 4 and measurement results of parameters of the liquid crystal display device of Example 4. As shown in FIG. 15B, the light distribution of the polarizing louver of the present example shows a substantial cross shape as in Example 1, and light incident on the liquid crystal panel is restricted at azimuths 45°, 135°, 225°, and 315°.

Figure 15C:
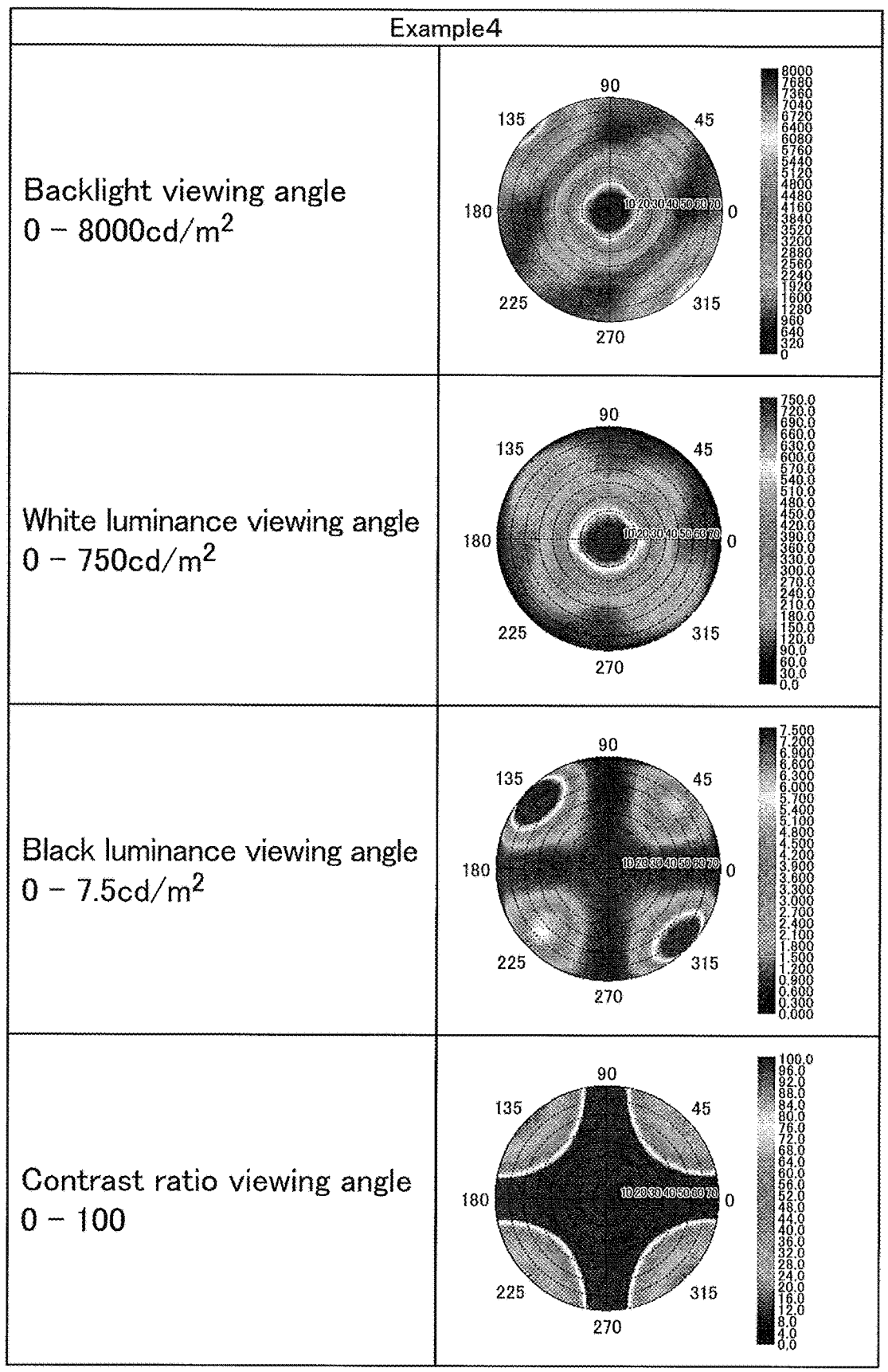
FIG. 15C includes contour plots showing measurement results of the viewing angle characteristics of the liquid crystal display device of Example 4.

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIGS. 15B and 15C. FIG. 15C includes contour plots showing measurement results of the viewing angle characteristics of the liquid crystal display device of Example 4. As shown in FIGS. 15B and 15C, in Example 4, light leakage in a black display state in oblique directions was reduced and the contrast ratio in the front direction was resultantly improved in comparison to Comparative Example 1. However, in Example 4, the retarders constituting the polarizing louver had flat wavelength dispersion characteristics, and thus a reduction in white luminance and yellowing were observed in oblique directions in comparison to Example 1 and Comparative Example 1.

Examples 5 and 6

Figure 16C:
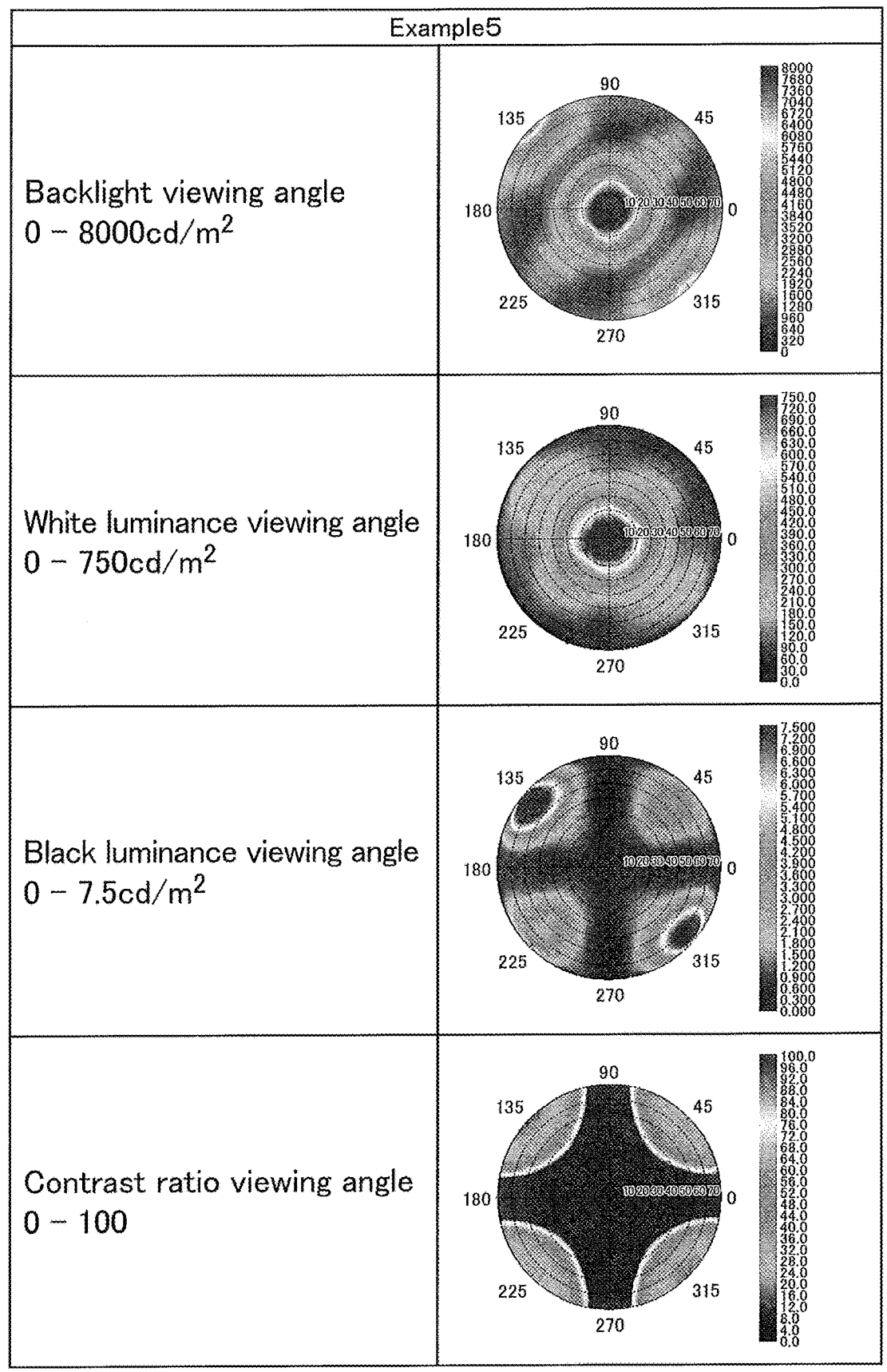
FIG. 16C includes contour plots showing measurement results of the viewing angle characteristics of the liquid crystal display device of Example 5.
Figure 17A:
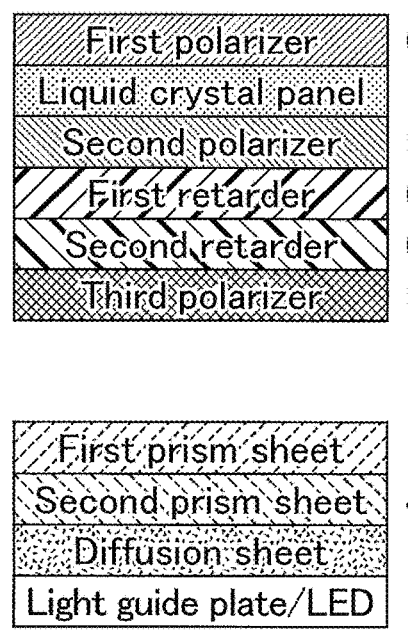
FIG. 17A is a figure showing the structure of a liquid crystal display device and a polarizing plate of Example 6.

Liquid crystal display devices and polarizing plates of Examples 5 and 6 respectively have the structures shown in FIGS. 16A and 17A. FIG. 16A is a figure showing the structure of the liquid crystal display device and the polarizing plate of Example 5. FIG. 17A is a figure showing the structure of the liquid crystal display device and the polarizing plate of Example 6. These examples are the same as Example 1 except for the structure of the retarder(s). The axis azimuths and the properties of the retarders are as shown in the corresponding figure. The polarizing plate of Example 5 included a stack sequentially including a second polarizer, a first retarder, and a third polarizer. The polarizing plate of Example 6 included a stack sequentially including a second polarizer, a first retarder, a second retarder, and a third polarizer.

Calculation results of transmittance viewing angle characteristics of the polarizing louvers of these examples are shown in FIGS. 16B and 17B. FIG. 16B is a figure showing calculation results of transmittance viewing angles of the polarizing louver of Example 5 and measurement results of parameters of the liquid crystal display device of Example 5. FIG. 17B is a figure showing calculation results of transmittance viewing angles of the polarizing louver of Example 6 and measurement results of parameters of the liquid crystal display device of Example 6. As shown in FIGS. 16B and 17B, the light distribution of the polarizing louvers of these examples shows a substantial cross shape as in Example 1, and light incident on the liquid crystal panel is restricted at azimuths 45°, 135°, 225°, and 315°.

Figure 17C:
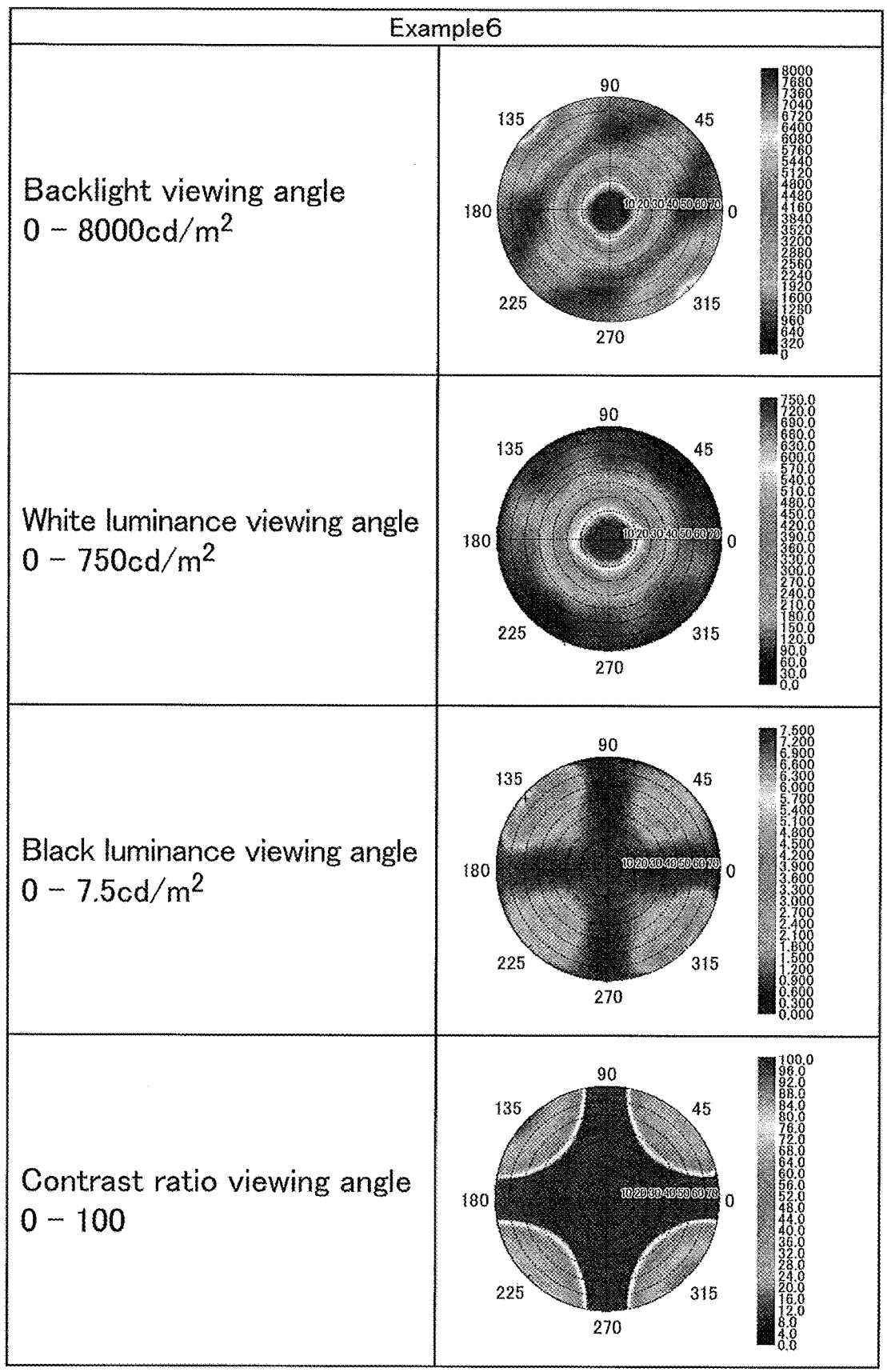
FIG. 17C includes contour plots showing measurement results of the viewing angle characteristics of the liquid crystal display device of Example 6.

The liquid crystal display devices of these examples were actually produced for trial, and parameters such as the contrast ratio in the front direction and the white luminance value in an oblique direction (azimuth 0°, polar angle 60°) were actually determined as in Example 1. The determination results are shown in FIGS. 16B, 16C, 17B, and 17C. FIG. 16C includes contour plots showing measurement results of the viewing angle characteristics of the liquid crystal display device of Example 5. FIG. 17C includes contour plots showing measurement results of the viewing angle characteristics of the liquid crystal display device of Example 6. As shown in FIGS. 16B, 16C, 17B, and 17C, in Examples 5 and 6, light leakage in a black display state in oblique directions was reduced and the contrast ratio in the front direction was resultantly improved in comparison to Comparative Example 1. Also, the retarder constituting the polarizing louver was a retarder that had a greater total absolute value of the thickness retardation Rth between the second polarizer and the third polarizer (Rth total in the corresponding figure) than in Example 1. Thus, a larger effect of improving the contrast ratio than in Example 1 was achieved. In particular, Example 6 achieved a large effect of improving the contrast ratio. However, Example 6 in which the total absolute value of the thickness retardation Rth exceeded 400 nm caused a reduction in white luminance and yellowing in oblique directions in comparison to Example 5. Thus, the liquid crystal display device of Example 5 is more suitable to general-purpose liquid crystal display devices required to have a certain viewing angle (e.g., laptop PCs, tablet computers, vehicle-mounted displays, and smartphones). Meanwhile, the liquid crystal display device of Example 6 is more suitable to liquid crystal display devices not required to have a wide viewing angle, such as head-mounted displays (VR displays), and to liquid crystal display devices including a light diffusion film or the like for increasing the viewing angle on the top surface thereof. The applications of the liquid crystal display devices of the examples are not limited to these examples.

Example 7

A liquid crystal display device and a polarizing plate of Example 7 have the structures shown in FIG. 18A. FIG. 18A is a figure showing the structure of the liquid crystal display device and the polarizing plate of Example 7. The present example is the same as Example 1 except for the structure of the retarders. The axis azimuths and the properties of the retarders are as shown in the figure. The polarizing plate of Example 7 included a stack sequentially including a second polarizer, a first retarder, a second retarder, and a third polarizer.

Calculation results of transmittance viewing angle characteristics of the polarizing louver of the present example are shown in FIG. 18B. FIG. 18B is a figure showing calculation results of transmittance viewing angles of the polarizing louver of Example 7 and measurement results of parameters of the liquid crystal display device of Example 7. As shown in FIG. 18B, the light distribution of the polarizing louver of the present example shows a substantial cross shape as in Example 1, and light incident on the liquid crystal panel is restricted at azimuths 45°, 135°, 225°, and 315°.

Figure 18C:
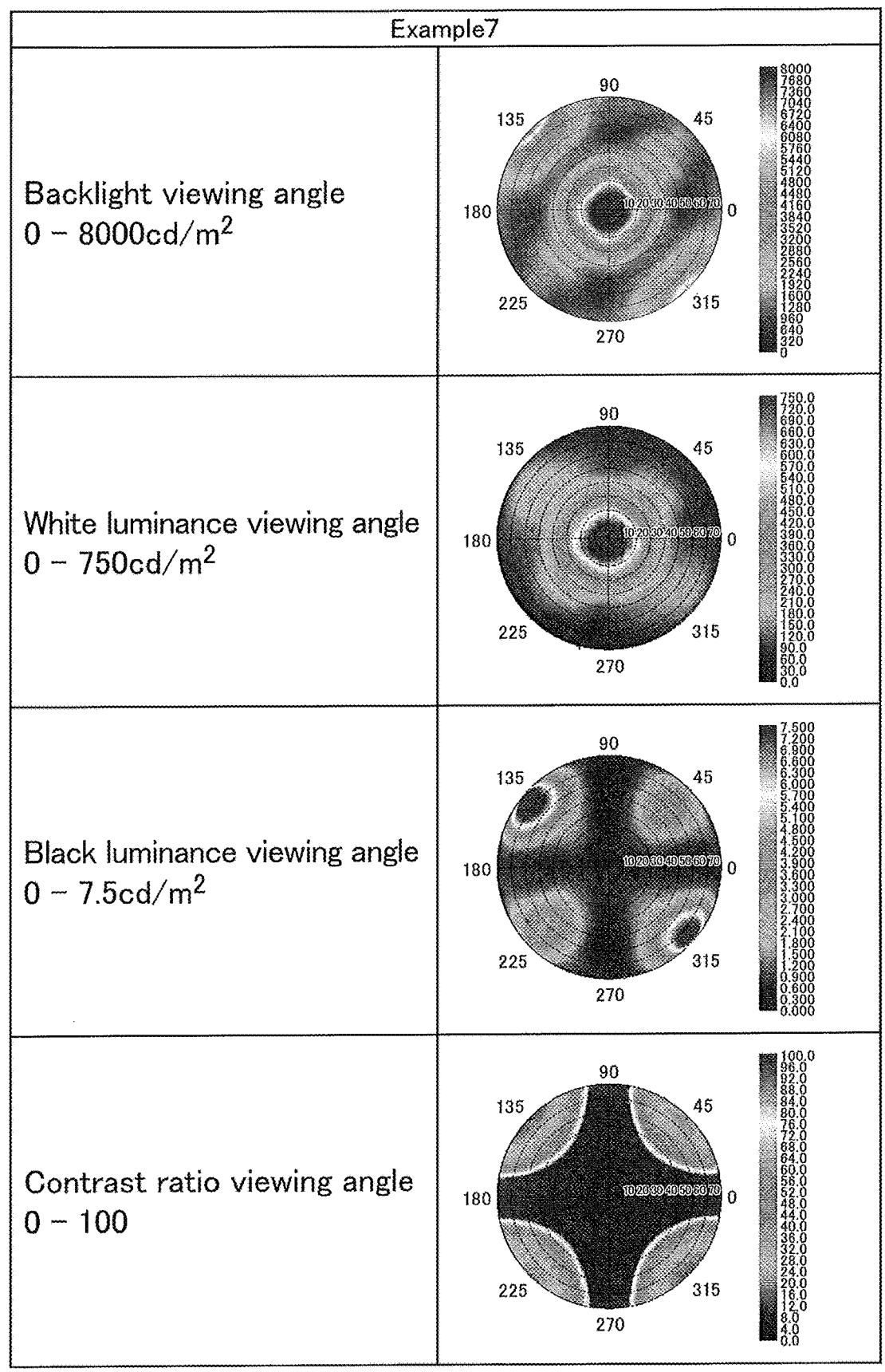
FIG. 18C includes contour plots showing measurement results of the viewing angle characteristics of the liquid crystal display device of Example 7.

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIGS. 18B and 18C. FIG. 18C includes contour plots showing measurement results of the viewing angle characteristics of the liquid crystal display device of Example 7. As shown in FIGS. 18B and 18C, in Example 7, light leakage in a black display state in oblique directions was reduced and the contrast ratio in the front direction was resultantly improved in comparison to Comparative Example 1. Similarly to Example 4, a retarder having an in-plane retardation of 140 nm, i.e., a λ/4 plate, was used in Example 7, but the λ/4 plate had a greater biaxial order parameter NZ than in Example 4 and a greater total absolute value of the thickness retardation Rth between the second polarizer and the third polarizer (Rth total in the corresponding figure) than in Example 4. Thus, a larger effect of improving the contrast ratio than in Example 4 was achieved.

Comparative Example 4

A liquid crystal display device of Comparative Example 4 has the structure as shown in FIG. 19A. FIG. 19A is a figure showing the structure of the liquid crystal display device of Comparative Example 4. The present comparative example is the same as Example 7 except that the azimuths (side lobe-occurring azimuths) perpendicular to the azimuth at which the ridge lines of the prism sheets extended were set to 110° and 20°.

Calculation results of transmittance viewing angle characteristics of the polarizing louver of the present comparative examples are shown in FIG. 19B. FIG. 19B is a figure showing calculation results of transmittance viewing angles of the polarizing louver of Comparative Example 4 and measurement results of parameters of the liquid crystal display device of Comparative Example 4. As shown in FIG. 19B, the light distribution of the polarizing louver of the present comparative example shows a substantial cross shape as in Example 1, and light incident on the liquid crystal panel is restricted at azimuths 45°, 135°, 225°, and 315°.

Figure 19C:
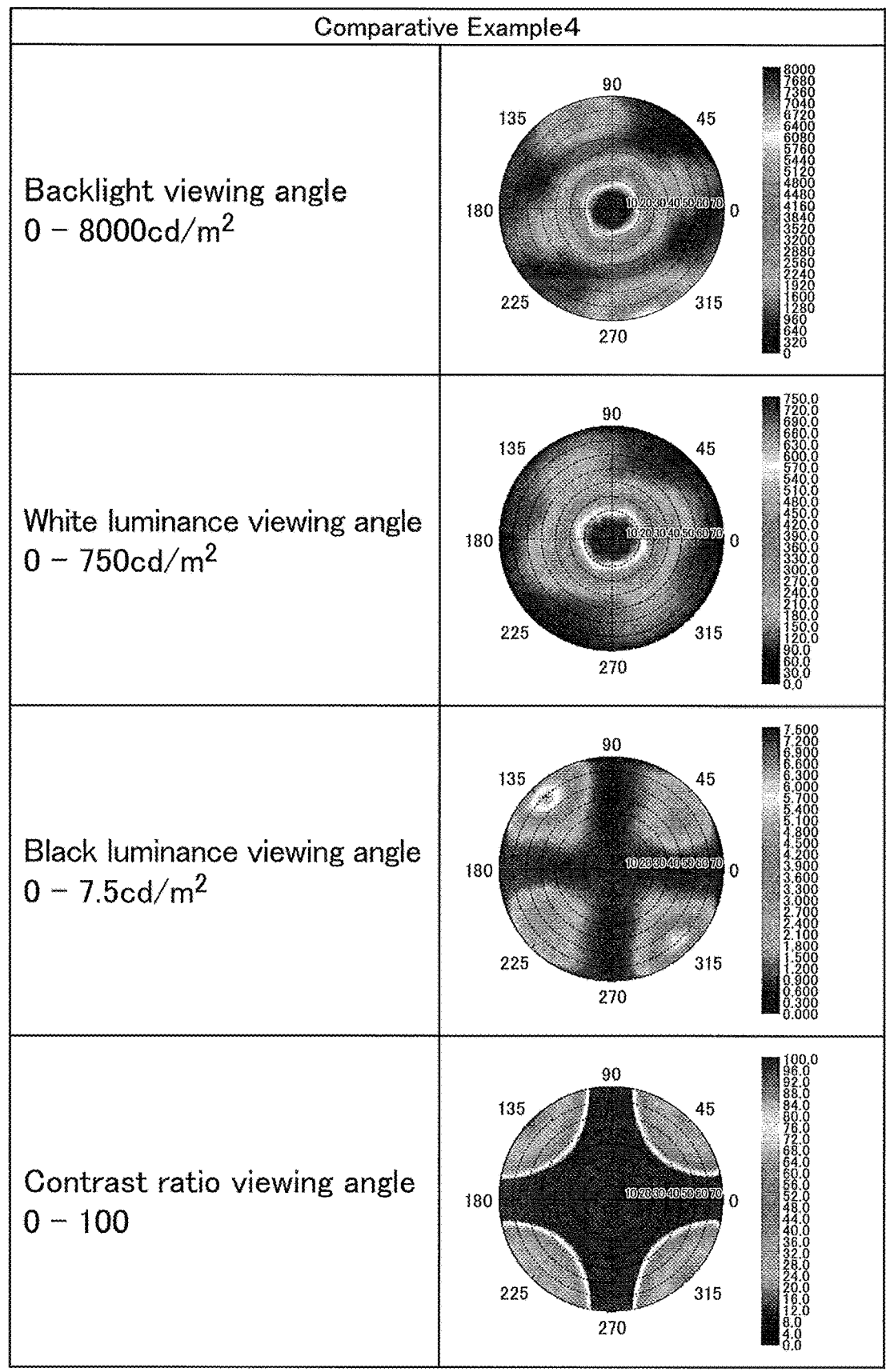
FIG. 19C includes contour plots showing measurement results of the viewing angle characteristics of the liquid crystal display device of Comparative Example 4.

The liquid crystal display device of the present comparative example was actually produced for trial, and parameters such as the contrast ratio in the front direction and the white luminance value in an oblique direction (azimuth 0°, polar angle 60°) were actually determined as in Example 1. The determination results are shown in FIGS. 19B and 19C. FIG. 19C includes contour plots showing measurement results of the viewing angle characteristics of the liquid crystal display device of Comparative Example 4. As shown in FIGS. 19B and 19C, in Comparative Example 4, light leakage in a black display state in oblique directions was reduced and the contrast ratio in the front direction was resultantly improved in comparison to Comparative Example 1. However, differently from Example 7, an effect of improving the contrast ratio was smaller than in Example 7 because the azimuths at which the polarizing louver restricted light incident on the liquid crystal panel did not match the side lobe-occurring azimuths.

Example 8

Figure 20A:
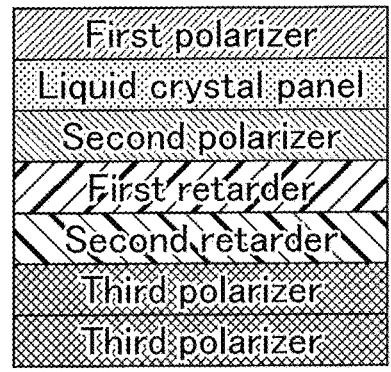
FIG. 20A is a figure showing the structure of a liquid crystal display device and a polarizing plate of Example 8.
Figure 20A:
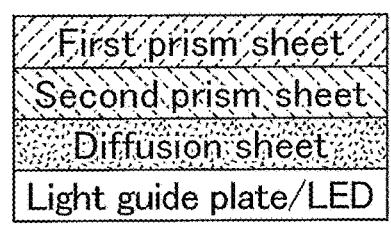

A liquid crystal display device and a polarizing plate of Example 8 have the structures shown in FIG. 20A. FIG. 20A is a figure showing the structure of the liquid crystal display device and the polarizing plate of Example 8. The present example is the same as Example 1 except for the structure of the retarders. The axis azimuths and the properties of the retarders are as shown in the figure. The polarizing plate of Example 8 included a stack sequentially including a second polarizer, a first retarder, a second retarder, a third retarder, and a third polarizer.

Calculation results of transmittance viewing angle characteristics of the polarizing louver of the present example are shown in FIG. 20B. FIG. 20B is a figure showing calculation results of transmittance viewing angles of the polarizing louver of Example 8 and measurement results of parameters of the liquid crystal display device of Example 8. As shown in FIG. 20B, the light distribution of the polarizing louver of the present example shows a substantial cross shape as in Example 1, and light incident on the liquid crystal panel is restricted at azimuths 45°, 135°, 225°, and 315°.

Figure 20C:
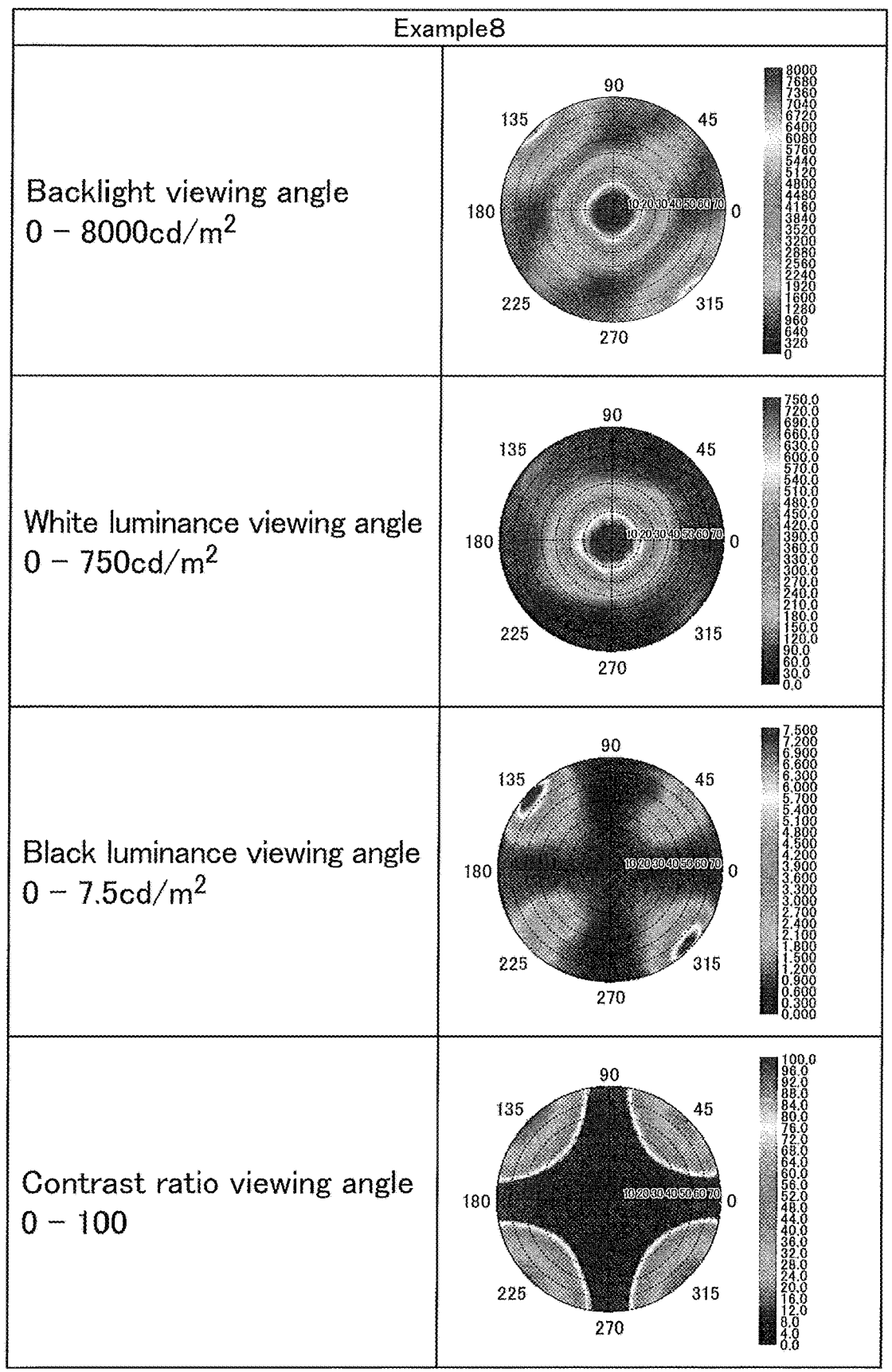
FIG. 20C includes contour plots showing measurement results of the viewing angle characteristics of the liquid crystal display device of Example 8.

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIGS. 20B and 20C. FIG. 20C includes contour plots showing measurement results of the viewing angle characteristics of the liquid crystal display device of Example 8. As shown in FIGS. 20B and 20C, in Example 8, light leakage in a black display state in oblique directions was reduced and the contrast ratio in the front direction was resultantly improved in comparison to Comparative Example 1. Similarly to Example 4, a retarder having an in-plane retardation of 140 nm, i.e., a λ/4 plate was used in Example 8, but the λ/4 plate had a greater biaxial order parameter NZ than in Example 4 and a greater total absolute value of the thickness retardation Rth (Rth total in the corresponding figure) than in Example 4. Thus, a larger effect of improving the contrast ratio than in Example 4 was achieved. However, Example 8 in which the total absolute value of the thickness retardation Rth exceeded 400 nm caused a reduction in white luminance and yellowing in oblique directions in comparison to Examples 4 and 7. Thus, the liquid crystal display devices of Examples 4 and 7 are more suitable to general-purpose liquid crystal display devices required to have a certain viewing angle (e.g., laptop PCs, tablet computers, vehicle-mounted displays, and smartphones). Meanwhile, the liquid crystal display device of Example 8 is more suitable to liquid crystal display devices not required to have a wide viewing angle, such as head-mounted displays (VR displays), and to liquid crystal display devices including a light diffusion film or the like for increasing the viewing angle on the top surface thereof. The applications of the liquid crystal display devices of the examples are not limited to these examples.

Examples 9 and 10

Figure 21A:
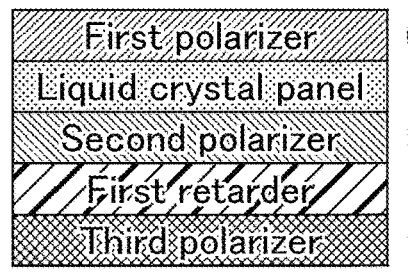
FIG. 21A is a figure showing the structure of a liquid crystal display device and a polarizing plate of Example 9.
Figure 22A:
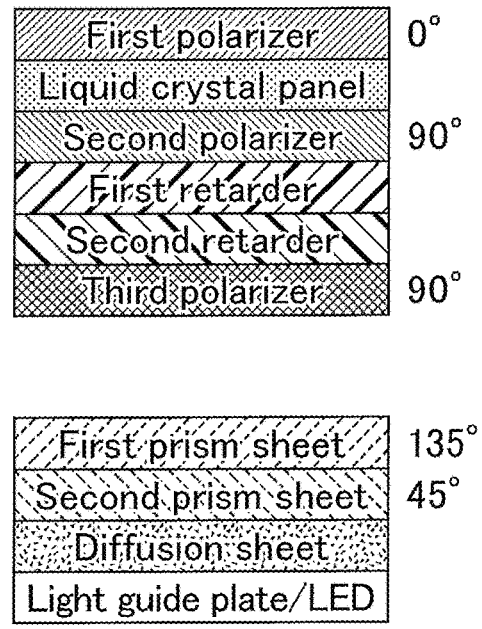
FIG. 22A is a figure showing the structure of a liquid crystal display device and a polarizing plate of Example 10.

Liquid crystal display devices and polarizing plates of Examples 9 and 10 respectively have the structures shown in FIGS. 21A and 22A. FIG. 21A is a figure showing the structure of the liquid crystal display device and the polarizing plate of Example 9. FIG. 22A is a figure showing the structure of the liquid crystal display device and the polarizing plate of Example 10. These examples are the same as Example 1 except for the structure of the retarder(s). The axis azimuths and the properties of the retarders are as shown in the corresponding figure. The polarizing plate of Example 9 included a stack sequentially including a second polarizer, a first retarder, and a third polarizer. The polarizing plate of Example 10 included a stack sequentially including a second polarizer, a first retarder, a second retarder, and a third polarizer.

Calculation results of transmittance viewing angle characteristics of the polarizing louvers of these examples are shown in FIGS. 21B and 22B. FIG. 21B is a figure showing calculation results of transmittance viewing angles of the polarizing louver of Example 9 and measurement results of parameters of the liquid crystal display device of Example 9. FIG. 22B is a figure showing calculation results of transmittance viewing angles of the polarizing louver of Example 10 and measurement results of parameters of the liquid crystal display device of Example 10. As shown in FIGS. 21B and 22B, the light distribution of the polarizing louvers of these examples shows a substantial cross shape as in Example 1, and light incident on the liquid crystal panel is restricted at azimuths 45°, 135°, 225°, and 315°.

Figure 21C:
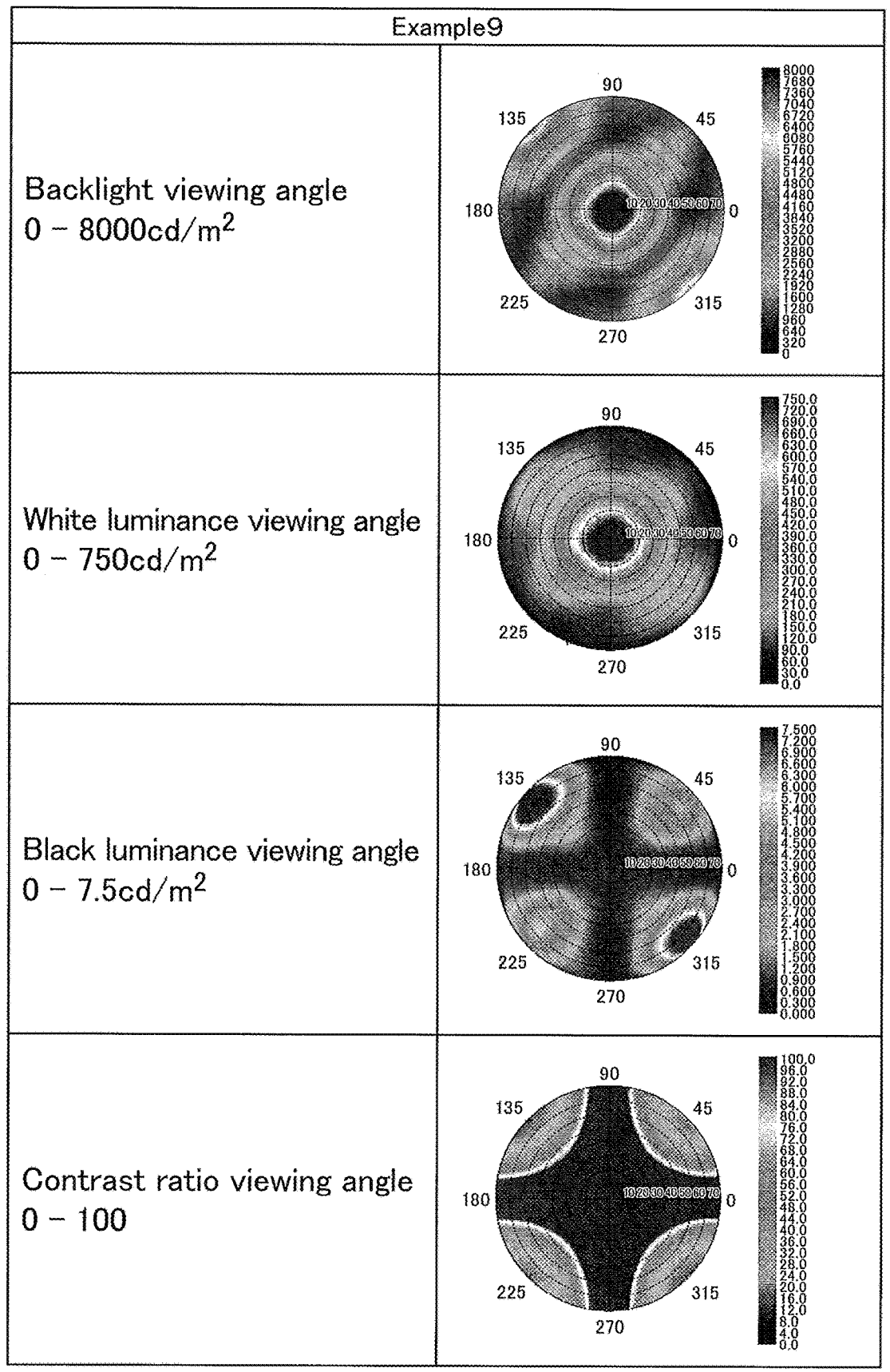
FIG. 21C includes contour plots showing measurement results of the viewing angle characteristics of the liquid crystal display device of Example 9.
Figure 22C:
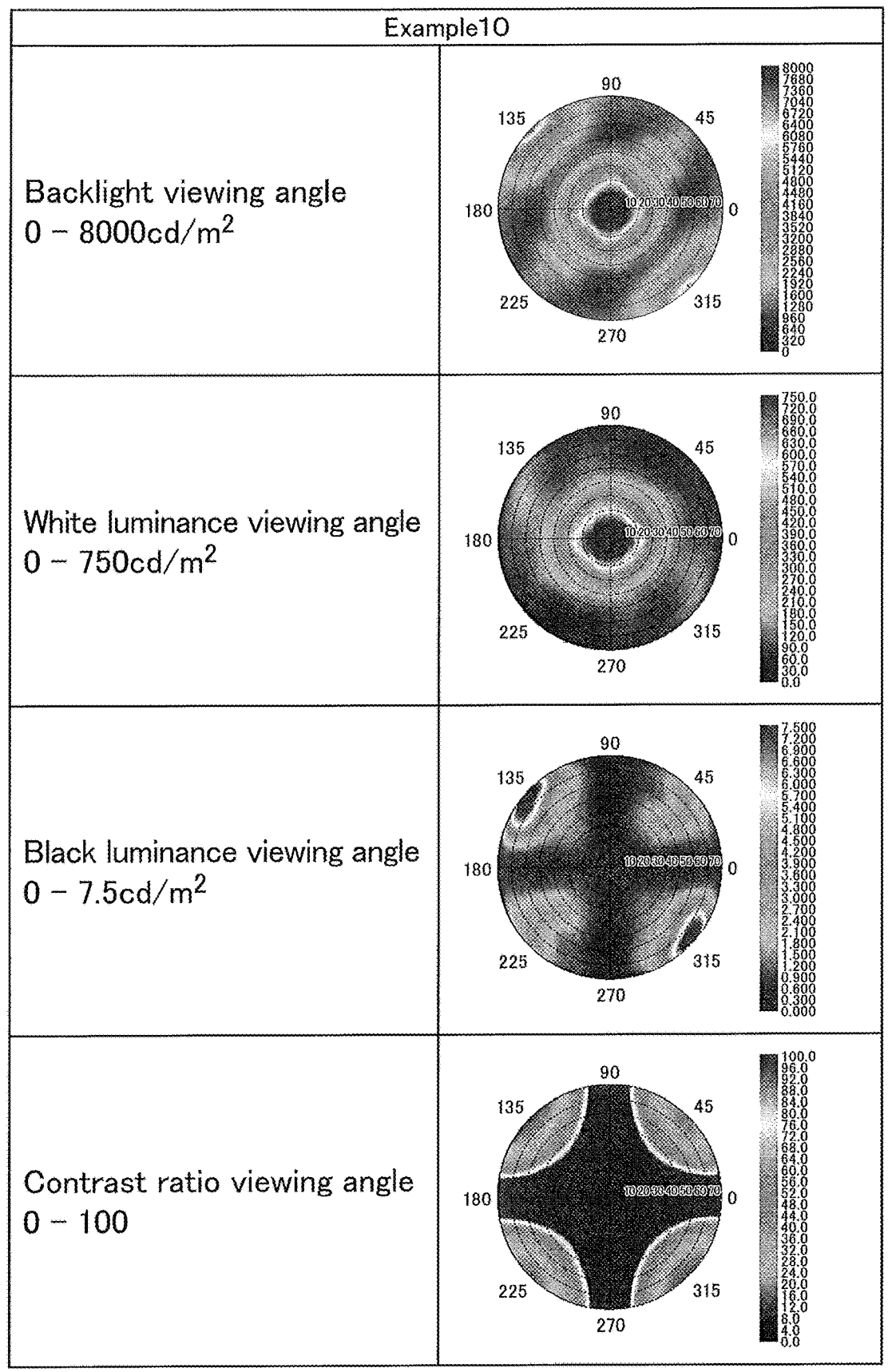
FIG. 22C includes contour plots showing measurement results of the viewing angle characteristics of the liquid crystal display device of Example 10.

The liquid crystal display devices of these examples were actually produced for trial, and parameters such as the contrast ratio in the front direction and the white luminance value in an oblique direction (azimuth 0°, polar angle 60°) were actually determined as in Example 1. The determination results are shown in FIGS. 21B, 21C, 22B, and 22C. FIG. 21C includes contour plots showing measurement results of the viewing angle characteristics of the liquid crystal display device of Example 9. FIG. 22C includes contour plots showing measurement results of the viewing angle characteristics of the liquid crystal display device of Example 10. As shown in FIGS. 21B, 21C, 22B, and 22C, in Examples 9 and 10, light leakage in a black display state in oblique directions was reduced and the contrast ratio in the front direction was resultantly improved in comparison to Comparative Example 1. Also, the retarder constituting the polarizing louver was a retarder that had a greater total absolute value of the thickness retardation Rth between the second polarizer and the third polarizer (Rth total in the corresponding figure) than in Example 1. Thus, a larger effect of improving the contrast ratio than in Example 1 was achieved. In particular, Example 10 achieved a large effect of improving the contrast ratio. However, Example 10 in which the total absolute value of the thickness retardation Rth exceeded 400 nm caused a reduction in white luminance and yellowing in oblique directions in comparison to Example 9. Thus, the liquid crystal display device of Example 9 is more suitable to general-purpose liquid crystal display devices required to have a certain viewing angle (e.g., laptop PCs, tablet computers, vehicle-mounted displays, and smartphones). Meanwhile, the liquid crystal display device of Example 10 is more suitable to liquid crystal display devices not required to have a wide viewing angle, such as head-mounted displays (VR displays), and to liquid crystal display devices including a light diffusion film or the like for increasing the viewing angle on the top surface thereof. The applications of the liquid crystal display devices of the examples are not limited to these examples.

Comparative Example 5

A liquid crystal display device of Comparative Example 5 has the structure as shown in FIG. 23A. FIG. 23A is a figure showing the structure of the liquid crystal display device of Comparative Example 5. The present comparative example is the same as Example 9 except that the azimuths (side lobe-occurring azimuths) perpendicular to the azimuth at which the ridge lines of the prism sheets extended were set to 110° and 20°.

Calculation results of transmittance viewing angle characteristics of the polarizing louver of the present comparative example are shown in FIG. 23B. FIG. 23B is a figure showing calculation results of transmittance viewing angles of the polarizing louver of Comparative Example 5 and measurement results of parameters of the liquid crystal display device of Comparative Example 5. As shown in FIG. 23B, the light distribution of the polarizing louver of the present comparative example shows a substantial cross shape as in Example 1, and light incident on the liquid crystal panel is restricted at azimuths 45°, 135°, 225°, and 315°.

Figure 23C:
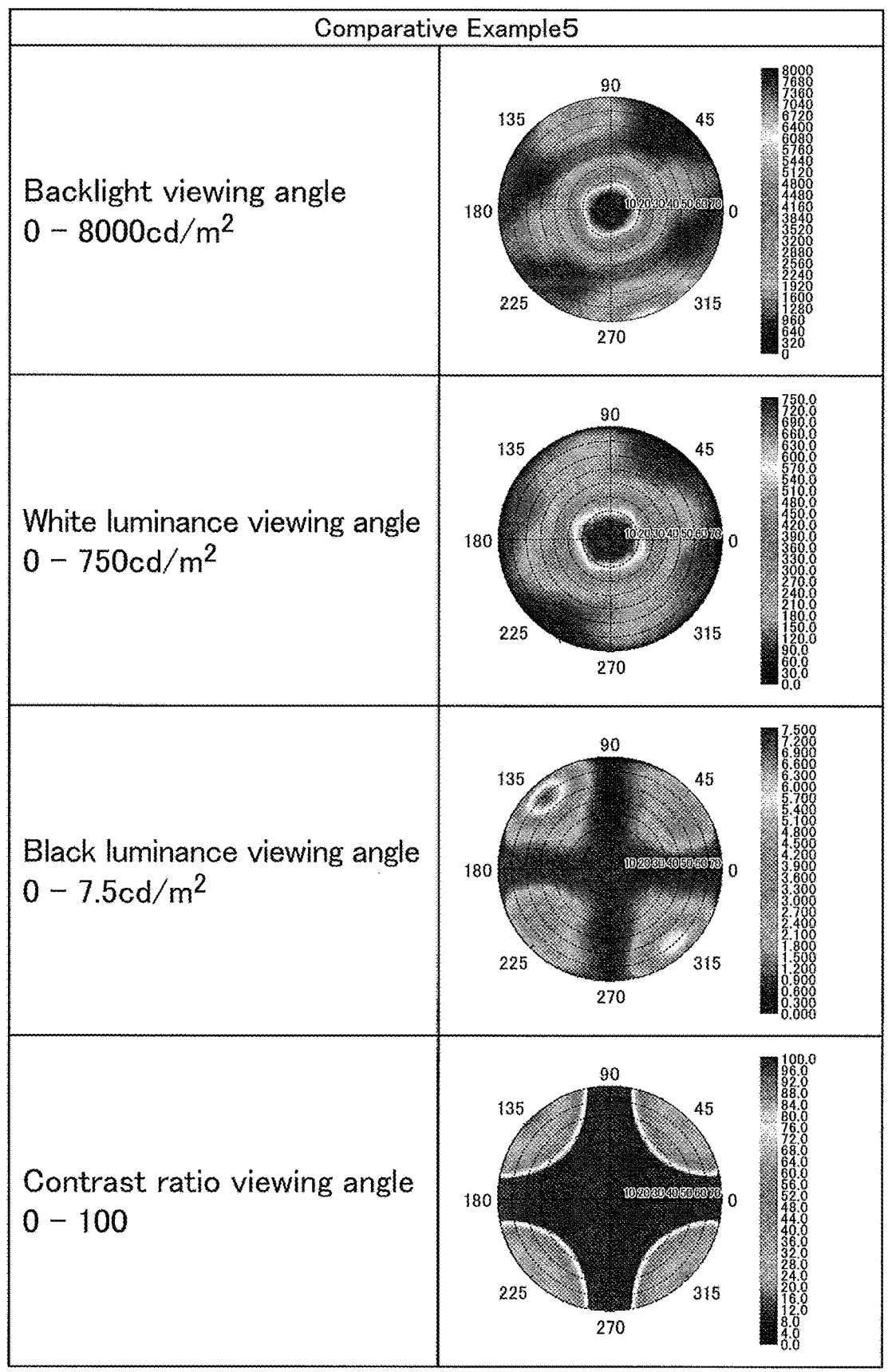
FIG. 23C includes contour plots showing measurement results of the viewing angle characteristics of the liquid crystal display device of Comparative Example 5.

The liquid crystal display device of the present comparative example was actually produced for trial, and parameters such as the contrast ratio in the front direction and the white luminance value in an oblique direction (azimuth 0°, polar angle 60°) were actually determined as in Example 1. The determination results are shown in FIGS. 23B and 23C. FIG. 23C includes contour plots showing measurement results of the viewing angle characteristics of the liquid crystal display device of Comparative Example 5. As shown in FIGS. 23B and 23C, in Comparative Example 5, light leakage in a black display state in oblique directions was reduced and the contrast ratio in the front direction was resultantly improved in comparison to Comparative Example 1. However, differently from Example 9, an effect of improving the contrast ratio was smaller than in Example 7 because the azimuths at which the polarizing louver restricted light incident on the liquid crystal panel did not match the side lobe-occurring azimuths.

Example 11

A liquid crystal display device and a polarizing plate of Example 11 have the structures shown in FIG. 24A. FIG. 24A is a figure showing the structure of the liquid crystal display device and the polarizing plate of Example 11. Example 11 is the same as Example 1 except for the axis azimuth of the third polarizer, the structure of the retarders, and the azimuths perpendicular to the azimuths at which the ridge lines of the prism sheets extend (side lobe-occurring azimuths). The axis azimuths and the properties of the respective retarders and the side lobe-occurring azimuths are as shown in the figure. The polarizing plate of Example 11 included a stack sequentially including a second polarizer, a first retarder, a second retarder, and a third polarizer.

Figure 24C:
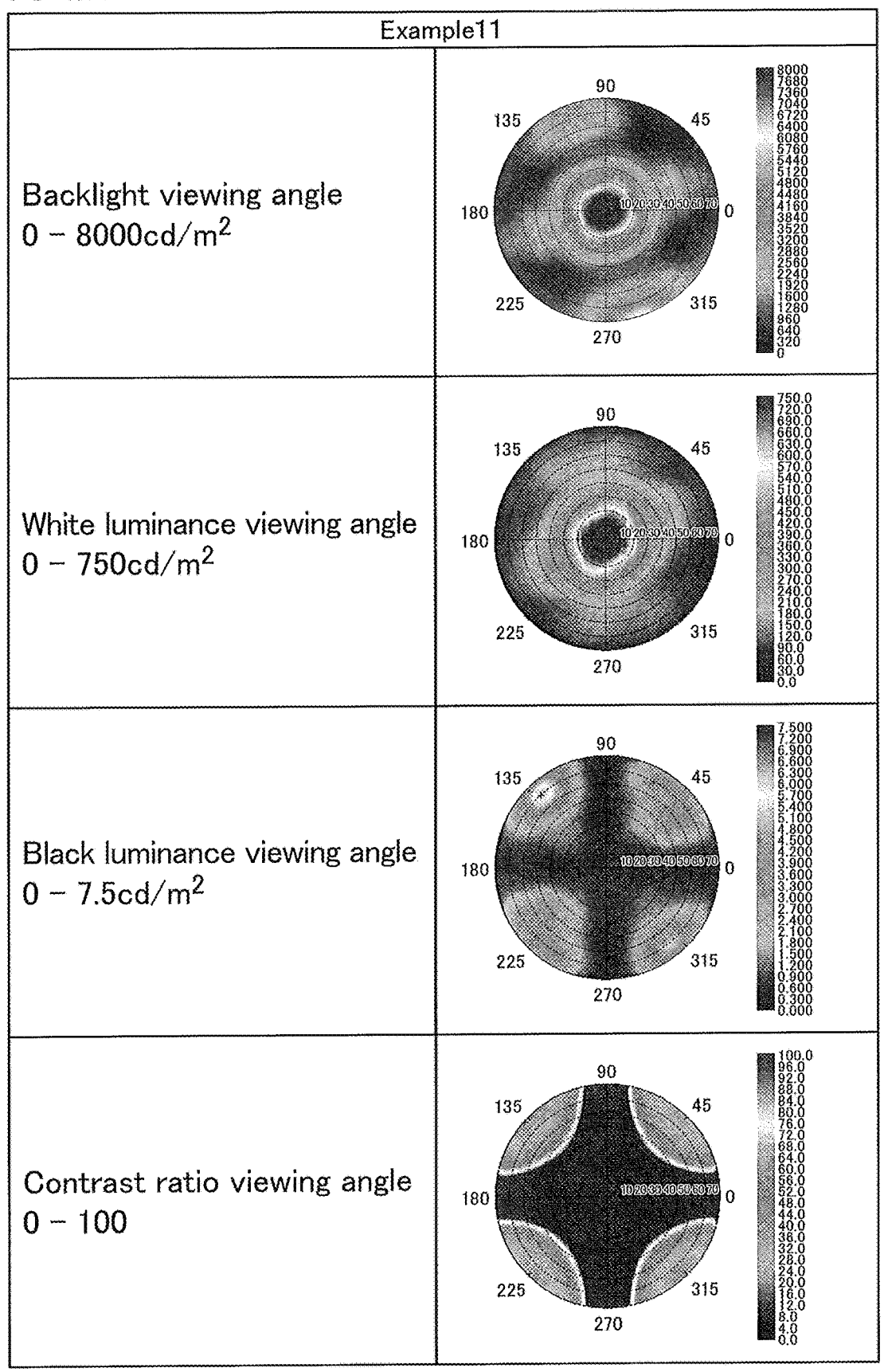
FIG. 24C includes contour plots showing measurement results of the viewing angle characteristics of the liquid crystal display device of Example 11.
Figure 25:
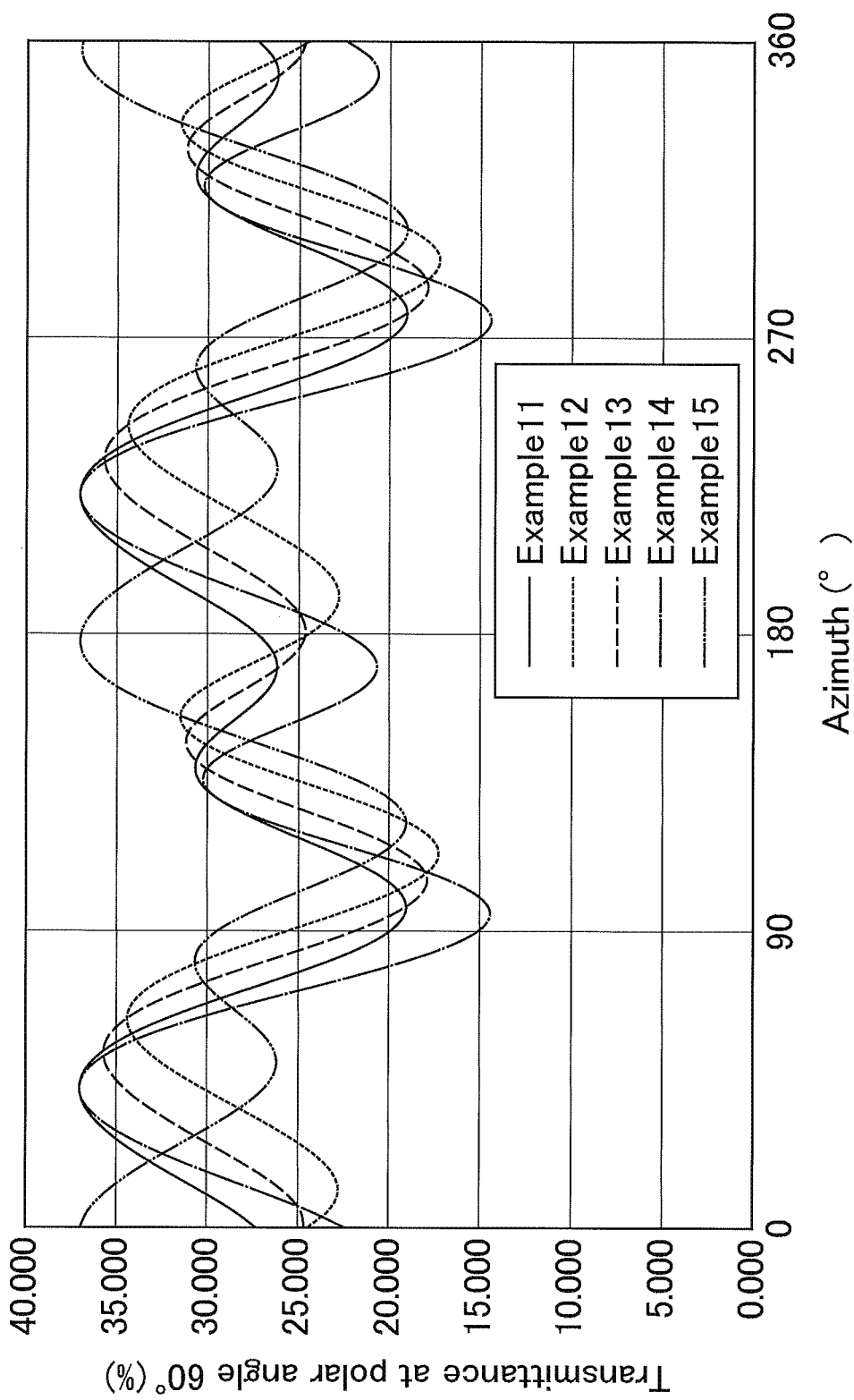
FIG. 25 is a graph showing azimuth angle dependence of the transmittance at a polar angle of 60° in the polarizing louvers of Examples 11 to 15, based on the calculation results of transmittance viewing angle characteristics.

Calculation results of transmittance viewing angle characteristics of the polarizing louver of Example 11 are shown in FIG. 24B. FIG. 24B is a figure showing calculation results of transmittance viewing angles of the polarizing louver of Example 11 and measurement results of parameters of the liquid crystal display device of Example 11. FIG. 25 is a graph showing azimuth angle dependence of the transmittance at a polar angle of 60° in the polarizing louvers of Examples 11 to 15, based on the calculation results of transmittance viewing angle characteristics. As shown in FIG. 24B, the light distribution of the polarizing louver of the present example shows an anisotropic light distribution. Also, as shown in FIG. 25, light incident on the liquid crystal panel is restricted at azimuths 95°, 170°, 275°, and 350°. Setting the angles of the prism sheets such that each side lobe comes to at least one of the azimuths is expected to efficiently restrict light leakage of the liquid crystal display device in oblique directions and to improve the contrast ratio. The side lobe-occurring azimuths were set to 110° and 20°.

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIGS. 24B and 24C. FIG. 24C includes contour plots showing measurement results of the viewing angle characteristics of the liquid crystal display device of Example 11. As shown in FIGS. 24B and 24C, in Example 11, light leakage in a black display state in oblique directions was reduced and the contrast ratio in the front direction was resultantly improved in comparison to Comparative Example 1. Even in the case where the azimuths of the ridge lines of the prism sheets are neither 45° nor 135° and the design of the second polarizer cannot be changed from the typical design in which the azimuth of the second absorption axis is 0° or 90°, designing a polarizing louver as in Example 11 such that the second transmission axis of the second polarizer 12 and the third transmission axis of the third polarizer 13 are not parallel to each other can allow the azimuths at which the polarizing louver restricts the amount of light incident on the liquid crystal panel to substantially match the side lobe-occurring azimuths, whereby an effect of improving the contrast ratio can be achieved. Also in Example 11, the retarder constituting the polarizing louver had reverse wavelength dispersion characteristics. Thus, a reduction in white luminance and yellowing in oblique directions could be restricted, and the display quality was similar to that of Comparative Example 1.

Comparative Example 6

Figure 26A:
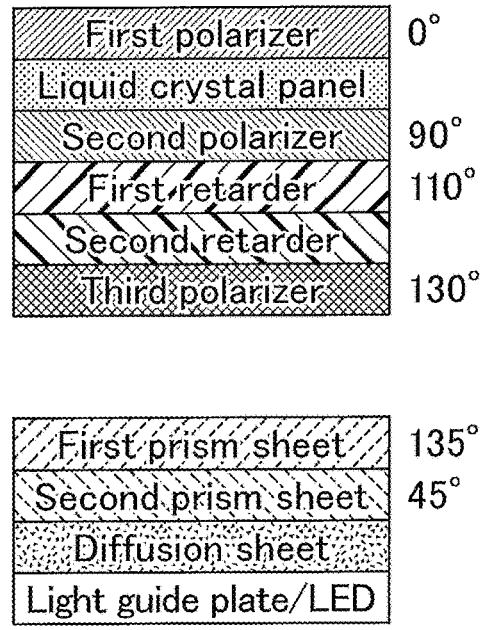
FIG. 26A is a figure showing the structure of a liquid crystal display device of Comparative Example 6.

A liquid crystal display device of Comparative Example 6 has the structure as shown in FIG. 26A. FIG. 26A is a figure showing the structure of the liquid crystal display device of Comparative Example 6. The present comparative example is the same as Example 11 except that the azimuths (side lobe-occurring azimuths) perpendicular to the azimuth at which the ridge lines of the prism sheets extended were set to 135° and 45°.

Calculation results of transmittance viewing angle characteristics of the polarizing louver of the present comparative example are shown in FIG. 26B. FIG. 26B is a figure showing calculation results of transmittance viewing angles of a polarizing louver of Comparative Example 6 and measurement results of parameters of the liquid crystal display device of Comparative Example 6. As shown in FIG. 26B, the light distribution of the polarizing louver of the present comparative example shows an anisotropic light distribution as in Example 11, and light incident on the liquid crystal panel was restricted at azimuths 95°, 170°, 275°, and 350° as in Example 11.

Figure 26C:
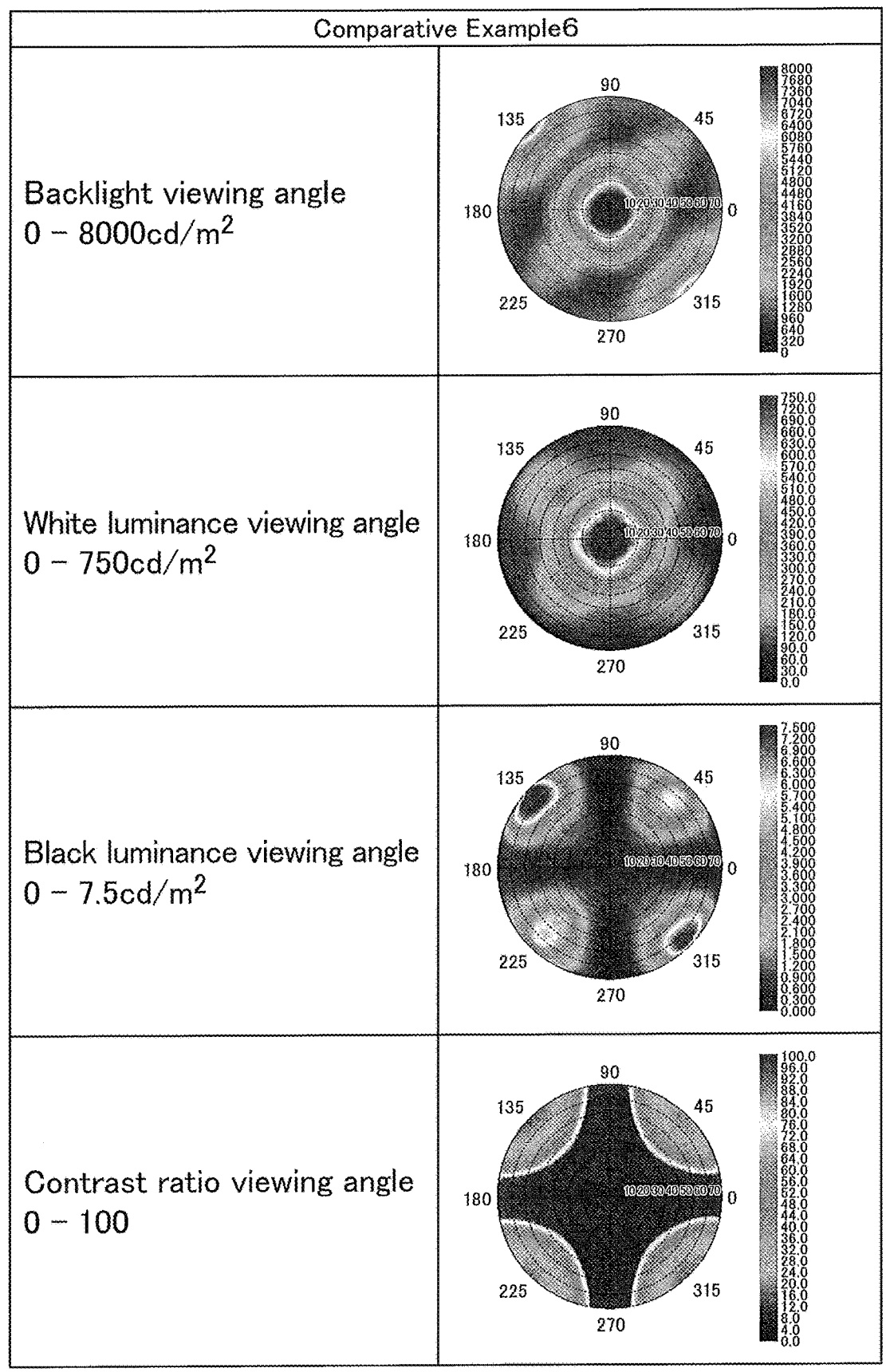
FIG. 26C includes contour plots showing measurement results of the viewing angle characteristics of the liquid crystal display device of Comparative Example 6.

The liquid crystal display device of the present comparative example was actually produced for trial, and parameters such as the contrast ratio in the front direction and the white luminance value in an oblique direction (azimuth 0°, polar angle 60°) were actually determined as in Example 1. The determination results are shown in FIGS. 26B and 26C. FIG. 26C includes contour plots showing measurement results of the viewing angle characteristics of the liquid crystal display device of Comparative Example 6. As shown in FIGS. 26B and 26C, in Comparative Example 6, light leakage in a black display state in oblique directions was reduced and the contrast ratio in the front direction was resultantly improved in comparison to Comparative Example 1. However, differently from Example 11, an effect of improving the contrast ratio was smaller than in Example 11 because the azimuths at which the polarizing louver restricted light incident on the liquid crystal panel did not match the side lobe-occurring azimuths.

Examples 12 and 13

Figure 27A:
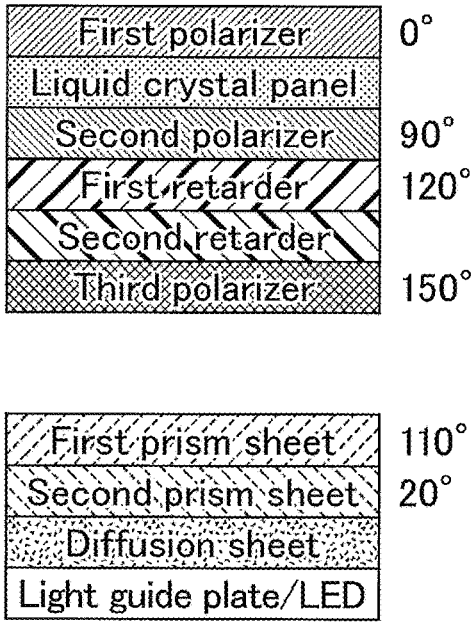
FIG. 27A is a figure showing the structure of a liquid crystal display device and a polarizing plate of Example 12.

Liquid crystal display devices and polarizing plates of Examples 12 and 13 respectively have the structures shown in FIGS. 27A and 28A. FIG. 27A is a figure showing the structure of the liquid crystal display device and the polarizing plate of Example 12. FIG. 28A is a figure showing the structure of the liquid crystal display device and the polarizing plate of Example 13. These examples are the same as Example 11 except for the axis azimuths of the third polarizer and the retarders. The axis azimuths and the properties of the respective retarders and side lobe-occurring azimuths are as shown in the corresponding figure. The polarizing plates of Examples 12 and 13 each included a stack sequentially including a second polarizer, a first retarder, a second retarder, and a third polarizer. In Examples 12 and 13, no liquid crystal display device was produced for trial. Thus, the description is made with reference to simulation results only.

Figure 27B:
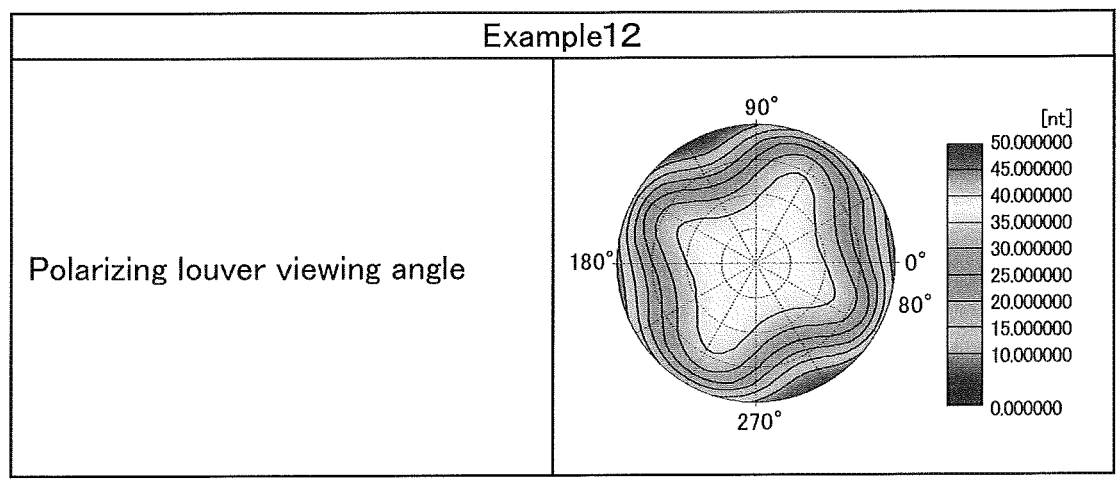
FIG. 27B is a figure showing calculation results of transmittance viewing angles of a polarizing louver of Example 12.
Figure 28B:
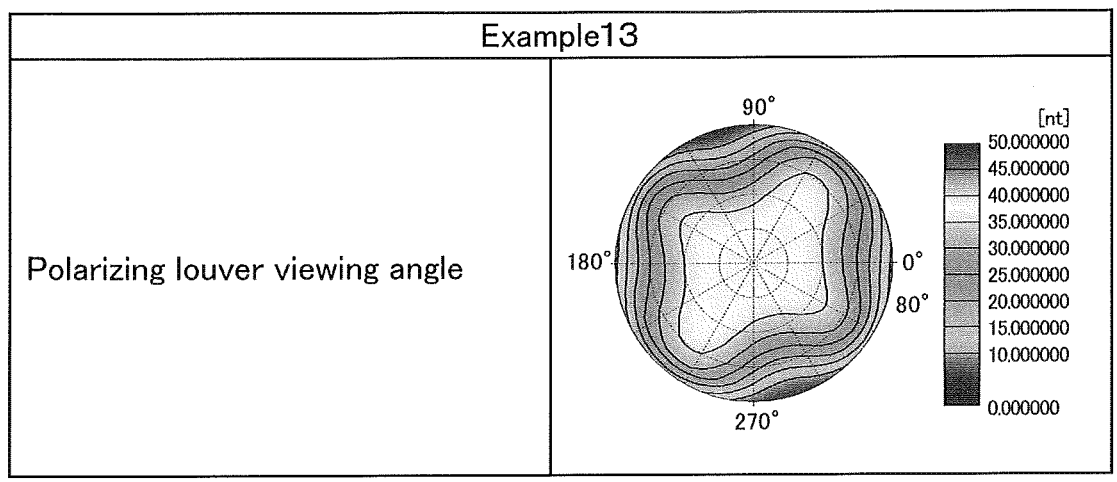
FIG. 28B is a figure showing calculation results of transmittance viewing angles of a polarizing louver of Example 13.

Calculation results of transmittance viewing angle characteristics of the polarizing louvers of these examples are shown in FIGS. 27B and 28B. FIG. 27B is a figure showing calculation results of transmittance viewing angles of the polarizing louver of Example 12. FIG. 28B is a figure showing calculation results of transmittance viewing angles of the polarizing louver of Example 13. As shown in FIGS. 27B and 28B, the light distributions of the polarizing louvers of these examples each show an anisotropic light distribution as in Example 11. Also, as shown in FIG. 25, light incident on the liquid crystal panel is restricted at azimuths 10°, 115°, 195°, and 295° in Example 12 and at azimuths 0°, 105°, 180°, and 285° in Example 13. Setting the angles of the prism sheets such that each side lobe comes to at least one of the azimuths in each example is expected to efficiently restrict light leakage of the liquid crystal display device in oblique directions and to improve the contrast ratio. The side lobe-occurring azimuths were set to 110° and 20°. In these examples, the azimuths at which the polarizing louver dims light more correspond to the side lobe-occurring azimuths than in Example 11. Thus, the contrast ratio in the front direction was presumably more improved. Also, in Examples 12 and 13, the retarder constituting the polarizing louver had reverse wavelength dispersion characteristics. Thus, presumably, a reduction in white luminance and yellowing in oblique directions could be restricted, and the display quality was similar to that of Comparative Example 1.

Example 14

A liquid crystal display device and a polarizing plate of Example 14 have the structures shown in FIG. 29A. FIG. 29A is a figure showing the structure of the liquid crystal display device and the polarizing plate of Example 14. The present example is the same as Example 11 except for the structure of the retarders. The axis azimuths and the properties of the retarders and side lobe-occurring azimuths are as shown in the figure. The polarizing plate of Example 14 included a stack sequentially including a second polarizer, a first retarder, a second retarder, and a third polarizer. In Example 14, no liquid crystal display device was produced for trial. Thus, the description is made with reference to simulation results only.

Figure 29B:
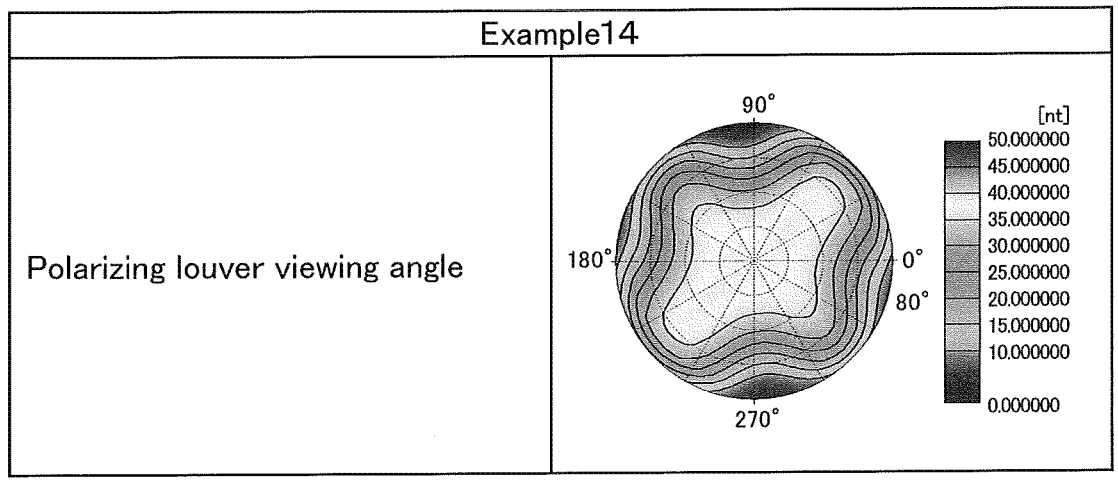
FIG. 29B is a figure showing calculation results of transmittance viewing angles of a polarizing louver of Example 14.

Calculation results of transmittance viewing angle characteristics of the polarizing louver of the present example are shown in FIG. 29B. FIG. 29B is a figure showing calculation results of transmittance viewing angles of the polarizing louver of Example 14. As shown in FIG. 29B, the light distribution of the polarizing louver of the present example shows an anisotropic light distribution as in Example 11, and light incident on the liquid crystal panel is restricted at azimuths 95°, 170°, 275°, and 350° as in Example 11. Also, the side lobe-occurring azimuths are set to 110° and 20° as in Example 11. Thus, the contrast ratio in the front direction can be presumably improved. Furthermore, the retarder constituting the polarizing louver has a greater total absolute value of the thickness retardation Rth between the second polarizer and the third polarizer (shown as "total Rth" in the figure) than Example 11. Thus, the effect of improving the contrast ratio is presumably greater than in Example 11. Moreover, the retarder constituting the polarizing louver had reverse wavelength dispersion characteristics. Thus, presumably, a reduction in white luminance and yellowing in oblique directions could be restricted, and the display quality was similar to that of Comparative Example 1.

Example 15

A liquid crystal display device and a polarizing plate of Example 15 have the structures shown in FIG. 30A. FIG. 30A is a figure showing the structure of the liquid crystal display device and the polarizing plate of Example 15. The present example is the same as Example 11 except that the axis azimuths and the properties of the first retarder and the second retarder are exchanged. The axis azimuths and the properties of the retarders and side lobe-occurring azimuths are as shown in the figure. The polarizing plate of Example 15 included a stack sequentially including a second polarizer, a first retarder, a second retarder, and a third polarizer. In Example 15, no liquid crystal display device was produced for trial. Thus, the description is made with reference to simulation results only.

Figure 30B:
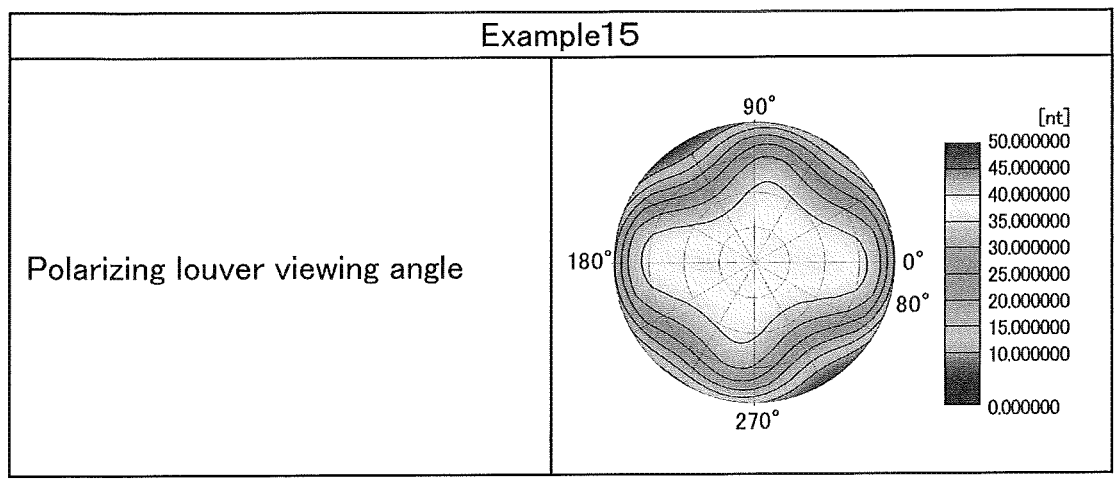
FIG. 30B is a figure showing calculation results of transmittance viewing angles of a polarizing louver of Example 15.

Calculation results of transmittance viewing angle characteristics of the polarizing louver of the present example are shown in FIG. 30B. FIG. 30B is a figure showing calculation results of transmittance viewing angles of the polarizing louver of Example 15. As shown in FIG. 30B, the light distribution of the polarizing louver of the present example shows an anisotropic light distribution as in Example 11. Also, as shown in FIG. 25, light incident on the liquid crystal panel is restricted at azimuths 50°, 125°, 230°, and 305°. Setting the angles of the prism sheets such that each side lobe comes to at least one of the azimuths is expected to efficiently restrict light leakage of the liquid crystal display device in oblique directions and to improve the contrast ratio. The side lobe-occurring azimuths were set to 110° and 20°. Accordingly, the azimuths at which the polarizing louver restricts the amount of light incident on the liquid crystal panel substantially the side lobe-occurring azimuths as in Example 11, whereby an effect of improving the contrast ratio is presumably achieved. Moreover, the retarder constituting the polarizing louver had reverse wavelength dispersion characteristics. Thus, presumably, a reduction in white luminance and yellowing in oblique directions could be restricted, and the display quality was similar to that of Comparative Example 1.

Example 16

A liquid crystal display device and a polarizing plate of Example 16 have the structures shown in FIG. 31A. FIG. 31A is a figure showing the structure of the liquid crystal display device and the polarizing plate of Example 16. The present example is the same as Example 1 except for the structure of the retarders. The axis azimuths and the properties of the retarders are as shown in the figure. The polarizing plate of Example 16 included a stack sequentially including a second polarizer, a first retarder, and a third polarizer. In Example 16, no liquid crystal display device was produced for trial. Thus, the description is made with reference to simulation results only.

Figure 31B:
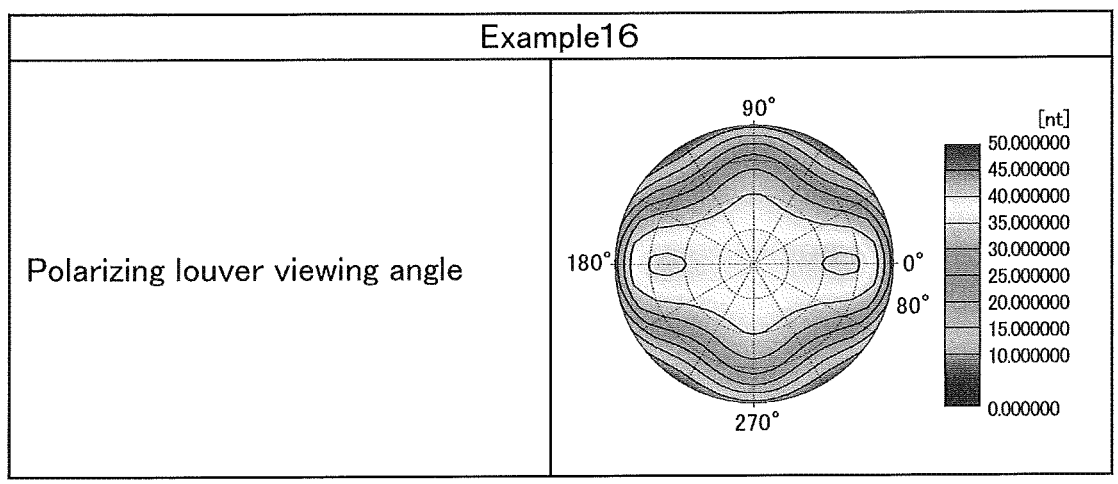
FIG. 31B is a figure showing calculation results of transmittance viewing angles of a polarizing louver of Example 16.

Calculation results of transmittance viewing angle characteristics of the polarizing louver of the present example are shown in FIG. 31B. FIG. 31B is a figure showing calculation results of transmittance viewing angles of the polarizing louver of Example 16. As shown in FIG. 31B, the light distribution of the polarizing louver of the present example shows a substantial cross shape as in Example 1, and light incident on the liquid crystal panel is restricted at azimuths 45°, 135°, 225°, and 315°.

Figure 31C:
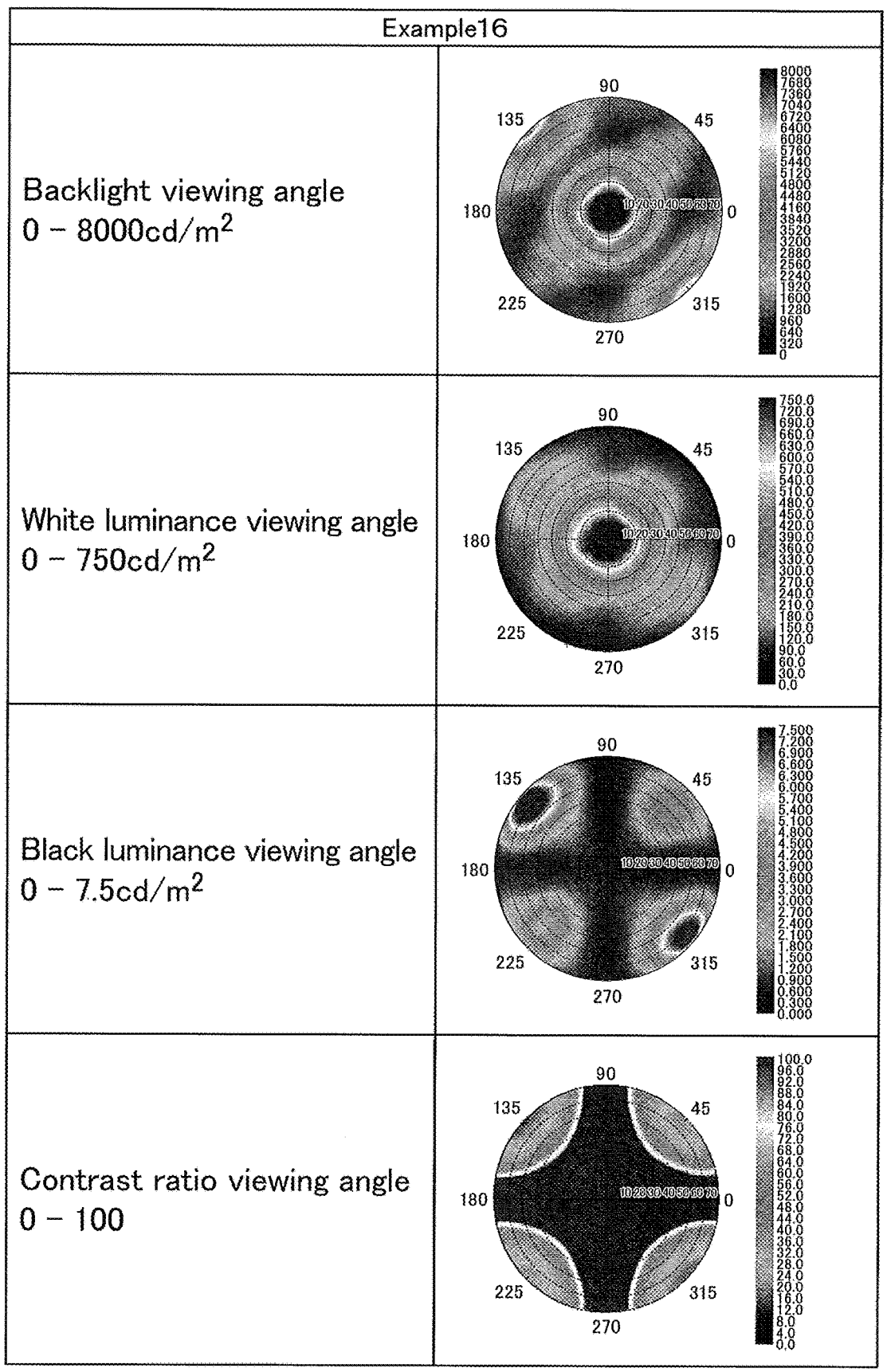
FIG. 31C includes contour plots showing measurement results of the viewing angle characteristics of the liquid crystal display device of Example 16.

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIG. 31C. FIG. 31C includes contour plots showing measurement results of the viewing angle characteristics of the liquid crystal display device of Example 16. As shown in FIGS. 21C and 31C, the same absolute value of the thickness retardation Rth provides the same results between the case of using a negative C plate (Example 9) and the case of using a positive C plate (present example). Setting the angles of the prism sheets such that each side lobe comes to the azimuth at which the polarizing louver dims light is expected to efficiently restrict light leakage of the liquid crystal display device in oblique directions and to improve the contrast ratio in the front direction. The side lobe-occurring azimuths were set to 135° and 45°. Accordingly, the azimuths at which the polarizing louver restricts the amount of light incident on the liquid crystal panel as in Examples 1 and 9 substantially match the side lobe-occurring azimuths, whereby an effect of improving the contrast ratio is presumably achieved.

Example 17

A liquid crystal display device and a polarizing plate of Example 17 have the structures shown in FIG. 32A. FIG. 32A is a figure showing the structure of the liquid crystal display device and the polarizing plate of Example 17. The present example is the same as Example 1 except for the structure of the retarders. The axis azimuths and the properties of the retarders are as shown in the figure. The polarizing plate of Example 17 included a stack sequentially including a second polarizer, a first retarder, a second retarder, and a third polarizer. In Example 17, no liquid crystal display device was produced for trial. Thus, the description is made with reference to simulation results only.

Figure 32B:
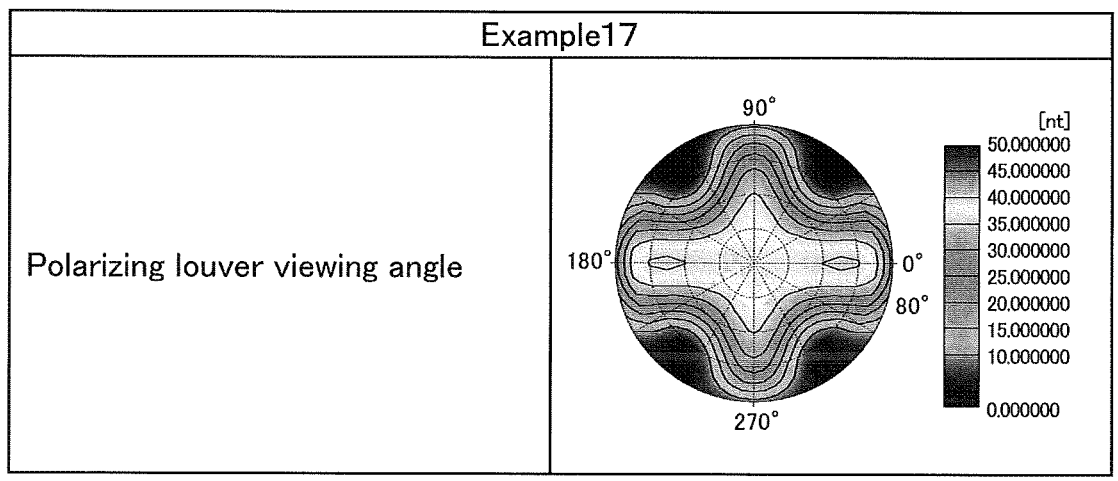
FIG. 32B is a figure showing calculation results of transmittance viewing angles of a polarizing louver of Example 17.

Calculation results of transmittance viewing angle characteristics of the polarizing louver of the present example are shown in FIG. 32B. FIG. 32B is a figure showing calculation results of transmittance viewing angles of the polarizing louver of Example 17. As shown in FIG. 32B, the light distribution of the polarizing louver of the present example shows a substantial cross shape as in Example 1, and light incident on the liquid crystal panel is restricted at azimuths 45°, 135°, 225°, and 315°.

Figure 32C:
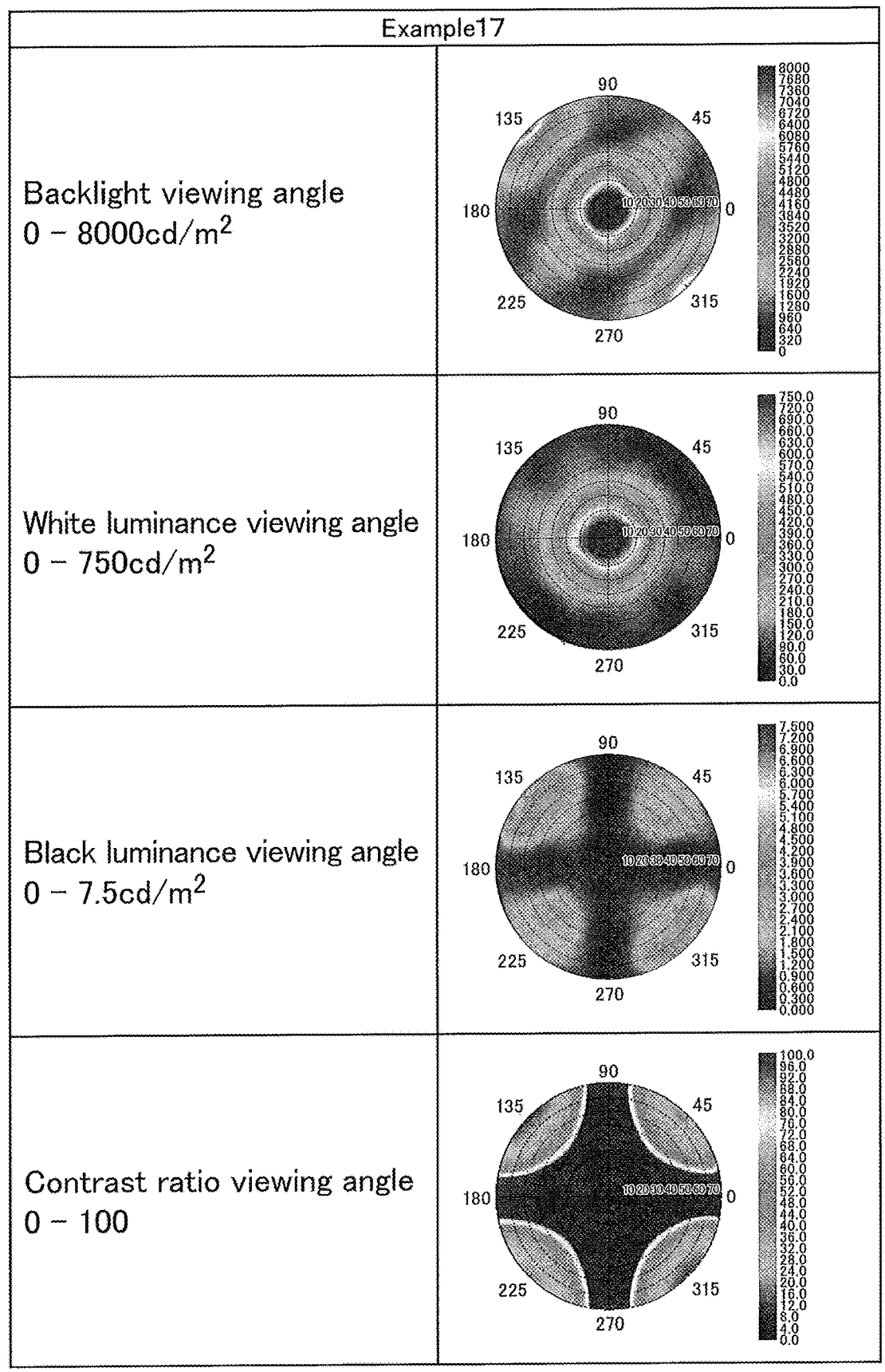
FIG. 32C includes contour plots showing measurement results of the viewing angle characteristics of the liquid crystal display device of Example 17.

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIG. 32C. FIG. 32C includes contour plots showing measurement results of the viewing angle characteristics of the liquid crystal display device of Example 17. As shown in FIGS. 22C and 32C, the same absolute value of the thickness retardation Rth provides the same results between the case of using a negative C plate (Example 10) and the case of using a positive C plate (present example). Setting the angles of the prism sheets such that each side lobe comes to the azimuth at which the polarizing louver dims light is expected to efficiently restrict light leakage of the liquid crystal display device in oblique directions and to improve the contrast ratio in the front direction. The side lobe-occurring azimuths were set to 135° and 45°. Accordingly, the azimuths at which the polarizing louver restricts the amount of light incident on the liquid crystal panel substantially match the side lobe-occurring azimuths as in Examples 1 and 10, whereby an effect of improving the contrast ratio is presumably achieved. In particular, Example 17, in which the total absolute value of the thickness retardation Rth exceeds 400 nm, presumably achieves a large effect of improving the contrast ratio. Unfortunately, in Example 17, a reduction in white luminance and yellowing in oblique directions are presumably observed in comparison to Example 16. Thus, the liquid crystal display device of Example 16 is more suitable to general-purpose liquid crystal display devices required to have a certain viewing angle (e.g., laptop PCs, tablet computers, vehicle-mounted displays, and smartphones). Meanwhile, the liquid crystal display device of Example 17 is more suitable to liquid crystal display devices not required to have a wide viewing angle, such as head-mounted displays (VR displays), and to liquid crystal display devices including a light diffusion film or the like for increasing the viewing angle on the top surface thereof. The applications of the liquid crystal display devices of the examples are not limited to these examples.

Examples 1 to 17 demonstrate that the polarizing plate of each of Examples 1 to 17 can reduce light leakage of a liquid crystal display device in oblique directions in a black display state, and the contrast ratio of the liquid crystal display device in the front direction can be resultantly improved.

Comparative Example 101

A liquid crystal display device of Comparative Example 101 has the structure as shown in FIG. 43A. FIG. 43A is a figure showing the structure of the liquid crystal display device of Comparative Example 101. The present comparative example is the same as Comparative Example 1 except that a viewing angle compensation film is disposed between the liquid crystal panel and the second polarizer. The viewing angle compensation film included a stack including a retarder A having an in-plane retardation R of 115 nm and satisfying NZ=1.2 and a retarder B having an in-plane retardation R of 25 nm and satisfying NZ=−3. The polarizing plate of Comparative Example 101 included a stack sequentially including the retarder B, the retarder A, a second polarizer, and a third polarizer. The slow axes of the retarder A and the retarder B were parallel to each other, and the slow axes of the retarder A and the retarder B were perpendicular to the second absorption axis of the second polarizer.

Calculation results of the transmittance viewing angle characteristics of the polarizing louver in the present comparative example are shown in FIG. 43B. FIG. 43B is a figure showing calculation results of transmittance viewing angles of the polarizing louver of Comparative Example 101 and measurement results of parameters of the liquid crystal display device of Comparative Example 101.

Figure 43C:
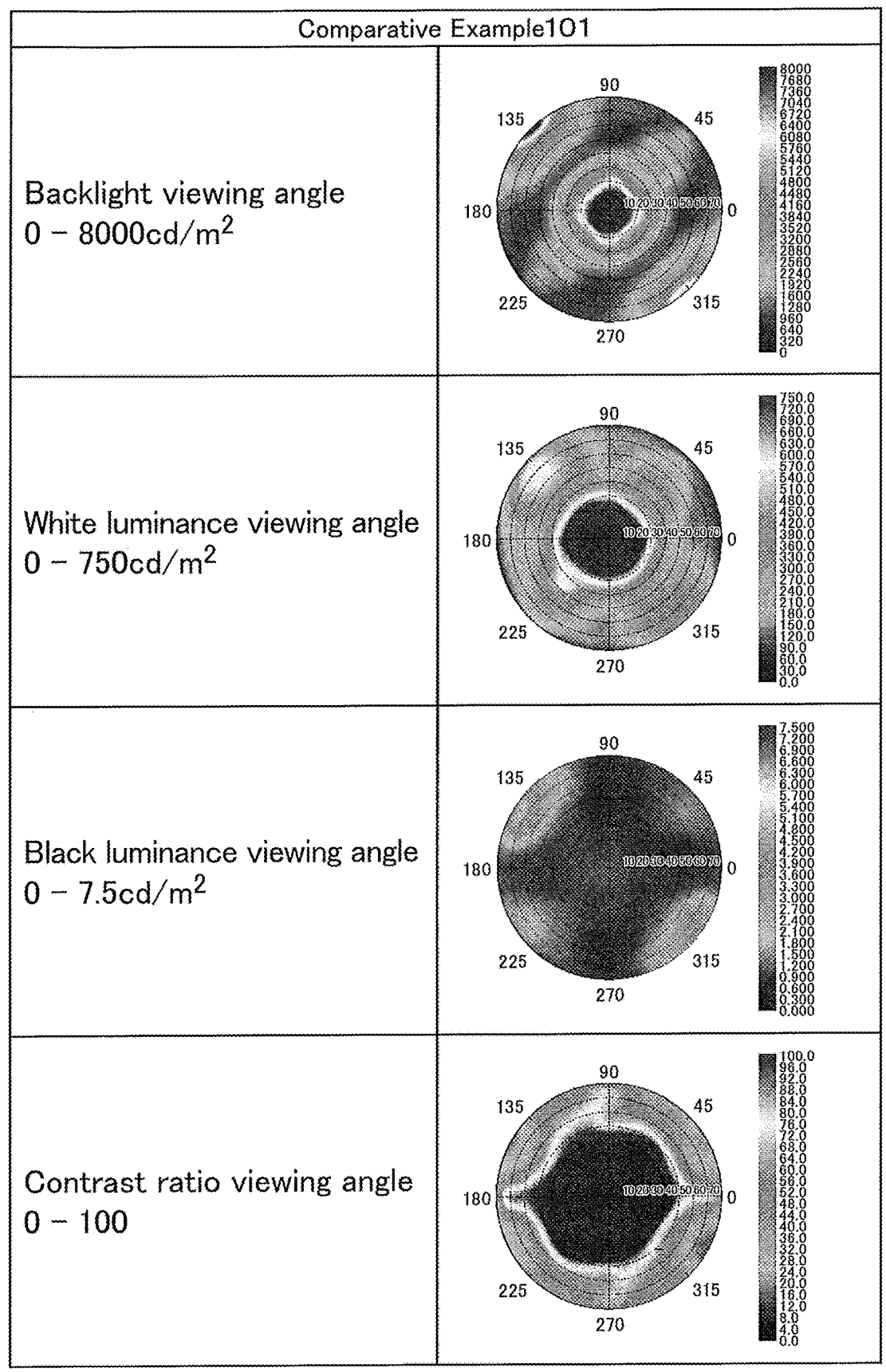
FIG. 43C includes contour plots showing measurement results of the viewing angle characteristics of the liquid crystal display device of Comparative Example 101.

The liquid crystal display device of the present comparative example was actually produced for trial, and parameters such as the contrast ratio in the front direction and the white luminance value in an oblique direction (azimuth 0°, polar angle 60°) were actually determined as in Example 1. The determination results are shown in FIGS. 43B and 43C. FIG. 43C includes contour plots showing measurement results of the viewing angle characteristics of the liquid crystal display device of Comparative Example 101.

In the present comparative example and in the later-described Examples 101, 103, and 109, the front CR improving ratio, the oblique CR improving ratio (azimuth 0°, polar angle 60°), and the oblique CR improving ratio (azimuth 45°, polar angle 60°) each indicate a ratio of the contrast ratio in each example to the contrast ratio in the present comparative example.

Example 101

Figure 44A:
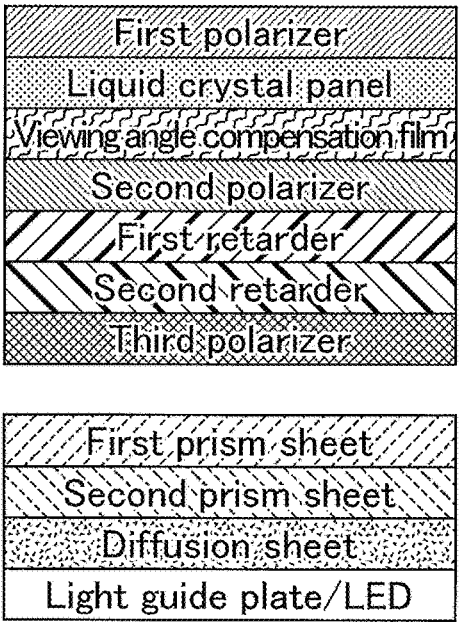
FIG. 44A is a figure showing the structure of a liquid crystal display device and a polarizing plate of Example 101.

A liquid crystal display device and a polarizing plate of Example 101 have the structure as shown in FIG. 44A. FIG. 44A is a figure showing the structure of the liquid crystal display device and the polarizing plate of Example 101. The present example is the same as Example 1 except that the viewing angle compensation film described in Comparative Example 101 was disposed between the liquid crystal panel and the second polarizer. The polarizing plate of Example 101 included a stack sequentially including the retarder B, the retarder A, a second polarizer, a first retarder, a second retarder, and a third polarizer. The slow axes of the retarder A and the retarder B were parallel to each other, and the slow axes of the retarder A and the retarder B were perpendicular to the second absorption axis of the second polarizer.

Calculation results of the transmittance viewing angle characteristics of the polarizing louver of the present example are shown in FIG. 44B. FIG. 44B is a figure showing calculation results of transmittance viewing angles of the polarizing louver of Example 101 and measurement results of parameters of the liquid crystal display device of Example 101.

Figure 44C:
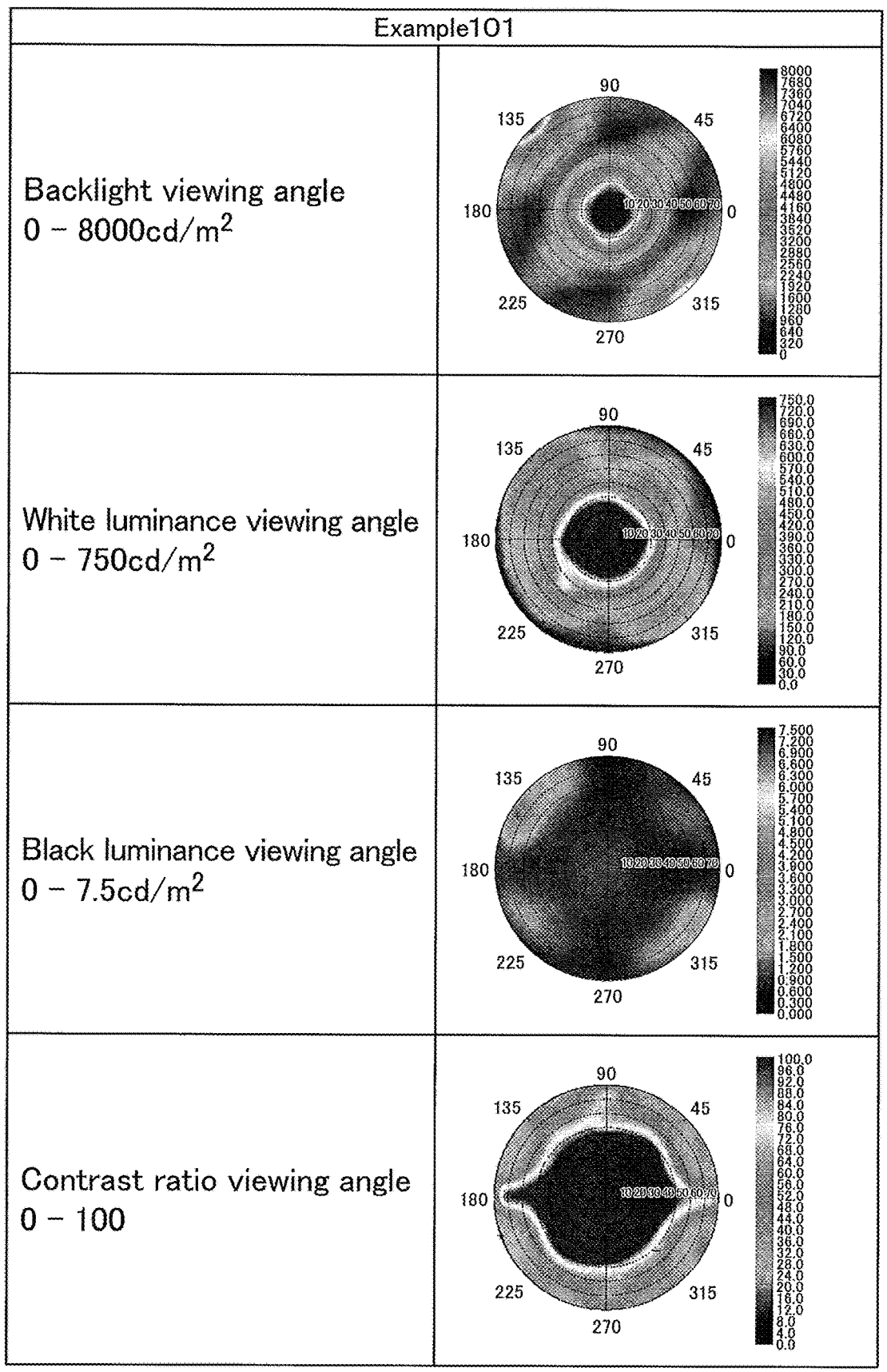
FIG. 44C includes contour plots showing measurement results of the viewing angle characteristics of the liquid crystal display device of Example 101.

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIGS. 44B and 44C. FIG. 44C includes contour plots showing measurement results of the viewing angle characteristics of the liquid crystal display device of Example 101.

Example 103

Figure 45A:
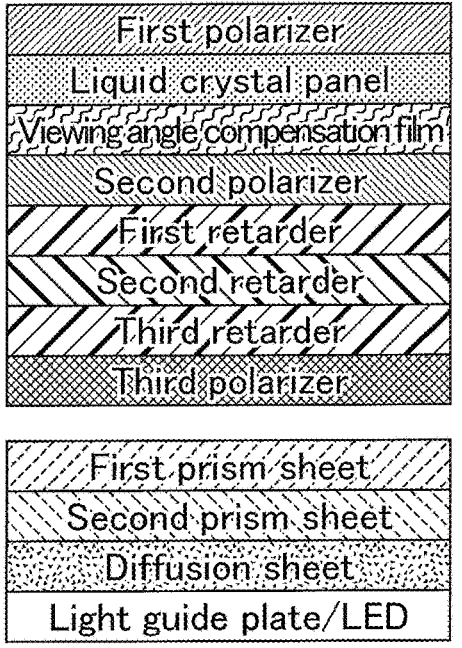
FIG. 45A is a figure showing the structure of a liquid crystal display device and a polarizing plate of Example 103.

A liquid crystal display device and a polarizing plate of Example 103 have the structure as shown in FIG. 45A. FIG. 45A is a figure showing the structure of the liquid crystal display device and the polarizing plate of Example 103. The present example is the same as Example 3 except that the viewing angle compensation film described in Comparative Example 103 was disposed between the liquid crystal panel and the second polarizer. The polarizing plate of Example 101 included a stack sequentially including the retarder B, the retarder A, a second polarizer, a first retarder, a second retarder, a third retarder, and a third polarizer. The slow axes of the retarder A and the retarder B were parallel to each other, and the slow axes of the retarder A and the retarder B were perpendicular to the second absorption axis of the second polarizer.

Calculation results of the transmittance viewing angle characteristics of the polarizing louver of the present example are shown in FIG. 45B. FIG. 45B is a figure showing calculation results of transmittance viewing angles of the polarizing louver of Example 103 and measurement results of parameters of the liquid crystal display device of Example 103.

Figure 45C:
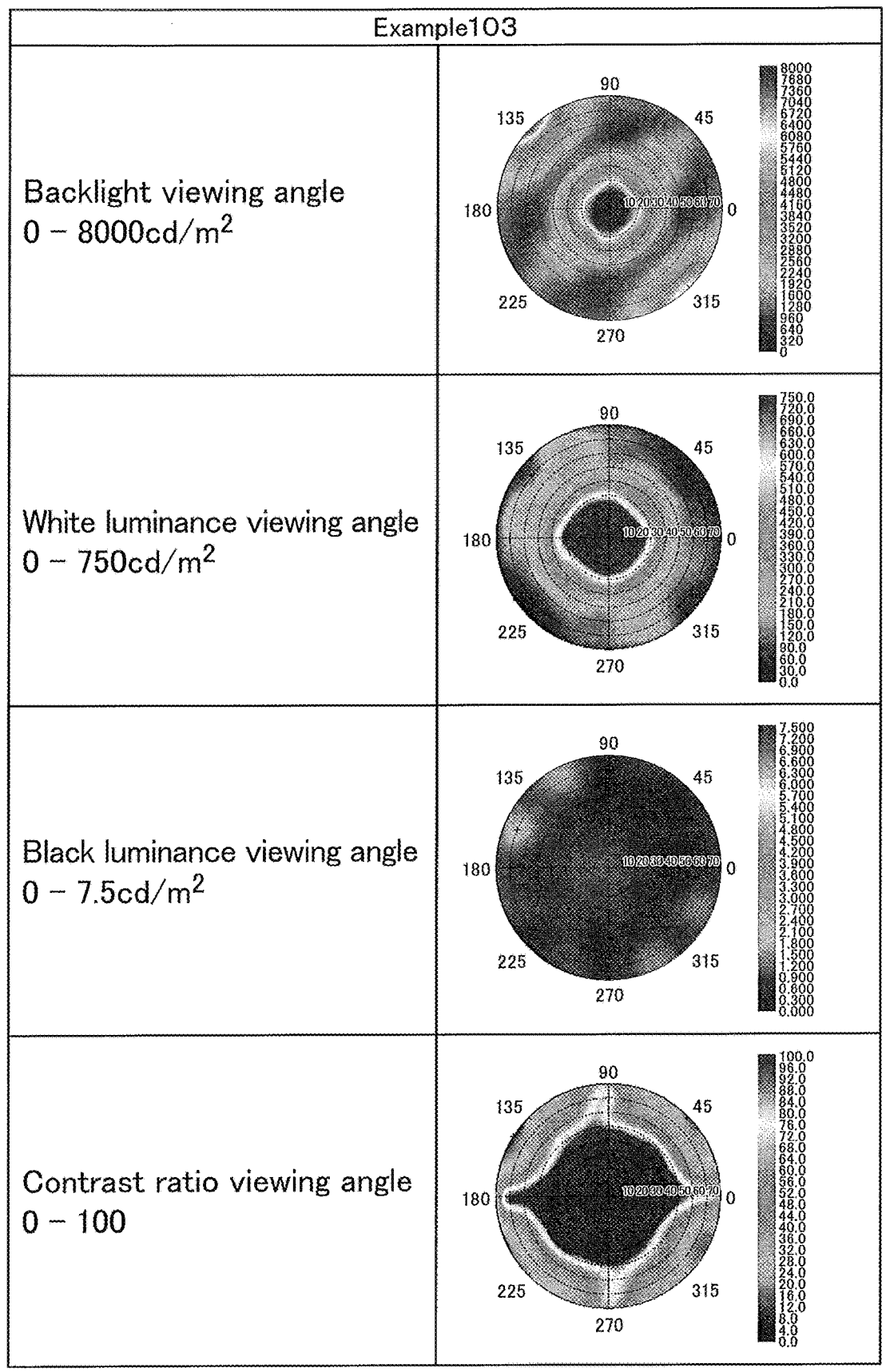
FIG. 45C includes contour plots showing measurement results of the viewing angle characteristics of the liquid crystal display device of Example 103.

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIGS. 45B and 45C. FIG. 45C includes contour plots showing measurement results of the viewing angle characteristics of the liquid crystal display device of Example 103.

Example 109

A liquid crystal display device and a polarizing plate of Example 109 have the structure as shown in FIG. 46A. FIG. 46A is a figure showing the structure of the liquid crystal display device and the polarizing plate of Example 109. The present example is the same as Example 9 except that the viewing angle compensation film described in Comparative Example 101 was disposed between the liquid crystal panel and the second polarizer. The polarizing plate of Example 109 included a stack sequentially including the retarder B, the retarder A, a second polarizer, a first retarder, and a third polarizer. The slow axes of the retarder A and the retarder B were parallel to each other, and the slow axes of the retarder A and the retarder B were perpendicular to the second absorption axis of the second polarizer.

Calculation results of the transmittance viewing angle characteristics of the polarizing louver of the present example are shown in FIG. 46B. FIG. 46B is a figure showing calculation results of transmittance viewing angles of the polarizing louver of Example 109 and measurement results of parameters of the liquid crystal display device of Example 109.

Figure 46C:
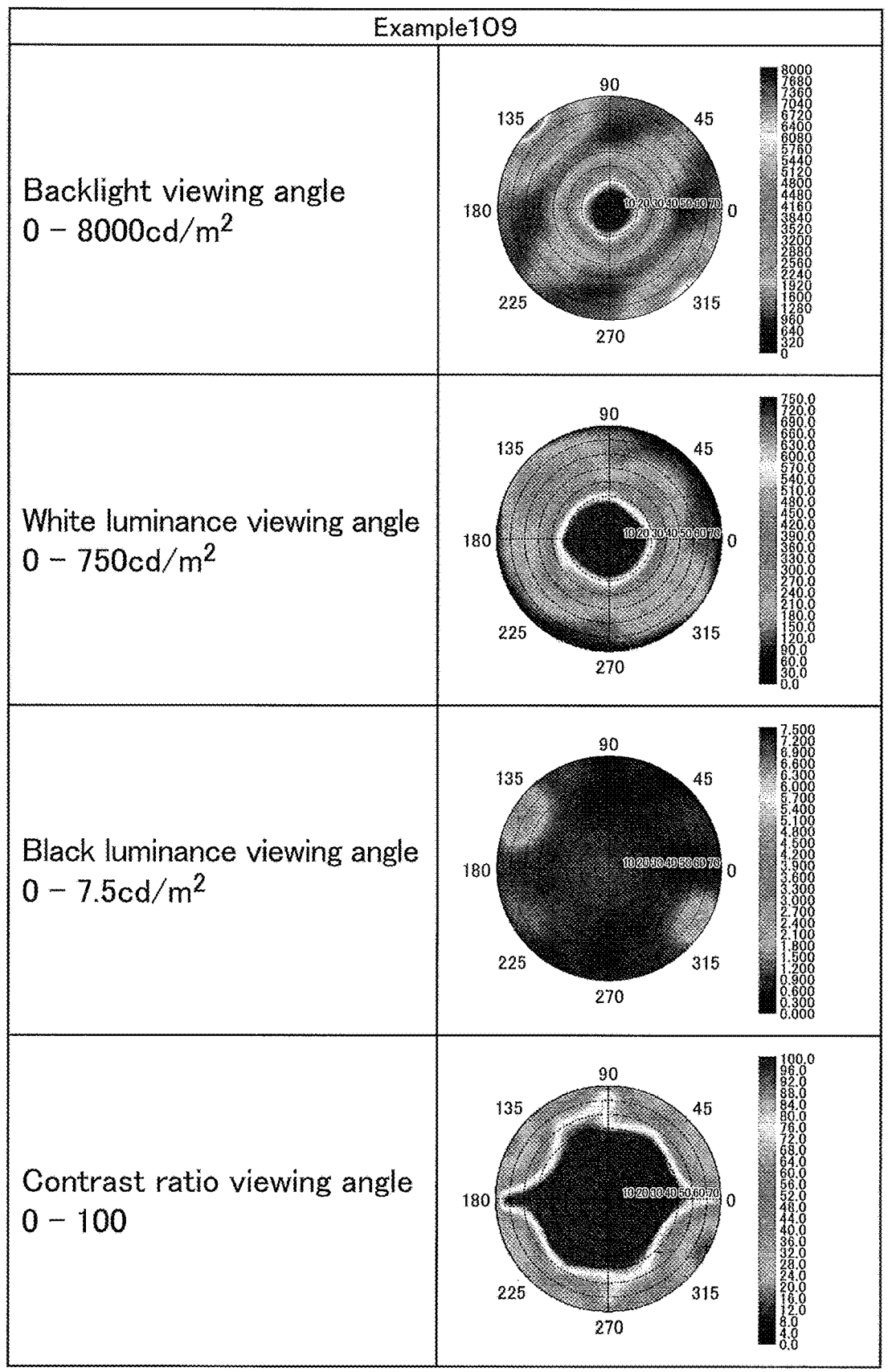
FIG. 46C includes contour plots showing measurement results of the viewing angle characteristics of the liquid crystal display device of Example 109.

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIGS. 46B and 46C. FIG. 46C includes contour plots showing measurement results of the viewing angle characteristics of the liquid crystal display device of Example 109.

In Examples 101, 103, and 109, light leakage in a black display state in oblique directions was reduced and the contrast ratio in the front direction was resultantly improved in comparison to Comparative Example 101. Also, the contrast ratio in an oblique direction at an azimuth of 0° was improved in comparison to Comparative Example 101. Meanwhile, the contrast ratio in an oblique direction at an azimuth of 45° was hardly improved or rather reduced in comparison to Comparative Example 101.

Comparative Example 201

Figure 47A:
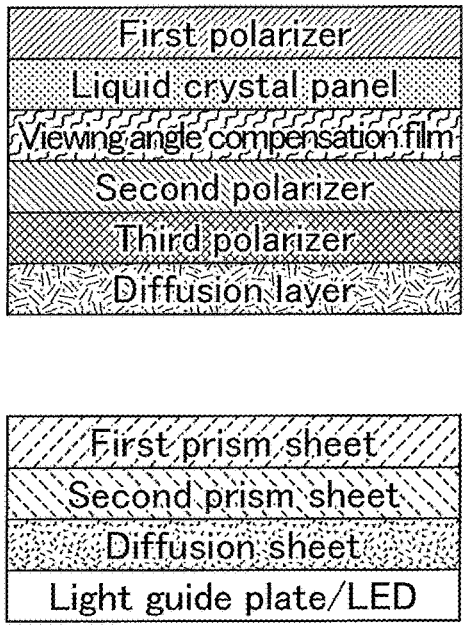
FIG. 47A is a figure showing the structure of a liquid crystal display device of Comparative Example 201.

A liquid crystal display device and a polarizing plate of Comparative Example 201 have the structure as shown in FIG. 47A. FIG. 47A is a figure showing the structure of the liquid crystal display device and the polarizing plate of Comparative Example 201. The present comparative example is the same as Comparative Example 101 except that a diffusion layer was disposed on the backlight side of the third polarizer. The diffusion layer used was prepared by mixing a transparent resin binder with a filler having a refractive index different from the resin binder, forming into a film to provide a diffusion sheet, and attaching the diffusion sheet to the third polarizer with a pressure-sensitive adhesive. In other words, the polarizing plate of Comparative Example 201 included a stack sequentially including the retarder B having an in-plane retardation R of 25 nm and satisfying NZ=−3, the retarder A having an in-plane retardation R of 115 nm and satisfying NZ=1.2, a second polarizer, a third polarizer, and a diffusion sheet. The slow axes of the retarder A and the retarder B were parallel to each other, and the slow axes of the retarder A and the retarder B were perpendicular to the second absorption axis of the second polarizer. The haze of the diffusion sheet was adjusted to 55%.

Calculation results of the transmittance viewing angle characteristics of the polarizing louver in the present comparative example are shown in FIG. 47B. FIG. 47B is a figure showing calculation results of transmittance viewing angles of the polarizing louver of Comparative Example 201 and measurement results of parameters of the liquid crystal display device of Comparative Example 201.

Figure 47C:
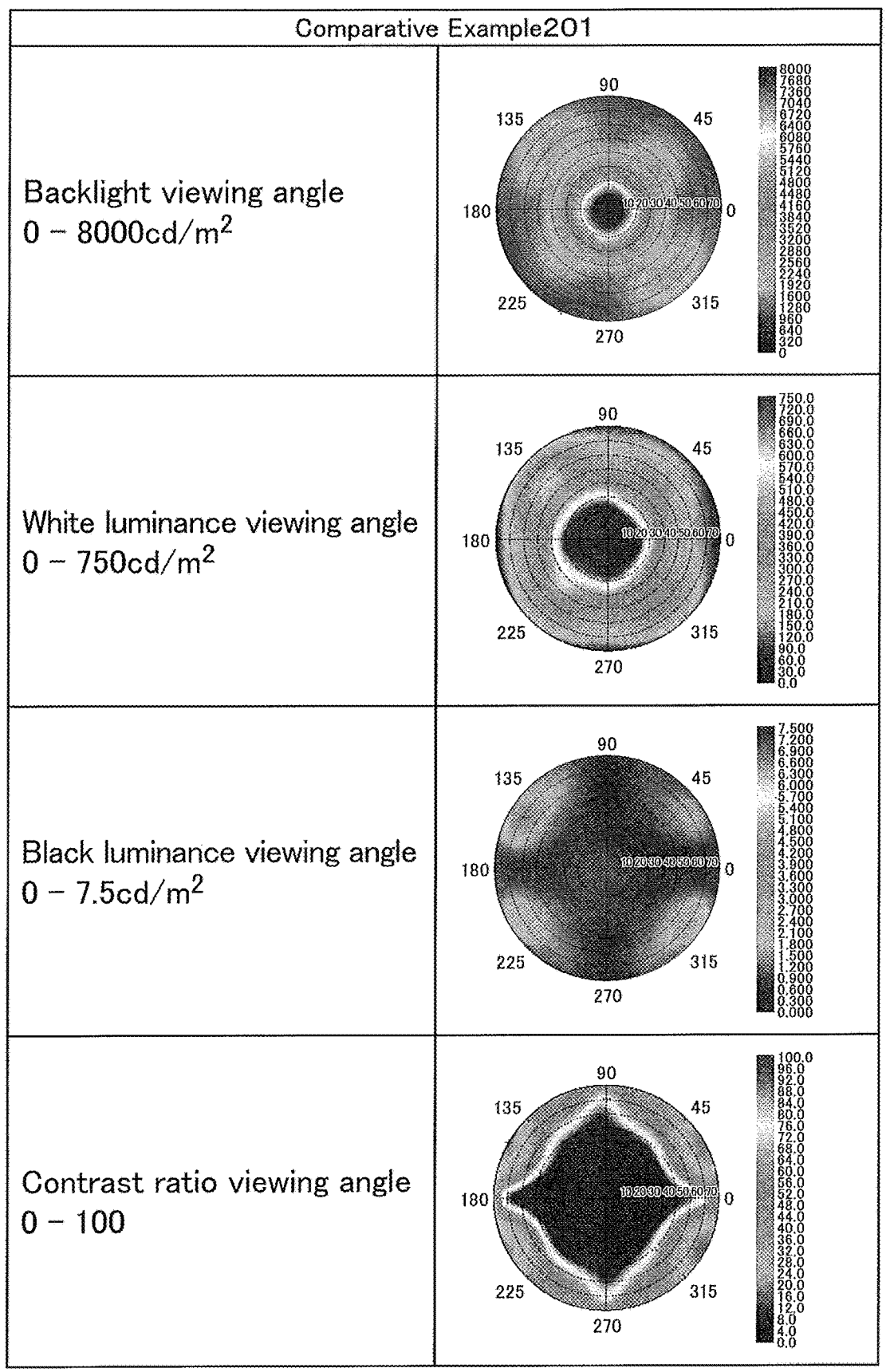
FIG. 47C includes contour plots showing measurement results of the viewing angle characteristics of the liquid crystal display device of Comparative Example 201.

The liquid crystal display device of the present comparative example was actually produced for trial, and parameters such as the contrast ratio in the front direction and the white luminance value in an oblique direction (azimuth 0°, polar angle 60°) were actually determined as in Example 1. The determination results are shown in FIGS. 47B and 47C. FIG. 47C includes contour plots showing measurement results of the viewing angle characteristics of the liquid crystal display device of Comparative Example 201.

In the present comparative example and in the later-described Examples 201, 203, and 209, the front CR improving ratio, the oblique CR improving ratio (azimuth 0°, polar angle 60°), and the oblique CR improving ratio (azimuth 45°, polar angle 60°) each indicate a ratio of the contrast ratio in each example to the contrast ratio in the present comparative example.

Example 201

Figure 48A:
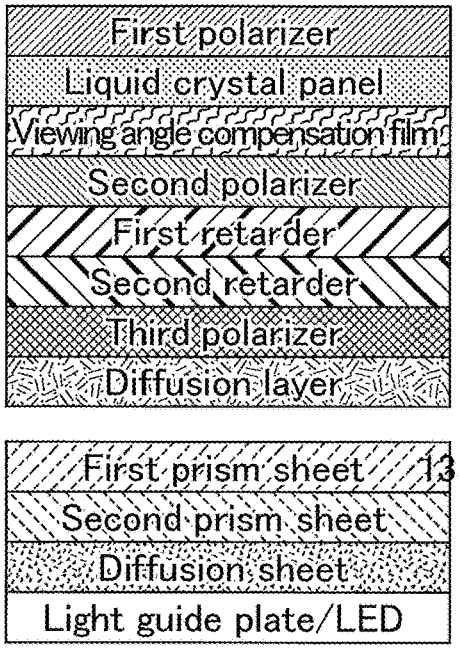
FIG. 48A is a figure showing the structure of a liquid crystal display device and a polarizing plate of Example 201.

A liquid crystal display device and a polarizing plate of Example 201 have the structure as shown in FIG. 48A. FIG. 48A is a figure showing the structure of the liquid crystal display device and the polarizing plate of Example 201. The present example is the same as Example 101 except that the diffusion layer described in Comparative Example 201 was disposed on the backlight side of the third polarizer. The polarizing plate of Example 201 included a stack sequentially including the retarder B, the retarder A, a second polarizer, a first retarder, a second retarder, a third polarizer, and a diffusion sheet. The slow axes of the retarder A and the retarder B were parallel to each other, and the slow axes of the retarder A and the retarder B were perpendicular to the second absorption axis of the second polarizer.

Calculation results of the transmittance viewing angle characteristics of the polarizing louver of the present example are shown in FIG. 48B. FIG. 48B is a figure showing calculation results of transmittance viewing angles of the polarizing louver of Example 201 and measurement results of parameters of the liquid crystal display device of Example 201.

Figure 48C:
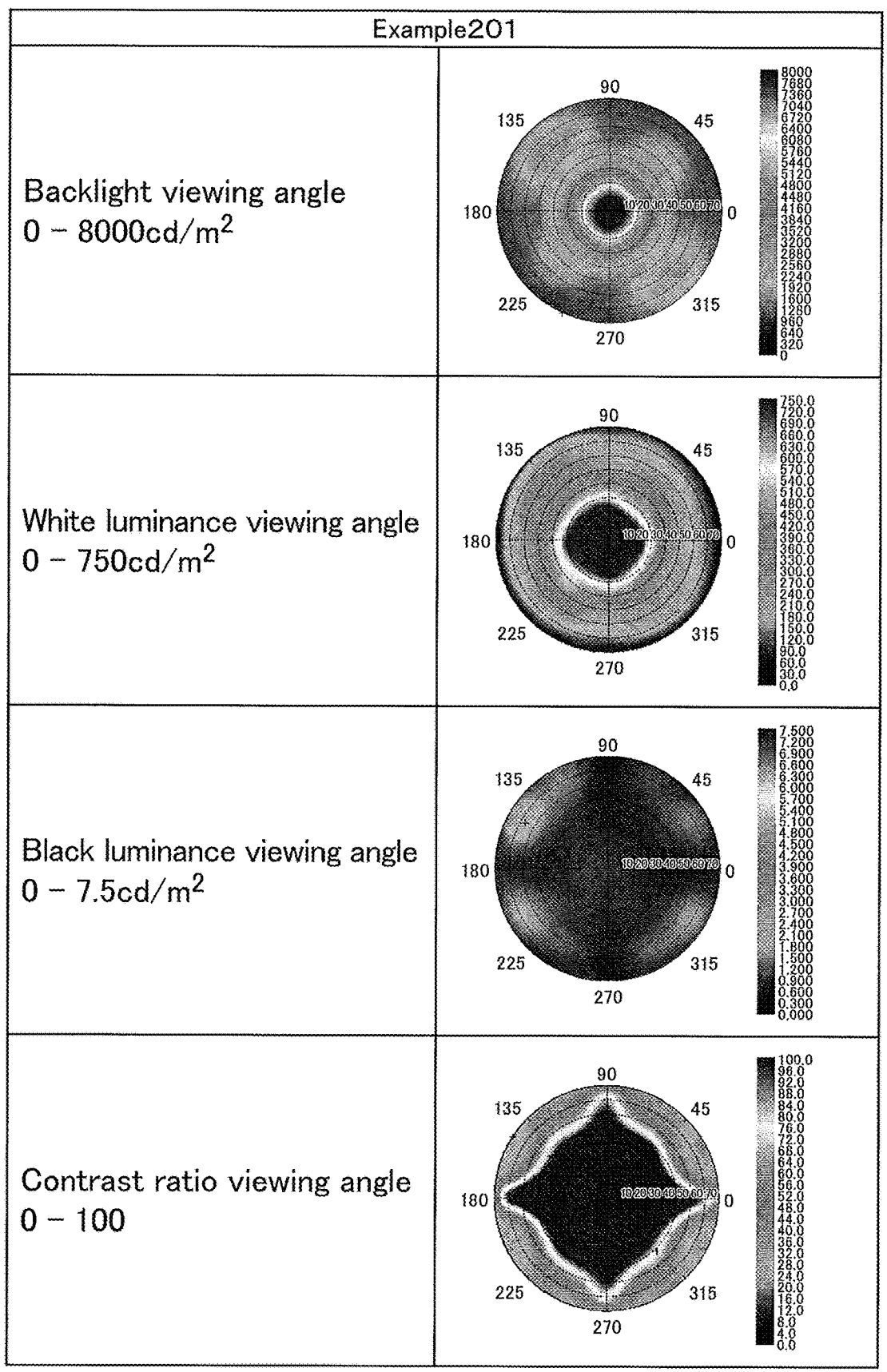
FIG. 48C includes contour plots showing measurement results of the viewing angle characteristics of the liquid crystal display device of Example 201.

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIGS. 48B and 48C. FIG. 48C includes contour plots showing measurement results of the viewing angle characteristics of the liquid crystal display device of Example 201.

Example 203

Figure 49A:
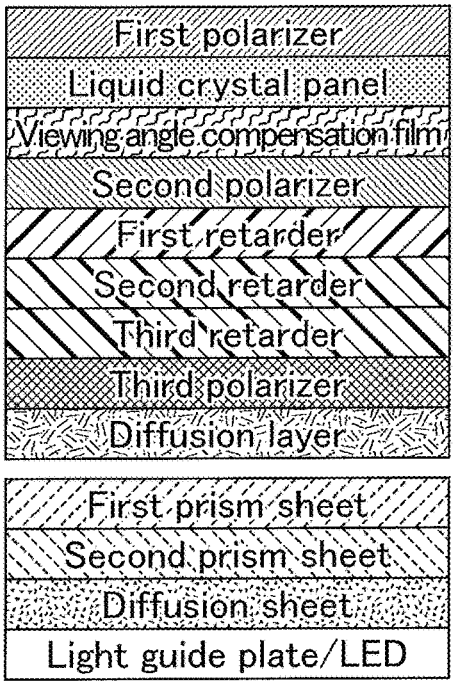
FIG. 49A is a figure showing the structure of a liquid crystal display device and a polarizing plate of Example 203.

A liquid crystal display device and a polarizing plate of Example 203 have the structure as shown in FIG. 49A. FIG. 49A is a figure showing the structure of the liquid crystal display device and the polarizing plate of Example 203. The present example is the same as Example 103 except that the diffusion layer described in Comparative Example 201 was disposed on the backlight side of the third polarizer. The polarizing plate of Example 203 included a stack sequentially including the retarder B, the retarder A, a second polarizer, a first retarder, a second retarder, a third retarder, a third polarizer, and a diffusion sheet. The slow axes of the retarder A and the retarder B were parallel to each other, and the slow axes of the retarder A and the retarder B were perpendicular to the second absorption axis of the second polarizer.

Calculation results of the transmittance viewing angle characteristics of the polarizing louver of the present example are shown in FIG. 49B. FIG. 49B is a figure showing calculation results of transmittance viewing angles of the polarizing louver of Example 203 and measurement results of parameters of the liquid crystal display device of Example 203.

Figure 49C:
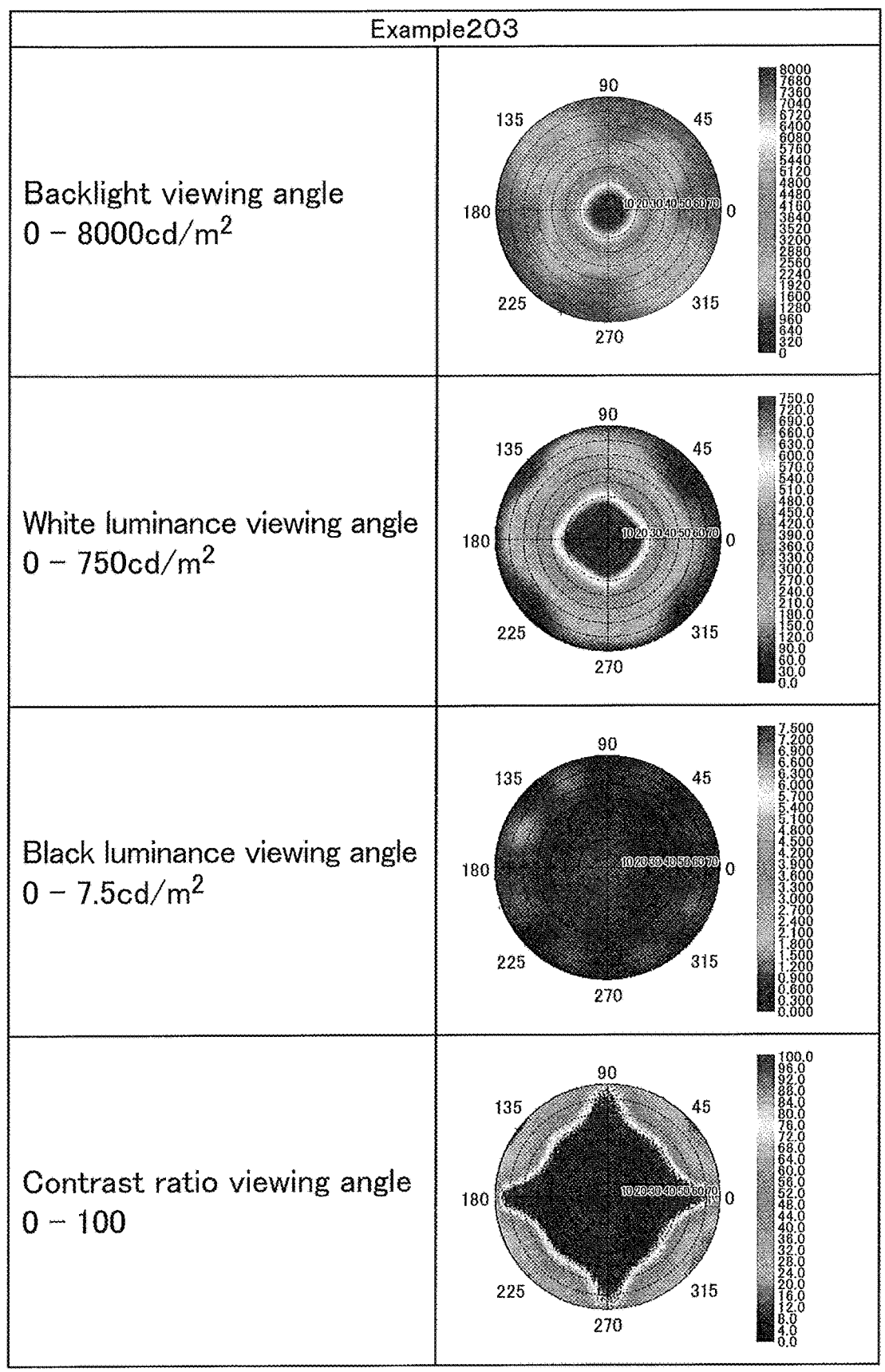
FIG. 49C includes contour plots showing measurement results of the viewing angle characteristics of the liquid crystal display device of Example 203.

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIGS. 49B and 49C. FIG. 49C includes contour plots showing measurement results of the viewing angle characteristics of the liquid crystal display device of Example 203.

Example 209

Figure 50A:
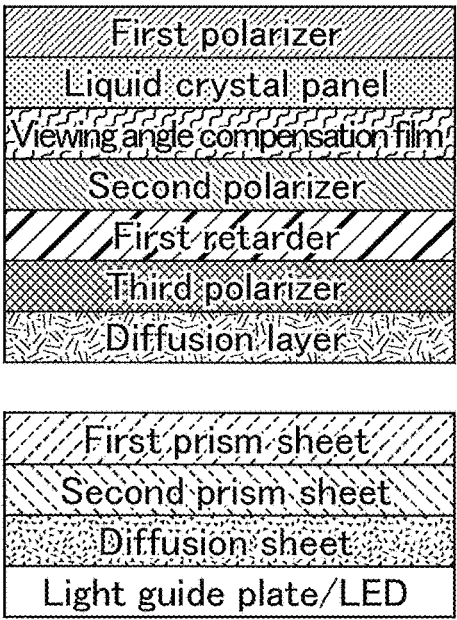
FIG. 50A is a figure showing the structure of a liquid crystal display device and a polarizing plate of Example 209.

A liquid crystal display device and a polarizing plate of Example 209 have the structure as shown in FIG. 50A. FIG. 50A is a figure showing the structure of the liquid crystal display device and the polarizing plate of Example 209. The present example is the same as Example 109 except that the diffusion layer described in Comparative Example 201 was disposed on the backlight side of the third polarizer. The polarizing plate of Example 209 included a stack sequentially including the retarder B, the retarder A, a second polarizer, a first retarder, a third polarizer, and a diffusion sheet. The slow axes of the retarder A and the retarder B were parallel to each other, and the slow axes of the retarder A and the retarder B were perpendicular to the second absorption axis of the second polarizer.

Calculation results of the transmittance viewing angle characteristics of the polarizing louver of the present example are shown in FIG. 50B. FIG. 50B is a figure showing calculation results of transmittance viewing angles of the polarizing louver of Example 209 and measurement results of parameters of the liquid crystal display device of Example 209.

Figure 50C:
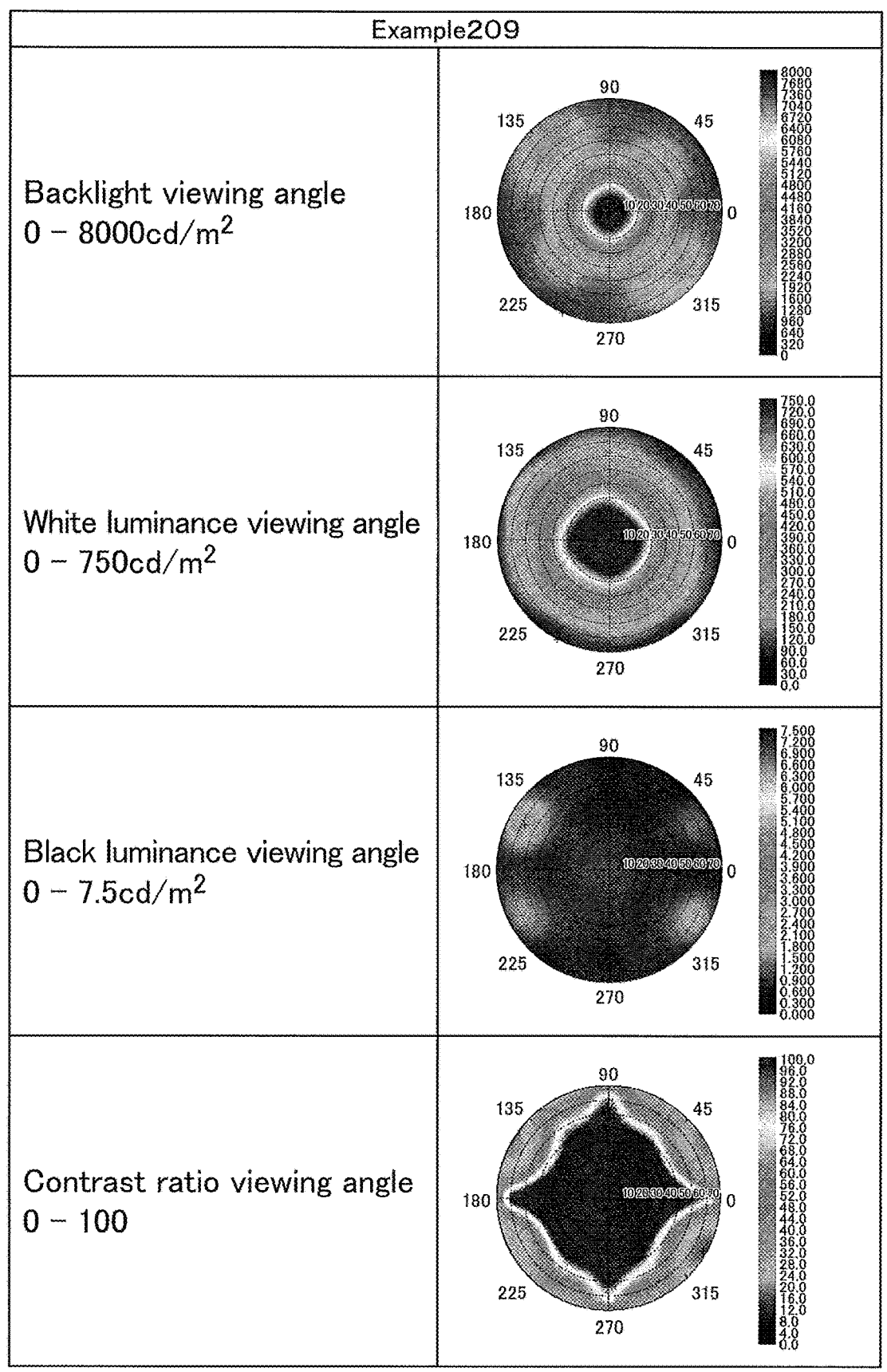
FIG. 50C includes contour plots showing measurement results of the viewing angle characteristics of the liquid crystal display device of Example 209.
Figure 51:
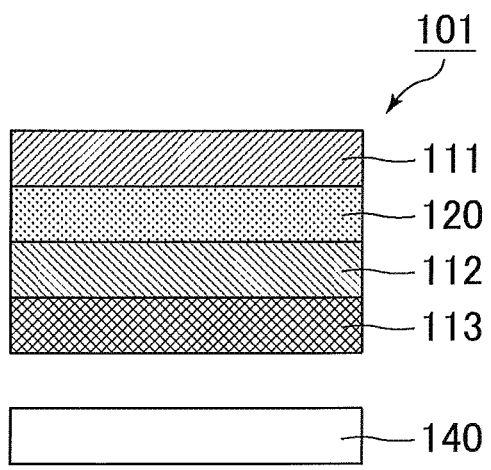
FIG. 51 is a schematic cross-sectional view of a liquid crystal display device of Comparative Embodiment 1.
Figure 52:
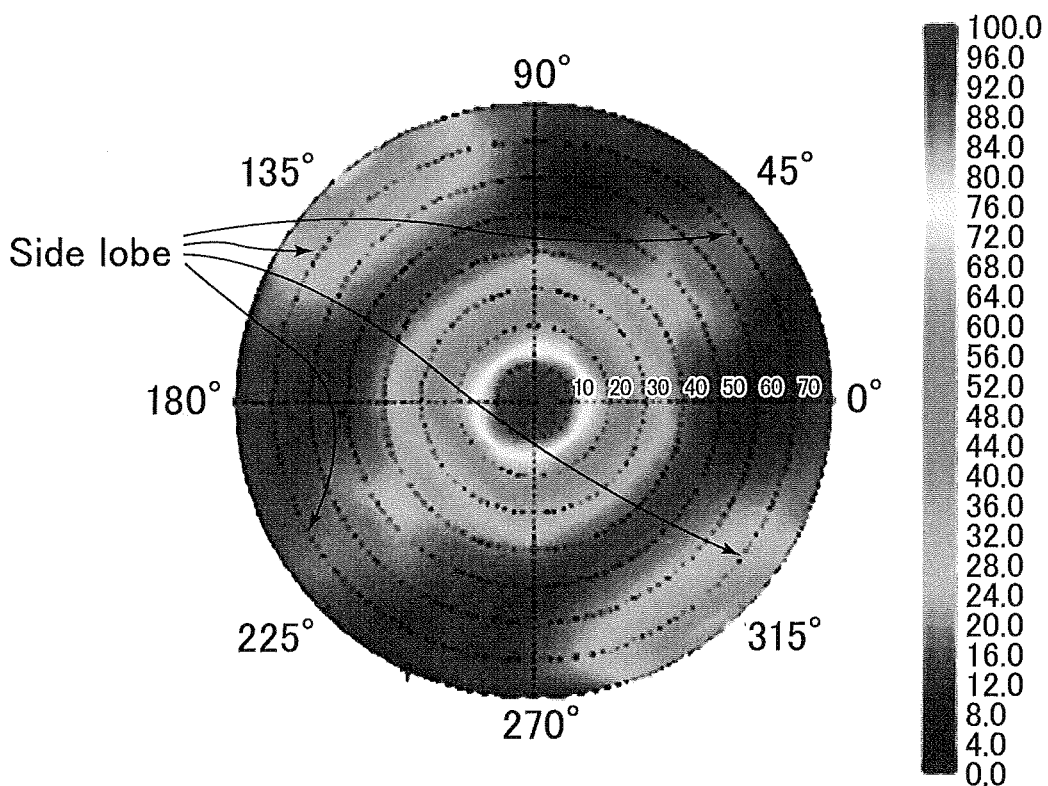
FIG. 52 is a contour plot showing measurement results of the backlight viewing angles of the liquid crystal display device of Comparative Embodiment 1.
Figure 53:
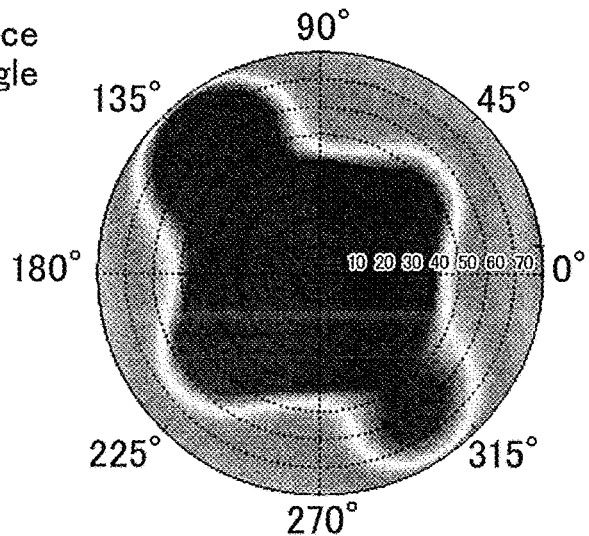
FIG. 53 includes contour plots showing measurement results of viewing angle characteristics of the liquid crystal display device of Comparative Embodiment 1. The upper plot shows white luminance viewing angles, the middle plot shows black luminance viewing angles, and the lower plot shows contrast ratio viewing angles.
Figure 53:
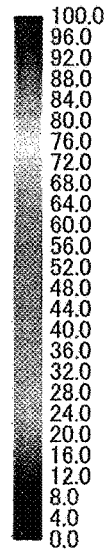
Figure 53:
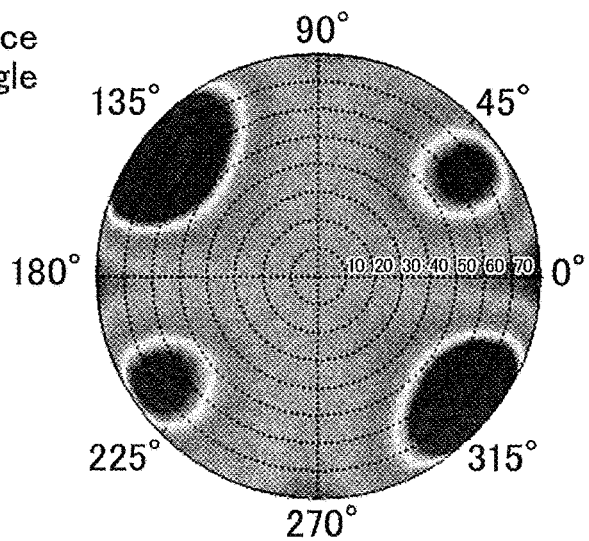
Figure 53:
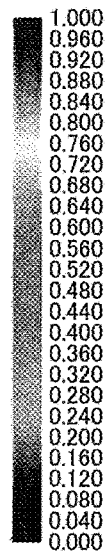
Figure 53:
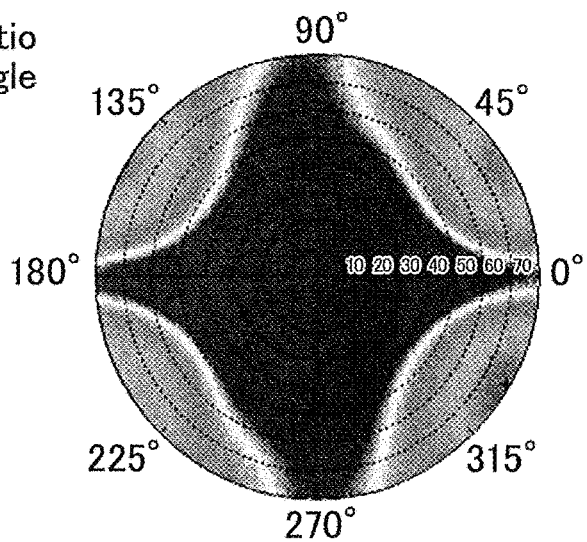
Figure 53:
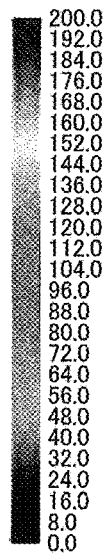

The liquid crystal display device of the present example was actually produced for trial, and parameters such as the contrast ratio in the front direction and the white luminance value in an oblique direction (azimuth 0°, polar angle 60°) were actually determined as in Example 1. The determination results are shown in FIGS. 50B and 50C. FIG. 50C includes contour plots showing measurement results of the viewing angle characteristics of the liquid crystal display device of Example 209.

In Examples 201, 203, and 209, light leakage in a black display state in oblique directions was reduced and the contrast ratio in the front direction was resultantly improved in comparison to Comparative Example 201. Also, the contrast ratio in an oblique direction at an azimuth of 0° was improved in comparison to Comparative Example 101. Furthermore, the contrast ratio in an oblique direction at an azimuth of 45° was also improved in comparison to Comparative Example 101. Thus, addition of a diffusion layer provides an effect of improving the contrast ratio at all azimuths.

The diffusion sheet as a diffusion layer may be replaced by an anti-glare layer formed on the side without the retarder of the third polarizer by a typical method or an adhesive diffusion layer disposed between the third polarizer and the second polarizer. Similar characteristics to Examples 201, 203, and 209 may be achieved even in these cases.

Also, the diffusion sheet as a diffusion layer may be independently disposed between the third polarizer 13 and the backlight 40. Similar characteristics to Examples 201, 203, and 209 may be achieved even in this case.

REFERENCE SIGNS LIST 1, 2, 3, 4, 5, 6: liquid crystal display device
11: first polarizer
12: second polarizer
13: third polarizer
20: liquid crystal panel
30, 50: retarder
31a, 31b, 31c, 51b: first retarder
32b, 32c, 52b: second retarder
33c: third retarder
40: backlight
41: first prism sheet
41a: first ridge line
41b: uneven portion
41c: first flat portion
42: second prism sheet
42a: second ridge line
42b: second uneven portion
42c: second flat portion
43: diffusion sheet
44: light source unit
44a: light guide plate
44b: light source
51, 52, 53, 54, 55, 56: polarizing plate
60: viewing angle compensation film
70: diffusion layer

What is claimed is:

1. A laminate comprising:
a pair of polarizers including a first polarizer and a second polarizer transmission axes of which are parallel to each other;
a retarder between the pair of polarizers;
a diffusion layer directly on a side without the retarder of the first polarizer; and
a viewing angle compensation film directly on a side of the second polarizer opposite the retarder, wherein
the retarder includes an in-plane slow axis that forms an angle of 40° or greater and 50° or smaller with the transmission axis of the first polarizer.

2. The laminate according to claim 1,
wherein the retarder has reverse wavelength dispersion characteristics.

3. The laminate according to claim 1,
wherein a total absolute value of a thickness retardation between the pair of polarizers is less than 400 nm.

4. The laminate according to claim 3,
wherein the total absolute value of the thickness retardation between the pair of polarizers is 120 nm or more.

5. The laminate according to claim 1,
wherein a total absolute value of a thickness retardation between the pair of polarizers is 400 nm or more.

6. The laminate according to claim 5,
wherein the total absolute value of the thickness retardation between the pair of polarizers is 600 nm or less.

7. The laminate according to claim 1,
wherein the retarder has a biaxial order parameter NZ satisfying $0.9 \leq NZ \leq 10$.

8. The laminate according to claim 1,
wherein the retarder has a biaxial order parameter NZ satisfying $10 \leq NZ$.

9. The laminate according to claim 1,
wherein the retarder includes a plurality of the retarders.

10. The laminate according to claim 1,
wherein the viewing angle compensation film includes one retarder satisfying $0 < NZ < 1$ or a combination of at least one retarder satisfying $NZ \geq 1$ and at least one retarder satisfying $NZ \leq 0$.

11. A laminate comprising:
a pair of polarizers including a first polarizer and a second polarizer transmission axes of which are parallel to each other;
retarders having reverse wavelength dispersion characteristics between the pair of polarizers;
a diffusion layer directly on a side without the retarders of the first polarizer; and
a viewing angle compensation film directly on a side of the second polarizer opposite the retarders, wherein
the retarders include a first retarder and a second retarder, and
a biaxial order parameter NZ of the first retarder satisfies $-11 < NZ \leq -0.9$ and a biaxial order parameter NZ of the second retarder satisfies $10 \leq NZ$.

12. The laminate according to claim 11,
wherein the viewing angle compensation film includes one retarder satisfying $0 < NZ < 1$ or a combination of at least one retarder satisfying $NZ \geq 1$ and at least one retarder satisfying $NZ \leq 0$.

13. A laminate comprising:
a pair of polarizers including a first polarizer and a second polarizer transmission axes of which are not parallel to each other;
a retarder between the pair of polarizers;
a diffusion layer directly on a side without the retarder of the first polarizer; and
a viewing angle compensation film directly on a side of the second polarizer opposite the retarder, wherein
a first transmission axis of the first polarizer and a second transmission axis of the second polarizer form an angle of 30° or greater and 70° or smaller.

14. The laminate according to claim 13,
wherein a total absolute value of a thickness retardation between the pair of polarizers is less than 400 nm.

15. The laminate according to claim 14,
wherein the total absolute value of the thickness retardation between the pair of polarizers is 120 nm or more.

16. The laminate according to claim 13,
wherein a total absolute value of a thickness retardation between the pair of polarizers is 400 nm or more.

17. The laminate according to claim 16,
wherein the total absolute value of the thickness retardation between the pair of polarizers is 600 nm or less.

18. The laminate according to claim 13,
wherein the retarder has reverse wavelength dispersion characteristics.

19. The laminate according to claim 13,
wherein the retarder includes a plurality of the retarders,
the retarders include a retarder having a biaxial order parameter NZ satisfying $0.9 \leq NZ < 10$ and a retarder having a biaxial order parameter NZ satisfying $10 \leq NZ$, and
the retarder satisfying $0.9 \leq NZ < 10$ includes an in-plane slow axis that forms an angle of $-5°$ or greater and $+5°$ or smaller with an azimuth that halves an angle between the transmission axes of the pair of polarizers.

20. The laminate according to claim 13,
wherein the viewing angle compensation film includes one retarder satisfying $0 < NZ < 1$ or a combination of at least one retarder satisfying $NZ \geq 1$ and at least one retarder satisfying $NZ \leq 0$.

* * * * *